(12) United States Patent
Berrera et al.

(10) Patent No.: US 12,497,621 B2
(45) Date of Patent: *Dec. 16, 2025

(54) OLIGONUCLEOTIDES FOR MODULATING RTEL1 EXPRESSION

(71) Applicant: Hoffmann-La Roche Inc., Little Falls, NJ (US)

(72) Inventors: Marco Berrera, Flueh (CH); Josephine Felber, Basel (CH); Jean-Christophe Hoflack, Saint-Louis (FR); Susanne Kammler, Holte (DK); Tony Kam-Thong, Basel (CH); Brian Leonard, Riehen (CH); Lykke Pedersen, Copenhagen NV (DK); Philipp Tropberger, Loerrach (DE); Miriam Triyatni, Basel (CH); Daniel Jeremy Turley, Basel (CH); Angelina Wallier, Flueh (CH); Jitao David Zhang, Riehen (CH)

(73) Assignee: Hoffmann-La Roche Inc., Little Falls, NJ (US)

( * ) Notice: Subject to any disclaimer, the term of this patent is extended or adjusted under 35 U.S.C. 154(b) by 1109 days.

This patent is subject to a terminal disclaimer.

(21) Appl. No.: 17/147,797

(22) Filed: Jan. 13, 2021

(65) Prior Publication Data
US 2021/0147850 A1    May 20, 2021

Related U.S. Application Data

(63) Continuation of application No. PCT/EP2019/068639, filed on Jul. 11, 2019.

(30) Foreign Application Priority Data

Jul. 13, 2018   (EP) .................................... 18183477

(51) Int. Cl.
*C12N 15/113*   (2010.01)
*A61P 31/20*   (2006.01)

(52) U.S. Cl.
CPC .......... *C12N 15/1137* (2013.01); *A61P 31/20* (2018.01); *C12N 2310/11* (2013.01); *C12N 2310/315* (2013.01); *C12N 2310/3231* (2013.01); *C12N 2310/3341* (2013.01); *C12N 2310/341* (2013.01); *C12N 2310/351* (2013.01)

(58) Field of Classification Search
CPC ............ C12N 15/1137; C12N 2310/11; C12N 2310/315; C12N 2310/3231; A61P 31/20; A61P 31/12
See application file for complete search history.

(56) References Cited

U.S. PATENT DOCUMENTS

| | | | |
|---|---|---|---|
| 5,885,968 A | 3/1999 | Biessen et al. | |
| 8,372,968 B2 | 2/2013 | Tuschl et al. | |
| 8,513,207 B2 | 8/2013 | Brown | |
| 8,883,996 B2 | 11/2014 | Rossi et al. | |
| 8,927,513 B2 | 1/2015 | Manoharan et al. | |
| 8,927,705 B2 | 1/2015 | Brown | |
| 9,012,138 B2 | 4/2015 | Tuschl et al. | |
| 9,012,621 B2 | 4/2015 | Tuschl et al. | |
| 9,029,524 B2* | 5/2015 | Han .................. | C12N 15/113 536/24.5 |
| 9,193,753 B2 | 11/2015 | Tuschl et al. | |
| 9,856,472 B2* | 1/2018 | Pierce .................. | C12N 15/111 |
| 2004/0162249 A1 | 8/2004 | Liang et al. | |
| 2007/0254362 A1 | 11/2007 | Quay et al. | |
| 2008/0274462 A1 | 11/2008 | Jeon et al. | |
| 2009/0099115 A1 | 4/2009 | McSwiggen et al. | |
| 2011/0294869 A1 | 12/2011 | Petersen | |
| 2017/0112898 A1 | 4/2017 | Liu | |
| 2017/0204125 A1 | 7/2017 | Chen et al. | |

FOREIGN PATENT DOCUMENTS

| | | | |
|---|---|---|---|
| EP | 2742135 A1 | 6/2014 | |
| WO | WO-1998/039352 A1 | 9/1998 | |
| WO | WO-1999/014226 A2 | 3/1999 | |
| WO | WO-00/47599 A1 | 8/2000 | |
| WO | WO-2000/66604 A2 | 11/2000 | |
| WO | WO-2001/23613 A1 | 4/2001 | |
| WO | WO-2004/046160 A2 | 6/2004 | |
| WO | WO-2004/083430 A2 | 9/2004 | |
| WO | WO-2005/014806 A2 | 2/2005 | |
| WO | WO-2006/066080 A1 | 6/2006 | |
| WO | WO-2007/085485 A2 | 8/2007 | |
| WO | WO-2007/090071 A2 | 8/2007 | |
| WO | WO-2007/094818 A2 | 8/2007 | |

(Continued)

OTHER PUBLICATIONS

Wu, Zhuochao, et al. "RTEL1 is upregulated in colorectal cancer and promotes tumor progression." Pathology-Research and Practice 252 (2023): 154958. (Year: 2023).*
Porreca, Rosa M., et al. "Human RTEL1 stabilizes long G-overhangs allowing telomerase-dependent over-extension." Nucleic Acids Research 46.9 (2018): 4533-4545. (Year: 2018).*
GenBank1 (GenBank1) *Homo sapiens* regulator of telomere elongation helicase 1 (RTEL1), RefSeqGene on chromosome 20, https://www.ncbi.nlm.nih.gov/nuccore/574997045?sat=46&satkey=74532466, May 8, 2017) (Year: 2017).*

(Continued)

*Primary Examiner* — Ekaterina Poliakova-Georgantas
*Assistant Examiner* — John Charles McKillop
(74) *Attorney, Agent, or Firm* — Clark & Elbing LLP; Thomas J. Takara

(57) ABSTRACT

Compositions of the disclosure include RTEL1 inhibitors for use in treatment of an HBV infection, in particular a chronic HBV infection, which may destabilize cccDNA, such as HBV cccDNA. Also provided are antisense oligonucleotides which are complementary to RTEL1 and capable of reducing a RTEL1 mRNA.

8 Claims, 7 Drawing Sheets

Specification includes a Sequence Listing.

(56) References Cited

FOREIGN PATENT DOCUMENTS

| | | |
|---|---|---|
| WO | WO-2007/107162 A2 | 9/2007 |
| WO | WO-2007/134181 A2 | 11/2007 |
| WO | WO-2007/146511 A2 | 12/2007 |
| WO | WO-2008/049085 A1 | 4/2008 |
| WO | WO-2008/113832 A2 | 9/2008 |
| WO | WO-2008/150729 A2 | 12/2008 |
| WO | WO-2008/154401 A2 | 12/2008 |
| WO | WO-2009/006478 A2 | 1/2009 |
| WO | WO-2009/058014 A2 | 5/2009 |
| WO | WO-2009/067647 A1 | 5/2009 |
| WO | WO-2010/033225 A2 | 3/2010 |
| WO | WO-2010/036698 A1 | 4/2010 |
| WO | WO-2010/077578 A1 | 7/2010 |
| WO | WO-2011/017521 A2 | 2/2011 |
| WO | WO-2011/133871 A2 | 10/2011 |
| WO | WO-2011/156202 A1 | 12/2011 |
| WO | WO-2012/024170 A2 | 2/2012 |
| WO | WO-2012/055362 A1 | 5/2012 |
| WO | WO-2012/109395 A1 | 8/2012 |
| WO | WO-2012/145697 A1 | 10/2012 |
| WO | WO-2013/003520 A1 | 1/2013 |
| WO | WO-2013/022966 A1 | 2/2013 |
| WO | WO-2013/154798 A1 | 10/2013 |
| WO | WO-2013/159109 A1 | 10/2013 |
| WO | WO-2013/173635 A1 | 11/2013 |
| WO | WO-2014/031487 A1 | 2/2014 |
| WO | WO-2014/032176 A1 | 3/2014 |
| WO | WO-2014/033176 A1 | 3/2014 |
| WO | WO-2014/076195 A1 | 5/2014 |
| WO | WO-2014/076196 A1 | 5/2014 |
| WO | WO-2014/088920 A1 | 6/2014 |
| WO | WO-2014/179620 A1 | 11/2014 |
| WO | WO-2014/179627 A2 | 11/2014 |
| WO | WO-2014/179629 A2 | 11/2014 |
| WO | WO-2014/187856 A1 | 11/2014 |
| WO | WO-2014/205105 A1 | 12/2014 |
| WO | WO-2014/207232 A1 | 12/2014 |
| WO | WO-2015/000371 A1 | 1/2015 |
| WO | WO-2015/132276 A1 | 9/2015 |
| WO | WO-2015/173208 A2 | 11/2015 |
| WO | WO-2015/188197 A2 | 12/2015 |
| WO | WO-2016/011080 A2 | 1/2016 |
| WO | WO-2016/055553 A1 | 4/2016 |
| WO | WO-2016/055601 A1 | 4/2016 |
| WO | WO-2016/073990 A2 | 5/2016 |
| WO | WO-2016/077321 A1 | 5/2016 |
| WO | WO-2016/091698 A1 | 6/2016 |
| WO | WO-2016/100401 A1 | 6/2016 |
| WO | WO-2016/141092 A1 | 9/2016 |
| WO | WO-2016/146598 A1 | 9/2016 |
| WO | WO-2017/017865 A1 | 2/2017 |
| WO | WO-2017/120527 A2 | 7/2017 |
| WO | WO-2017/157899 A1 | 9/2017 |
| WO | WO-2017/178656 A1 | 10/2017 |
| WO | WO-2017/211791 A1 | 12/2017 |
| WO | WO-2017/216390 A1 | 12/2017 |
| WO | WO-2018/098328 A1 | 5/2018 |
| WO | WO-2018/222910 A1 | 12/2018 |
| WO | WO-2019/076842 A1 | 4/2019 |
| WO | WO-2019/079781 A1 | 4/2019 |
| WO | WO-2019/137201 A1 | 7/2019 |
| WO | WO-2019/138057 A1 | 7/2019 |
| WO | WO-2019/141723 A1 | 7/2019 |
| WO | WO-2019/193165 A1 | 10/2019 |
| WO | WO-2019/233921 A1 | 12/2019 |
| WO | WO-2020/011902 A1 | 1/2020 |
| WO | WO-2020/191207 A1 | 9/2020 |
| WO | WO-2021/122735 A1 | 6/2021 |
| WO | WO-2021/122869 A1 | 6/2021 |
| WO | WO-2021/130266 A1 | 7/2021 |
| WO | WO-2021/178612 A1 | 9/2021 |
| WO | WO-2021/198958 A1 | 10/2021 |
| WO | WO-2022/029209 A1 | 2/2022 |

OTHER PUBLICATIONS

GenBank2, *Homo sapiens* regulator of telomere elongation helicase 1 (RTEL1), transcript variant 3, mRNA, https://www.ncbi.nlm.nih.gov/nuccore/545688899?sat=46&satkey=62249183, Mar. 29, 2017) (Year: 2017).*

Takedachi, A., et al. "SLX4 interacts with RTEL1 to prevent transcription-mediated DNA replication perturbations." Nature structural & molecular biology 27.5 (2020): 438-449. (Year: 2020).*

Vannier, Jean-Baptiste, et al. "RTEL1 dismantles T loops and counteracts telomeric G4-DNA to maintain telomere integrity." Cell 149.4 (2012): 795-806. (Year: 2012).*

Lu et al., 2008, "Efficient siRNA selection using hybridization thermodynamics" Nucleic Acids Research, 36(3), p. 640-647 (Year: 2008).*

Wang et al., 2022, "Developing predictive hybridization models for phosphorothioate oligonucleotides using high-resolution melting" PLOS ONE, 17(5), e0268575 (Year: 2022).*

Cheung, Vivian G., and RicharCheung, Vivian G., and Richard S. Spielman. "The genetics of variation in gene expression." Nature genetics 32.4 (2002): 522-525.d S. Spielman. "The genetics of variation in gene expression." Nature genetics 32.4 (2002): 522-525.*

Warner, Katherine Deigan, Christine E. Hajdin, and Kevin M. Weeks. "Principles for targeting RNA with drug-like small molecules." Nature reviews Drug discovery 17.8 (2018): 547-558. (Year: 2018).*

Hentze, Matthias W et al. "A brave new world of RNA-binding proteins." Nature reviews. Molecular cell biology vol. 19,5 (2018): 327-341. doi: 10.1038/nrm.2017.130 (Year: 2018).*

Eurogentec (Eurogentec, https://www.eurogentec.com/en/custom-sirna-duplexes, retrieved Apr. 25, 2024). (Year: 2024).*

Holen, Torgeir, et al. "Similar behaviour of single-strand and double-strand siRNAs suggests they act through a common RNAi pathway." Nucleic Acids Research 31.9 (2003): 2401-2407. (Year: 2003).*

GenBank2, Accession NM_001283009, *Homo sapiens* regulator of telomere elongation helicase 1 (RTEL1), transcript variant 3, mRNA, https://www.ncbi.nlm.nih.gov/nuccore/545688899?sat=46&satkey=62249183, Mar. 29, 2017, retrieved Apr. 22, 2024, printed as p. 1/5-5/5. (Year: 2017).*

Pushparaj, P. N., et al. "siRNA, miRNA, and shRNA: in vivo applications." Journal of dental research 87.11 (2008): 992-1003. (Year: 2008).*

Elsner, Markus. "Single-stranded siRNAs for in vivo gene silencing." Nature biotechnology 30.11 (2012): 1063-1063. (Year: 2012).*

Fisher, Chris. "Recent insights into the control of human papillomavirus (HPV) genome stability, loss, and degradation." Journal of clinical medicine 4.2 (2015): 204-230. (Year: 2015).*

GenBank1, Accession NG_033901, *Homo sapiens* regulator of telomere elongation helicase 1 (RTEL1), RefSeqGene on chromosome 20, https://www.ncbi.nlm.nih.gov/nuccore/574997045?sat=46&satkey=74532466, May 8, 2017, retrieved Apr. 22, 2024, printed as p. 1/20-20/20. (Year: 2017).*

Babushok et al., "Disrupted lymphocyte homeostasis in hepatitis-associated acquired aplastic anemia is associated with short telomeres," Am J Hematol. 91(2): 243-7 (2016).

Dodson et al., "Chapter 6: Dyskeratosis Congenita and the Telomere Biology Disorders," *Bone Marrow Failure.* G.M Kupfer et al. Springer, Cham. 111-135 (2018).

Edwards et al., "DNA Damage Repair Genes Controlling Human Papillomavirus (HPV) Episome Levels under Conditions of Stability and Extreme Instability," PLoS One. 8(10):e75406 (2013) (16 pages).

Frizzell et al., "RTEL1 Inhibits Trinucleotide Repeat Expansions and Fragility," Cell Rep. 6(5):827-35 (2014).

Hagedorn et al., "Locked Nucleic Acid: Modality, Diversity, and Drug Discovery" Drug Discov Today. 23(1):101-14 (2018).

Kaur et al., "Perspectives on Chemistry and Therapeutic Applications of Locked Nucleic Acid (LNA)," Chem Rev. 107(11):4672-97 (2007).

(56) References Cited

OTHER PUBLICATIONS

Locarnini et al., "Molecular genetics of HBV infection," Antivir Ther. 15 Suppl 3:3-14 (2010).
Nassal, "HBV cccDNA: Viral Persistence Reservoir and Key Obstacle for a Cure of Chronic Hepatitis B," Gut. 64(12):1972-84 (2015).
Porreca et al, "Human RTEL1 stabilizes long G-overhangs allowing telomerase-dependent over-extension," Nucleic Acids Res. 46(9):4533-45 (2018).
Schertzer et al., "Human regulator of telomere elongation helicase 1 (RTEL1) is required for the nuclear and cytoplasmic trafficking of pre-U2 RNA," Nucleic Acids Res. 43(3):1834-47 (2015).
Speckmann et al., "Clinical and Molecular Heterogeneity of RTEL1 Deficiency," Front Immunol. 8:449 (2017) (19 pages).
Vannier et al., "RTEL1: Functions of a Disease-Associated Helicase," Trends Cell Biol. 24(7):416-25 (2014).
International Search Report and Written Opinion for International Patent Application No. PCT/EP2019/068639, mailed Oct. 9, 2019 (16 pages).
Derksen et al., "Illegitimate WNT signaling promotes proliferation of multiple myeloma cells," PNAS 101(16):6122-6127, Apr. 20, 2004.
Dirks, "Brain tumor stem cells: Bringing order to the chaos of brain cancer," J Clin Oncology 26(17):2916-2924 (2008).
López-Lázaro, "The migration ability of stem cells can explain the existence of cancer of unknown primary site. Rethinking metastasis." Oncoscience 2(5):467-475 (2015).
Mabey, "Epidemiology of sexually transmitted infections: worldwide," Medicine 42(6):287-290 (2014).
Tran et al., "Survival comparison between glioblastoma multiforme and other incurable cancers," J Clin Neurosci. 17(4):417-421 (2010).
Office Action for Russian Patent Application No. 2021102269, dated Mar. 7, 2023 (11 pages).
Abe et al., "Dumbbell-Shaped Nanocircular RNAs for RNA Interference," J Am Chem Soc. 129(49):15108-9 (2007).
Agarwal et al., "Antiviral activity, pharmacokinetics, and safety of the second-generation hepatitis B core inhibitor ABI-H2158 in a phase 1b study of patients with HBeAg positive chronic hepatitis B infection," EASL Digital International Liver Conference, Aug. 27-29, 2020 (1 page).
Allen et al., "Ansel Pharmaceutical Dosage Forms and Drug Delivery Systems," Lippincott Williams & Wilkins. (2004) (4 pages).
Ansel et al., *Pharmaceutical Dosage Forms and Drug Delivery Systems, Sixth Edition.* Williams & Wilkins. 105-116 and 194-200 (1995) (41 pages).
Antao et al., "A Thermodynamic Study of Unusually Stable RNA and DNA hairpins," Nucleic Acids Res. 19(21):5901-5 (1991).
Bastin et al., "Salt selection and optimisation procedures for pharmaceutical new chemical entities," Org Process Res Dev 4(5):427-35 (2000).
Bergstrom, "Unnatural Nucleosides with Unusual Base Pairing Properties," Curr Protoc Nucleic Acid Chem. Chapter 1(Unit 1.4):1.4.1-1.4.32 (2009) (32 pages).
Biessen et al., "Receptor-dependent Cell Specific Delivery of Antisense Oligonucleotides," Cardiovascular Specific Gene Expression. Kluwer Academic Publishers. 285-300 (1999) (16 pages).
Biessen et al., "Synthesis of Cluster Galactosides with High Affinity for the Hepatic Asialoglycoprotein Receptor," J Med Chem. 38(9):1538-1546 (1995).
Blaising et al., "Combination Treatment of Liver-Targeted HBV Locked Nucleic Acid Antisense Oligonucleotide and TLR7 Agonist RO7020531 Leads to Prolonged Off-Treatment Antiviral Effect in the AAV-HBV Mouse Model," Hepatology. 70(Suppl. 1):428A-429A Abstract 687 (Oct. 2019).
Blaising et al., "Combination treatment of liver-targeted HBV locked nucleic acid antisense oligonucleotide and TLR7 agonist RO7020531 leads to a prolonged off-treatment anti-viral effect in the AAV-HBV mouse model," Conference Reports for NATAP—The Liver Meeting, Nov. 8-12, Boston, Massachusetts (Nov. 2019) (5 pages).

Bramsen et al., "A large-scale chemical modification screen identifies design rules to generate siRNAs with high activity, high stability and low toxicity," Nucleic Acids Res. 37(9):2867-81 (2009).
Bramsen et al., "Development of therapeutic-grade small interfering RNAs by chemical engineering," Front Genet. 3:154 (2012) (22 pages).
Bramsen et al., "Improved silencing properties using small internally segmented interfering RNAs," Nucleic Acids Res. 35(17):5886-97 (2007).
Chang et al., "Asymmetric Shorter-duplex siRNA Structures Trigger Efficient Gene Silencing With Reduced Nonspecific Effects," Mol Ther. 17(4):725-32 (2009).
Chang, "Hepatitis B virus infection," Semin Fetal Neonatal Med. 12(3):160-7 (2007).
Cheong et al., "Solution structure of an unusually stable RNA hairpin, 5'GGAC(UUCG)GUCC," Nature. 346(6285):680-2 (1990).
Cornish-Bowden, "Nomenclature for incompletely specified bases in nucleic acid sequences: recommendations 1984," Nucleic Acids Res. 13(9):3021-30 (1985).
Deleavey et al., "Designing Chemically Modified Oligonucleotides for Targeted Gene Silencing," Chem Biol. 19(8):937-54 (2012).
Dellinger et al., "Solid-Phase Chemical Synthesis of Phosphonoacetate and Thiophosphonoacetate Oligodeoxynucleotides," J Am Chem Soc. 125(4):940-50 (2003).
Duff et al., "Intrabody Tissue-Specific Delivery of Antisense Conjugates in Animals: Ligand-Linker-Antisense Oligomer Conjugates," Methods Enzymol. 313:297-321 (2000).
Elsner, "Single-stranded siRNAs for in vivo gene silencing," Nat Biotechnol. 30(11):1063 (2012) (1 page).
Fanning et al., "Therapeutic strategies for hepatitis B virus infection: towards a cure," Nat Rev Drug Discov. 18(11):827-44 (Nov. 2019).
Freier et al., "The ups and downs of nucleic acid duplex stability: structure-stability studies on chemically-modified DNA:RNA duplexes," Nucleic Acids Res. 25(22):4429-43 (1997).
Gane et al., "A Phase 1, Double-Blind, Randomised, Placebo-Controlled, First-in-Human Study of the Safety, Tolerability, Pharmacokinetics and Pharmacodynamics of oral JNJ-64794964, a Toll-like Receptor-7 Agonist, in Healthy Adults," Presented at EASL The International Liver Congress, Apr. 10-24, Vienna, Austria, DOI: 10.3252/pso.eu.ILC2019.2019 (2019) (1 page).
Geretti et al., "Liver-directed Targeting of PD-L1 with RO7191863, a Locked Nucleic Acid, in Chronic Hepatitis B: First Report of Phase 1 Tolerability, Pharmacokinetics, and Pharmacodynamics," The Liver Meeting Digital Experience, American Association for the study of Liver Disease (AASLD), National Aids Treatment Advocacy Project, Nov. 12-16, Virtual (2019).
Guo et al., "The recombined cccDNA produced using minicircle technology mimicked HBV genome in structure and function closely," Sci Rep. 6:25552 (2016) (10 pages).
Hamilton et al., "Two classes of short interfering RNA in RNA silencing," EMBO J. 21(17):4671-79 (2002).
Hansen et al., "Entropy Titration. A Calorimetric Method for the Determination of deltaG° (K), deltaH° and deltaS°¹," Chemical Communications. 3:36-38 (1965).
He et al., "Construction and Identification of Therapeutic Double-Plasmid HBV DNA Vaccine," Med J Chin PLA. 28(6):493-6 (2003) (5 pages) (English abstract).
Heermann et al., "Large Surface Proteins of Hepatitis B Virus Containing the Pre-s Sequence," Journal of Virology. 52(2):396-402 (1984) (7 pages).
Heus et al., "Structural Features that Give Rise to the Unusual Stability of RNA Hairpins Containing GNRA Loops," Science. 253(5016):191-4 (1991) (5 pages).
Hirao et al., "Natural versus Artificial Creation of Base Pairs in DNA: Origin of Nucleobases from the Perspectives of Unnatural Base Pair Studies," Acc Chem Res. 45(12):2055-65 (2012).
Hohjoh, "Enhancement of RNAi activity by improved siRNA duplexes," FEBS Lett. 557(1-3):193-8 (2004).
Holdgate et al., "Measurements of binding thermodynamics in drug discovery," Drug Discov Today. 10(22):1543-50 (2005) (8 pages).

(56) References Cited

OTHER PUBLICATIONS

Hu et al., "Identification, Synthesis, and Strategy for Minimization of Potential Impurities in the Preclinical Anti-HBV Drug Y101," Org Process Res Dev. 17(9):1156-1167 (2013).
Hu et al., "Process development of clinical anti-HBV drug Y101: identification and synthesis of novel impurities," Res Chem Intermed. 42:2577-95 (2016).
Huang et al., "Preclinical Profile and Characterization of the Hepatitis B Virus Core Protein Inhibitor ABI-H0731," Antimicrob Agents Chemother. 64(11):e01463-20 (Nov. 2020) (18 pages).
Huch et al., "In vitro expansion of single Lgr5+ liver stem cells induced by Wnt-driven regeneration," available in PMC Aug. 14, 2013, published in final edited form as: Nature. 494(7436):247-250 (2013) (10 pages).
Imanishi et al., "BNAs: novel nucleic acid analogs with a bridged sugar moiety," Chem Commun (Camb). (16):1653-9 (2002).
Javanbakht et al., "Liver-Targeted Anti-HBV Single-Stranded Oligonucleotides with Locked Nucleic Acid Potently Reduce HBV Gene Expression In Vivo," Mol Ther Nucleic Acids. 11:441-54 (Jun. 2018).
Ji et al., "XIAP Limits Autophagic Degradation of Sox2 and Is A Therapeutic Target in Nasopharyngeal Carcinoma Stem Cells," Theranostics. 8(6):1494-510 (Feb. 2018).
Kakuni et al., "Chimeric Mice with Humanized Livers: A Unique Tool for in Vivo and in Vitro Enzyme Induction Studies," Int J Mol Sci. 15(1):58-74 (2014).
Khorev et al., "Trivalent, Gal/GalNAc-containing ligands designed for the asialoglycoprotein receptor," Bioorg Med Chem. 16(9):5216-31 (2008).
Koshkin et al., "LNA (Locked Nucleic Acids): Synthesis of the Adenine, Cytosine, Guanine, 5-Methylcytosine, Thymine and Uracil Bicyclonucleoside Monomers, Oligomerisation, and Unprecedented Nucleic Acid Recognition," Tetrahedron. 54(14):3607-30 (26 pages) (1998).
Kraynack et al., "Small interfering RNAs containing full 2'-O-methylribonucleotide-modified sense strands display Argonaute2/eIF2C2-dependent activity," RNA. 12(1):163-76 (15 pages) (2006).
Li et al., "A novel Smac mimetic APG-1387 demonstrates potent antitumor activity in nasopharyngeal carcinoma cells by inducing apoptosis," Cancer Lett. 381(1):14-22 (2016).
Liu et al., "A pharmacokinetic study on a novel anti-HBV agent imidol hydrochloride in rats," Int J Pharm. 461(1-2):514-18 (2014).
Liu et al., "Targeting cIAPs, a New Option for Functional Cure of Chronic Hepatitis B Infection?" Virol Sin. 33(5):459-61 (Oct. 2018).
Loakes et al., "3-Nitropyrrole and 5-nitroindole as universal bases in primers for DNA sequencing and PCR," Nucleic Acids Research. 23(13):2361-6 (1995).
Loakes et al., "5-Nitroindole as an universal base analogue," Nucleic Acids Res. 22(20):4039-43 (1994).
Lopatin et al., "Safety, pharmacokinetics and pharmacodynamics of GS-9620, an oral Toll-like receptor 7 agonist," Antivir Ther. 18(3):409-18 (2013).
Mackman et al., "Discovery of GS-9688 (Selgantolimod) as a Potent and Selective Oral Toll-Like Receptor 8 Agonist for the Treatment of Chronic Hepatitis B," J Med Chem. 63(18):10188-10203 (May 14, 2020) (3 pages) (Abstract only).
Martin et al., "TG1050, an immunotherapeutic to treat chronic hepatitis B, induces robust T cells and exerts an antiviral effect in HBV-persistent mice," Gut. 64(12):1961-1971 (2015).
Matsui et al., "Argonaute 2-dependent Regulation of Gene Expression by Single-stranded miRNA Mimics," Mol Ther. 24(5):946-955 (2016).
Mctigue et al., "Sequence-Dependent Thermodynamic Parameters for Locked Nucleic Acid (LNA)—DNA Duplex Formation," Biochemistry. 43(18):5388-405 (2004) (18 pages).
Meade et al., "Efficient delivery of RNAi prodrugs containing reversible charge-neutralizing phosphotriester backbone modifications," available in PMC Mar. 30, 2015, published in final edited form as: Nat Biotechnol. 32(12):1256-1261 (2014) (18 pages).
Mergny et al., "Analysis of Thermal Melting Curves," Oligonucleotides. 13:515-537 (2003).
Mitsuoka et al., "A bridged nucleic acid, 2',4'-BNA$^{COC}$: synthesis of fully modified oligonucleotides bearing thymine, 5-methylcytosine, adenine and guanine 2',4'-BNA$^{COC}$ monomers and RNA-selective nucleic-acid recognition," Nucleic Acids Res. 37(4):1225-38 (2009).
Moore et al., "Short Hairpin RNA (shRNA): Design, Delivery, and Assessment of Gene Knockdown," available in PMC Jun. 11, 2013, published in final edited form as: Methods Mol Biol. 629:141-158 (2010).
Morita et al., "2'-O,4'-C-Ethylene-Bridged Nucleic Acids (ENA): Highly Nuclease-Resistant and Thermodynamically Stable Oligonucleotides for Antisense Drug," Bioorg Med Chem Lett. 12(1):73-76 (2002).
Nakano et al., "Selection for Thermodynamically Stable DNA Tetraloops Using Temperature Gradient Gel Electrophoresis Reveals Four Motifs: d(cGNAAg), d(cGNABg), d(cCNNGg), and d(gCNNGc)," Biochemistry. 41(48):14281-92 (2002).
NCATS Database of Drug Development Information Entry for Serplulimab, <https://drugs.ncats.io/drug/S3GQZ2K36V>, retrieved on Aug. 15, 2022 (5 pages).
Okabe et al., "The Molecular-Level Phenomenon of Life (55): Development of Artificial Receptors that Recognize DNA Tetraloops," Nippon Kagakai Koen Yokshu. 78(2):731 (2000) (2 pages).
Pan et al., "A novel SMAC mimetic APG-1387 exhibits dual antitumor effect on HBV-positive hepatocellular carcinoma with high expression of cIAP2 by inducing apoptosis and enhancing innate anti-tumor immunity," Biochem Pharmacol. 154:127-35 (Apr. 2018).
Paul et al., "Combination Therapy for Chronic Heptatis B: Current Indications," Curr Hepat Rep. 10(2):98-105 (2011).
Prakash et al., "Identification of metabolically stable 5'-phosphate analogs that support single-stranded siRNA activity," Nucleic Acids Res. 43(6):2993-3011 (2015).
PubChem CID 86278347, retrieved from <https://pubchem.ncbi.nlm.nih.gov/compound/Ropeginterferon-ALFA-2B>, last modified Sep. 9, 2022 (10 pages).
PubChem CID 9604654, retreived from <https://pubchem.ncbi.nlm.nih.gov/compound/9604654>, last modified Sep. 9, 2022 (18 pages).
PubChem SID 387065574: envafolimab, <https://pubchem.ncbi.nlm.nih.gov/substance/387065574/version/2>, last modified on Sep. 2, 2021, retrieved on Aug. 16, 2022 (6 pages).
PubChem SID 404620031: Isothiafludine, <https://pubchem.ncbi.nlm.nih.gov/substance/404620031/version/1#section=Identity>, last modified on Jan. 31, 2022, retrieved on Aug. 9, 2022 (7 pages).
Remington, "Pharmaceutical Sciences: The Science and Practice of Pharmacy," Philadelphia Lippincott, Williams & Wilkins. 20th Edition (2000).
Remington, The Science and Practice of Pharmacy, 22nd ed. Pharmaceutical Press, summary (2013) (2 pages).
Rowe et al., "Handbook of Pharmaceutical Excipients," Pharmaceutical Press. (2005).
Santalucia, Jr., "A unified view of polymer, dumbbell, and oligonucleotide DNA nearest-neighbor thermodynamics," Proc Natl Acad Sci U S A. 95(4):1460-65 (1998).
Seth et al., "Synthesis and Biophysical Evaluation of 2',4'-Constrained 2'O-Methoxyethyl and 2',4'-Constrained 2'O'-Ethyl Nucleic Acid Analogues," J Org Chem. 75(5):1569-81 (2010) (7 pages).
Silverman et al., Chapter 8: Prodrugs and Drug Delivery Systems. *The Organic Chemistry of Drug Design and Drug Action, Second Edition.* Elsevier Academic Press, 497-557 (2004) (63 pages).
Snead et al., "5' Unlocked Nucleic Acid Modification Improves siRNA Targeting," Mol Ther Nucleic Acids. 2(7):e103 (2013) (7 pages).
Soriano et al., "New antivirals for the treatment of chronic hepatitis B," Expert Opin Investig Drugs. 26(7):843-51 (2017) (10 pages).
Sugimoto et al., "Thermodynamic Parameters To Predict Stability of RNA/DNA Hybrid Duplexes," Biochemistry. 34(35):11211-16 (1995).
Sun et al., "Asymmetric RNA duplexes mediate RNA interference in mammalian cells," Nat Biotechnol. 26(12):1379-82 (2008).

(56) References Cited

OTHER PUBLICATIONS

Tateno et al., "Generation of Novel Chimeric Mice with Humanized Livers by Using Hemizygous cDNA-uPA/SCID Mice," PLoS One. 10(11):e0142145 (2015) (20 pages).
Terrault et al., "AASLD Guidelines for Treatment of Chronic Hepatitis B," available in PMC Jun. 5, 2018, published in final edited form as: Hepatology. 63(1):261-83 (2016) (44 pages).
Tumas et al., "Preclinical Characterization of GS-9620, A Potent and Selective Oral TLR7 Agonist," 46th Annual Meeting of the European Association for the Study of the Liver, Mar. 30-Apr. 3, 2011, Berlin, Germany. Journal of Heptaology. Poster No. 1776 (2011) (1 page).
U.S. Centers for Disease Control and Prevention (CDC), "Hepatitis B FAQs for the Public—Transmission," <http://www.cdc.gov/hepatitis/b/bfaq.htm>, last modified on Jun. 9, 2009, retrieved on Nov. 11, 2011 (7 pages).
U.S. Appl. No. 60/432,650, filed Dec. 11, 2002 (78 pages).
U.S. Appl. No. 60/432,651, filed Dec. 11, 2002 (16 pages).
U.S. Appl. No. 62/378,635, filed Aug. 23, 2016 (168 pages).
U.S. Appl. No. 62/383,207, filed Sep. 2, 2016 (92 pages).
U.S. Appl. No. 62/393,401, filed Sep. 12, 2016 (100 pages).
Uhlmann, "Recent advances in the medicinal chemistry of antisense oligonucleotides," Curr Opin Drug Discov Devel. 3(2):203-13 (2000).
Van Aerschot et al., "An acyclic 5-nitroindazole nucleoside analogue as ambiguous nucleoside," Nucleic Acids Res. 23(21):4363-70 (1995).
Wan et al., "The Medicinal Chemistry of Therapeutic Oligonucleotides," J Med Chem. 59(21):9645-67 (2016) (23 pages).
WHO International, "Hepatitis B Fact Sheet No. 204," dated Jul. 2014, retrieved on Jan. 28, 2020 (4 pages).
Woese et al., "Architecture of ribosomal RNA: Constraints on the sequence of 'tetra-loops'," Proc Natl Acad Sci U S A. 87(21):8467-71 (1990).
Wu et al., "Preclinical Characterization of GLS4, an Inhibitor of Hepatitis B Virus Core Particle Assembly," Antimicrob Agents Chemother. 57(11):5344-54 (2013).
Wu et al., "Toward a Cure for Hepatitis B Virus Infection: Combination Therapy Involving Viral Suppression and Immune Modulation and Long-term Outcome," J Infect Dis. 216(Suppl_8):S771-S777 (2017).
Xu et al., "Vaccination with recombinant HBsAg-HBIG complex in healthy adults," Vaccine. 23(20):2658-64 (2005).
Yan et al., "HBVcircle: A novel tool to investigate hepatitis B virus covalently closed circular Dna," J Hepatol. 66(6):1149-57 (2017).
Yang et al., "A mouse model for HBV immunotolerance and immunotherapy," Cell Mol Immunol. 11(1):71-78 (2014).
Yang et al., "Phase II b trial of in vivo electroporation mediated dual-plasmid hepatitis B virus DNA vaccine in chronic hepatitis B patients under lamivudine therapy," World J Gastroenterol. 23(2):306-17 (2017) (13 pages).
Yuen et al., "The Second-Generation Hepatitis B Virus (HBV) Core Inhibitor (CI) ABI-H2158 is Associated with Potent Antiviral Activity in a 14-Day Monotherapy Study in HHBeAg-positive Patients with Chronic Hepatitis B (CHB)," American Association for the Study of Liver Diseases (AASLD) Annual Meeting, Nov. 8-12, Boston, Massachusetts (2019) (1 page).
Yuen et al., "The Second-Generation Hepatitis B Virus (HBV) Core Inhibitor (CI) ABI-H2158 is Associated with Potent Antiviral Activity in a 14-Day Monotherapy Study in HHBeAg-positive Patients with Chronic Hepatitis B (CHB)," Conference Reports for NATAP—The Liver Meeting, <https://www.natap.org/2019/AASLD/AASLD_60.htm>, retrieved on Mar. 23, 2021 (Nov. 2019) (9 pages).
Zhang et al., "Structural basis of a novel PD-L1 nanobody for immune checkpoint blockade," Cell Discov. 3:17004 (2017) (12 pages).
Zoulim et al., "JNJ-56136379, an HBV Capsid Assembly Modulator, Is Well-Tolerated and Has Antiviral Activity in a Phase 1 Study of Patients With Chronic Infection," Gastroenterology. 159(2):521-533.e9 (Aug. 2020) (22 pages).
Barber et al., "RTEL 1 Maintains Genomic Stability by Suppressing Homologous Recombination," Cell 135:261-271 (Oct. 2008) (11 pages).
Barber et al., Supplemental Data, "RTEL 1 Maintains Genomic Stability by Suppressing Homologous Recombination," Cell 135:1-7 (Oct. 2008) (7 pages).

* cited by examiner

SEQUENCE LISTING

<160> NUMBER OF SEQ ID NOS: 246

<210> SEQ ID NO 1
<211> LENGTH: 38444
<212> TYPE: DNA
<213> ORGANISM: hsapiens

<400> SEQUENCE: 1

```
agtcagccct gctgccagcc agtgccgggt gctggggact cagggaggcc cgccgggacc      60
actgcgggac agtgagccga gcagaagctg aacgcagga gaggaaggag aggggcggt      120 cagggctctc aggagccggg tcctgggcaa ggcgcagccg ttttcaaatt ttcaggaaag     180
cggtcggctc acactcgagc agtaaaaaga tgcctctggg gaggaggccc gtgcagctct     240
ccgggcaatg gtggtggctc ggcctagaga ggcggtagtg gaacgcagac cctggtgggg    300
gaatgacatc aagggaggag acgggcggga ccccagattt ctgcctgtgg gcgatggaag    360
tgaggttcac tggccagcgg agccggacac agaacgcgca aaacgccgtg taggcctgga    420
ggagccgaag agcaggcgga ccccctccgc gggggaacag tttccgccgg gagcacaaag    480
caacggaccg gaagtggggg gcggaagtgc agtgggctca gcgccgactg cgcgcctctg    540
cccgcgaaaa ctctgagctg gctgacagct ggggacgggt ggcggccctc gactggagtc    600
ggttgagttc ctgagggacc ccggttctgg aaggttcgcc gcggagacaa gtgagcagtg    660
agtcgcagtg accctacaag tggttctttt acccgagcgg ctcgtaggcg cgttgcggtt    720
tttcgaaact acagctcccg gcaggcccca agccgccctc ggggccgcgg gtcggcggat    780
```

```
tggccgcgct gcattttggg acctgtagtt tcctgcgctc gtggcgctgg cgccgcggcg    840
ttggctgagc ccttgaccgg ggctggaggg aagggccgac attcagtgtg tccgcgtctg    900
ttctgttagt cccagttccc gggcgggatt gaggcttaga gaagttgagt gatttgctga    960
gggctgcacg ggttggcatc ccggcatgct ctttcgctac tttggctgca tctggttgcc   1020
cacccgggcg gatggggaat ggactccagc cagccaggag ggcagagggc tggagaggca   1080
gggccggagg ttcagaccct ccgctctgac gttgcgcctg gtgaggccgg gaggggtgcc   1140
gcttgcctct tcagccctca cgctcttgtg gaagtcgcgg aattactgca ggcggaactt   1200
gcagcactgt gggcgtcttt tccagagaag gacggagttg tggggcggga ggataaggca   1260
aggcccagcc acttcgcatc ttcgccccgc cagctcctcg agatgggata taccagggtt   1320
gctctccaac cctctccgca ggagggactg atggaaacgc tgggaaagt agcccggtac    1380
ccacaaaggc tgtctacaaa cagagtctta ctgtctttcc caggtctgtg ccatagggat   1440
tctcgaagag aacagcgttg tgtcccagtg cacatgctcg catcgcttac caggagtgcc   1500
cgagaccta agatgttcgg agtggttttt tcgcacagac ccgaatagcc tgcccctcag   1560
ccacgctctg tgcccttctg agaacaggct gatatgccca agatagtcct gaatggtgtg   1620
accgtagact tccctttcca gccctacaaa tgccaacagg agtacatgac caaggtcctg   1680
gaatgtctgc agcaggtaga gcacaggccc gaggaaagg actgcgggtg ggtgagctt    1740
cagccaggac ggggtgtgct tccctctccc ggcccattcc agccaggccc ctccgggcca   1800
gaggcagcgt ctgtcataaa aagggctggt gttccaggtg gggtcagaga gaggattgac   1860
aagtaaaaac gatcgtcctt tgaaggggc cggcccctcc acacctgtgg gtatttctca    1920
tcaggcggga cgagagactg agaaaatgaa taagacacag agacaaagta tagagagaaa   1980
agtgggccca ggggaccggc gctcagcata cagaggacct gcaccggcac cagtctctga   2040
gtttcctcag tattcattaa ttactatttt cactatctca gcaagaggaa tgcggcagga   2100
cagcaaggtg atagtgggga gaaggtcagc aagaaaacgt gagcaaagga atctgggtca   2160
caaataagtt caaggaagg tactatgcct ggatgtgcac gtaggctagt tttatgcttt     2220
tctccaccca aacatctcgg tggagtaaag agtaacagag cagcattgct gccaatatgt   2280
ctcgcctcct gccacagggc ggcttttctc ctatctcaga attgaacaaa tgtacaatcg   2340
ggttttatac cgaaacattc agttcccagg ggcaggcagg agacagtggc cttcctctat   2400
ctcgactgca agaggctttc ctcttttact aatcctcagc acagacccttt cacgggtgtt   2460
gggctggggg actgtcaggt ctttcccatc ccacgaggcc atatttcaga ctatcacatg   2520
gagagaaacc ttgggcaata cccggctttc cagggcagag gtccctgcgg ctttccgcag   2580
tgcatcgtgc ccctggttta tcgagactgg agaatggcga tgactttac caagcatact    2640
gcctgtaaac atattgttaa caaggcacgt tctgcacagc tctagatccc ttaaaccttg   2700
attccataca acacatgttt ctgtgagctc aaggctgggg caaagttaca gattaacagc   2760
atcttagggc aaagcaattg ttcagggtac aggtcaaaat ggagtgtgtt atgtcttccc   2820
tttctacata gacacagtaa cagtctgatc tctcttttcc ctacagtcct gagggtgac    2880
agacttagga gtgccttggg ggcctctctg aggagcagct gatattcacg ggtcaggagg   2940
aagcatttcc attagagggg cagccggtgg ccagcctcac ttggaaggtc tttgaacctc   3000
gggggtgcag ggaggtggca gtggtgcagg ttgccttctc ctgggttcct tgaggtgccc   3060
tcttgtaccc ggctcacacc cttcccctcc ccgagtttcc tgctcaggtt cccgtctgag   3120
```

```
agcttgtatg taggacgtca gataggacag cataaatgtt tggatccaga aacgcagaac    3180
agtttcctat tttgagactt gacacctaat tagtcatctt actatttaag ctgaaaaata    3240
gtgtcgtgtt ttgggtaacg ttctgcaaat cgtttgctaa tggcggctga gttgcttcac    3300
gccctttagg gcaagagtgg gacttgcctg tggacttctc cgcggtccca cagggctctc    3360
gccacctggc agtggcctct gcatctgcaa agagctgccc gctggctgcc gaagcttgtc    3420
tcagggcagc ttgtgtggcc tcgcctcttc ctggcttccc cgtaaccctt gctccgaact    3480
ccgttcagaa ggtgaatggc atcctggaga gccctacggg tacagggaag acgctgtgcc    3540
tgctgtgcac cacgctggcc tggcgagaac acctccgaga cggcatctct gcccgcaaga    3600
ttgccgagag ggcgcaagga gagcttttcc cggatcgggc cttgtcatcc tggggcaacg    3660
ctgctgctgc tgctggagac cccataggtg accctagttc ccaggcctct cctggcctcc    3720
tgtggggatg gttggcaagg gatggcgctg agggtggggt gggcccatgg ggactcctgc    3780
cgtctctcaa gcagaactca aggagaattt tttagctgct gtataatttc tcgccatcgt    3840
gggtgtaaac ctagggttgg gctttttgc tgaattaggg cacggcagat gcccacttca    3900
cccattttgtg ataaaccagt atctggggtg tcagattctt ggctgtctgc agggccgagt    3960
tagccgaatg ccacctgcct ttgatacgtg agaacgttgt ctgagaaccg tgacttctgt    4020
gcttgcttgt gtctggtcag cttgctacac ggacatccca aagattattt acgcctccag    4080
gacccactcg caactcacac aggtcatcaa cgagcttcgg aacacctcct accggtgggt    4140
cagacgagtt tacacctgtc tcggggtcct caagagaacc agcttggcat ggtgctgagt    4200
ccacagcccc atgctgtgct gtggtggagg gtggtggtct ttctagacgc tcccccgaag    4260
tgtgcagagc gctggtgccc aggggtgggg tgcggcctgg gctgcctcca atgcccatta    4320
cttgtgagga agcagctttg catctgtgtg ctgaccttgg gcgggcgtcc tgagctcctc    4380
gcaggtgctg ttgtagcagc tgtgcagtag gtcagggctg gcccccagtg cagctttgca    4440
catgaagtag gaggaggccc tgctgcttgt cagagcccag cagagtcttg gtgttctgtc    4500
gggttcctgt ggccggacca gtggcagggt gctgtggaag ctgtcgaatc tcctccctct    4560
gtccagtacc cccgctcgtc ttctagctcc ctcctacgcc cgggccacgt ttcagttatg    4620
ctcacttcct ctgaccgccg aggctcctgc gtgtctccat acagctcacg ctgcagggcc    4680
acgctgtggg tgttggagac agctcctcct cgacccacgg tgctctctcc caccaggcct    4740
aaggtgtgtg tgctgggctc ccgggagcag ctgtgcatcc atcctgaggt gaagaaacaa    4800
gagagtaacc atctacaggt aggctcctgg gctcccgctc cggctcagtg tccgacaggc    4860
gagtgctgct gggtgtccag agcccaggc tgcgctcccg ctgggctagg gtttgaagtt    4920
cactggggga ctgcagggga ggacctggtg gggtgggga ctggcttcgg tccttttcttg    4980
gccgtgcttc agctgcgcac tctgcccttc ctcccacaga tccacttgtg ccgtaagaag    5040
gtggcaagtc gctcctgtca tttctacaac aacgtagaag gtacaagcag ctgggtggga    5100
ccagggtcgg gttggagtgt gtgcagcctc tcagggtgga gctcagtggt gtcacagcct    5160
ggttgtgctt gcccggtggg gcggccagtg cggccatgta cctgggccct gtcttctgac    5220
tcggggccac ccatgttaga cttctgtgtg gaagagctca cacagtggtc tgagacagcc    5280
agccggcaag actgcctctg gctggtgcct ggggccttgg attttgggaa ggctccctcc    5340
atttcctgat gagagggtct ccctgcacct aacctgctgg tgcaaacagt aggggttttg    5400
ctgaacaccg gctttctctt cggggacttt gttgcttgcc cagcagcagg tgctccagtg    5460
accggccctc ataccatctt gggagggtgt cctggaagcc gtgtctggcc tcccgcgacc    5520
```

```
ctgccccgtg tgtcttttc  ctgtgctgac cttgctgcgg aaaattatgg ccctgagtgt  5580
gactccaggc tgagtcctgt gggtccaaca cgggatgcct tggggcctct tctggagacg  5640
ggatgtgagt gacaggagcc ggccggggca gcttgccctg tgactgcacg tggccacagc  5700
ctgtgagggc cggggtgct  tctccaccca cgtggctgcc cctcgggtat gtcaagggct  5760
tctgggctc  atcacggggt cctagagaca gtggcagggt gcaccccgt  tggctgccct  5820
tacagtttct gtgacctgag ggtggcatct gtgcagtcgg cgcggtctgt gcttctgtgg  5880
gatcagggtt ccctctgttt cctgcctcag ttggggctca agcctcaggt gaggtggccc  5940
cggagcactc agaaggcatc ggcggtcctg tgggctgctt tctgcactca cgtttgctga  6000
gtgctcagtg tgccaggact gaggaccctg aagctgctct tgtatttagg gcggcgctcc  6060
cctggcagag actgagccag gtggtcccgc atgacccact accaggcgtt tctgggccct  6120
ggcccttgga gggacagggt gggcggaaca tgggcctgca gggaggctcc cgcttactgg  6180
aggcatgtgc tgtgttgctg gagacatcct ctgtgttgct tcttgttcgc tgtggttttt  6240
ggtctggtgg caccaaggac cctcagtcat cttgatgtgt ggttgtccag gccttttgt   6300
tggtcctaag aaggggctct gcctttgtgc cccaggttc  cctgacagga gctgccggct  6360
cgtcccggtg atgcctgcag gacgtgactc tgggacgggg ggttgggcag atgtgctgat  6420
ggaaattctc aagcaggcgt catttccgag gtcctcacct ggattccag  gacaggagtg  6480
cctgctgggt gtccccagtc ccatgcagcg ggggtccttg ggatagcatg gaacgctgag  6540
catgggcctg gccggccgtg gtcctggaca agggcagtgc cccggtggct gctgggcctg  6600
ggacctggtg gggacgctgg gcctggtacc tggtggggat gctgggcctg ggacctggtg  6660
gggaggcctc tgactgcctc ctggtgctgc ttccgtctgt gttaggcctc tgggtattgg  6720
ggcccccatc tgtctcctcc tccaggcctg tggactcaga ccaggaagac acaggccagc  6780
ccctgcctgt cccccttggc ttgggctctc actgcccgac ctggcgggag gttgcctagc  6840
cgtgaacctt cgcaccctgt ctgccaccgg acaggctgtg agggggtgtc tgcagcacct  6900
gcaccggcct gagcatcttc agagtgggct gcagctcctg gaggggtctg agaggaaggg  6960
aggcaggtat tttgggcgaa tgaggagaca gctggagagc tggcacccctt cctggcctgc  7020
gtcctgtgag gactctggtt ggggacagca agcttgggt  cagcctgggg cagagcctct  7080
gggacggccc cgccctcgt  gccccttccc ctcgcagctc ctgtcctcgc cccgccctca  7140
gctctccgcc aggcaaggtt tggcaagtgc cgctgtgcgg cagtgcctgc tgattggctg  7200
gtctgttgct atggtgctgc ccaggggtgt gcttttcctc ccctgccttc cctgctatcc  7260
ctggagtat  ctggggttgg gtcatcgctg gtgtgtgtga gtgtgtgtgt gtgtgtatgt  7320
gcacgtgtgc atatgtgtgc gcttctggcc tctgcagctg agtcctggcc ctcgggggc   7380
ctggcacctc ctggggacag gcacaaagca gccatgatgg agtcgggagc tggggaggc   7440
cccattgccc cacgtggctg ccctgtgact ctggggtgct tgttagaaga ggtatctggt  7500
tctgtctgtg tttaagcaac tccctaagga attcttgtgg ttccagtttg gggggcctgt  7560
actgtagagg caagggaggg gcaggacatc ccccagactc tgacttctga agccttttct  7620
gcccggggcc tctccgccag tacaggcagt gtccttgcc  agggctgcca tgctgcagag  7680
gggagtgggc cactgtttag cccaggaaaa cctggctctc ccttagctgg aagttctggg  7740
cctgttgtgg ttgcagggga agctgagtga cggtgctaat cacaggggca cctgcagggg  7800
tttgtgggag atgcctctgt gggttggggc gataggctga ggggctgttc ttccctgccc  7860
```

```
tgaggagggc tgagtgtagc cgccactcct gtcctgtctt gggctgtctc ggagaggatg   7920
cgtagaaccc tcgggatcct gctggcctcc gtctggtcca ccctgaacct caggccttct   7980
gggggcagag gaggattccc tcaggatcac tcgggtgggg gcctctcttg ggcacctgag   8040
accctcagtg ggtgctttgt ggcgcgttca cggttggtgg gggacgccca gccctgcccg   8100
ccgtgtagga gccgttctgt cctgggcatc cccctgtggt ctgggactta gtggaccctg   8160
agggtgtgtg tttaccctg cctcacacct gcagaaaaaa gcctgagca ggagctggcc     8220 agccccatcc tggacattga ggacttggtc aagagcggaa gcaagcacag gtgagacccc   8280
tcagtgaggc cacgaccact gtccttccat ggcccagctc tcctgtgacc tgtgaggcc    8340 cggatatatt tcttcacttt tctttgttcc tttttaaatt atgaaactaa ccaccattca   8400
gtacgaaaaa gtttaagcag ctctgaggaa gatagagtaa aaaattgtct ccctcttccc   8460
tggccctcag ccatccccgg tggccaccgt ggagtgtgga cggagccctg caggcctgtg   8520
tctgtgcgga agcacgcgca gttttgtctg cacagactgt cctgcagttg gctgttttca   8580
ctcagcgttg tgggtatagc ttcccatgct ggtgctggca gctcggcctt gttcttttga   8640
ggacagcaga tgtctcctat gtctacctct tacagcttca gagattcaag ttataataaa   8700
gctcttctta tattgagggg gaaacctccc tccccctttt ttttgaaaca gggtctcgct   8760
ctgctaccca ggctgcagtg cagtgtcaca gtcttggctc actgcagcct cagcctccca   8820
ggctcaagcg attttcccac ctcagcctcc caagtagccg ggactgcagg cacacaccac   8880
catgcctggt taattttgt atttttgta cagacagggt ctcactctgt tgctcaggcc     8940
agtctcctga gctcgagagt tccacctgcc ttggcctccc aaagtgctgg gattacaggc   9000
gtgagacccc atgcctggcc agctcttttt tttttttttt ttttttttga cggagtct     9060 cgctctgtcg cccaggctgg agtgcagtgg tgcgatctcg gctcactgca agctccgcct   9120
cccgagttca cgccattctc ctgcctcagc ctcccgagta gctgggacta caggtgcccg   9180
ccaccacgtc tggctaattt tctgtatttt tagtagagac ggggtttcac cgtgttagcc   9240
aggatggtct cgatcttctg accttgtgat ccgcccacct cggcctccca aagtgctggg   9300
attacaggag tgagccaccg cgcccggccc agctctgctt tttcttagtg gttctgcgtt   9360
gtgtttgttt ctatccagga atagggttgg ttttacttt ccatcgagtt tttaaagaga    9420
cgacgattta catggtcgga aactcacgag gactccccat cccttggtcg gaaactcaca   9480
tggactcccc atcccttggt cagaaactca cgtggactcc catccatccc aggcagcagc   9540
ttcccacctg ggccctacgt gcaggatgag ggctccttcc gggtcagaag acatggcggc   9600
ctcggggcac cgtcccctgc atgggtgct cacaggatct tctcctctct ccttcccagg    9660
gtgtgccctt actacctgtc ccggaacctg aagcagcaag ccgacatcat attcatgccg   9720
tacaattact tgttggatgc caaggtgggg gctcagtcct gtagctgacg actcctgatg   9780 tccagggggtg tccctgggct tgggaacagc tgtccgagcc tttgctgctt cagggcctta   9840
gatcagcagg cctgggtggg aggactcacc tctgtcactg gcaggggct caacctggcc    9900 agacacactt gtgagcagcc ccaggccaca ggtcagtttt ctgagcagtc tgggagcggg   9960
caggctggtg ggagtgagga gagacctcca ggctgtggtc cataggccag tgcccgctct  10020
tgatcctgac agctcaggtt ctctccttca cgtcaggcca tgggaggcac cgagaacaca  10080
ggaagcccac tgactcccct cttcccagcg cgtgccggc cccacactca ctccccctcc    10140
cagcatgtgc ccggcttcac actcactccc ctcttcccag tgcatgccg gccccacact   10200 cactcccccc acagcatgtg cccggcctga cactcactcc cctcctccca gtgtgtgccc  10260
```

```
agccccactc ccttccgccc cgtgtgccca gccccacgct cactcccccc gccagcatgt    10320
gcccggcccc acactcaact cccctcctcc cagtgtgtgc ccggccctgc tgccctcctc    10380
cccatgtgcc ctgcttttgt gccccacact ttttacttag tgcaggtggg atcacacgcc    10440
acgggtcaat ggtttgtgtg ttcacgtgac gatggcgtgg tgacgtttcc agatcccgtc    10500
gttggttcgc tcattctcgg ggtgtatatt tattgagagc tcatcatgct gggtgctatt    10560
ccaggcatag caagactggc ttcactcaca tggagctttg attctagtgg tggggacagg    10620
tggacagcaa aagagtaagc acgtgagctg atgatactga agggaaatag agcagaggga    10680
ggaggcggag accgagccaa gcgggcccaa gtgcgatgtc ggcgggaggt ggggaatgct    10740
ggtgggtctg aggggagcct cagcaggtgc agcagagcaa gggaagaggt gagtggggc     10800 ggctggggg  ccgactcctg ggaagctgta gcagaacccc acagagagct ggtgaggttt    10860
gccgtggttg tgggtgactc ggtgctttga gccctggctg cccctgggaa ccatctggag    10920
agcttctaac ccaaccaggc ccctccctgg gacagttata tcacagctgg taagccgagt    10980
ctaacacttt cacggaaacg cagaagatct aaaacagcaa gatgaccgtg aagaagaaca    11040
gagctggagc actcacctcg ctggtttcaa gactcctcta aagctgcagg agtggaggtg    11100
gagatggccc agctcaggca caggcctgca ggccatggag aaggcagcaa gctcaagctg    11160
acccacacgc atgtggtcat tgttttttttt ttcagttgga atctcactct gtcacccagg    11220
ttggagtgca gtggcaccat ctcggctcac tgcagccccc gccctaggt  tctagcgatt    11280 ctcccacatc agcctcccga gtagctggga ttacaggcgt gcgccaccat gcctggccct    11340
tggtgattgt ttttgacaa acatgccaat ttaattgaga gaggaaatga aggttgattt     11400
ctggttttct gaaaaaatgg tgctaagaac agctggatat ctgttcggaa acagtgaat     11460 cttaactctt gttttaccct gtataaacct aaatgtaaaa gctaaactaa aagttataga    11520
aaggaacatg ggggaggtct ttgcaacttt ggggtaggca gagatttctt agtatggata    11580
cacaaggcac tagccatgaa gaaaaacatt aaaatttaga cttcaccaaa atttaaagct    11640
tcaactctgt ggaagagttg agaaaatgaa aaagcagtta agaaaggga gaaaatactt     11700 cttttcaaagg acttaaaaaa ttttttcagc cctcctctga tttgaaagga cctttgacca    11760
gagtatgtaa aattctccca taactaagca aacaacccac ttaaccactg ggaagggatc    11820
tggacagacg tttcaccaag atgggtggaa tggccagtta accactggga gagcatccgg    11880
acagacgttt cgccaagatg ggtggaatgg ccagttaacc actgggagag catccggaca    11940
gacgtttcgc caagatgggt ggaatggcca gttaaccact gggagagcat ccggacagac    12000
gtttcgccaa gatgggtgga atggccagtt aaccactggg agagcatccg gacagacgtt    12060
tcgccaagat gggtggaatg ccagttaac cactgggaga gcatccggac agacgtttcg    12120
ccaagatggg tggaatggcc agttaaccac tgggagagca tccggacaga cgtttcgcca    12180
agatgggtga atggccagt taaccactgg gagagcatcc ggacagacgt ttcgccaaga    12240
tgggtggaat ggccagttaa ccactgggag agcatccgga cagacgtttc gccaagatgg    12300
gtggaatggc cagttaacca ctgggagagc atccggacag acgtttcgcc aagatgggtg    12360
gaatggccag ttaaccactg ggagagcatc cggacagacg tttcgccaag atgggtggaa    12420
tggccagtta accactggga gagcatccgg acagacgttt cgccaagatg ggtggaatgg    12480
ccagttaacc actgggagag catccggaca gacgtttcgc caagatgggt ggaatggcca    12540
gttaaccact gggagagcat ccggacagac gtttcgccaa gatgggtgga atggccagtt    12600
```

```
aaccactggg agagcatccg acagacgtt tcaccaaggt ggatggaatg accagttgag    12660
cacatggaaa gtcgcccagc atctccagtc ataggagaag gcagattaaa gccacgggga    12720
gccgacactg tggtcccact ggcatggctg aaattcagaa gccctgagtg tggcatgagg    12780
atgtggaaca gctggatctc atccatcgct gtgaagttgt gtagccactc cacaaacgtg    12840
tggcaaacag ccgagccggg agaagggaag acgtgttcaa agattcatat gtggccaggc    12900
tcagtggctc acgcctgtaa tcccagaact ttaggggcca aggctggggg atcgcttaag    12960
cccaggagtt tgagaccagc ctaggcaaca tagggagacc ccatctcaaa aaaaaaaaa     13020 aagaaaaaag aaaagacttc agtgtgcagg tttaccagag ttttgtttgc agttgccaaa    13080
actgggaagc agcccgcgtg agcccatcca caggtgaatg gacagaccgt ggtacccgaa    13140
cactaacagc agccacgggc gtggactgtg tcacacagc agcagggagc cgatgagtct     13200
cggacatgct aacccagaga ggcccattga ggaggaccta ctgtttttg tgttttgtt      13260 ttttgttttg aaatggagtc tcgctctgtg gtgcaggctg gagtgcagtg gtgtggtctt    13320
ggctcactgc agcttccgcc tcttgggttc aaacagttct cctgcctcag ccttccgagt    13380
agctgggact acaggcaccc gccaccacac ccggctaatt tttgtatttt cagtagagac    13440
ggcagttcgc catgttggcc aggctggtcc caaactcctg accttgtcat ccactcactt    13500
tggcctccca agtgctgag gttgcaggca tgaaccaccg cacccggctg gacctactgt     13560
tttattccat ttatgtgaca ctctattaat agaaaaggca ggggtggggc tggtggttat    13620
atggtgcaca taactgccag aactcagtac acttaaaatg aacatcttaa tgtgtgaaat    13680
tttttttttt gagacggggt cttgctctgt cacccaggct agagtgcagt ggtgcgatct    13740
ccactcactg caagctctgc ctcctgggtt cacgccattc tcctgcctca gcctcccgag    13800
tagctgggac tacaggcgcc cgccaccacg cctggctaat tttttttttt ttttgtatt    13860 tttagtagag acggggtttc acagtgttcg ccaggctggt ctcgatctcc tgacctcgtg    13920
atccgcctgc ctcggcctcc gaaagtgctg ggcttgcagg cgtgagccac catgcccggc    13980
caatgtgtga aaatttaaaa gtaccaaagc tggaccccac cccagattgc tcccatgaca    14040
ctctgtgggt gggacctggg agttgggttt tgttttgttt tgttttgttt ttgagatgaa    14100
gtctcactct gtcgcctagg ctggagtgca gtgacacaat ctcggctcac attaacctct    14160
gcctcccaga tgaaagcgat tctcctgcct cagccttctg agtagctggg attacaggca    14220
cacaccacca cccctgcta attttttgtat ttttagtaga cacggggttt taccatgttg    14280
gccaggctgt tcttgaactc ctgacctcgt gatccgcccg cctcggcctc ccaaagtgct    14340
gggattacag gcgtgagcca ccgcgcctgg ctgggagttg ggtttgtaaa tctccctgag    14400
tggggctggg gcagggaact gctggtctg ggtcttcctg gctcctctgg tctgtggctt     14460
cctgactgcg gtggccgggg gctcccaggg catcgtggcc gtctgtcttg ctgagcgtgg    14520
cacgtgcctt tccatgctgt ggaggagcgt ctcccggtat ggcgaactgc tggttagggt    14580
ggggcggtgt tgccaggtca tccaggtctg gcctctgctc tcgacatcgc cggcgctgtt    14640
gctcatctgc gcttgtgatg ttcgatgcct gctgcacatg tcttggcttc cctctttccc    14700
ggcctctgtg agctccagcg ctgcgtccct tctcttcctc ctgtagagcc gcagagcaca    14760
caacattgac ctgaagggga cagtcgtgat cttgacgaa gctcacaacg tggtgagtct     14820
ccgctggcct cctaaacacc tcctattgct tctggccttt tgtcaagag ccacgcaaac     14880 ctttctggag gggctctggc caaactcctg aagcccctagg tgcccaggac tggggactga    14940
gcacaccagg agcttctgcc acccctccc gccctgatcc gatgcctctg ctggggctgg     15000
```

```
agactggcca gctgggccag ggacctgccc gtcaggcgca gggcccccac aggccgctca    15060
ccagacccct tccctccagc cagctcgggg tcagcctggg ccagggctgt ctcctctgcc    15120
ctcggcagca gcaggcttgt ggtcttgcct gcagtgtctc tgcccttccg gccacatggc    15180
ttgagactga ggcaggagaa tcgcttgaac cttggaggca gaggctgcag tgagccagga    15240
tcacaccact gcattccagc ctgggtgaca aagcgggatt ctgtgtcaaa aaaaaaatg    15300
ttgactgggc gcgctagctc atgcctataa tcccagcact ttgggaggct gaggtgggcg    15360
gatcacgagg tcaagagatc aagaccatcc tggccaacat agtgaaacac cgtctctact    15420
aaaaatacaa aaaattagc tgggcgtggt ggcgtgtgcc tatagtccca gctactcagg    15480
aggctgaggc aggagaatca ctcgaaccca ggaggtagag gttgcaatga gccaagatca    15540
caccactgta ctccagcctg gtgacagagc aagactccgt ctcaaaaaaa ataaaatcaa    15600
aaagaataat tggcaattcc agtgaaataa ttgtttgttt gtttgttgag acagggtctc    15660
cttctgtcgt ccaggctgga gttcagtggt atgatcttgg cccactgcaa cctccacctc    15720
ctgggctcaa gccatcctcc cacctcagcc tcccgagtag ccgggactac aggtgcacac    15780
caccacgccc ggctaatttt tgtatttttt gtagaggcgg ggtttcccag cgttgcccag    15840
gctggtcttg aaccctgag ctcaagtgat ctgcccacct tggcctccca aagtgctggg    15900
attacaggtg tgagccaccg cgcccggcct gaaacaatcg tttctaaata ttggtgtggg    15960
ccacacagtc atgtttggac ctacttgtgg ccttttacag accccaggcc aaggctttgg    16020
gaacttggct gtcagcctcc tgtgccttct gcaccccac cccatttctg ctttctggaa    16080
cccccgatcc tgtcctgttc tgtggtgatt cgggtgtgct tgggctctag gagaagatgt    16140
gtgaagaatc ggcatccttt gacctgactc cccatgacct ggcttcagga ctggacgtca    16200
tagaccaggt gctggaggag cagaccaagg cagcgcagca gggtgagccc cacccggagt    16260
tcagcgcgga ctcccccagc ccaggtgcgt tcatagccag actgcttggt cctgaggcct    16320
gcgctgctgc agggtgagcc ccaccggag ttcagcacgg actcccccag cccaggtgcg    16380
ttcatagcca ggctgcttgg tcctgaggcc cgtgctactg cagtgggcag cctgccctgt    16440
ggctgtgtgt ggtcggcctg gcaccatct attcaggctg gcactgcagg gcatccgctt    16500
ctctcagagg cttcttgggt gtgaattctt cagggtcctg tagcctgtgg aagggctggt    16560
attgttcagt agttctggta ttttccaaag acctatgtct tctcccagcc agtatcaact    16620
tggcctctac tgtgtaaaac tggaaaactc tactttgtga agctgagttg ggagcatcgc    16680
ttgaggccag gagtttgaga ccagcctggg caacatggcg gaacctcgcc cctgccaaaa    16740
aattagccag gtgtggtggt gtgctcctgt ggtccaagct tttccggagg ccgaagtggg    16800
aggcgtgctt gagcctggga ggcagagctt ccggtgcccc agatgactcc actgcactcc    16860
agcctgggcg gcagagtgag gccatctcaa aaaaaaaaaa aaggaaaact aaatatattc    16920
actgtaaggg cattttgcat ctttaaatga cccacaaatc tggcatgcat cagctgctct    16980
gcctgtaggt tccttcccag tgtttgtcca gaggtgtatt tccacacagc gctagtcacg    17040
gcatacgtgg aaaacgtgga aaccttcat ggatgttgtc agttggtcta tattttcttt    17100
cttttttttt tttttgagat ggagtttcac ttttgttgcc caggctggag tgcaatggcg    17160
cgatcttggc tcactgcaac ctccgcctcc tgggttcaag caattctcct gcctcagcct    17220
cccaagtagc tgggatcaca ggcgtgcacc accacgccca gctaattttg tattttagt    17280
agagatggtt tctccgtgtt ggccaggctg gtctcgaact cctgacctca cgtgatccac    17340
```

```
ccgcttcggc ctcccaaagt gctgggatta caggcgtgag ccgccacgcc cggcctttgt   17400 ccatatttc tacatggctt ctgtaaacag ctgactagga gtctgtgtga atatcttcat    17460
aggttctgct gtgacactac ttgctcgtga gcatctccag gtgtaaacag catcagcttc   17520
ccccattttc ctttaaaatc gcacatgtgg acggacacca cggggaccct ggaccctggg   17580
gagccccgtc ctcaccctc tcaccaggat ggctgcttgg tagagagtga gtttgcaaag    17640
ttggcatttg tttagtacag aagttatcag gtgttctggc tttagaatcc ctttatatat   17700
atatatatat acatatattt aagtgacagg gtctcactct gttgcccagg ctggaatgtg   17760
gtggtacaat caaagttccc tgtagcctcg gcctcctggg ctcatgggat cttcccgtct   17820
cagcgtctta aagcgccggg accacaggtg tgcaccactg ccaccggctc tcaagattgc   17880
cacgcaggga gttgcagtgg gggaaggggt tcctgggact ttgaacgctc cacctccctc   17940
ctctccacag tcccccaacc ccacctctct aacggggtgg acggccgcct ctttccatcc   18000
ttcgcttggc gcagggtggg gagagtgaca ggtctcctc cctcatctcg gcagctgcca    18060
tttcatcgct tacataacgt gggagaaaca tccacccacc cccaggcctg tgtgaacatc   18120
accacggggc cttctccact cttcagtttt gttagttact tgatgtgcag ggcttttgt    18180 tgtaactagt gggggacgtg tggtggggtg ggcttctgcc atctcattca ggaccagaac   18240
ttcagttttc atccctatct gttccccac cctttggag atggggtctc actctgtcac     18300
ccaggctgga gagcggtggt gccatcacgg ctcactgcag cctccacctc ctgcagcctc   18360
cacctcttgg gctcaagtga tcctcctgcc tcggcctccc aagctcctgg gactacaggc   18420
gtgtgccact gtgcttggca gggtccattc ttttcctcac actttattta ttgaagagcc   18480
caggccgttt accctgcaga gtcggaatct gtacaggagg ggcagccaca cgagttcccc   18540
ggtttactct gaacttaggt ggcttgaggg ccccagttag actgcggcca ccgtttgccg   18600
ggctccagat gggacgtcct ttctatcaga aggctcacag tatctccttt ccgtttctt    18660 cccatgtgaa cattgttgct gctgaacacc tgaatatgtt aatcactggg ggcttgcaag   18720
atggcagtgt gctaattcca tcatctagtc agttagcagg aataacttag gaccacgccc   18780
tgcaccatat cagctatgtg gtgatcccat tcacacagga aaggtgggac aaatgctggg   18840
ggtgggccgg gtgtgctgtc tcacacctgt catcccagca ctttgggagg cccaggcagg   18900
cggatcacga ggtcagagat tgagaccatc ctggccaaca cggtgaaacc ccgtctctac   18960
taaaaataca aaaaattag ccaggtgtgg tggtgcatgc ttgtaatccc agctacttgg    19020
gaggctgagg caggagaatc acttgaaccc aggaggcgga ggttgcagtg agccgagatc   19080
gcaccattgc actccagcct ggcgacagag cgagactccg tctcaaaaat caatcagtca   19140
atcaagtgtc atcactgaat gtttgtgtgt gaacgtgggg attggtcctg ccccatgctc   19200
cctcctgaat ctcactcctg acctcagttg ctgcaccttg aggtgttttc atgtgggctc   19260
ttgtgtcctg accccggcgg ttgtggcctc tttgctgtct gggagtcagg attttcaca    19320 ctcatgtcct gctccagacc tggaatcagc caagtctcca agaagccctg ctttcttttc   19380
ctgcaagacg gtatttcaag acccgccatg cggcagcggg ttggtcatgg ttactgggtt   19440
ggtcgttgtt actgggtgtt ttcgtggaga tacagccata cgcacaggtg tgttcacaaa   19500
tgttaattct aaaggtcaaa cacccggcca ggcataaggg ctcagcggta atcccagcac   19560
tttgggagac caagactggt ggatcacctg aggtcaggag tttaagacca gcctgagcaa   19620
cagggtgaaa ccccatctct actaaaaatg cgaaaattag ccgggcatgg tggcgcacac   19680
ctatagtccc agctagtcgg gagacagaca cgagaattgc ttgaacctgg gacatggagg   19740
```

```
ttgcagtgag cagagatggc gctgctgcac ccctgcctgg gtgacagagt gacaccctgt    19800
ctcaaaaatg aatagataaa taaagataaa acacctgctc ctcttggtgt ctccagtttg    19860
gatttggcct gtgtagcctc ttccttcgcc tgttggtgga tttggcctgc acggattctg    19920
tgtggcctct tccttcccct gttggtggat tggcctgca  cggattctgt gtggcctctt    19980
ccttcccctg ttggtggatt tggcctgcac ggattctgtg tggcctcttc cttcccctgt    20040
tggtggattt ggcctgcacg gattctgtgt ggcctcttcc ttccctgtt  ggtggatttg    20100 gcctgcacgg attctgtgtg gcctcttcct tccctgttg  gtggatttgg cctgcacgga    20160
ttctgtgtgg cctcttcctt ccatgttgg  tggatttggc ctgcatggat tctgtgtggc    20220
ctcttccttt ccatgttggt gtcctttttt ccatgccagg aatcctggtt ctcaagggcg    20280
gggttgttgg cacgagcgtg atgcagactg cctttgctgc cttttctcttg cccagggctg   20340 aacatggagc tggaagacat tgcaaagctg aagagtaagt gttgccctcc ccgcctcctt    20400
gcagctgggt ggggcctcct ccttgcgagg aggtgggtga cacctcctcg acccacagtg    20460
atcctgctgc gcctggaggg ggccatcgat gctgttgagc tgcctggaga cgacagcggt    20520
gtcaccaagc cagggaggtg agaggcgggg agccagcccc ttcactgcag gcccagccta    20580
gagctagaaa cgggccatgg tgcagtcctg ggctgtcaca tcacgagtga ggcctgtttt    20640
caggcctgtt ttcccttttt gagacctggg aggagcacct gctttgcatg atctggttgc    20700
tgagatgttg agaggagcag cacacactcc cacgggacag cacacagccc cccacggaac    20760
ggcacacaca cccatggaac agcacacaca ctcccacgaa cagcacacac actcccacga    20820
acagcacaca cactcccacg gaacagcaca cacccacg   gaacggcaca cacccacg     20880 gaacagcaca cacactccca cggaacagca cacacccca  cggaacgggca cacactccca   20940 cggaacggca cactctccca cggaacagca cactctccca cggaacagca cacacactcc    21000
cacggaacag cacacacacc cacggaacgg cacacactcc cacggaacag cagactctcc    21060
cacggaacag cacacacact cccacagaca gcacacacac acccacggaa cagcacactc    21120
tcccacgcgg ggccgctggg tttcctgcag tttctcctcc tccaggcctt tccctggacc    21180
ctggtccagt ccgtcatttg agcacaggtg cctgttagaa cgagaccttc ttgttaggac    21240
gatgagtgtc ccagccacca cctcttttgg actccgggag gcctggaacg ttctgaacgc    21300
tccgtggggc tccagtcttc tccgcagcca gggcagcagg gtttgctgtc tgtcctgcag    21360
gcagatgagg agtcagggct ggggcctgtg tgggggctct cctgagcgca cagccgccga    21420
ggtggagcgt gttctgcctg agcgccgacc tggtcggggg aatcccagtt gcttccaggt    21480
ggagccactg tcctcagcgt aatgctcaag gctctggcct ggctcctcgg ccaccctgca    21540
ccctcagggt cccctcctgt agcttctgct gccccatcac tgtcactctc aaagctttg    21600 gggactctgc ccagagccac cgcctcccag aagcccctga caacctcttg acgacccct    21660 agtgacccca tccctcccct ctgacggcgg cccctgctct gaggcggctt cttttcctcg    21720
gtgctgttct cgtgctggcc aggcctcctc tccccacctg gaggctcctg agggcggagg    21780
cctctcacct ccaatgctgg cgtccctggg agggctgaat tgtttccga  gggaaggaaa    21840 cttccacagt tgttgccttc agttccaaag ctgcagcctg atttcccct   ccaggctcga   21900 gcctgttttc ttctcggcag ctacatcttt gaccagtgtc gtcccccctc aggcccgagc    21960
ctgccttctt ctcctcagtt cccaaagctg cagtctggtc ccccgccag  gctcgagcct    22020 gccttcttct cctcggcagc tacatctttg agctgtttgc tgaagcccag atcacgtttc    22080
```

```
agaccaaggg ctgcatcctg gactcgctgg accagatcat ccagcacctg gcaggacgtg    22140
agtgctggca cggggtcttt ggtgcgggca aatgtggcgt aggggtgca gcaggcctcc     22200 atcttggcag tcagggctcc cctggccgtc acctggccgt cagcaggaac aggcccacag    22260
aacctcatct tctgatcggg gcgtggaggc gttagtgcca cttgccagct gccgtagagc    22320
ctgtcccagt tctgcagctg gcggcttcgt cctacagcct catcccatta ttctgctttt    22380
gagaaagagc agcccaaggc cctagctggc ttgtggggcc tctggcttct ccacaccacc    22440
ccgagttctg cttctcagag ttgtggggtc cagaggcttt gcccagaggc ggtgtcccca    22500
tgggctgctc tggtttgaga cgccgggccc agcggggtct ctcctctgct gcgctcccgg    22560
gtgctgggga gggtggcttt tgctgcttca acccttaggc gaccatagag cctcttttca    22620
agtcccactg accccttgg agactctgtc cctgcctggc ttctctcctg gctgctggga     22680
agagcaggcg aactgcccgc cctgaatgga tgctgcgctc caccctgggc ccccattgg     22740 gcaggagatg gagcttggca gtcgggctga gcgggctcat gctggaaggg ccggggctgg    22800
ggtcggggcc tcccctgcct gcagtgtggg tgtcagcgcc ctgctgccct ccaggtgctg    22860
gagtgttcac caacacggcc ggactgcaga agctggcgga cattatccag gtggggcctg    22920
ctcctctgtg gcatctcctt ccctgatgga agccgggcgg gtgccttctc ctgctgtatt    22980
agttaactga ttctagactt ggggatggga gaaaggcccc tacaccacct gtttctgatt    23040
ggcaaactct cggctccttt ccagtgccct aaacccacac tgggcctcct gcagggatgg    23100
gggaggacga ggtctggtgg cacatgccca gggtgatgct ggtgagggag gacgcaaagg    23160
acagtggggg ccggggagcc gctcctgccc tgtccgggcc ctcaggccag ggggaccca     23220 ctgctggcag ccccagcagc cccagctgca cgcagatgaa gagctctgga cacacgcggc    23280
ttcctgaaca gcttctccag ggacagacaa atggggaccc tgcaggttcc cggcaggggt    23340
gtccctggga gcccatgatt gggggtgcga ccctggcccc cttctcattg gccccgtcct    23400
gtcctgcaat gcccgtccca tgtgaggtct gcttctggct ccatgcctat ggcagcacct    23460
gctttccctg gcgtagaggt gcttgtccgg tttgtggagg gcacgcccca ttttgggtgc    23520
tctgggcacg ttgcctctcc ggggcctcgg tggcttttttt agaagcagac tcagaagtcc    23580
ctgactgggg aagccaaggc acaggtggct gtgtggagcc ctgtgaggcc tcctctgtgc    23640
tgcccacgct gtacctgctg gccacacgag atcatggcag ggttaggcag ggctgcccag    23700
cgctatgaca gcttcatgag tgtccatctg gcctgtgggg tgcttgagct gggggaggcc    23760
gcagaagaac cctgggatgc atggctggcc tgtgcatgct gctgggcatg gagctgcaga    23820
tcccggaaca agcaggcact gccttctcct tcacagacgc agctctgagc gggggcgaga    23880
cctgggcagg gaccaggtgg ggtgggcaca gggtggtggg gcccaggctc agccctccct    23940
ccactgtggc cgtctctgtg gccagtgacg ccacagcctg tgtcttctct gtgcggtagc    24000
tggggctgga aggacagcac tgccttgtcc tcccaactcc tccccaaagg cacggtgggc    24060
atcccaggcc cagacccctc tgtctgtggc tcctgcctgc caagggctgc tgtgctgtcc    24120
cgcatggagt gtggttggct cttcaagcag gaggccgtgc acctatcagg cggacctgct    24180
tccatgtccc tgatgggtca ctgcaaagca cctccagcac atggcaggc gaggtagccc     24240 tgcagcccag ggcctggagg gcaggtgtga gctggcccgg gcctgtccct ccctggaata    24300
cagcttccca ggctcccact tatggagaag tctcctccac actatggaac tgaatcctag    24360
aatgtggctt ctgaggttcc tacactcgaa ctgaatcctg gaatgcggct tccaaggctt    24420
ccagctatgg agaagactcc acactctgga accgaatcct ggaacgcggc ctcccaggcc    24480
```

-continued

```
cccagctatg gagaagactc cacactctgg aaccgaatcc tggaacgcgg cctcccaggc   24540
ccccagctat ggagaagact ccacactctg gaaccggatc ctggaacgcg gcctcccagc   24600
ctcccactta aggagaagtc tccacactct ggaaccggat cctggaacgt ggcctcccag   24660
gcccccactt aaggagaaga ctccacactc tggaaccgaa tcctgcacac tccatcggtt   24720
tggaatttcc tttggctgct gctctaagta gccgctggtg gatgactcag cttctgccag   24780
ccctcgggtg cctggaggat gagggactgc acacagtgct cacccgcgtt ggctcctgag   24840
cccctgcagg tgtgggcggt gcccataggg ctggtgctgg gttgggcctg cagccctgag   24900
tcacaggtga ccctggggc agagtggggc cagtggcccc aggaagagga tgtgggatgc   24960
acagctcagc tggaggcgaa ctccaggcag ggtcaggccg tgtgctcgga agtcagggct   25020
tagctggagg caaactctgg gcagtgctgg cccgtgttgg ggaaccagtt gcccctgggc   25080
ccccgtgaga ctgctgggtc ctcatccctc tctgcctgag gccggagctg ccctgggctg   25140
aggcacaggg ggatttgtgg tggtgttttt ttgagaaagg gtctcgcttt gtcaccccgg   25200
ctggagtgca ggggcttgat cacagctcac tgcagcctca acctcctggg cccaagtgat   25260
cctcttgcct cagccacccg aggagctgtg aacacaggtg tgcaccaccg cactcagcta   25320 attttaaaa ttttttgta gagatgaggt cttgccatgt ttcccaggct ggtctcaaac   25380
tcctgggctc aggcagtctg cccgccttgg cctcccaaag tgctgggatt acaggcaaga   25440
gcttccatgc ctgcccagca gaaggctttt cgaaggaagc tgtttcctga ggcagactca   25500
gccctgctca tggcagccac cagcgtgggg gtgaacttgt tctgttactt ccatccccgt   25560
gggccaaatg ctttggtaaa acacaaggcc ctgtgtttag ctgtcttgac agtgaaaatg   25620
gctgggaagg aaggaaggaa cggaaggaaa tttctctctc cttctgtgcg tacccaggca   25680
cgtgcacatg catgcagagt acgcacacac gcacgcacgc ctgcacaaat ccacgcatgt   25740
tgccaagtct ctgtgttcca gccgtggtgt ctgccccccg tgttctcta gttcggcttc   25800 tccgcatttc tgtgaatgat tccggcttct tggtgttccc agcagaactc cctcaagtct   25860
gcggcggggc tctgacggcg gtggcttggc tgacatggcc acattgctga gcctgttggg   25920
ggctttgcgt tcctgttctg gccgttttg gctcgttttc caggaacggt cgtcacgcgc   25980
tcctctccta gtgcaggcat cattcctttc ccattgattt gcagggttct ctgtaagttc   26040
tgaggatccc atatacatat actctctgta agttctgagg atcccatata catattctct   26100
ctctaagttc tgaggatccc atatacatat tctctctcta agttctgagg atcccatgcc   26160
gacatacata ttctttcctt gtctcatgct ggtcattttt tccatttca tgacaggttt   26220 ggtgaacaca tgtttccttg tcagattttt gttctgagct tgtgcctccc gaccaagatg   26280
ctaaaccggg tctgtgtat tctccaaact gcactgtaga gtgacggagc tttgtgtctg   26340
ggcctccatg ccttctgacg tcacctgtgg gggtgtgaaa ggcagactct accttgattt   26400
ttcccagcac gccacaccgg tggttctgtg cgctgaccga gcggctcggc ttcccccaac   26460
tccactgggc acctgccaca cttttcctca tgttttgtt cactgtggtt ttgtcgtaag   26520
tcctggtgtt ggcctgaacc aatttctttt tgtttgtttt tgagacagag ttttgctctt   26580
gttgcccagg ctggagtgca gtggcgcgat ctcggctcac tgcaagctcc gcctcccggg   26640
ttcacgccat tctcctgcct cagcctccca aatacctggg attataggca cctgccacca   26700
cgcctggcta ttttttgta ttttagtag agacgaggtt tcaccgtgtt agccaggatg   26760
gtctcgatct cctgacctcg tgatccgcct cccaaagtgc tgggattaca ggcatgagcc   26820
```

-continued

```
accgtgccca gcctgatatt tttagtagaa atggggtttt gccatgttgg ccaggctggt    26880
ctcgaactcc tgacctcagg tgatcctctc accttggcct cccagagtgc tgggattacg    26940
ggtgtgagcc accacgcccg gcctcttgtt cttttgaaac ctgccctgac gttttttcca    27000
tagtgcatct tggagtcagc gtgtctactt cctgtaaaaa tcttactgtg attttgacta    27060
gaatgtgttg aattcctgtt ttttttttga gtcagggtct ctctgttgcc caggctggag    27120
tgcagtggga ccatcacagc tcactgcagc ctcaacctcc tgggctcagg gatcctctc     27180
agctcaacct cccaagtagc tgggaccaca ggcacatgcc accatgcccg gctaggtttt    27240
tttttttttt ttttggtga acaccctggg gttgcaccat gttgcccagg ctggtctcga     27300
actcctgggt tcgggcagtt tgctcctctc agcctcccgg agtgctggga ttacaggcct    27360
gagccactgc actaggccat gttgaatttc tagattaatt tggggccctc aggggcacag    27420
agaggagggc tgggccagtt ggcgggagga gaggcccctc gggctgccgc attttcagtg    27480
catggagatg gcctatgttg ggggaacaca gagctcaccg ggggtccctg caggaggag     27540
aaagggtcag gcaggtgcca gctcctgtcc attggcctgg ggctgcatga tgcaggggc     27600
cggtgaaccg atgacccctg ggtgtcctgt gaccttctgt gtatgcggct gatgctgcag    27660
aaagtcgggt ggcctcaggc tcctgacggg gctgcacttc ctctgccttt cagattgtgt    27720
tcagtgtgga cccctccgag ggcagccctg gttcccagc agggctgggg gccttacagt     27780
cctataaggt aggggccacc tccaggaggc aggtggaggg cagcccttgt tccccggcag    27840
ggctgggggc cttacagtcc tataaggtgg gggccacctc caggaggcag gtgggctgg     27900
gggtcttctg gtcctaaaag gtaaggggct gcccccagga catgggcggg gcctccacac    27960
tcctggtcct gtcccctcca ggtgcacatc catcctgatg ctggtcaccg gaggacggct    28020
cagcggtctg atgcctggag caccactgca gccagaaagc gaggtacaga cctgggccca    28080
cacgctcccc gcccgcccgg gtgcagtgcc cggcaccacc atgccacagg ctaggcacat    28140
gcccagccgt ggatcctctg cccccatggg cctggccacc ttctccatat ccaggccaat    28200
ccagagcatt ctcctcactg tccctctgaa gattggagtt actgagagac gtaggagatg    28260
gcctgatggc accgtgacct gcccagagtc acctggttgg tggtggcaga gccacagccc    28320
agccaggcct ccctgctggg acacgctcgt ttatgccgag gccgtcagca cagagcctcc    28380
acagtgaggc acggctctgc ctgctgcctc cacgcagcgc ctggccgggc caagcctcag    28440
ggtcacatct gaaggggcc cggctggccc tgttgtccga agcccctggt gcgctcagcc     28500
ccgaggcccc acgtgccttc ttggcttcct gtgctccgtg gcgtcttcga gtcggtgctg    28560
ccggggacgc tgtgtggatg gggtctgtga gtgtgccctc ggctccgtgt ccggagccct    28620
gtggttcttg gggtgtatct ggccccaccc ccactgcgtg gtgtccaggg tggggcttca    28680
cggctgcagc tgcgggagct gctgcccctg ccttgtgctc cagtgggcc ttgcctctgg     28740
gcttggttcg tccctctctg gaacattctt tctcagctgc tgtccgaccc atggtggcat    28800
gacgtggccc tggctgaagc agcccttgtg cggttgctgt ggttgggtct gcctggccga    28860
gccggaaggg aagggctggg agggcgtcag ggtggcgtgg cttgaccccc gctcggtgat    28920
ggtcctgcag caaggcctct cccagcagga agcgtccatc ccgggggag gccggcgccc     28980
ctcacgcagt tggggttgcg ggaggcagtg cgtgcctgag gcagccggtg cacagattcc    29040
aagggcctgg aatctgtttg ttccattgac ctctgatgtc acttgacttc tcagaagcag    29100
ccactccctg cactgggcgt ttgtaggaaa tgagctcctg gaggagggg tggggaagtt     29160
cccccattgc agggcacact cagccccagg aaggaaacgt gcctcgtccc tgctgactcc    29220
```

```
gaatcgcagt cagagtcgtt ctgcttgtgc cgtgttgaat tcccggcatc cggcatccag   29280
actcagcctc ctccccaggc cacggccgcc gtggccagtc ggtcaagccc ttctaggaac   29340
ttcctttgag ctgcgccct  tgttcactgc tgacgccact cagaggcttg tgcacgtgtc   29400
ctgcttccag gcagagctgg gaactcgcac cccgtcttct gcacgcggcc gtggaatgtc   29460
gggatgccgg cgcttccttc ccgtgtgctc ttggcggggt gggcttcttg ccctgagccg   29520
catgtcacag tttctgcaga agtttagggt tggagtgggc tgacctctct gcaggtgtcc   29580
ccagcctctg cctggggtct gcctcctact cccaggaccc cctgtccccc agaggggccc   29640
caagctggca ggctcacact cagggcagcc tcctttgttc tgacttctgc acagtgggcc   29700
tgggtggctg cccgcggctc gcttgcttga tgccagtggg tggagagggt gatgggcaga   29760
gaggcaggtg gtcaggcccc cagtcccgtc ctcacactct gtgccctctg ccgccccccg   29820
ccccacaggg aaggtgctga gctactggtg cttcagtccc ggccacagca tgcacgagct   29880
ggtccgccag ggcgtccgct ccctcatcct taccagcggc acgctggccc cggtgtcctc   29940 cttttgctctg gagatgcaga tgtacgggcc acccctgcca gggcctgagc accggtgaca   30000
cctctgacat cagcggggtg gaagtggtgg gggtccccat gagccgggtg ctgggggtct   30060
cgggcctcga gggctaaagg ggtgctggtg cacttcccca ctgtctgctc cctctggcca   30120
cgctcagccc tttcccagtc tgcctggaga acccacacat catcgacaag caccagatct   30180 gggtggggt  cgtccccaga ggcccgatg  agcccagtt  gagctccgcg tttgacagac   30240
ggtgagggcc tgtccctggg ccctgctggg gtgggaggtg ggggagcact gaggcctgag   30300
gtcctgagca gtggcctctc cggctctagg ttttccgagg agtgcttatc ctccctgggg   30360
aaggctctgg gtgagtgccc tgaatgcccc agctgtgccc atcctggatc ctggaccct   30420 gctcccaaga gctggtaggg aaccctgcag acatcctgcc cctgccttga ccccggcccc   30480
tgcacttcca gcaacatcg  cccgcgtggt gccctatggg ctcctgatct tcttcccttc   30540
ctatcctgtc atggagaaga gcctggagtt ctggcgggtg cgtctcccct gtgttctggg   30600
cggggtgggt gagggcaggg ctggagcatg aagcaggcag tggtcacagc tcctgcttgc   30660
cctcatcgga tcggcggcgt gaccagggct gccgtgtccc tgcctcttcc tcccacaggc   30720
ccgcgacttg gccaggaaga tggaggcgct gaagccgctg tttgtggagc ccaggagcaa   30780
aggcagcttc tccgaggtcg gcacttggcc ggggctctgg gcctgctgcc ccctcgtgcc   30840
tcccctgcct ctcacagctt ccccaaggct gaccactggc cctgaccatg ggctccggcg   30900
gctcccgctg cctcttcagg gctcctgcgt ttccttcctg gccctgagtg ttgcctctta   30960
tcttacaaag cccccagcac cgggtgggtg tggtaacagt ggccctcctg tctgagtagc   31020
cctagtcggc caccctggcc ctggggttcc ccgtgttttc tgggaagcac tgagcaggc   31080 tggggtcagc ctgggatccg tgccaggaag aagcttccag aacccgattg gccttcctgg   31140
ctaggacgat ccttcatctt ggagcatgag acctgggtct ccctcatggg ggaggaaggg   31200 gctgggggg  ggctccaggc tcagcctcac caactttcct tccagaccat cagtgcttac   31260
tatgcaaggg ttgccgcccc tgggtccacc ggcgccacct tcctggcggt ctgccggggc   31320
aaggtgagct ctccagggcc ctctgccctg acctggttgc ctgttccctg gtgggtgctt   31380
atggctcccc agcagactct gggccctggg ggctgcccgg tcccctcctt gggtcccacg   31440
agagcgactg ctgccctgc  tgggagcgtg tcctgctctg ggcctgggca ggcaggatgg   31500
gagtttcctg gccacaagag ttggaggtgg cgtctgggag ctgtggaccc caagtggggt   31560
```

```
cctgacccac agatggagct tcctcccacc cctggttggg gacggagcct cggggaaggt    31620
ggctgggctg ggtgtgggca ccagggagag gagccccccac ggccccaggc agctccctgg   31680
tgtgtcccct aggccagcga ggggctggac ttctcagaca cgaatggccg tggtgtgatt    31740
gtcacgggcc tcccgtaccc cccacgcatg gaccccaggg ttgtcctcaa gatgcagttc    31800
ctggatgaga tgaagggcca gggtggggct gggggccagg tgagttacag cagggtgggg    31860
ctggggtaag gcggtctggt gactgagccc ccgccccgtg gccaagggag ccccgtgac    31920
cgagccgcct cgccccacag ttcctctctg gcaggagtg gtaccggcag caggcgtcca    31980
gggctgtgaa ccaggccatc gggcgagtga tccggcaccg ccaggactac ggagctgtct   32040
tcctctgtga ccacaggtgc gtgcagtccg gtggcaggcg cggcgccagg ggacacgccc    32100
acacccccact gggcccctgg actctccttc cccacatgag gccccgtctc tccagagcc    32160
tctccggcta ctcggggtca gcgtgggcc cctgcagcag atgagggtct tcacttcggt     32220
gaactgaacc cttgaagcgg ctgtgggcag ggcagcaggg ctatggccac ccccaggtt     32280
cgcctttgcc gacgcaagag cccaactgcc ctcctgggtg cgtccccacg tcaggtgta    32340
tgacaacttt ggccatgtca tccgagacgt ggcccagttc ttccgtgttg ccgagcgaac   32400
tgtgagttcc tgcccaggga ggggatgagg gtgttgtccc cagaggagcc agaaatgggt    32460
ccacccaccc ccatggttct gcagatgcca gcgccggccc ccgggctac agcacccagt    32520
gtgcgtggag aagatgctgt cagcgaggcc aagtcgcctg gccccttctt ctccaccagg    32580
aaagctaaga gtctggacct gcatgtcccc agcctgaagc agaggtcctc aggtgcggac    32640
gggcagcgct gggtgggcgg tgtggggtg gcggagcggg cggcgtgggg cgggcagcac    32700
caggcgccca gggcggaggc gactcacctg gctttgtgcg cttcccctcc cacctccaaa    32760
ggctgcctct ccctcctagg gcagggcccc cacgggctgc aaccctcccc tacaggcaga    32820
gaacgcccca ggcaaggatg ccccccgagg ctgagactcc cccaatagc agggaggaca    32880
cccacaggca ggacccccaag tgctgggact ctcccccaag aggggctttg ccacaggcag   32940
ggaccccagc tggggcccc cgtgggcttc actgcgcact cgggtgcccc tgcagggtca    33000
ccagctgccg ggaccccga gagtagcctg tgtgtggagt atgagcagga gccagttcct    33060
gcccggcaga ggcccagggg gctgctggcc gccctggagc acagcgaaca gcgggcgggg   33120
agccctggcg aggagcaggt acagttccag ggccttggga tggacacaga ccctctgtct    33180
cctgaggcca acccgacccc gcccatctgg cctcaggcac ctccccacac acccctgtaa   33240
atccctgcc tggcaggcag gcgggcaagc gggcggggga tcccagctgc ctggctgtct    33300
gtgggtcctc caccccacct caccccacagg ctgctggctc ccaggtggtg catgccctgg   33360
ccctccgcgg gtgcccccca catcactttg gttctctggc gggtcagctt ggctcagtgc    33420
actcaaggtc gggtgcccct gccactggct gcgcttgagg ctggcctttc tccaggaatg    33480
tgctgcgggt ggaacccagg ttccttcttc cttgggcct tttgcccag aagcccataa      33540
ttcctcaggc caacccgaaa ttttctccct gcttcctgct gggagccatt ccctcttcc     33600
tgcccatccc tgcccttcag gcccctggag tgagctccag gtgcaggcac caggcacctg    33660
tgtcccccttc ctgccagccc ctcgctgtgg tcggactgtc ttccctggac ctgctcttac   33720
aagtcaccac ctgcgagcct catgagccgc tggtgtgact tggacaggac caagttgtgg    33780
cactgtcacc ggggtgtgct gtgcccccct ccccgacct ccatcttggc tcagggctcc    33840
tttgggaccat cttccctgtg cgtccaggtg cttttgggacc ccagagtgtg tggttggggt   33900
ctgtgtgtgg ttgtgagctg tgtcctcctc aggcccacag ctgctccacc ctgtccctcc    33960
```

```
tgtctgagaa gaggccggca gaagaaccgc gaggagggag gaagaagatc cggctggtca    34020
gccacccggt gcgtgagctg tccctgcacc tgtgccgacc accatagaca cgcatgggaa    34080
cgcagccgtg ggtgccccca gccacggctg gtcccgatgg gaccagggaa tccaccccca    34140
ggagctgatg tccagggcag ctgtgatgct gacggccagg ggctcaagtg tgtggtttct    34200
tctgcagggg gctcatgagt cccagctgga atcaggcccc acccttgggc aggtttggca    34260
tggggcctgc agcactgggc ttggccctgg catttccctc aagtgtggat gcacacctgc    34320
ctcatgtgag ggacacagcc cattcctagc cttggatcaa agaacggagt tatagccgga    34380
gccaggaagc cccctgcctg ctggaaaacc ccaagtgtgg cggcctttgt ccatgtccct    34440
tggcttctgg gaagaactgg gtggtgccca ggcagggctg gtgccatcag gaagtgggtg    34500
gctgctgagg ggcctgggct ggcgagggcc tgggtgggga gtgcctgggc cgcccctgcc    34560
ttggtttcca cgtttccgtg ttggtctggg gtgtgtagag agatgggcac tgctcatccg    34620
gaagcccctc cttgtgcgct gccatcctgg gagcctcagc cgcatccgct gtggggcagg    34680
gggcttgagg gaggaggaga gagacgggcc atgcaggacc cctggcttga ggcagagcca    34740
atctaccctt tgcccattca ctgctctcag ttccctgcca gcctctcact gtgtgacctc    34800
agacgggccc agccccacag ctttcttccc gcagcccctc cctatgtcca tccagccagc    34860
cagtttctca ggcagcagcc ccacctcggc agtcactgtc ccagggaacg ctcaatgttc    34920
caaggaaggc tctgcagccc cagggaccag atgatgaggc tggccctgat ggagcctcgg    34980
gcctgtgtcc tgcaggagga gcccgtggct ggtgcacaga cggacagggc caagctcttc    35040
atggtggccg tgaagcagga gttgagccaa gccaactttg ccaccttcac ccaggccctg    35100
caggactaca agggttccga tgacttcgcc gccctggccg cctgtctcgg ccccctcttt    35160
gctgaggacc ccaagaagca caacctgctc caaggtgccc tggcttgcag aggccaccca    35220
ccctgagggc agtgctgccg ccgcgtgtgg ggtgggggcc atctgggtcc aaggtggtct    35280
ctgttctcta gagaaaaagg ggcagatggg gacagacgcc ccttcctcta caggcttcta    35340
ccagtttgtg cggcccccacc ataagcagca gtttgaggag gtctgtatcc agctgacagg    35400
acgaggctgt ggctatcggc ctgagcacag cattccccga aggcagcggg cacagccggt    35460
cctggacccc actggtaaat ggggccccag gtgggaccct cagactcctg cgtggaaggc    35520
agtgtgggcc agagtcctgg gctgcttggg gtgggcatcc tcgggccctg cttggccccg    35580
cctctctgtt ccctatggg agtgatgggg gcctccacct ccaccaccag caccagcagc    35640
accacctcca cctccaccctc cacctccacc tccaccacca cctccacctc caccaccacc    35700
tcctccacca ccaccacctc caccaccacc accaccacca ccacctccac ctccaccacc    35760
tccacctcca ccaccaccac ctccacctcc accaccacca cctccacctc caccaccacc    35820
tccaccacca ccacctccac ctccaccacc acctccacca ccaccaccac caccaccacc    35880
accaccacca ccacctccac caccaccacc tgcaccacca cctccacctc caccaccacc    35940
accacctcca cctccaccag cagcagcatc acttgttggg gagaccctgt gcaactccat    36000
gcacagccct gtccctgcca tagccccgac ccctaagcac agccctgtcc aactgccaca    36060
cgtccctgc ctcccatgca tggtcctggg gggtcaactg cacacgccag ggtcctaggg    36120
tcctagaccc ctgtcctccc tgtttctgcc tctgtttggg gtggagtcca agtctccaga    36180
ggcggaagca tctgtgttcg tgtgttaatg aacagcccct acagagttcc cctagttcac    36240
ccaggggggga acctagcctg ttgggacgac cccagatccc ttctgggctt ggtactcact    36300
```

```
gggatatcct catgcctgca cccagcctac ggctctgagc tcctgagtgg ggctttggcc    36360
tgcccgccac tgttccagcc cccatccagc aggctggtgt ctcctctgat gcccccagca    36420
cccaggcgtg tacctgcctg ggttttcccg ccctggtctg aggtgggtga ggcctggcct    36480
ccctagccag ccctgccccc caccccagg gaactttcca gatgctctcg accagctttg     36540
tggctctaca tctcttcatc aggaagaacg gcgccggatc ccaagctgac cgtgtccacg    36600
gctgcagccc agcagctgga cccccaagag cacctgaacc agggcaggcc ccacctgtcg    36660
cccaggccac ccccaacagg tagctgactc ctgaaccgtg tgcagcctac gacttggtgg    36720
gtccctcagt ggcttcacga ggctaactct tgagtgtggc cggggctgcc cctgtgggga    36780
gccatctcat ggtggggact gctcccggtt ctgcaccccg cagttgtcct gagcagctct    36840
ccaggagttc ctggaggaag ggcgggcagg gcggtgggac tctcagtcct ccaccccagc    36900
gccactctga gccatgctac tcccacacca ggagaccctg gcagccaacc acagtggggg    36960
tctggagtgc ccagagcagg gaagcagggc cagcacgccg tgagcgccta cctggctgat    37020
gcccgcaggg ccctggggtc cgcgggctgt agccaactct tggcagcgct gacagcctat    37080
aagcaagacg acgacctcga caaggtgctg gctgtgttgg ccgccctgac cactgcaaag    37140
ccagaggact tcccccctgct gcacagcaag tggccctggc gtggggaaca gccggtgggg    37200 tgggggggcag gggacaaaat gggggctgtg ccgggtctga ttgaagctcc ccgcagggtt    37260
cagcatgttt gtgcgtccac accacaagca gcgcttctca cagacgtgca cagacctgac    37320
cggccggccc tacccgggca tggagccacc gggaccccag gaggagaggc ttgccgtgcc    37380
tcctgtgctt acccacaggg ctccccaacc aggtagggca cctgcctggc tgctcctggc    37440
agcgccccaa ccgcacgcag ccctgggagt gagcagcaaa gccccaggcc cccctcagac    37500
tcaagtctct gtctccaggc ccctcacggt ccgagaagac cggaagacc cagagcaaga    37560 tctcgtcctt ccttagacag aggccagcag ggactgtggg ggcgggcggt gaggatgcag    37620
gtcccagcca gtcctcagga cctccccacg ggcctgcagc atctgagtgg ggtgagcctc    37680
atgggagaga catcgctggg cagcaggcca cgggagctcc gggcgggccc ctctcagcag    37740
gctgtgtgtg ccagggctgt ggggcagagg acgtggtgcc cttccagtgc cctgcctgtg    37800
acttccagcg ctgccaagcc tgctggcaac ggcaccttca ggttggtgcc tggccactac    37860
agttcctgct gggtgtagcc ccaggtgatg ggctgagggg gaaagggcag gcccttgtcc    37920
tggtggcaac gcctggcaga cgtgtgcagt gggccggttg tctcacaggc ctctaggatg    37980
tgcccagcct gccacaccgc ctccaggaag cagagcgtca tgcaggtctt ctggccagag    38040
ccccagtgag tgcccacgga ggcccccagc acacccaacg tggcttgatc acctgcctgt    38100
ccagctctgg tgggccaaga acccacccaa cagaataggc cagcccatgc cagccggctt    38160
ggcccgctgc aggcctcagg caggcggggc ccatggttgg tccctgcggt gggaccggat    38220
ctgggcctgc ctctgagaag ccctgagcta ccttggggtc tggggtgggt ttctgggaaa    38280
gtgcttcccc agaacttccc tggctcctgg cctgtgagtg gtgccacagg gcacccccag    38340
ctgagcccct caccgggaag gaggagaccc ccgtgggcac gtgtccactt ttaatcaggg    38400
gacagggctc tctaataaag ctgctggcag tgcccaggac ggtg                     38444
```

<210> SEQ ID NO 2
<211> LENGTH: 37214
<212> TYPE: DNA
<213> ORGANISM: mfascicularis
<220> FEATURE:
<221> NAME/KEY: misc_feature

```
<222> LOCATION: (4525)..(4624)
<223> OTHER INFORMATION: n is a, c, g, or t
<220> FEATURE:
<221> NAME/KEY: misc_feature
<222> LOCATION: (4914)..(5013)
<223> OTHER INFORMATION: n is a, c, g, or t
<220> FEATURE:
<221> NAME/KEY: misc_feature
<222> LOCATION: (9472)..(9571)
<223> OTHER INFORMATION: n is a, c, g, or t
<220> FEATURE:
<221> NAME/KEY: misc_feature
<222> LOCATION: (16613)..(17049)
<223> OTHER INFORMATION: n is a, c, g, or t
<220> FEATURE:
<221> NAME/KEY: misc_feature
<222> LOCATION: (19812)..(19911)
<223> OTHER INFORMATION: n is a, c, g, or t
<220> FEATURE:
<221> NAME/KEY: misc_feature
<222> LOCATION: (35806)..(36357)
<223> OTHER INFORMATION: n is a, c, g, or t

<400> SEQUENCE: 2
atgcccaaga tagtcctgaa tggtgtgacc atagacttcc cattccagcc ctacaaatgc      60
caacaggagt acatgaccaa ggtcctggaa tgcctgcagc aggtagagca caggctggga     120
ggaaaggact gcaggcaggt ggagctgggg ctgggtgtgc gtccctctcc cgacccattc     180
cagccaggcc cctccagagg cagcctctgt cataaaaagg ctggtgttcc aggtggggtc     240
agagagagga ttgacaagta aaacatcgt ccttgagagt gacagactta gtgccttggg      300
ggcctctgag gagcggctgg tattcacagg tcaggaggaa gcatttccat cagaggggca     360
gccgggggcc agcctcactt tgaaggtctt tgaacctttg gggtgcaggg aggtggcagc     420
ggcgcaggtt gccttctcct gggttccttg aggtgccctc ttgtacccgg ctcacacccc     480
tcccctcccc gagtttcccg ctcaggttcc catctgagag ctcgtatgta ggacatcaga     540
taggacagcg taagtgtttg gatctggaaa cacagaacag tttcctattt tgagacttga     600
tgcctaatta gtcatcttac tatttaggct gaaaaatact gttgcatttc gggtaacgtt     660
ctgcaaatgg tctgctgatg gcagctggag ttgcttcacg ccctttaggg caagagtgga     720
aagtgtcctg cggacttatc catggtcccg tggggtctc gccacctgac agcggcctct     780
gcatctgcga agagctgccc actggctgct gaggcttgtc tcaggtggt ttgtgtggcc      840 ttgcctcttc ctggcttccc cgtaaccctt gcccccaact ctgttcagaa ggtgaacggc     900
attctggaga gccccacggg cacggggaag acgctgtgcc tgctgtgtac cacgctggcc     960
tggcgagaac acctccgaga caccatctct gcccgcaaga ttgccgagag gttcaaggg    1020 gagcttttcc cgaatcaggc cttgtcgtcc tggggcaacg ctgctgctgc tgctgaagat    1080
cccataggtg accctagttc ccaggccttc cctgacctcc tgtggggatg ctggcaagg    1140 gatggcgctg agggtagggt gggcccatgg ggacttctgc cagcagagct caaggagaat    1200
tttgtagctg ccacataatt tctcgccatc gtgggtataa acctagggtt gggcttttt    1260 gctgaattag ggcgtggcag gtgtacactt cgcccgtttg tgataaacga gtctctgggg    1320
tgtcagattc ttggctgtct gcagggctga gttagccgaa tgccaccgc ctttaacacg     1380 tgagaaccat gacctctgtg cttgcttgtg tctgggcagc ttgctacacg gatatcccaa    1440
agatcattta cgcctccagg acccactcgc aactcacgca ggtcatcaac gagcttcgga    1500
acacctccta ccggtgggtc agacgagttc acgcctgtct tggggtcctc gagagaacca    1560
gcttgacgtg gtgctgggtc cacagaccac gctgtgctgt agtggagggg gcggtctttc    1620
```

```
cagacgctcc ccagaagtat gcagtgtgct ggtgcccagg ggtggggcgg ggcccgggct    1680
gtccctagtg cccattactt gtgaggaggc agctttgcat ttgtgtgctg accttgggct    1740
ggcgtcctga gctcctttca ggtgctgttg tggcagctgt gtggcaggtc agggccggcc    1800
cccagtgcag ctttgcacat gaagtgggag gaggccctgc cgcttgtcag agccctgcag    1860
agtcttggtg ttctgtcggg ttcctgtgga ggggccgatg gcggggtgct gtggaagctg    1920
tcgaatctcg tccctctgtc cagttccccc gcttgtctcc ttgctccctc ctactcccgg    1980
gccacgatcc tatgccgggg ccactctcct gcacccggac cacgctccta cgcccaggcc    2040
actctcctac gcctggacca cattgcagtt atgctgactt cctctggctg ccagtgctcc    2100
tgtgtgtctc catacagctc acgctgcggg accacgctgt ggctgttgga ggcagctcct    2160
cctccaccca tagtgctctc tccctccagg cctaaggtgt gtgtgctggg ctcccgggag    2220
cagctgtgca tccatccaga ggtgaagaaa caagagagta accacatgca ggtgggctcc    2280
tggctcccgc tccggctcag ggttccgtga ggcgagtgct gctgggtatc cagagtccca    2340
ggctgtgctc ctgctgggct gggggttcgaa gttcactggg ggactgcagg cgagggcctg    2400
gtgggggtgg ggactggctc gggtcctttc ttggccatac tccagccgcg cactctgccc    2460
ttcctcccgc agatccactt gtgccgcaag aaggtggcaa gtcgctcctg tcatttctac    2520
aacaacgtgg aaggtacagg cagctcggtg ggaccaggct tgggttggag tgtgtgcagc    2580
ctctcagggc gtcagcctgg ttgtgcttgc cgggtggggc ggccagtgca gccgtgtacc    2640
tgggcactgt cttctgactc gggaccaccc gtgttagtct tctgtgtgga agagctcacc    2700
cagtggtctg agacagccag ccggccggac tgcctgtggc tggtgcctgg ggccttggat    2760
tttgggaagg ctccctccat ttccggacga gaagggctcc ctgcacctga ctactggtgc    2820
atacagcagc ggttttgctg aacacctgct ttgtcttcgg ggagcctgag gttttgttgc    2880
ttgcccagca gcgggtgctc ctgtgaccgg cccttgtacc atcttgggag ggtgtcctgg    2940
aagccgtgtc tggcctcccc cgaccttgcc gcatgtgtct ttgtcctgtg ctgacgttgc    3000
agagaaaaat tacagccccg agcgtgactc caggctgagt cctgtgggtc cgacacggga    3060
ggccttgggg cctcttcagg agacgggatg agtgagtgat gggagcagag ccagggcacc    3120
tcgccctgtg actgcaggtg gccacagcct gtgagggcca ggggtgcttc tccacccacg    3180
tggctgcccc tcgggtatgt caggggcttc tggggctctt cacgaggtct cagagacagt    3240
agcagggtgt gcccccgtcg gctgccctta cagtttctgt gacctgaggg tggcatctgt    3300
gcggttggca tggcctgagc ttctgtggga tcagagttcc ctttgtttcc tgcctcagtt    3360
ggggctcaag cctcaggtga cgtggccctg gagcacctgg aaggcgtcgg cggtcctgcg    3420
ggctgctgtc tgcactcgtg tttgctgagt gctcagtatg ccaggactga ggaccctgaa    3480
gctgctgtta tatttaggac ggttctcccc tggcagagac ggagccgggt ggtcccgcct    3540
gacccaccac caggcgtttc tgggccctgg agggacaggg tgggcggaac atggcctgc    3600 agggagacct ccacttactg gaggctcgtg ctgtgttgct ggaggcatct tctgtgttgc    3660
ttcttgtttg ctgtgtcttt tgttctggtg gcaccaagga cctccagtca ccttgatgtg    3720
tggttgtcca ggccttttg gtggtcctga aaggggtct gaggggctct gcctctgccg    3780
ccaggttccc tgatggaagc tgcccactcg tcctggtggt gcccacagga cgtgactctg    3840
gcacaggagg gcagatgtgc tgttggagat tctcagcccg tcgtcgtcat ttccaaagtc    3900
ctcacccgca tttctgggac aggacaggag tgcctgctgg gtgtccccgg tcccatgcag    3960
cgggggtcct tgggatagtg tggaacgctg agtgtgggcc tgtccggcgg tggtcctgga    4020
```

```
caagggtagc accccctgtgg ccgccgggcc tggtgcctgg tgcctagcgg ggaggccgct    4080
gaccgcctcc tgtgctgctt ccatccgtgt caggcctctg ggtgttgggc ccccatctgt    4140 ctcccccag gcctgtggga tcagtccaag aagactcaat ccagcccag cctgtccccc     4200 ttggcttggg ctctcactgc ccgacctggc aggaggttgc ctagcggtga acctttgcat    4260
cctgtctgcc ccctggacag gctctgaggg ggtgtctgca acacctgtgc cagcctgggc    4320
atcttttttt ttttttttt cttttgagac gaaatctcgc tctgccgccc aggctggagt    4380
gcagtggcgt gatctcagct cactgcaagc tccacctccc gggttcacgc cattctcctg    4440
cctcagcctc ccgagtagtt gggactacag gtgcccgcca ccatgcccgg ctaattttt     4500 gtatttttt tcttttttt tttgnnnnnn nnnnnnnnnn nnnnnnnnnn nnnnnnnnnn      4560
nnnnnnnnnn nnnnnnnnnn nnnnnnnnnn nnnnnnnnnn nnnnnnnnnn nnnnnnnnnn    4620
nnnntttgag acggagtctc gctatgtcgc ccagggtgga gtgcagtggc cggatctcag    4680
ctcactgcaa gctccgcctc ccgggttttt acgccattct cctgcctcag cctcccgagt    4740
agccgggact acaggcgccc gccacctcgc ccggctagtt ttttgtattt tttagtagag    4800
acggggtttc actgtgttag ccaggatggt ctcgaactcc tgacctcgtg atccgcccgt    4860
ctcggcctcc caaagtgctg ggattacagg cttgagccac cgcgcccggc cttnnnnnnn    4920
nnnnnnnnnn nnnnnnnnnn nnnnnnnnnn nnnnnnnnnn nnnnnnnnnn nnnnnnnnnn    4980
nnnnnnnnnn nnnnnnnnnn nnnnnnnnnn nnnttttgta tattttttta gtagagatgg    5040
ggtttcaccg tgttagccag gatggtctcg atgatctgac cgcgtgatcc gcccacctcg    5100
gcctcccaaa gtgctgggat tgcaggcttg agccaccgtg cccggccagc ctgggcatct    5160
ttagagtggg ctgcagctcc tggaggggtc tgagaggaag gaaggcaggt attttgtgaa    5220
tgaagagaca gctagagagc tggcaccctt cctggcctgc gtcctgtgag gactctggtt    5280
ggggacagca agcttggggt tagcctgggg cagagcctct gggaggcccc tgccccttgt    5340
cccccttccc cttgcagctc ctgtcctcgc cccgccctca gctctctgcc agggaaggtt    5400
tggcaagtgc cgctgtgcgg cagtgcgtgc tgattgctg tcgttgcta tggtgccgct     5460 cagggatatg cttttcctcc cctgccttcc ctgctatccc tgggagcatc tggagttgag    5520
tcatcgctgg tgtgtgtgtg tgtgtgtgag tgtgtgtgtg agtgtgtgag tgtgtgtgtg    5580
cgtgtgtgtg tgtgtgtgtg agtgtgtgag tgtgtgtgtg tgagtgtgtg tgtgagtgtg    5640
tgtgtgtgtg agtgtgtgtg tgtgtgtgtg tgtgtgtgtg tgtgagtgtg tgtgtgagtg    5700
tgtgtgtgtg tgtgtgtgtg tgagtgtgtg tgtgtgtgtg tgtgtcagtg tgtgtgtgtg    5760
tgtgtgtgtg tgtgtgagtg tgtgtgtgtg tgtgtgtgtg tgagtgtgtg tgtgagtgtg    5820
tgtgtgagtg tgtgtgtgag tgtgtgtgag tgtgtgtgag tgtgtgtgtg agtgtgtgtg    5880
agagtgtgtg tgagtgtgtg tgtgagtgtg tgtgtgtgag tgtgtgtgtg agtgtgtgtg    5940
tgagagtgtg tgtgtgagtg tgtgtgtgtg tgtgagagtg tgtgtgtgtg agtgtgtgtg    6000
tgtgagtgtg tgtgtgtgtg tttgtgcccg tgtgcgcctc tggcctctgc agctgagtcc    6060
tggctctcag ggggcctggc acctcccggg gatgggcaca aagcagccac gatgcagccg    6120
ggagctgggg aaggccccat tgccccacac ggctgcccta agactctggg gtgcttcttg    6180
gaagaggtcc ttgcttctgt ctgtgttaa gcagctccct aaggagttct gtggttcca      6240 ggttgggggc ctgtgctgtg gaggcgaggg aggggcagga ccccaactc cctgaagcct    6300 tttctggcct ggtcctctca gccagcatag gcagggccct ttcccaggc tgccatgctg    6360
```

```
cagaggggag cgggccacta tgtagcctag gaaaacctga cgttccttcc gctggcagtt      6420
ctgggcctgt tgtggttggc agggaagctg agccacggtg ctcatcacag gggcacctcc      6480 aggattttttg ggagatgcct ccgtgggctg gggcgatacg ctgaggagct gttcttccct     6540
gccctgagga gggctgagtg tagccgtcac ccctgtcctg tcttgggctg tctcagggag      6600
gatgcataga accctcggaa ccctgctggc ccttgtctga tccaccctca acctcaggcc      6660
ttctaggggc acaggagggc tccgtcggga tcactgcggg tgggggcctc ccttggacac      6720
ctgagaccct caatgggtgc tttgtggcac gttcatgatt gggcggggg gcacccagcc       6780 ctgcctgccg tgtaggagct gttctgtcct gggcgtccct ctgtggttgg acccggagg       6840 gtgtgtgttt accccgcctc acacctgcag agaaaggcct ggagcaggag ttggccagcc      6900
ccatcctgga catcgaggac ttggtcaaga gcggaagcaa gcacaggtga dccccctcag     6960
tgaggccacg accactgtcc ttccatggcc cagctctcct gtgacctgtg gaggcccaga      7020
tatgtttctt ccctttttctt tgttcctttc taagtcgtga aactaaccac cgtttagtgt     7080
gagaaagttg aagcagctct gaggaacgta gagtaaaaag cgaaaccgcc tccctcttcc     7140
ctggccgtca gccaccccag gagccaccgt ggagcgggga cagagccctg caggctcgtg     7200
tctgtgtgga agcacgcacg gttttgtctg cacagactgt tctgcagttt gccgttttca     7260
ctcagcgttg tgggtagctt cgcatgctgg tgctggtcgt ccggcttcgt tcttctgagg     7320
acagcaaata tgtcctttgt ccacctcttt tatagtttca gagattcaag ttataataaa     7380
gcttttctta tattgagggg gagagctcct gcccctcttt tttttttttag acagagtctc     7440 gctctgctgt ccaggctgga gtgcagcgtc gtgatcttgg ctcactgcag tctcaacctc     7500
ccaggctcaa gtgattctct cagctcagcc tcccaagtag ctgggactgc aggcatgcac     7560
caccacgcct ggttaatttt tgtatttttt gtacggacaa ggtctcactc tgttgctcag     7620
tccagtcttg aactcctgag ctcaagagtt ccacccgcct cggcctccca aagttctggg     7680
attccaggcg tgagcaccac gcccgaccca gctctgcttt gttttagtgg ttctgtttgt     7740
gtttgtttct gatgacctct atccaggaat agggttggtt tttcttttcc atggagtttt     7800
taaagagatg atgatttaca tggttttaaaa ctcatgtgga ctccccgtcc atcccagaca     7860
gcggcttccc acctggaccc catgctcagg attagggctc cttccgggtc agaagatgtg     7920
gcggccccgg cctcgggtca ccgtcccctg cacggggtgc tcacagcatc ttcccctctc     7980
ctcgttccca gggtgtgccc ttactacctg tcccggaacc tgaagcagca agccgacatc     8040
gtcttcatgc cgtacaatta cttgttggat gccaaggtgg gggctcagtc tgcgtcgctg     8100
acaactcctg atgtccaggg gggttcctgg gcttgggaaa ggccgtccga gcctttgctg     8160
ctgcagggac ttagagcagc aggcctgggt gggagagctc acctgtcact gggcaggggc     8220
tcaacctggc cagacacact tgtgagcacc cccaggccct gggtcagttg ttctgagcaa     8280
tctgggagtg ggcaggctgg tgggagtgag gagaggcctc caggctgtgg tccacaggcc     8340
agcgcccact cttgatcctg acagctcagg ttctctcctt cacgtccgat cacaggaagc     8400
aaagcactga gaacacggga agcccactca ctcccctcct cccagcccca cactcactcc     8460
cccccatgcc cggcccaca ctcacttccc tcctcgtagc ctgtactcac ccacatgctg      8520
ttgtgcccca cacttttttat ttagtgcagg tggcatctcg ccgcgggtca gtgacttgtg    8580
ttcacgtggc gatgacgtgg tgacgcttcc agatccctcc attggtttgc tcattctcag     8640
ggtgtatatt tatcaagagc ccatcgtgct gggggctgtt ctaggcatag caagactggc     8700
ttcattcatg tggagctttg attctagcgg tggggacagg tagacagcag aagagtaagc     8760
```

```
ccgtgagccg atgagactga agagaagtag agcagagcga ggaggtggag acagagccga    8820
gtgggcaggg cccaagtgcg atgtcggcag agatggggga atgctgatgt gtctgagggg    8880
agcccgagct ggtgcagcag agcaaggagg gaggcggggg gccgactcct gggcagcgat    8940
tgtagaaccc cacggagagc tggtgaggtt tgccgtggtt gcaggtgact cggtgctttg    9000
agccgtggct gcccctggga accacctgga gagcttctaa cccaaccagg cccttccctg    9060
ggacaattct gtcacagctg gtaagctaag tccaacactt tcacggaaac acagaagatc    9120
taaaacggca cgatgaccgt gaagaacaga gctggaggac tcacctcact ggtttcaaga    9180
ctcctctaaa actgcaggag tggaggtgga acggctcag ctcaggcaca agcctgcagg    9240
ccatggagaa ggcagcaagc tccagctgac ccacacgctt gcggtcattg tttttttttt    9300
ttagttggaa tctccctctg tcaccccagt tggactgcag tggcaccatc tcggctcact    9360
gcagccccca cctcctgggt tcaagcgatt ctcccacatc agcctcccga gtcactggga    9420
ttacaggcgt gcgccaccac gccctgcccg tgatgattgt tttttttttt tnnnnnnnnn    9480
nnnnnnnnnn nnnnnnnnnn nnnnnnnnnn nnnnnnnnnn nnnnnnnnnn nnnnnnnnnn    9540
nnnnnnnnnn nnnnnnnnnn nnnnnnnnnn nttttgagac agagtctcgc tgtgtcgccc    9600
agggtggagt gcagtggccg gatctcagct cactgcaagc tctgcctccc gggttttac    9660 gccattctcc tgcctcagcc tcccgagtgg ccgggactac aggcacccac cacctcgccc    9720
ggctagtttt ttgtattttt tagtagagac ggggtttcac cgtgttagcc aggatggtct    9780
cgaactcctg acctcgtgat ccgcccgtct cggcctccca aagtgctggg attacaggct    9840
tgagccaccg cgcccggccg atgattgttt tttgacaaat gcgccaatgt aattgagaga    9900
ggaaatgaag gttgattttt ggttttctga aaaagtggtg ctaagaacag ctggatatct    9960
gtttggaaaa cagcgaatct taactcttgc tttactctat ataaacctaa atgtaaaagc    10020
taaactaaag gttatagaaa gaaacatggg ggggtctttg caactctggg gtaggcagag    10080
attccttagt gtggatacat aaggcactag ccgtgaagaa aaacataaaa tttggatttc    10140
accaaaattt aaagcttcaa cacttgaaa gacttgagaa aattaaagag cagttatgga    10200
aagggagaaa atgcttctgt cttttcagagg acttaaaaaa catttttcag ccctcctcat    10260
attttaaagg acctttgacc agagtatgta aaattctctc ataactaagc aaaaaaccca    10320
tttaaccagt gggaaaggat ctgcacagac gtttcaccaa gatggacgga gtggccagtt    10380
gggcacatgg aaggacgccc agcatctcca gtcacaggag aaggcagatt aaagccacgg    10440
ggagccggca ctacggtccc gctagcatgc tgaaattcag aagcctgagt gtggcacgag    10500
gaggtggaac agctggatct catccattgc tcctaagctg tgaagctgtg tagccactcc    10560
acaaacacgt gtggcgaaca gccgaaccgg gagaagggaa gacgtgttca aagatttgtg    10620
tgtggccagg ctcagtggct cacacctgta atcccagaac tttaggggcc aaggctcagg    10680
gatcgcttac gcccaggagt ctgagaccag cctgggcaac ataggagac cccatctcaa    10740 aaaaaaagaa aaagaaaaa aaaagactta aatgtgcaag tttaccagag ctttgtttaa    10800
gttgccagaa ctgggaagcc gcccacgtga gtccatccac tggtgaacgg acaaaccgtg    10860
gttcgcaaac cccaacagca gccgcgggca tgggctgtgg tcacacagca gcaggagcc    10920 agtgagtctc agatgtgcta acccagaggc caactgagga ggacctactg ttttttgttt    10980
tttgattttt gttttgagac agagtcttgc tctgtggtgc aggctggagt gcagtggtgt    11040
ggtctcggct cactgcagcc tctgcctctc gggttcaagc agttctcctg cctcagcctt    11100
```

```
ccgagtatct gggactacag gcacccgcca ccacacccgg ctaattttt g tattttagt    11160 agagacggca tttcgccatg ttggccaggc tggtttcaaa ctcctgacct tgtgatccac    11220
tcaccttggc ctcccaaagt gctgggatta caggcgtgag ccaccgcacc cagctggacc    11280
tactgtttta ttccgtttat atgacgctgt attaatagaa gaggcagggg tagagctggt    11340
ggttatgtgg tgcacttaac tgccagaact cagtacccct taaaatgggca tcttaatgtg    11400 tgaaaactta aaagtaccaa agctggaccc cacccccagct tgctcccatg acactctgtg   11460
gtgggacctg ggagttgggg ttttttttt tttttttcag atggagtctc actctgttgc     11520
ccaggctgga gtgcagtggt gcaatcttgg ctcactgcaa cctctgcctc ccagattaaa    11580
gcgattctcc tgcctcagcc ttctgagtag ctggggttac aggcgcacac caccacgccc    11640
ggctaatttt tgtgttttta gtagagatgg ggtttcacca tgttggtcag gctggtctcg    11700
aactcctgac ctcatgatcc acccgcctcg gcctcccaca gtgctgggat tacaggtggg    11760
agccaccgcg cccggcctgg agttgggttt gtaaatctcc ctgagtgggg ccggggcaga    11820
gaactgctgg gtctgggtct tcctggctcc tgtggtctgt ggctggctga ctgcggtggc    11880 cggggggctcc caggacgtcg tggccgtccg tcttgctgag cgtggcgcgt gccttccat    11940 gctgtgcgtg agcgtctccc ggcgtggcga gctgctgctt cgggtggggc ggtgttgcca    12000
ggttgccatc cagatctggc ctctcctctc cacgtcgccg gcggtgtttg tcatcggcac    12060
ttgcgatgtt cgatgccggc cacatgtgcc ttggtttccc tccttcctgc ccctgtgagc    12120
tccagcaccg tgtcccttct cttcctcctg tagagccgca gagcacacag cattgacctg    12180
aaggggacgg tcgtgatctt tgacgaagct cacaatgtgg tgagtctcca ctgcctccta    12240
aacgcctcct gtttcttcaa gagcagcgca aacctttctg gaggggctct ggccaaaccc    12300
ttgcagcctt cggtgcccag gactgaggac tgagcacccc aggagcttct gcaccccttc    12360
ccactctgat ccgatgcctc tgctggggct ggagactggc cagctgggcc agggacctgc    12420
ccctcaggcg cagggccccc acaggccgct ccccaggcct tccctctagc cagctagggg    12480
tcagcctggg ccaggggtgt ctcctctgcc ctcggcttct gtcaccaggg cagcagcagg    12540
cgtgtggtct cgcctgcagt gtctctgccc ttccggccac atggcctgag ctgaggcag    12600 aattgcttga accctggagg tggaggctgc ggtgagccag gatcacaccg ctgcactcca    12660
gcctgggtga cagagcggga ttctgtgtca aaaaaaaaa aaatgttgac tgggcgcagt     12720
aggtcatgcc tataatccca gcactttggg aggccgaggc gggcggatca tgaagtcaag    12780
agatcaagac tatcctggcc aacatagtga accccatt t ctactaaaaa tacaaaaata    12840
ttagctgggc gtggtggtgg gtgcctatag tcccagctac tcaggaggct gaggcaggag    12900
aattgctcga acccgggagg tggaggttgt agtgagccaa gatcacacta ttgcactcta    12960
gcctggtgac agcgagactc cgtctcaaaa aaaaaaaa aaaaaaatt ggcaactcca       13020 ttgaaataat tgtttgtttg tgttttgaga cagggtctca ttctgtcgtc caggctggag    13080
ttcagtggtg tgatcttggt ccactgcaac ctccacctcc tgggctcaag ccatcctcct    13140
acttcatcct cccaagtaac caggactaca ggtgcacacc accacgcctg gctaattttt    13200 gtatttttg tagagatggg gttttgcatc attgcccagg ctggttttga actcctgagc     13260
tcaagtgatc tgtccacctc agcctcccaa agtgctggga tcacaggtgt gagccgctgc    13320
gcctggcctg aaataatcgt ttctcaatat tggtgtgggc cagacagtcg tgtttggacc    13380
tgcttgtggc ctggccttag agaccccagg gcgtggcttt ggggacttgg ctgtcagcct    13440
cctgtgcctt ctgcacccaa ccccattcct gctttctgga accccgatc ctatcctgct     13500
```

```
ctgtggtgat ccgggtgatt tgggctcccg atcctatcct gctctgtggt gatccgtgtg   13560
attcgggctc ctgatcctat cctgctcggt ggtgatcccg gtgattcggg cccccgatcc   13620
tatcctgctc tgtggtgatc cgggtgattc gggctcctga tcctatcccg ctctgtggtg   13680
atctgggtga ttcaggctcc cgatcctgtc ctgctctgtg gtgatccggg tgattcaggc   13740
tcctgatcct atcctgctct gtggtgatcc cggtgattcg gcccccaat cctatcctgc   13800 tctgtggtga tcccggtgat tccggctccc gatcctgtcc tgctgtgtgg tgatcccggt   13860
gattcgggcc cccaatccta tcccgctctg tggtggtccg ggtgatttgg gctcctgatc   13920
ctgtcctgct ctgtggtgat ccgtgtgatt caggctcctg atcctgtcct gctcggtggt   13980
gatcccagtg attcgggccc ccgatcctat cctgctctgt ggtgatccgt gtgattcggg   14040
ctcctgatcc tatcctgctc tgtggcgatc ccggtgattt gggctcccga tcctatcctg   14100
ctctgtggtg atctgggtgt gctcggactc caggagaaga tgtgtgaaga atcagcgtcc   14160
tttgacctga ccccccatga cctggcttca ggactgacg tcatagacca ggtgctggag   14220
gagcagacca agactgtgca gctgggcgag ccccacccgg agttcagcac agactccccc   14280
agcccaggtg cgttcatagc caggctgctc ggtcctgagg cctgcgctgc tgcagggggc   14340
agcctgccct gtggctgtgt gtggtcggcc tgggcactgt ctgttcaggc tggcactgca   14400
gggcacccac ttctctcaga ggcttctcgg gtgtgaattg tttggggtcc tgtaggctgt   14460
ggaagggctg gtatcgttca gtagttctgg tattttccga agacctatgt cttctcccag   14520
ccagtgtcaa cttggcctct actgtgtaaa attagagaac tatactttgt gaagctgaga   14580
tgggagcatc gcttgaggcc aggagttcga gaccagcctg ggcaacatag cgaaacctcg   14640
cctctgccaa aaaattagcc aggtgtggtg gtatggtcct gtggtcctgt ggtcagagct   14700
tttctggagg ctgaagtggg aggagctctt gagcccggga ggcagagctt gccccagatg   14760
gctccactgt actccagcct gggtgacaga gtgaggctgt ctccaaaaaa aaaaaaaaa   14820 aaagtaaaac taactatatt cactgtaagg gcattttgcg tgtttaaatg acccacacat   14880
cgggcctgca tcacttgctg tgcccgtaga ttccttccca gtgttcgtcc agaggcgtat   14940
ttccacacag cgctagtcac ggcgtacgtg gaaaacgcgg aaaccccccat ggatgtggtc   15000 ggttggtctg tactgtctgt gttttcttcc tttctttttt tttttgagat ggagttccac   15060
tcttgttgcc caggctggag tgcaatggtg cgatcttggc tcaccgcaac ttcctcctcc   15120
caggttcaag tgattctcct gcttcagcct cccaagtacc tgggactaca ggcgcgcgcc   15180
accacgccca gctaattttg tattttagc agagtcaggg tttctccatg ttggccaggc   15240
tggtctcaaa ctccaggtga tccgcccacc tcggcctcct gaagtgctgg gatccaggcg   15300
tgagccgccg cgcccggcct gtgtcgtgtt ttctgcgtgg cctctgtaaa cagctgacta   15360
ggagtctgtg agcatcttca ttggttccgc tgtgacttgc gtgtgagcat ctccagcatc   15420
agctttcctc attttccttt aaaatcgcac atgtggatgg acaccatggg gaccctggac   15480
cctgggcagc ctcgtcctca cctttctcac cagggtggct gcttgggaga gagtgagttt   15540
gcgaacttgg catttgttct ggctgtagga tccgtttata tatatacata tatttaagtg   15600
acagggtctg actctgttgc ccaggctgga atgcggtggc gtgatcttag ctccctgtag   15660
cctcagcctc ctgggctcgt ggggtcttcc cgtctcagcc tcttaaagca ccgggaccgc   15720
aggcggtcgc cactgccatc ggatctcaag gctgccacgc agggcgctgc agtaggggaa   15780
ggggttcctg ggactttgaa cgctccacct ccctcttctc cacagtcccc caaccccacc   15840
```

```
tctaactggg agtggatggc cacctctttc catcctttgc ctggcgcagg gtggggagaa      15900
tgacaggtct ccttcccgca tctcggcagc tgccctttcg tcggttatat gacgtggag       15960 agaccccggc cacccccagg gctgtgtgac gtgggagaga ccccggccac ccccagggct      16020
gtgaacaccg ccacagggc cttctccact cttcagtttt gttagttacg tgacgtgcag       16080
ggcttttcgt tgtaactagt gggggacgtg tggtgagggg ggcttctgcc gtctcattca      16140
ggaccggaac ttcagttttc atcgctattt gtcctcctac gcctttggag atggggtctc      16200
gctctgttac ccaggctgga gagcagtggt gccatcaggg ctcacggcag cctcctcctc      16260
ctgcagcctc cgcctcttgg gctcacacaa tcctcctgcc tcggcctccc aaactcctgg      16320
gacgactaca gacgtgcgcc accgtgcttg gcagggttca ttcttttcct cacactttat      16380
ttattggaga gcccggtaga gcgcccggtt tgcacgatct ggttgttgag acgttgagag      16440
gaaccctgcg gagtctgaat ctgggtatgg gaggggcagt cacacgagtt ccccggtgtc      16500
ctcgtctcct ccgcacttag gtgcccttag gtggcttgag gaccccagtt agactggggc      16560 cacccttttgc ctggctccag gcgggatgtc ctttcttttt tttttttttt ttnnnnnnnn    16620
nnnnnnnnnn nnnnnnnnnn nnnnnnnnnn nnnnnnnnnn nnnnnnnnnn nnnnnnnnnn      16680
nnnnnnnnnn nnnnnnnnnn nnnnnnnnnn nnnnnnnnnn nnnnnnnnnn nnnnnnnnnn      16740
nnnnnnnnnn nnnnnnnnnn nnnnnnnnnn nnnnnnnnnn nnnnnnnnnn nnnnnnnnnn      16800
nnnnnnnnnn nnnnnnnnnn nnnnnnnnnn nnnnnnnnnn nnnnnnnnnn nnnnnnnnnn      16860
nnnnnnnnnn nnnnnnnnnn nnnnnnnnnn nnnnnnnnnn nnnnnnnnnn nnnnnnnnnn      16920
nnnnnnnnnn nnnnnnnnnn nnnnnnnnnn nnnnnnnnnn nnnnnnnnnn nnnnnnnnnn      16980
nnnnnnnnnn nnnnnnnnnn nnnnnnnnnn nnnnnnnnnn nnnnnnnnnn nnnnnnnnnn      17040
nnnnnnnnnc tgggactaca ggcgcccgcc acctcgcccg gctagttttt tgtatttttt      17100
agtagagacg gggtttcacc gtgtcagcca ggatggtctc gatctcctga cctcgtgatc      17160
cgcccgcctc ggcctcccaa agtgctggga ttacaggctt gagccaccgc gcccggccgg      17220
gatgtccttt ctatcaggag gctcacagta tctgctttcc agtttcttct gatgttaatg      17280
ttgttgctgc tgaacacctg actctgttga ttattggggg attgcaagat ggtagtgtcc      17340
caattctgtc gcttagtcag ttagcaggaa taatctagca ccatgctctg catcgcatca      17400
gccgtgtggt gatcccattc acacaggaaa ggcgggataa atgctggctg tgggccgggt      17460
gtgctgtccc gcatctgtaa tcccagcact ttgggaggcc agggcggtcg gatcacgagg      17520
tcagagattg agaccatcct ggccaacatg gtgaaacccc gtctctacta aaaatacaaa      17580
aaaaaaccca aaacatgagt gggctgtggt ggcgcgtgct tgtaatccca gctaccgggg      17640
agactgaggc aggagaatca cttgaacccg ggggcggag gttgcagaga ctgagatcg        17700 cgccactgca ctccagcctc acaacaaagc gagactctgt ctcagtaatc aatcagtcaa      17760
tcaatcagac gtcatcagtg aatgtacgtg agcgtgtagg gattggtcct gctccgcgcg      17820
ccaccctcaa tctcacttct gacctccgtt ctccacctcg aggtgttttc atgtgggccc      17880
gtgtgtcctg accccagcag ttgtggcctc tttgctgtct gggagtcagg attttttcaca     17940 ctcatgtcct gctccagacc tggaatcagc caagtctcca agaagctctg gtttcttttc      18000
ctgcaaggtg gtatttcagg acccacgatg cggcaacagg ctggtcatgg ttactgggtt      18060
ggtcattgtt actgggtgtt tttgtggaga tacatccata cgcacagatg tgttcacaaa      18120
tgttaactct gaaggtaaac cacccggctg gcacaagggg ctcaccggta atcccagcac      18180
tttgggagac cgagacagtt ggatgacctg aggtcgggag tttaagacca gcctgggcaa      18240
```

```
catggtgaaa ccccatctct actaaaaacg caaaaattag ccaggtgtgg tggcacacgc    18300
cggtagtccc agctagttgg gagacagaca tgctggaacc tgggacacgg aggttgcaga    18360
gagcagagat agtgccgctg caccccagcc tgggtgatag ggtgacaccc tgtctccaaa    18420
ataaatagat aaataaaggg aaaacgcctc ctcttggtgt ctccagtttg gactggctgg    18480
catgggttcc ggtagcctct tcccccatgg tggcgtcctt ttttccatgc cgggaatcct    18540
ggttctcaag ggcggggttg ttggtctgag tgtgacacag actgtgcctt tgctgccttt    18600
ctcttgccca gggctgaaca tggagctgga agacattgca aagctgaaga gtaagtgctg    18660
ccctccccac cttcttgcgg ctgggtgggg cctcccccctg atgcctcctc aacccgacct   18720
gcagtgatcc tgctccgcct ggagggggcc atcgatgcca ttgagctgcc tggagacgac    18780
agcggtgtca ccaagccagg gaggtgagag gcggggagcc agctgcttca ctggaggccc    18840
agcctggagc tagagatagg ccatggtgca gtcctaggct gtcccaccag tgaggcctgt    18900
tttcaggccc gttttccctt tttgagacct ggtaggagca cctggtttgc atgatctggt    18960
tgttgagacg ttgagaggaa gagcacacgc atccacggaa cagcacacgc atccacggaa    19020
cagcacacgc atccacggaa cagcacacac tcccacggaa cagcacacgc atccacggaa    19080
cagcacccac tcccacggaa cagcacacac acccacggaa cagcacatgc ttccacggaa    19140
cagcacatgc ttccacggaa cagcacaccc cacggaacg gcacccacgg aacagcacgc    19200
acgcccccac agaacagcac acccccac agaacagcac ccacgccccc acggaacagc    19260
acacacaccc acggaacagc acacgcgccc cacagaaca gcacacaccc ccacggaaca    19320
gcacacgcac ccatggaaca gcacccacgg aacagcacac actcccacgg aacagcacac    19380
gcccccacgg aacagcacac acacccacg aacagcacac actcccacgg aacagtacac    19440
gcatccacgg aacagcacac acgccacgg aacagcacac gcatccacgg aacagcacac    19500
actcccatgg aacagcacac gcatccacag aacagcacac acactcccac ggaacagcac    19560
acaacagcac acactcccac ggaacagcac acgcccccac ggaacagcac acacacccac    19620
ggaacagcac acactcccac ggaacagcac acgcccccac ggaacagcac acacacccac    19680
ggaacagcac acacgccccc acagaacagc acacaccccc acggaacagc acacgcaccc    19740
atggaacagc acccacgaa cagcacacac tcccacggaa cagcacacgc acccacggaa    19800
cagcacacac annnnnnnnn nnnnnnnnnn nnnnnnnnnn nnnnnnnnnn nnnnnnnnnn    19860
nnnnnnnnnn nnnnnnnnnn nnnnnnnnnn nnnnnnnnnn nnnnnnnnnn ngcacccacg    19920
gaacagcacg cacgcccca cagaacagca cacccccca cagaacagca cccacgcccc    19980
cacggaacag cacacacacc cacggaacag cacacacgcc cccacagaac agcacacacc    20040
cccacggaac agcacacgca cccatggaac agcacccacg gaacagcaca cactcccacg    20100
gaacagcaca cgccccacg gaacagcaca cactcccacg gaacagcaca cgccccacg    20160 gaacagcaca cacacccacg gaacagcaca cactcccacg gaacagtaca cgcatccacg    20220
gaacagcaca cacgcccacg gaacagcaca cgcatccacg gaacagcaca cactcccatg    20280
gaacagcaca cgcatccaca gaacagcaca cacactccca cggaacagca cacactccca    20340
tggaacagca cacacacacc cacggaacag cacacacgcc cacggaacag cacacactcc    20400
cacggaacag cacacacatc cacggaacag cacccacgga acagcaccca cgcccgcatg    20460
gaacagcacc cacggaacaa cacacaccc cacggaacag cacacaccc cacggaacaa    20520 cacacactcc cacggaacaa cacacacccc cacggaacaa cacacacccc cacggaacag    20580
```

```
cacacacacc cacggaacaa cacacactcc cacggaacaa cacacacccc cacggaacaa    20640
cacacacccc cacggaacag cacacacacc cccacggaac aacacacacc cccacggaac    20700
agcacacact cccatggaac agcacacaca cccacggaac agcacacaca cacccacgga    20760
acagcacaca cacgcccacg gaacagcaca caccccacg gaacagcaca caccccacg     20820 gaacagcaca caccccacg gaacagcaca cacacgccca cggaacagca cacacgccca    20880
tgcggggccg ctgggtttcc tgcagtttgt cctcctccag gcctttccct ggacctcctc    20940
aggtgcctgt tagaatgaga ccttcttgtt aggacgatga gtgtcccagc caccacctct    21000
tttggactcc gggaggcccg gaacattctg aaggctccgt gggtctcctg tcttctccgc    21060
ggccagggca gcagcatttg ttgtctgtcc tgcaggcaga tgagggtcag gcctggggcc    21120 cgtgtgggc tccactgagt gcacagccgc caaggcgagc gcgttctgcc tgagcgctga    21180
ccttgtggcg actcccagtt gcttccaggt ggagccagtg tcctcagcgt aatgctcaag    21240
gctctggcgt ggctcctcgg ccacctgcac ccccaggggc cctcctgta gcttctgctg     21300 ccgccatcac tgtcactctc ccaaggcttt ggggactctg cccagagccg ctgcctccca    21360
gaagcccctg acgaccccc ggcgacccca tccctccctc tgatgacggc ctctgccccg     21420
aggcggcttt tccttggtgc tgttcttgtg ccggccaggc ctccacttcc catctggagg    21480
ctcctgaggg cggaggcctc tcaccccaa tgccggcgtc cctggaggg ctcagtttgt      21540 ttccgaggga aggaaacttc acagttgct gccttcagtt cccaaagctg cagcctgatc      21600 cccgtccag gctcgagcct gccttcttct cctcgcagct acatctttga gctgtttgct     21660
gaagcccgga tcacgtttca gaccaagggc tgcatcctgg actcgctgga ccagatcatc    21720
cagcacctgg ccggacgtga gtgccggggc ggggtccttg gtgtgggcag acgtggcgta    21780
gggggtgcag caggcctcca tcctggcagt cagggctcgc ctggccatca cctggccgtc    21840
agcaggaaca ggctcacaga acctcacctg gtcgggcgt ggaggcgtta gtgccggttg     21900
cccactgccg tagagcctgt cccagttctg cagctggcgg cttcgtcctg cagactcatc    21960
ccattattcc cctttaagg aagagcagcc caaggccctg gctgggttgt ggggcctcag     22020
gcttctccac acaccctgag ttctgcttct cagagctgtg gggtccagag ctttgccca     22080 gaggcagtgt cgtcatgggc tgctctggtt tgagatgccg gcccgccggg gcctctgctg    22140
tgctcccagg tgctggggag ggcggctctt gctgcttcaa accttaggtg accatagagc    22200
ctcttttcaa gttccaccgg ccccccttgga dacgctgtcc ctgcctggct gctctcctgg    22260
ctgctgggaa gggcaggcga gctgcccgcc ctgagtggac actgcgctcc accctgggcc    22320
ccccgttggg caggagatgg agcttggcag tcgggctgag ctggcttatg gctggaaggg    22380
cgggggctgg ggtcggggcc tcccctgcct gcagtgcggg tgtcagcgcc ggcatgcta    22440 cctccccagg tgctggagtg ttaccaaca cggccggact gcagaagctg gcggacatca     22500
tccaggtggg gcctgctcct ctggcgtctc cttccctgat ggaagccggg cgggtgcctt    22560
ctcctgctgt attagttact gactctagac gtggggtgg gagaacggcc cccacaccac    22620
ctgtttccga ctggcaaacg cttggctcct ttcctgtgac ccaaacccac actgggcctc   22680
ccgcggggat gggggaggac gaggtctggt ggcccgtgcc cagggtgacg ctggtggggg    22740
aggacgtgaa ggggagtggg ggccagggag ccgctcctgc cctgtccggg ccctcaggcc    22800 gggggaccc actcctggca gccccagcta cacgcagatg aagagctctg gacacacgta     22860
gcttcctgaa cagcttctcc agggacagac aaacggggac cctgcaggtt gccggcgggg    22920
gtgtccctgc gagcccatga tgggggatgc ggccccggcc cccttcttgg ccccgtcctg    22980
```

```
ccctgtgatg cccgtcccct cccatgtgag gttgctcctg gctctgtgcc tgtggcagca    23040
cctgctttcc ctgaggcaga cgggcttgtg cggtttgtgg agggcaagcc ccattttttgg   23100 gtgctctggg cacacacttg cctctcctgg acctcggtgc attttttaga agcagaccca    23160
caagtccctg actgggaggc catcagtcct tggggaaacc gaggcacagg tggctgtgtg    23220
gagccatgtg aggctgcctc tgtgctgccc acactgaacc tcctggccac acgaggtcat    23280
ggcagggtta ggtggggctg cccagctctg tgacaacttc gtgagtgtcc gcctggggtg    23340
gggggtgctt gagctggggg aggccgcaga agaaccctgg aatgtaccgc cggcctgtgc    23400
atgcagtgcg gtgctctgtg catgctactg gcgtggagc tgcaggcccc aggacgacca     23460
ggcactgcct tcttcataga cgtggctctg agcaggggcg agacctgggc agggaccagg    23520
tggggtgggc acagcaggtg gtagggccca ggctcagccc tacctccacc gtggccttct    23580
ctgcggccag tgatgccaca gccagtgtct tctctgtgtg gcagctgggg ctggaaagac    23640
ggcactgcta tgtctcccag ctcctcccca aaagcacggt gggcatccca gggccagacc    23700
cctctctctg tggctcctgc ctgccaaggg ctgctttgcc gtcccgcctg gagcgtggtt    23760
ggctcttcaa gcaggaggcc gtgcacctgc caggcggacc tgcttccatg tcctgacggg    23820
tcactcaaag cacctccagc acatggccat cgaggcagcc ctgcagccca gggcctggag    23880
ggcaggtgtg agctggcccg ggcctgcccc tccctggaat gtggcttccc aggctccagt    23940
atggagcagt gtccacactc tggaaccaaa tcttgttcac cccattggtt tggaatttcc    24000
tttggctgct gctctaagta gccactggga gatgactcag ctcctcccaa ccctggggac    24060
tgcacaccgt gttcaccctc ggctgctcct gagtccctgc aggtgtgggc actgctcata    24120
gggctgctgc tgggctggac ttgcagccct gaggcacagg tgaccctggg gacagagtgg    24180
ggctagagtg gggctagtgg ccccaggaag aggatgtggg atgcacggtt cagttggagg    24240
caagtccggg cagggccagg ctgtgtgctg gggaggtaga gcttagctgg aggcaaaactc   24300 tgggcagtgc tggcccgtgc tgggcagcca gtcaccgctg ggcccctgtg agactagtgg    24360
gtcccctttc ttctctgcct gagctgccct ggggctgaag cacggggcgg tttgtagtgg    24420 tgttttttg agacagggtc tcgctctgtc accccagcgg gagtgcaggg ccttgtcacc     24480
agctcactgc agcctcagcc tcctgggccc aggccatcct cttgcctcag ccacctgagt    24540
agctgggaac acaggcgtgc accaccacgc ccggctaatt ttaaaagctt ttttgtggag    24600
atggggtctt ggcgtgcacc accacgctcg gctaattttt taaattttta tgtggagatg    24660
ggtcttgcca tgttgcccag gctggtctca aagtcctggg ctccggcagt ctgcccacct    24720
tggcctccca cagtgctggg attacaggta agagcttcca ggcctgccca tcagagggct    24780 ggcttttga gggaagctgt ttcctgaggc agcctcagcc cctgctcatg gcagcccctg     24840
gtgtcatggt gaatttgttc tgttgttttcc atccctgtgg gccaaatgct ttggtaaaac   24900
gcaaggcctt gtatttagct gtcttgacag tgaaaatggc tgggaaggaa ggaaggaagg    24960
aatggaagga agtttctctc tcccgtgcat acccaggcac gtgcacacgt gcgcagtcca    25020
cgcacgctgc cggtctctgt cccagccgcg gtgccggccc ccgtgttctc cagttcagct    25080
tctccgcatt tctgtgaacg attccggctt cttgatgttc ccagcagaac tccctcaagc    25140
cttcggcttc tccagggctc tgacggcggc tgggctgacg tggccgctct gcggagcctg    25200
ttggggcttc acgttcctgt tctggccatt tccggctctt tttccgggaa gggtcatcac    25260
gcgctctttt cctagtgcag gcatcgtccc tttcccgttg atttgcaggg ttctctgtaa    25320
```

```
gatctgagga acacgtgcca acatattctt tcctggtctc gtgctggtca ttttttccat    25380
tttcacgaca ggtttggtga acagatgttt ccttgtcatc agacttttgt cttgagcttg    25440
tatccccga ccaagatgct aaactgggtc ttgtgtgttc tccaaactgc actgtagggt    25500
ggcggagctt tgtgtcgggg cctccgcacc ttccggcgtc acctgtgggg gtgtgaaagg    25560
cagactctac ctggattttt cccagcacgc cacaccggtg gttccgtctg ctgaccgagt    25620
ggctcggctt ctcccaactc cgctgggcac ctgccacact gttttcctca cggttttgtt    25680
cgtggtggtt ttgtcgtaag tcctggtgtc ggccagaacc aatttctgtt tttgtttgtt    25740
tttgagatgg agtttcgctc ttgtcgccca gggtggagtg cagtggtacg atcttggctc    25800
actgtaacct ccgcctcctg ggttcaaatg attctcctgc ctcagcctcc tgagtagctg    25860
ggattacagg tgcttgccac cacgcccagc taattttcat attttagta gagacggggt    25920
tttgccgtgt gggccaggct ggtctcgaac ccctgacctc aggtgatcct ctcgcctcag    25980
cctcccagag tgctgggatt acaggtgtga gccgccgcgc ccggcctctt gttcttctta    26040
aacctgccct gatgttttct ccatgatgca tgttggagtc aacctgtctg cttcctttaa    26100
aaatcttgct gtgattttga ctggaatgtg tggaattcct gtgttttga gtcagtgtct    26160
ctctgttgcc cagtctggag tgcagtggga ccatcacagc tcactgcagc ctcaacctcc    26220
tgggctcagg ggatcctctc agcccagcct cccaagtagc tgggaccacg gcacgtgcca    26280
ccacgcccgg ctagttttca tattttttg gtggagaccc cagggttgca ccatgttgcc    26340
caggctggtc tcgaactcct gggttcgggc agttcgcccc tctcggcctc tcagagtgct    26400
gggattacag gcgtgagcca ctgcactagg ccatgttgaa tttctagatt aatttgggac    26460
ccttaggggc acagagagga gggctgggcc agctggtggg aggagaggcc tctcgggctg    26520
ccgcatttcc agtgcacgga gatggcctgc gtagggggaa cagagctcac tgggggtccc    26580
tccagggagg agaaagggtc aggcaggtgc cagctcctgt ccatcagcct ggggctgcat    26640
gatggcaggg gctggtgaac cgatgacctc tgggtgtcct gtgaccttcc gtgtgtgggg    26700
ctgatgccgc agaagatcag gtggcctcca gggctccggg ctctggcctc aggctcctca    26760
cgggactgca cctcctctct ttcagattgt gtttagtgtg gaccccctccg agggcagccg    26820
tggttcccg gcagggctgg gaccccttaca gtcctataag gtaggggcca cctccaggag    26880
gcaggtgggg ctgggggtcc tgcagtcctg aaaggtaagc ggctgcccc aggacacggg    26940
cggggtctcc acacttctgg tcctgtcccc tccaggtgca cgtccatcct gatgctggtc    27000
accggaggac ggctcagcgg tctgatgcct ggagcaccac tgcagccaga aagcgaggta    27060
cagacctggg cccacactct ccccgcccgc ccgggtgtgg tgctcagcac cagcatgcca    27120
caggctaggc acgtggccag ccgtgggtct cctgcccccc tgggcctggc caccttctcc    27180
atgtccaggc caatccagag cgttctcctc actgtccctc tgaaggctgg agttactgag    27240
agacatggga gagggcctga tggcaccgtg acctgcccag agtcacctgg ttggtggcgg    27300
cagagccaca gctcagccag gccttcctgc tgggacacac tggtttatgc caaggccgtc    27360
agcacggagc cccacagtga ggcacagctt ccctgctgc ctccacccag cgcctggctg    27420
ggccaagcct cagggtctca tctgaagggg gccgactgg ccctgttgtc cgaagcctct    27480
ggtgcgctcg gccctgaggc cccacgtgcc ttgttggctt cctgtgctct gtggcgtctt    27540
cgagtcggtg ctgccgggta cctgtgtgga tggggcccgt gagtgggccc tcggctccgt    27600
gtccagagtc ctgtggttct tggagtgtgt ccggccccac ccggccatgt ggtgtccaag    27660
gggggctttg tggcggcagc ggtgggagct gctgccccctt ctcgtgctcc agtggggcct    27720
```

```
tgcctctggg cttggttcgt tcctctctgg aacgttcttt ctcagagctc tctggcccgc   27780
ggtggcacga cgtggccctg gctgaagcag cccccgcgtg gttgctgtgg ttggtctgcc   27840
tggccgagcc ggaaggggag gcccgggagg gcgtcagggt tgcgtggctt gaccccggt    27900 cggtggctcg gtgatggcct cgtggcaagg cgtctcccag caggaagcgt ccatcctggg   27960
gggtcgtggg aggcggcgcg tgcctgaggc agctggcgca cagatcctga gggcctggaa   28020
tctatttgtt ccattgacct gtgacgtcac ttgacttctg agaagcagcc gctccctgcg   28080
ttgggtgttt gtaggaaatg agttcctgga ggcggaggtc gggaagttcc cccgctgcag   28140
ggcacgctca gccccaggaa gcggggtgac ctttgctggg agaggtgcct tgtccctgct   28200
gaccccgagt cacagtcagc gtcgttctgc ttgtgccgtg tttaattcct ggtgtccggt   28260
gcccaggctc agtctcctcc ccaggccgcg ccgctgcgg tcagtcagtc aagcacttct    28320
aggaacttcc tttgaaccgg tgcccttgtt cgctgctgac gccactcgga ggcttcctgg   28380
cggagcgggg aactcgcact tcctcttgtg cgcgtccctg gaatgtcggg acgctggcgc   28440
ttgcttcccg tgcgctcttg gcgggatgag cttgccctga gctgcatgtc actgtttctg   28500
cagaagttta gggttggagt tggctgacct ctctggaggt gtccccagca tctgcctggg   28560
gtctgcctcg tactcccggg acccccagtc ccccagaggg gaccccagct ggcagactgc   28620
gctcacactc agggcagcct cctttgttct gacttctgca cgctgggcct gggtggctgt   28680
gggcggctca cttgcttgat gccagtgggt gagagggtga tgggcagaga ggcaggcggt   28740 caggcccccca gtcccgtcct cacaccctgt gtccctgct ccctccgcc ccacagggaa     28800 ggtgttgagc tactggtgct tcagtcccgg ccacagcatg cgcgagctgg tccgccaggg   28860
cgtccgctcc ctcatcctta ccagcggcac gctggcccg gtgtcctcct ttgccctgga    28920
gatgcagatg tacgggccac ccctgccagg ggcctaagca ctggtgacgc ctgtgacgtt   28980
agtggggtgg gagtgctggg ggtccccatg agccggggtg ctgggggtct tgggcctcac   29040 tggggtctc gggccttgag ggctaaaggg gtgctggtgt ccttccccac tgtctgtccc    29100
tccggccacg ctcagccctt tcccggtctg cctggagaac ccacacatca tcgacaagca   29160
ccagatctgg gtgggggtcg tccccagagg tcccgacgga gcccagctga gctccgcgtt   29220
tgacagacgg tgagggcctg tccctgggcc gtgctggggt gcgaggtcgg ggagtactga   29280
gccctgaggc cctgagcagt ggcctctcgg ctctgtgcag gttttctgag gagtgcttgt   29340
cctccctggg gaaggctctg ggtaagtgcc cggcacaccc cagctgtgcc catcctggat   29400
cctggaccct gctcccaaga gctggtaggg acccccggaag acgccccgcc cctgccctga   29460
ccccagcccc tgcacttcca ggcaacatcg cccgcgtggt gccctacggg ctgctgatct   29520
tcttcccttc ctatcctgtc atggagaaga gcctggagtt ctggcgagta tgtctcccct   29580
gtgtgtcctg ggtggggtgg gtgagggcag ggctggagca cgaagcaggc agtggccaca   29640
gctcctgcct gccctcatcg gatcggcggc gtaaccaggg ctgccgtgtc cctgcctctt   29700
cctcccacag gcccgcgact tggccaggaa gatggaggca ctgaagccgc tgtttgtgga   29760
gcccaggagc aaaggcagct tctccgaggt cagcacttgg ccggggctct gggtctgctg   29820
ccccctcgtg cctcccgtgc ccctcacagc ttccccgagg ctgaccacca gccctgacca   29880
cgggctctgg cggctcccgc ctgcctcttc agggcccctg cgtttccttc ctggccctga   29940
gtgttgcctt ttatcttaca aagccccag cactgggtgg gtgtgcgac agtggtcctc     30000 ctgcctgagg agctatagcc ggcggccacc ctggccctgg gattccccgt gttttctggg   30060
```

```
aagcactgag caggcgcagg atcagcctgg gatccgtgcc aggaagaagt ttccagaacc    30120
cagttggcct tcctggctag gatagtcctt catcttggag gatgagacct gggtctccct    30180
catgggggaa gaaggggccg aggtgggctc caggctgagc ctgaccaact ttccttccag    30240
accatcagtg cttactatgc aagggtcgct gcccctgggt ccaccggcgc caccttcctg    30300
gcggtgtgcc ggggcaaggt gagctctctg gggccctctg tcctgacccg gttgcctgtt    30360
ccccagtggg tgctcatggc tcctcagctg actttgggcc ctgggggctg cctggtcccc    30420
tccttgggcc ccacaagagc aaagcactgg tggcctgctg ggagcgtgcc ccgctctggg    30480
tcgggcaggc aggatgcagg aggttcctgg ccacgagagt tggaggtggc gtctgggagc    30540
tgtggacccc aagtggggtc ctgacccata gatgggctt cctcccaccc ctggttggag    30600
cccccatggc cccaggcagc tccctggtgt gtccccagg ccagcgaggg gttggacttc    30660
tcagacacga atggccgtgg tgtgatcgtc acgggcctcc cgtaccccc ccgcatggac    30720 ccccgggttg tcctcaagat gcagttcctg gacgagatga agggccaggg tggggctggg    30780
ggccaggtga gttacagcag ggcggggctg gggtaaggca atctggcgac tgagccccc    30840 tgtgaccacg ggagccctg tgaccgagcc tcctcgccct ccagttcctc tctgggcagg    30900
agtggtaccg gcagcaggcg tccagggcgg tgaaccaggc catcgggcga gtgatccggc    30960
accgccagga ctacggggct gtcttcctct gtgaccacag gtgcgtgcag tccggggca    31020 ggcgtggcgc caggggacac ggccacatcc cactgggccc tggactcctt ccccacatga    31080
ggccccgtct cccccagagc ctctctggcg actcggggtc agcctgaggc ccctgcggca    31140
gatgagggtc ttcacttggg tgaactgacc ccctgaagcg gctgtgggca gggcagcagg    31200
gctgtggcca ccccccaggt tcgcctttgc tgatgccaga gcccagctgc cctcctgggt    31260
gcgtcctcac gtcagggtgt acgacaactt cggccacgtc atccgagacg tggcccagtt    31320
cttccgtgtt gccgagcgaa ctgtgagttt ctgcccaggg agggggatgag ggtgttgtcc    31380 ccagaggagc cagaaatggg cccacccacc cccagtggtt ctgcagatgc cagcaccggc    31440
cccccgggct gcagcaccca gtttgcgtga aggagaagat gctgtcaggg aggccaagtc    31500
gcctgacccc ctcctctcca ccaggaaagc taagagtctg gacctgcatg tccccagcct    31560
gaagcagagg tcctcaggtg cagatggcca gtgcgggacg ggcagtgtgg ggcgggcggg    31620
gcaggcggat tggggcgggc cgtgtggggc aagcagcggg gcaggtggtg tggggcgggc    31680
ggcaccaggc gcccagggtg gaggcggctc acctggcttt atgcactgcc cctcccacct    31740
ccaaaggctg tgtctgcctc ctagggtggg gttcccacgg gctggaaccc tcccctacag    31800
gcagagaagg cctcaggcaa agacgcgccc caaggctggg actcccccta atagcaggga    31860
ggacacccac aggcaggggc ccccaaatgc tgggaccctc cctcaggagg ggctccgtca    31920
taggcaggga ccccagctg gggccccgcg gtgggcttca ctgcgcactc gggtactctg    31980
caggatcacc agctgccggg gaccccgaga gtagcctgtg tgtggagtat gagcaggagc    32040
cagttcctgc ccgcagagg cccaggggc tgctggccgc cctggagcac agtgaacagc    32100
gggccgggga ccttggcgag gagcaggtgc agttccaggg ccttgggatg gacacagacc    32160
ctctgtctcc tgaggccaac cccacccccgc ccatctgact tcaggcacct ccccacacac    32220
ccctgtaaat ccctgcctg tggggcgggc aggcaggtga gggatcccag ctgcctggct    32280
gtgtgtgtgc cctccacctc gcctcaccca caggctgctg gctcccaggt ggtgcatgcc    32340 ctggcctca gcgggtgccc ccacatcact ttgattctct ggcaggtcag cttggctcag    32400
ggcactcaag gtcgggtgcc cctgcccctg gctgtgcctg aggctggcct ttctccagga    32460
```

```
atgtgctgcg gttgggaccc aggttccttc ctccttgggg cctttttgccc cagaagccca   32520 taatttctca gctttctccc tgcttcctgc tgggggccgt tctcttgctg cctgtccctg   32580
cccttcaggc tcctggagtg agccccgggt gcaggcacca gacacctgtg tccccttcct   32640
gccagcccct cgctgtggtc ggactgtcct tcctggacct gctcttacgt gtcaccacct   32700
gtgagcctca tgagccgctg gcgtgacttg gacaggacca agttgtggga ctgtcaccag   32760
ggtgtgccgc gcccctcccc cgaccttcgt cttggctact gctcagggct ccttggggcc   32820
atcttccctg tgggcccagg tgctttgggg ccctggagtg tgtggttgga accacagctg   32880
tgtcctcctc aggcccacag ctgctccacc ctgtccctcc tggctgagaa gaggccggca   32940
gaggagctgc gaggagggag gaagaagatc cggctggtca gccacctggt gcgtgagctg   33000
tccctgcacc tgtgccgacc accatagaca cgtgtgggaa cccggccctg ggtgccccca   33060
gccaagttgg gatgtgggcc cgatgggacc aggaagttca cccccgggag ctgatgtcca   33120
gggcggctgt gaagctgtcg gcccaagggc tcaagggcag ctgggatcag gccccgccct   33180
tgggcaggct tggtttgggg gctgcagcac tgggtttggc cctggcattt ccctcaagtg   33240
tggacgtgca cctgcctcat tcgagggggcg cagcccattc ccagccttgg atgaaagaac   33300
cgagttatag tcggagccag gaagcccccct gcctgctgga aagccccaag tgtggcagcc   33360
tttgtccatg tcccttggct tctgggaaga actgggtggt gcccaggcag ggctggtgcc   33420
atcaggaagt gggcggctgc cgaggggcct gggctgttga gggcctgggt ggggagtgcc   33480
ggggctgccc ctgccttggt ttccacgttt ccgtgttggt ctggggtgtg tggagagatg   33540
agcaccgctt cttgggaagc ccctccctat gatctgccat cctggagcct cagctgtgtc   33600
cgctgtgggg tgggggcttt agggaggagg agagaggacc cccagcttga gggagagcca   33660 gtctacccctt tgcccattcg ctgccctcgg ttccctgcca gcctctcact gtgtgaccca   33720
gacaggccca gccccgcagc tttcctcccg cagcacctcc gtgtccatcc agccaaccag   33780
tttctcaggc agcagccccc gctcagcaat cactgtcccg gggaacaccc aatgctccaa   33840
ggaaggctct gcagctccag ggacgggatg atgaggctgg ccctgatgga gcctcgggcc   33900
tgtgtgctgc aggaggagcc cgtggctggc gcacagatgg acagggccaa gctcttcatg   33960
gtggctgtga agcaggaact gagccaagcc aactttgcca ccttcaccca ggccctgcag   34020
gactacaagg gttccgatga cttcgccgcc ctggccgcct gtctcggccc cctctttgct   34080
gaggacccca agaagcacag cctgctccaa ggtgccctgg cttgcagggg ccgcccatcc   34140
tgagggcagt gctgccgctg tgtggggtgg gggccatctg ggtccaaggt tgtctctgtt   34200
ctctagagaa aaggggggcgg atggggacag acacccccttc ctctacaggc ttctaccagt   34260
ttgtgcggcc tcaccacaag gagcagtttg aggaggtctg tatccagctg acgggacggg   34320
gctgcggcta ccggccagag cacagcgttc cccgaaggca gcgggcacag ccagccctgg   34380
accccactgt aaatgggggc ctcggtgggg accctcagac tcctccgtgg aaggcaccgg   34440
agtcctgggc tggttggggt gggcatccct ggggccctgc gtggcccgc ctctctgttc   34500 ccgtgtggga gtgatggggg ccaccccca ccaccagcag cagtatcact tgttggggag   34560
accctgtgca actccacgca gggccctgcc cttcccatag cccctgaccc ctacgcacag   34620
ccctgtccag ctgccgcacg tgtcccctgc ccccatgca cagccctggg gagtccactg   34680
cacacgccag ggtcctagac ccctagaccc ctagatccct gtcctcccgt cctccctact   34740
tctgcctttg cctagggtgg agtccaagcc tccagaggtg ggagtgtctg tgttcgtgct   34800
```

-continued

```
tgttaacgaa cagcccccat agagctcctc cagtgtaggg ttcacccagc ggggaaccta    34860
acctgttggg aagacccag accccttctg ggcttggtac ccaccctggg gctctaagct     34920
cctgagcagg gctttggcct gcctgccact gttccagccc ccatccagca gttggtgtct    34980
cctctgctgc cccggcacct gggcacgtgt gcctgcctgg gttttcccgc cctggtccga    35040
ggtgggtgag gcctggcctc cccagccagc ccttccccct ccccggggga actttccagg    35100
tgcttgggac cagctttgtg gctctccatc tcttcatcag gaaggacagc gctagatccc    35160
aagctgactg tgtccaaggc tgcagcccag cagctggacc cccgagagca cctgaaccag    35220
ggcaggcccc acctgtcgcc cagaccaccc cccacaggta gctgagtcct gaactgtgtg    35280
cagcctgtga cttggtgggt tcctcagtgg cttgatgagg ctaacacttg agtgtggctt    35340
gagcctttga accggaggtg ccagtggagc tgcccctgtg gggagcatct cctggtgggg    35400
gctcccggtt ctgtaccccg cagttgtcct gagcagctct ccaggagttc gtgggaggaa    35460
gggcaggcag ggtggtggga ctctcagtcc tctgccccag cgccactctg agccatgcta    35520
ctcccacacc aggaggccct ggcagccacc cacagcaggg gtccagagcg cccagagcag    35580
ggaagcaggg ccagcgcgcc gtgagcgcct acctggcaga tgtccgcagg gccctggggt    35640
ctgcaggctg tagccagctc ttggcagcac tgacagccta caagcaagac gatgacctcg    35700
acaaggtgct ggccgtgctg gccgcccctga ccactgcaaa gccggaggac ttccccctgc   35760
tgcagagcaa gtgcctggg cgtggggac agccagtggg gtgggnnnnn nnnnnnnnnn     35820
nnnnnnnnnn nnnnnnnnnn nnnnnnnnnn nnnnnnnnnn nnnnnnnnnn nnnnnnnnnn    35880
nnnnnnnnnn nnnnnnnnnn nnnnnnnnnn nnnnnnnnnn nnnnnnnnnn nnnnnnnnnn    35940
nnnnnnnnnn nnnnnnnnnn nnnnnnnnnn nnnnnnnnnn nnnnnnnnnn nnnnnnnnnn    36000
nnnnnnnnnn nnnnnnnnnn nnnnnnnnnn nnnnnnnnnn nnnnnnnnnn nnnnnnnnnn    36060
nnnnnnnnnn nnnnnnnnnn nnnnnnnnnn nnnnnnnnnn nnnnnnnnnn nnnnnnnnnn    36120
nnnnnnnnnn nnnnnnnnnn nnnnnnnnnn nnnnnnnnnn nnnnnnnnnn nnnnnnnnnn    36180
nnnnnnnnnn nnnnnnnnnn nnnnnnnnnn nnnnnnnnnn nnnnnnnnnn nnnnnnnnnn    36240
nnnnnnnnnn nnnnnnnnnn nnnnnnnnnn nnnnnnnnnn nnnnnnnnnn nnnnnnnnnn    36300
nnnnnnnnnn nnnnnnnnnn nnnnnnnnnn nnnnnnnnnn nnnnnnnnnn nnnnnnggg    36360
ggcaggggca gggtggggac cgtgccgggt ctgagtgaag ctccccgcag ggttcagcat    36420
gtttgtgcgt ccacaccaca agcagcgctt ctcacagacg tgcacagacc tgaccggcag    36480
accctccctg ggcacggagc caccaggacc ccaggaggag agtcttgccg tgcctcctgt    36540
gctcacccac agggctcccc aaccaggtag ggcgcctgcc tggctgctcc tgacagtgcc    36600
ccaaccgcac gcagccctgg gagtgagcag caaagcccca ggccctgctc agactcagtc    36660
tccgtctcca ggcccctcac ggtccgagaa gcccggaaag acccagagcg agatctcgac    36720
cttccttaga cagaggccag cagggactgt gggggcgggc ggtgaggctg cagggcccag    36780
ccagtcccca ggacctcccc acgggcctgc agcatctgag tggggtgagc ctcctgggag    36840
agaccttgct gggcagcagg ctgcgggagc tccgagcggg cccctctcag caggctgtgt    36900
gtgccagggc tgtggggcgg aggatgtggt gccttccag tgcctgcct gtgatttcca     36960
gcgctgccaa gcctgttggc aacggcacct tcaggttggt gcctggtcac tacagttcct    37020
gctgggtgta gccccaggtg gtgggctgag ggggaaaggg ccgggtatag ccccaggtgg    37080
tgggctggtg gcaacgcctg gcaggtgcgt ccagcgggcc ggttgtctta caggcctcta    37140
ggacgtgccc atcctgccac accgcctcca ggaagcagag cgtcacgcag gtcttctggc    37200
```

```
cagagcccca gtga                                                         37214

<210> SEQ ID NO 3
<211> LENGTH: 18
<212> TYPE: DNA
<213> ORGANISM: Homo sapiens

<400> SEQUENCE: 3
gaccactgtc cttccatg                                                        18

<210> SEQ ID NO 4
<211> LENGTH: 46
<212> TYPE: DNA
<213> ORGANISM: Homo sapiens

<400> SEQUENCE: 4
ttcagagatt caagttataa taaagctctt cttatattga ggggga                         46

<210> SEQ ID NO 5
<211> LENGTH: 18
<212> TYPE: DNA
<213> ORGANISM: Homo sapiens

<400> SEQUENCE: 5 aggaatagggg ttggtttt                                                       18

<210> SEQ ID NO 6
<211> LENGTH: 17
<212> TYPE: DNA
<213> ORGANISM: Homo sapiens

<400> SEQUENCE: 6
ccttactacc tgtcccg                                                         17

<210> SEQ ID NO 7
<211> LENGTH: 20
<212> TYPE: DNA
<213> ORGANISM: Homo sapiens

<400> SEQUENCE: 7
acaattactt gttggatgcc                                                      20

<210> SEQ ID NO 8
<211> LENGTH: 18
<212> TYPE: DNA
<213> ORGANISM: Homo sapiens

<400> SEQUENCE: 8
agcttctaac ccaaccag                                                        18

<210> SEQ ID NO 9
<211> LENGTH: 21
<212> TYPE: DNA
<213> ORGANISM: Homo sapiens

<400> SEQUENCE: 9
tataaaccta aatgtaaaag c                                                    21

<210> SEQ ID NO 10
<211> LENGTH: 20
<212> TYPE: DNA
<213> ORGANISM: Homo sapiens
```

```
<400> SEQUENCE: 10
ttcaccaaaa tttaaagctt                                              20

<210> SEQ ID NO 11
<211> LENGTH: 26
<212> TYPE: DNA
<213> ORGANISM: Homo sapiens

<400> SEQUENCE: 11
ctttgaccag agtatgtaaa attctc                                       26

<210> SEQ ID NO 12
<211> LENGTH: 18
<212> TYPE: DNA
<213> ORGANISM: Homo sapiens

<400> SEQUENCE: 12
aagacgtgtt caaagatt                                                18

<210> SEQ ID NO 13
<211> LENGTH: 17
<212> TYPE: DNA
<213> ORGANISM: Homo sapiens

<400> SEQUENCE: 13
ggacctactg tttttg                                                  17

<210> SEQ ID NO 14
<211> LENGTH: 19
<212> TYPE: DNA
<213> ORGANISM: Homo sapiens

<400> SEQUENCE: 14
ggacctactg ttttattcc                                               19

<210> SEQ ID NO 15
<211> LENGTH: 22
<212> TYPE: DNA
<213> ORGANISM: Homo sapiens

<400> SEQUENCE: 15
gtcccttctc ttcctcctgt ag                                           22

<210> SEQ ID NO 16
<211> LENGTH: 19
<212> TYPE: DNA
<213> ORGANISM: Homo sapiens

<400> SEQUENCE: 16
cgtgatcttt gacgaagct                                               19

<210> SEQ ID NO 17
<211> LENGTH: 16
<212> TYPE: DNA
<213> ORGANISM: Homo sapiens

<400> SEQUENCE: 17
cgcaaacctt tctgga                                                  16

<210> SEQ ID NO 18
<211> LENGTH: 23
<212> TYPE: DNA
<213> ORGANISM: Homo sapiens
```

```
<400> SEQUENCE: 18
agcctgtgtg tggagtatga gca                                          23

<210> SEQ ID NO 19
<211> LENGTH: 20
<212> TYPE: DNA
<213> ORGANISM: Homo sapiens

<400> SEQUENCE: 19
cgtttccgtg ttggtctggg                                              20

<210> SEQ ID NO 20
<211> LENGTH: 19
<212> TYPE: DNA
<213> ORGANISM: Homo sapiens

<400> SEQUENCE: 20
gactacaagg gttccgatg                                               19

<210> SEQ ID NO 21
<211> LENGTH: 20
<212> TYPE: DNA
<213> ORGANISM: Homo sapiens

<400> SEQUENCE: 21
agtttgagga ggtctgtatc                                              20

<210> SEQ ID NO 22
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 22
catggaagga cagtggt                                                 17

<210> SEQ ID NO 23
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 23
agctttatta taacttgaat                                              20

<210> SEQ ID NO 24
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 24
cgggacaggt agtaag                                                  16

<210> SEQ ID NO 25
<211> LENGTH: 15
<212> TYPE: DNA
<213> ORGANISM: Artificial sequence
<220> FEATURE:
<223> OTHER INFORMATION: Synthetic oligonucleotide
```

```
<400> SEQUENCE: 25
cgggacaggt agtaa                                                    15

<210> SEQ ID NO 26
<211> LENGTH: 19
<212> TYPE: DNA
<213> ORGANISM: Artificial sequence
<220> FEATURE:
<223> OTHER INFORMATION: Synthetic oligonucleotide

<400> SEQUENCE: 26
gcatccaaca agtaattgt                                                19

<210> SEQ ID NO 27
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 27
gcatccaaca agtaattg                                                 18

<210> SEQ ID NO 28
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 28
ggcatccaac aagtaatt                                                 18

<210> SEQ ID NO 29
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 29
ggttgggtta gaagct                                                   16

<210> SEQ ID NO 30
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 30
gcttttacat ttaggtttat                                               20

<210> SEQ ID NO 31
<211> LENGTH: 19
<212> TYPE: DNA
<213> ORGANISM: Artificial sequence
<220> FEATURE:
<223> OTHER INFORMATION: Synthetic oligonucleotide

<400> SEQUENCE: 31
catgttcctt tctataact                                                19

<210> SEQ ID NO 32
<211> LENGTH: 19
```

```
<212> TYPE: DNA
<213> ORGANISM: Artificial sequence
<220> FEATURE:
<223> OTHER INFORMATION: Synthetic oligonucleotide

<400> SEQUENCE: 32
agctttaaat tttggtgaa                                                    19

<210> SEQ ID NO 33
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 33
ttttacatac tctggtcaaa                                                   20

<210> SEQ ID NO 34
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 34
ttttacatac tctggtca                                                     18

<210> SEQ ID NO 35
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 35
gaattttaca tactctggtc                                                   20

<210> SEQ ID NO 36
<211> LENGTH: 19
<212> TYPE: DNA
<213> ORGANISM: Artificial sequence
<220> FEATURE:
<223> OTHER INFORMATION: Synthetic oligonucleotide

<400> SEQUENCE: 36
gaattttaca tactctggt                                                    19

<210> SEQ ID NO 37
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 37
gagaatttta catactctgg                                                   20

<210> SEQ ID NO 38
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 38
```
atctttgaac acgtctt                                                    17

<210> SEQ ID NO 39
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 39
acaaaaaaca gtaggtcc                                                   18

<210> SEQ ID NO 40
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 40
ggaataaaac agtaggtc                                                   18

<210> SEQ ID NO 41
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 41
agcttcgtca aagatcac                                                   18

<210> SEQ ID NO 42
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 42
ggtgggtgga tgtttc                                                     16

<210> SEQ ID NO 43
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 43
ggtggtgtgg agaagc                                                     16

<210> SEQ ID NO 44
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 44
gctcatactc cacacac                                                    17

<210> SEQ ID NO 45
<211> LENGTH: 20
<212> TYPE: DNA
<213> ORGANISM: Artificial sequence

```
<220> FEATURE:
<223> OTHER INFORMATION: Synthetic oligonucleotide

<400> SEQUENCE: 45
catcggaacc cttgtagtcc                                              20

<210> SEQ ID NO 46
<211> LENGTH: 19
<212> TYPE: DNA
<213> ORGANISM: Artificial sequence
<220> FEATURE:
<223> OTHER INFORMATION: Synthetic oligonucleotide

<400> SEQUENCE: 46
gatacagacc tcctcaaac                                               19

<210> SEQ ID NO 47
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 47
ggtggaggtg gtgctgc                                                 17

<210> SEQ ID NO 48
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 48
aggtggaggt ggtgct                                                  16

<210> SEQ ID NO 49
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 49
tggtgtggga gtagca                                                  16

<210> SEQ ID NO 50
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 50
cgatggcgag aaatta                                                  16

<210> SEQ ID NO 51
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 51
taattcagca aaaagccca                                               20
```

```
<210> SEQ ID NO 52
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 52
aagaatctga caccca                                                      17

<210> SEQ ID NO 53
<211> LENGTH: 21
<212> TYPE: DNA
<213> ORGANISM: Artificial sequence
<220> FEATURE:
<223> OTHER INFORMATION: Synthetic oligonucleotide

<400> SEQUENCE: 53
agacagccaa gaatctgaca c                                                21

<210> SEQ ID NO 54
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 54
cagccaagaa tctgaca                                                     17

<210> SEQ ID NO 55
<211> LENGTH: 15
<212> TYPE: DNA
<213> ORGANISM: Artificial sequence
<220> FEATURE:
<223> OTHER INFORMATION: Synthetic oligonucleotide

<400> SEQUENCE: 55
acaggaaccc gacag                                                       15

<210> SEQ ID NO 56
<211> LENGTH: 21
<212> TYPE: DNA
<213> ORGANISM: Artificial sequence
<220> FEATURE:
<223> OTHER INFORMATION: Synthetic oligonucleotide

<400> SEQUENCE: 56
gttactctct tgtttcttca c                                                21

<210> SEQ ID NO 57
<211> LENGTH: 19
<212> TYPE: DNA
<213> ORGANISM: Artificial sequence
<220> FEATURE:
<223> OTHER INFORMATION: Synthetic oligonucleotide

<400> SEQUENCE: 57
ttactctctt gtttcttca                                                   19

<210> SEQ ID NO 58
<211> LENGTH: 19
<212> TYPE: DNA
<213> ORGANISM: Artificial sequence
<220> FEATURE:
<223> OTHER INFORMATION: Synthetic oligonucleotide
```

```
<400> SEQUENCE: 58
gttactctct tgtttcttc                                                     19

<210> SEQ ID NO 59
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 59
cgtgggtgga gaagca                                                        16

<210> SEQ ID NO 60
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 60
acgtgggtgg agaagc                                                        16

<210> SEQ ID NO 61
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 61
cagaaactgt aagggca                                                       17

<210> SEQ ID NO 62
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 62
agggatagca gggaagg                                                       17

<210> SEQ ID NO 63
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 63
gcttaaacac agacaga                                                       17

<210> SEQ ID NO 64
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 64
tgcttaaaca cagacag                                                       17

<210> SEQ ID NO 65
```

```
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 65
cagggcaggg aagaacag                                                   18

<210> SEQ ID NO 66
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 66
catggaagga cagtgg                                                     16

<210> SEQ ID NO 67
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 67
ccccctcaat ataagaa                                                    17

<210> SEQ ID NO 68
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 68
aaccaaccct attcctgg                                                   18

<210> SEQ ID NO 69
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 69 accaaccct ttcctg                                                      16

<210> SEQ ID NO 70
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 70
aaccaaccct attcctg                                                    17

<210> SEQ ID NO 71
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 71
```

```
aaaaccaacc ctattcct                                                    18

<210> SEQ ID NO 72
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 72
aaaccaaccc tattcc                                                      16

<210> SEQ ID NO 73
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 73
ggtagtaagg gcacacc                                                     17

<210> SEQ ID NO 74
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 74
gacaggtagt aagggcacac                                                  20

<210> SEQ ID NO 75
<211> LENGTH: 15
<212> TYPE: DNA
<213> ORGANISM: Artificial sequence
<220> FEATURE:
<223> OTHER INFORMATION: Synthetic oligonucleotide

<400> SEQUENCE: 75
gtagtaaggg cacac                                                       15

<210> SEQ ID NO 76
<211> LENGTH: 19
<212> TYPE: DNA
<213> ORGANISM: Artificial sequence
<220> FEATURE:
<223> OTHER INFORMATION: Synthetic oligonucleotide

<400> SEQUENCE: 76
gacaggtagt aagggcaca                                                   19

<210> SEQ ID NO 77
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 77
acaggtagta agggcaca                                                    18

<210> SEQ ID NO 78
<211> LENGTH: 17
<212> TYPE: DNA
```

```
<213> ORGANISM: Artificial sequence
<220> FEATURE:
<223> OTHER INFORMATION: Synthetic oligonucleotide

<400> SEQUENCE: 78
gacaggtagt aagggca                                                   17

<210> SEQ ID NO 79
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 79
cgggacaggt agtaaggg                                                  18

<210> SEQ ID NO 80
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 80
catccaacaa gtaattgt                                                  18

<210> SEQ ID NO 81
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 81
ggcatccaac aagtaattgt                                                20

<210> SEQ ID NO 82
<211> LENGTH: 19
<212> TYPE: DNA
<213> ORGANISM: Artificial sequence
<220> FEATURE:
<223> OTHER INFORMATION: Synthetic oligonucleotide

<400> SEQUENCE: 82
ggcatccaac aagtaattg                                                 19

<210> SEQ ID NO 83
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 83
ggcatccaac aagtaat                                                   17

<210> SEQ ID NO 84
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 84
cgtgaaggag agaacct                                                   17
```

<210> SEQ ID NO 85
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 85
acgtgaagga gagaacc                                                17

<210> SEQ ID NO 86
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 86
gacgtgaagg agagaacc                                               18

<210> SEQ ID NO 87
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 87
gacgtgaagg agagaac                                                17

<210> SEQ ID NO 88
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 88
cagtcttgct atgcct                                                 16

<210> SEQ ID NO 89
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 89
ctagaatcaa agctcca                                                17

<210> SEQ ID NO 90
<211> LENGTH: 15
<212> TYPE: DNA
<213> ORGANISM: Artificial sequence
<220> FEATURE:
<223> OTHER INFORMATION: Synthetic oligonucleotide

<400> SEQUENCE: 90
acatcgcact tgggc                                                  15

<210> SEQ ID NO 91
<211> LENGTH: 16
<212> TYPE: DNA
<213> ORGANISM: Artificial sequence
<220> FEATURE:

<223> OTHER INFORMATION: Synthetic oligonucleotide

<400> SEQUENCE: 91
cacggcaaac ctcacc                                                          16

<210> SEQ ID NO 92
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 92
aaccacggca aacctcac                                                        18

<210> SEQ ID NO 93
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 93
caaagcaccg agtcacc                                                         17

<210> SEQ ID NO 94
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 94
tcaaagcacc gagtcac                                                         17

<210> SEQ ID NO 95
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 95
ctggttgggt tagaag                                                          16

<210> SEQ ID NO 96
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 96
tataactttt agtttagc                                                        18

<210> SEQ ID NO 97
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 97
ttcctttcta taactttt                                                        18

```
<210> SEQ ID NO 98
<211> LENGTH: 19
<212> TYPE: DNA
<213> ORGANISM: Artificial sequence
<220> FEATURE:
<223> OTHER INFORMATION: Synthetic oligonucleotide

<400> SEQUENCE: 98
gttcctttct ataactttt                                           19

<210> SEQ ID NO 99
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 99
gttcctttct ataacttt                                            18

<210> SEQ ID NO 100
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 100
atgttccttt ctataacttt                                          20

<210> SEQ ID NO 101
<211> LENGTH: 19
<212> TYPE: DNA
<213> ORGANISM: Artificial sequence
<220> FEATURE:
<223> OTHER INFORMATION: Synthetic oligonucleotide

<400> SEQUENCE: 101
atgttccttt ctataactt                                           19

<210> SEQ ID NO 102
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 102
atgttccttt ctataact                                            18

<210> SEQ ID NO 103
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 103
gctttaatct gccttc                                              16

<210> SEQ ID NO 104
<211> LENGTH: 17
<212> TYPE: DNA
<213> ORGANISM: Artificial sequence
<220> FEATURE:
<223> OTHER INFORMATION: Synthetic oligonucleotide
```

```
<400> SEQUENCE: 104
ccgtggcttt aatctgc                                                    17

<210> SEQ ID NO 105
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 105
ccgtggcttt aatctg                                                     16

<210> SEQ ID NO 106
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 106
caaaaaacag taggtcc                                                    17

<210> SEQ ID NO 107
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 107
gaataaaaca gtaggtcc                                                   18

<210> SEQ ID NO 108
<211> LENGTH: 19
<212> TYPE: DNA
<213> ORGANISM: Artificial sequence
<220> FEATURE:
<223> OTHER INFORMATION: Synthetic oligonucleotide

<400> SEQUENCE: 108
ggaataaaac agtaggtcc                                                  19

<210> SEQ ID NO 109
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 109
ggaataaaac agtaggt                                                    17

<210> SEQ ID NO 110
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 110
ggaataaaac agtagg                                                     16

<210> SEQ ID NO 111
<211> LENGTH: 16
```

```
<212> TYPE: DNA
<213> ORGANISM: Artificial sequence
<220> FEATURE:
<223> OTHER INFORMATION: Synthetic oligonucleotide

<400> SEQUENCE: 111
cacagagtgt catggg                                                     16

<210> SEQ ID NO 112
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 112
acagcatgga aaggcacg                                                   18

<210> SEQ ID NO 113
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 113
cagcatggaa aggcacg                                                    17

<210> SEQ ID NO 114
<211> LENGTH: 21
<212> TYPE: DNA
<213> ORGANISM: Artificial sequence
<220> FEATURE:
<223> OTHER INFORMATION: Synthetic oligonucleotide

<400> SEQUENCE: 114
tacaggagga agagaaggga c                                               21

<210> SEQ ID NO 115
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 115
acaggaggaa gagaaggg                                                   18

<210> SEQ ID NO 116
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 116
tctacaggag gaagagaa                                                   18

<210> SEQ ID NO 117
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 117
```

-continued tctacaggag gaagaga                                    17

<210> SEQ ID NO 118
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 118
cttcgtcaaa gatcacg                                    17

<210> SEQ ID NO 119
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 119
gcttcgtcaa agatcacg                                   18

<210> SEQ ID NO 120
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 120
gcttcgtcaa agatcac                                    17

<210> SEQ ID NO 121
<211> LENGTH: 15
<212> TYPE: DNA
<213> ORGANISM: Artificial sequence
<220> FEATURE:
<223> OTHER INFORMATION: Synthetic oligonucleotide

<400> SEQUENCE: 121
ccagaaaggt ttgcg                                      15

<210> SEQ ID NO 122
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 122
tccagaaagg tttgcg                                     16

<210> SEQ ID NO 123
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 123
cagaggcatc ggatcag                                    17

<210> SEQ ID NO 124
<211> LENGTH: 16
<212> TYPE: DNA
<213> ORGANISM: Artificial sequence

```
<220> FEATURE:
<223> OTHER INFORMATION: Synthetic oligonucleotide

<400> SEQUENCE: 124
cagaggcatc ggatca                                                       16

<210> SEQ ID NO 125
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 125
agcagaggca tcggatc                                                      17

<210> SEQ ID NO 126
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 126
attcttcaca catcttc                                                      17

<210> SEQ ID NO 127
<211> LENGTH: 15
<212> TYPE: DNA
<213> ORGANISM: Artificial sequence
<220> FEATURE:
<223> OTHER INFORMATION: Synthetic oligonucleotide

<400> SEQUENCE: 127
ctatgaacgc acctg                                                        15

<210> SEQ ID NO 128
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 128
ggctatgaac gcacctg                                                      17

<210> SEQ ID NO 129
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 129
gctgggagaa gacatag                                                      17

<210> SEQ ID NO 130
<211> LENGTH: 19
<212> TYPE: DNA
<213> ORGANISM: Artificial sequence
<220> FEATURE:
<223> OTHER INFORMATION: Synthetic oligonucleotide

<400> SEQUENCE: 130
caaaatgccc ttacagtga                                                    19
```

<210> SEQ ID NO 131
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 131
caaaatgccc ttacagt                                                17

<210> SEQ ID NO 132
<211> LENGTH: 21
<212> TYPE: DNA
<213> ORGANISM: Artificial sequence
<220> FEATURE:
<223> OTHER INFORMATION: Synthetic oligonucleotide

<400> SEQUENCE: 132
tgtgcgattt taaaggaaaa t                                           21

<210> SEQ ID NO 133
<211> LENGTH: 21
<212> TYPE: DNA
<213> ORGANISM: Artificial sequence
<220> FEATURE:
<223> OTHER INFORMATION: Synthetic oligonucleotide

<400> SEQUENCE: 133
catgtgcgat tttaaaggaa a                                           21

<210> SEQ ID NO 134
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 134
tgtgcgattt taaaggaa                                               18

<210> SEQ ID NO 135
<211> LENGTH: 19
<212> TYPE: DNA
<213> ORGANISM: Artificial sequence
<220> FEATURE:
<223> OTHER INFORMATION: Synthetic oligonucleotide

<400> SEQUENCE: 135
catgtgcgat tttaaagga                                              19

<210> SEQ ID NO 136
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 136
atgtgcgatt ttaaagga                                               18

<210> SEQ ID NO 137
<211> LENGTH: 21
<212> TYPE: DNA
<213> ORGANISM: Artificial sequence
<220> FEATURE:
<223> OTHER INFORMATION: Synthetic oligonucleotide

```
<400> SEQUENCE: 137
accctgtcac ttaaatatat g                                              21

<210> SEQ ID NO 138
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 138
gagggaggtg gagcgtt                                                   17

<210> SEQ ID NO 139
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 139
ctgaagagtg gagaagg                                                   17

<210> SEQ ID NO 140
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 140
caataaataa agtgtgagga                                                20

<210> SEQ ID NO 141
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 141
caacccagta accatgac                                                  18

<210> SEQ ID NO 142
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 142
caacccagta accatga                                                   17

<210> SEQ ID NO 143
<211> LENGTH: 19
<212> TYPE: DNA
<213> ORGANISM: Artificial sequence
<220> FEATURE:
<223> OTHER INFORMATION: Synthetic oligonucleotide

<400> SEQUENCE: 143
accaacccag taaccatga                                                 19

<210> SEQ ID NO 144
```

```
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 144
gagcaggtgt tttatc                                                   16

<210> SEQ ID NO 145
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 145
ggtcgaggag gtgtcac                                                  17

<210> SEQ ID NO 146
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 146
gtcgaggagg tgtcac                                                   16

<210> SEQ ID NO 147
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 147
ggtcgaggag gtgtca                                                   16

<210> SEQ ID NO 148
<211> LENGTH: 15
<212> TYPE: DNA
<213> ORGANISM: Artificial sequence
<220> FEATURE:
<223> OTHER INFORMATION: Synthetic oligonucleotide

<400> SEQUENCE: 148
ggtcgaggag gtgtc                                                    15

<210> SEQ ID NO 149
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 149
ccaggtctca aaaggg                                                   17

<210> SEQ ID NO 150
<211> LENGTH: 15
<212> TYPE: DNA
<213> ORGANISM: Artificial sequence
<220> FEATURE:
<223> OTHER INFORMATION: Synthetic oligonucleotide

<400> SEQUENCE: 150
```

```
attacgctga ggaca                                              15

<210> SEQ ID NO 151
<211> LENGTH: 15
<212> TYPE: DNA
<213> ORGANISM: Artificial sequence
<220> FEATURE:
<223> OTHER INFORMATION: Synthetic oligonucleotide

<400> SEQUENCE: 151
cattacgctg aggac                                              15

<210> SEQ ID NO 152
<211> LENGTH: 14
<212> TYPE: DNA
<213> ORGANISM: Artificial sequence
<220> FEATURE:
<223> OTHER INFORMATION: Synthetic oligonucleotide

<400> SEQUENCE: 152
cttgagcatt acgc                                               14

<210> SEQ ID NO 153
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 153
cgaggagaag aaggcag                                            17

<210> SEQ ID NO 154
<211> LENGTH: 19
<212> TYPE: DNA
<213> ORGANISM: Artificial sequence
<220> FEATURE:
<223> OTHER INFORMATION: Synthetic oligonucleotide

<400> SEQUENCE: 154
ccttggtctg aaacgtgat                                          19

<210> SEQ ID NO 155
<211> LENGTH: 15
<212> TYPE: DNA
<213> ORGANISM: Artificial sequence
<220> FEATURE:
<223> OTHER INFORMATION: Synthetic oligonucleotide

<400> SEQUENCE: 155
ctaacgcctc cacgc                                              15

<210> SEQ ID NO 156
<211> LENGTH: 15
<212> TYPE: DNA
<213> ORGANISM: Artificial sequence
<220> FEATURE:
<223> OTHER INFORMATION: Synthetic oligonucleotide

<400> SEQUENCE: 156
ggacaggctc tacgg                                              15

<210> SEQ ID NO 157
<211> LENGTH: 20
<212> TYPE: DNA
```

```
<213> ORGANISM: Artificial sequence
<220> FEATURE:
<223> OTHER INFORMATION: Synthetic oligonucleotide

<400> SEQUENCE: 157
actaatacag caggagaagg                                                    20

<210> SEQ ID NO 158
<211> LENGTH: 21
<212> TYPE: DNA
<213> ORGANISM: Artificial sequence
<220> FEATURE:
<223> OTHER INFORMATION: Synthetic oligonucleotide

<400> SEQUENCE: 158
aactaataca gcaggagaag g                                                  21

<210> SEQ ID NO 159
<211> LENGTH: 21
<212> TYPE: DNA
<213> ORGANISM: Artificial sequence
<220> FEATURE:
<223> OTHER INFORMATION: Synthetic oligonucleotide

<400> SEQUENCE: 159
taactaatac agcaggagaa g                                                  21

<210> SEQ ID NO 160
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 160
ttgaagagcc aaccac                                                        16

<210> SEQ ID NO 161
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 161
ccattttcac tgtcaag                                                       17

<210> SEQ ID NO 162
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 162
gccattttca ctgtcaa                                                       17

<210> SEQ ID NO 163
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 163
agaaatgcgg agaagc                                                        16
```

<210> SEQ ID NO 164
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 164
aaatggaaaa aatgaccagc                                              20

<210> SEQ ID NO 165
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 165
aggacttacg acaaaaccac                                              20

<210> SEQ ID NO 166
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 166
ggacttacga caaaacca                                                18

<210> SEQ ID NO 167
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 167
gacttacgac aaaacca                                                 17

<210> SEQ ID NO 168
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 168
acaccaggac ttacgaca                                                18

<210> SEQ ID NO 169
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 169
tagaaattca acatggc                                                 17

<210> SEQ ID NO 170
<211> LENGTH: 18
<212> TYPE: DNA
<213> ORGANISM: Artificial sequence
<220> FEATURE:

<223> OTHER INFORMATION: Synthetic oligonucleotide

<400> SEQUENCE: 170
ctagaaattc aacatggc                                                    18

<210> SEQ ID NO 171
<211> LENGTH: 14
<212> TYPE: DNA
<213> ORGANISM: Artificial sequence
<220> FEATURE:
<223> OTHER INFORMATION: Synthetic oligonucleotide

<400> SEQUENCE: 171
gtcatcggtt cacc                                                        14

<210> SEQ ID NO 172
<211> LENGTH: 14
<212> TYPE: DNA
<213> ORGANISM: Artificial sequence
<220> FEATURE:
<223> OTHER INFORMATION: Synthetic oligonucleotide

<400> SEQUENCE: 172
actcgaagac gcca                                                        14

<210> SEQ ID NO 173
<211> LENGTH: 14
<212> TYPE: DNA
<213> ORGANISM: Artificial sequence
<220> FEATURE:
<223> OTHER INFORMATION: Synthetic oligonucleotide

<400> SEQUENCE: 173
gactcgaaga cgcc                                                        14

<210> SEQ ID NO 174
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 174
ggcacaagca gaacgac                                                     17

<210> SEQ ID NO 175
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 175
agtcagaaca aaggaggc                                                    18

<210> SEQ ID NO 176
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 176
gaagtcagaa caaaggag                                                    18

<210> SEQ ID NO 177
<211> LENGTH: 19
<212> TYPE: DNA
<213> ORGANISM: Artificial sequence
<220> FEATURE:
<223> OTHER INFORMATION: Synthetic oligonucleotide

<400> SEQUENCE: 177
gcagaagtca gaacaaagg                                                19

<210> SEQ ID NO 178
<211> LENGTH: 19
<212> TYPE: DNA
<213> ORGANISM: Artificial sequence
<220> FEATURE:
<223> OTHER INFORMATION: Synthetic oligonucleotide

<400> SEQUENCE: 178
gtgcagaagt cagaacaaa                                                19

<210> SEQ ID NO 179
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 179
gtgcagaagt cagaacaa                                                 18

<210> SEQ ID NO 180
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 180
aaggatgagg gagcggac                                                 18

<210> SEQ ID NO 181
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 181
gtaaggatga gggagc                                                   16

<210> SEQ ID NO 182
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 182
tggtaaggat gagggag                                                  17

<210> SEQ ID NO 183
<211> LENGTH: 16
<212> TYPE: DNA
<213> ORGANISM: Artificial sequence
<220> FEATURE:
<223> OTHER INFORMATION: Synthetic oligonucleotide

```
<400> SEQUENCE: 183
cgtacatctg catctc                                                    16

<210> SEQ ID NO 184
<211> LENGTH: 21
<212> TYPE: DNA
<213> ORGANISM: Artificial sequence
<220> FEATURE:
<223> OTHER INFORMATION: Synthetic oligonucleotide

<400> SEQUENCE: 184
tgtaagataa gaggcaacac t                                              21

<210> SEQ ID NO 185
<211> LENGTH: 21
<212> TYPE: DNA
<213> ORGANISM: Artificial sequence
<220> FEATURE:
<223> OTHER INFORMATION: Synthetic oligonucleotide

<400> SEQUENCE: 185
ttgtaagata agaggcaaca c                                              21

<210> SEQ ID NO 186
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 186
ttgtaagata agaggcaaca                                                20

<210> SEQ ID NO 187
<211> LENGTH: 21
<212> TYPE: DNA
<213> ORGANISM: Artificial sequence
<220> FEATURE:
<223> OTHER INFORMATION: Synthetic oligonucleotide

<400> SEQUENCE: 187
tttgtaagat aagaggcaac a                                              21

<210> SEQ ID NO 188
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 188
tgtaagataa gaggcaa                                                   17

<210> SEQ ID NO 189
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 189
ctggaaggaa agttggt                                                   17

<210> SEQ ID NO 190
<211> LENGTH: 19
```

```
<212> TYPE: DNA
<213> ORGANISM: Artificial sequence
<220> FEATURE:
<223> OTHER INFORMATION: Synthetic oligonucleotide

<400> SEQUENCE: 190
atagtaagca ctgatggtc                                          19

<210> SEQ ID NO 191
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 191
tagtaagcac tgatgg                                             16

<210> SEQ ID NO 192
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 192
catagtaagc actgatg                                            17

<210> SEQ ID NO 193
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 193
ctgtaactca cctggc                                             16

<210> SEQ ID NO 194
<211> LENGTH: 15
<212> TYPE: DNA
<213> ORGANISM: Artificial sequence
<220> FEATURE:
<223> OTHER INFORMATION: Synthetic oligonucleotide

<400> SEQUENCE: 194
cggatcactc gcccg                                              15

<210> SEQ ID NO 195
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 195
acacaggcta ctctcgg                                            17

<210> SEQ ID NO 196
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 196
```
acacaggcta ctctcg					16

<210> SEQ ID NO 197
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 197
ccacacacag gctactc					17

<210> SEQ ID NO 198
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 198
atactccaca cacaggct					18

<210> SEQ ID NO 199
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 199
atactccaca cacaggc					17

<210> SEQ ID NO 200
<211> LENGTH: 19
<212> TYPE: DNA
<213> ORGANISM: Artificial sequence
<220> FEATURE:
<223> OTHER INFORMATION: Synthetic oligonucleotide

<400> SEQUENCE: 200
gctcatactc cacacacag					19

<210> SEQ ID NO 201
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 201
tcatactcca cacacag					17

<210> SEQ ID NO 202
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 202
gctcatactc cacacaca					18

<210> SEQ ID NO 203
<211> LENGTH: 18
<212> TYPE: DNA
<213> ORGANISM: Artificial sequence

```
<220> FEATURE:
<223> OTHER INFORMATION: Synthetic oligonucleotide

<400> SEQUENCE: 203
tgctcatact ccacacac                                                   18

<210> SEQ ID NO 204
<211> LENGTH: 19
<212> TYPE: DNA
<213> ORGANISM: Artificial sequence
<220> FEATURE:
<223> OTHER INFORMATION: Synthetic oligonucleotide

<400> SEQUENCE: 204
agcaggaagc agggagaaa                                                  19

<210> SEQ ID NO 205
<211> LENGTH: 15
<212> TYPE: DNA
<213> ORGANISM: Artificial sequence
<220> FEATURE:
<223> OTHER INFORMATION: Synthetic oligonucleotide

<400> SEQUENCE: 205
tccgaccaca gcgag                                                      15

<210> SEQ ID NO 206
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 206
cagaagccaa gggacatg                                                   18

<210> SEQ ID NO 207
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 207
cagaagccaa gggacat                                                    17

<210> SEQ ID NO 208
<211> LENGTH: 19
<212> TYPE: DNA
<213> ORGANISM: Artificial sequence
<220> FEATURE:
<223> OTHER INFORMATION: Synthetic oligonucleotide

<400> SEQUENCE: 208
ccagaccaac acggaaacg                                                  19

<210> SEQ ID NO 209
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 209
ccagaccaac acggaaac                                                   18
```

```
<210> SEQ ID NO 210
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 210
gaatgggcaa agggtaga                                                 18

<210> SEQ ID NO 211
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 211
aatgggcaaa gggtaga                                                  17

<210> SEQ ID NO 212
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 212
gaatgggcaa agggtag                                                  17

<210> SEQ ID NO 213
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 213
gaacccttgt agtcctg                                                  17

<210> SEQ ID NO 214
<211> LENGTH: 15
<212> TYPE: DNA
<213> ORGANISM: Artificial sequence
<220> FEATURE:
<223> OTHER INFORMATION: Synthetic oligonucleotide

<400> SEQUENCE: 214
aacccttgta gtcct                                                    15

<210> SEQ ID NO 215
<211> LENGTH: 15
<212> TYPE: DNA
<213> ORGANISM: Artificial sequence
<220> FEATURE:
<223> OTHER INFORMATION: Synthetic oligonucleotide

<400> SEQUENCE: 215
ggaacccttg tagtc                                                    15

<210> SEQ ID NO 216
<211> LENGTH: 18
<212> TYPE: DNA
<213> ORGANISM: Artificial sequence
<220> FEATURE:
<223> OTHER INFORMATION: Synthetic oligonucleotide
```

```
<400> SEQUENCE: 216
atcggaaccc ttgtagtc                                              18

<210> SEQ ID NO 217
<211> LENGTH: 19
<212> TYPE: DNA
<213> ORGANISM: Artificial sequence
<220> FEATURE:
<223> OTHER INFORMATION: Synthetic oligonucleotide

<400> SEQUENCE: 217
catcggaacc cttgtagtc                                             19

<210> SEQ ID NO 218
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 218
catcggaacc cttgtagt                                              18

<210> SEQ ID NO 219
<211> LENGTH: 20
<212> TYPE: DNA
<213> ORGANISM: Artificial sequence
<220> FEATURE:
<223> OTHER INFORMATION: Synthetic oligonucleotide

<400> SEQUENCE: 219
gatacagacc tcctcaaact                                            20

<210> SEQ ID NO 220
<211> LENGTH: 19
<212> TYPE: DNA
<213> ORGANISM: Artificial sequence
<220> FEATURE:
<223> OTHER INFORMATION: Synthetic oligonucleotide

<400> SEQUENCE: 220
gatacagacc tcctcaaac                                             19

<210> SEQ ID NO 221
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 221
gatacagacc tcctcaaa                                              18

<210> SEQ ID NO 222
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 222
gatacagacc tcctcaa                                               17

<210> SEQ ID NO 223
```

```
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 223
gccccattta ccagtg                                                    16

<210> SEQ ID NO 224
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 224
cccaacaagt gatgct                                                    16

<210> SEQ ID NO 225
<211> LENGTH: 15
<212> TYPE: DNA
<213> ORGANISM: Artificial sequence
<220> FEATURE:
<223> OTHER INFORMATION: Synthetic oligonucleotide

<400> SEQUENCE: 225
cccaacaagt gatgc                                                     15

<210> SEQ ID NO 226
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 226
gtaccaagcc cagaagg                                                   17

<210> SEQ ID NO 227
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 227
gtaccaagcc cagaag                                                    16

<210> SEQ ID NO 228
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 228
ttcctgatga agagatg                                                   17

<210> SEQ ID NO 229
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 229
```
tcctgatgaa gagatg                                              16

<210> SEQ ID NO 230
<211> LENGTH: 15
<212> TYPE: DNA
<213> ORGANISM: Artificial sequence
<220> FEATURE:
<223> OTHER INFORMATION: Synthetic oligonucleotide

<400> SEQUENCE: 230
tgggagtagc atggc                                               15

<210> SEQ ID NO 231
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 231
tgtgggagta gcatggc                                             17

<210> SEQ ID NO 232
<211> LENGTH: 16
<212> TYPE: DNA
<213> ORGANISM: Artificial sequence
<220> FEATURE:
<223> OTHER INFORMATION: Synthetic oligonucleotide

<400> SEQUENCE: 232
gtgggagtag catggc                                              16

<210> SEQ ID NO 233
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 233
aaacatgctg aaccctg                                             17

<210> SEQ ID NO 234
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 234
acaaacatgc tgaaccct                                            18

<210> SEQ ID NO 235
<211> LENGTH: 18
<212> TYPE: DNA
<213> ORGANISM: Artificial sequence
<220> FEATURE:
<223> OTHER INFORMATION: Synthetic oligonucleotide

<400> SEQUENCE: 235
cacaaacatg ctgaaccc                                            18

<210> SEQ ID NO 236
<211> LENGTH: 17
<212> TYPE: DNA

```
<213> ORGANISM: Artificial sequence
<220> FEATURE:
<223> OTHER INFORMATION: Synthetic oligonucleotide

<400> SEQUENCE: 236
cacaaacatg ctgaacc                                                        17

<210> SEQ ID NO 237
<211> LENGTH: 17
<212> TYPE: DNA
<213> ORGANISM: Artificial sequence
<220> FEATURE:
<223> OTHER INFORMATION: Synthetic oligonucleotide

<400> SEQUENCE: 237
tggacgcaca aacatgc                                                        17

<210> SEQ ID NO 238
<211> LENGTH: 21
<212> TYPE: DNA
<213> ORGANISM: artificial
<220> FEATURE:
<223> OTHER INFORMATION: Primer

<400> SEQUENCE: 238
ggagtgtgga ttcgcactcc t                                                   21

<210> SEQ ID NO 239
<211> LENGTH: 20
<212> TYPE: DNA
<213> ORGANISM: artificial
<220> FEATURE:
<223> OTHER INFORMATION: Primer

<400> SEQUENCE: 239
agattgagat cttctgcgac                                                     20

<210> SEQ ID NO 240
<211> LENGTH: 27
<212> TYPE: DNA
<213> ORGANISM: artificial
<220> FEATURE:
<223> OTHER INFORMATION: probe

<400> SEQUENCE: 240
aggcaggtcc cctagaagaa gaactcc                                             27

<210> SEQ ID NO 241
<211> LENGTH: 21
<212> TYPE: DNA
<213> ORGANISM: artificial
<220> FEATURE:
<223> OTHER INFORMATION: primer

<400> SEQUENCE: 241
ccatcctgga cattgaggac t                                                   21

<210> SEQ ID NO 242
<211> LENGTH: 21
<212> TYPE: DNA
<213> ORGANISM: artificial
<220> FEATURE:
<223> OTHER INFORMATION: primer

<400> SEQUENCE: 242
caggttccgg gacaggtagt a                                                   21
```

```
<210> SEQ ID NO 243
<211> LENGTH: 21
<212> TYPE: DNA
<213> ORGANISM: artificial
<220> FEATURE:
<223> OTHER INFORMATION: primer

<400> SEQUENCE: 243
cgtctgtgcc ttctcatctg c                                        21

<210> SEQ ID NO 244
<211> LENGTH: 20
<212> TYPE: DNA
<213> ORGANISM: artificial
<220> FEATURE:
<223> OTHER INFORMATION: primer

<400> SEQUENCE: 244
gcacagcttg gaggcttgaa                                           20

<210> SEQ ID NO 245
<211> LENGTH: 20
<212> TYPE: DNA
<213> ORGANISM: artificial
<220> FEATURE:
<223> OTHER INFORMATION: primer

<400> SEQUENCE: 245
ccgtctgaac tatcctgccc                                           20

<210> SEQ ID NO 246
<211> LENGTH: 20
<212> TYPE: DNA
<213> ORGANISM: artificial
<220> FEATURE:
<223> OTHER INFORMATION: primer

<400> SEQUENCE: 246
gccgtagtcg gtgtactcgt                                           20
```

OLIGONUCLEOTIDES FOR MODULATING RTEL1 EXPRESSION

SEQUENCE LISTING

The instant application contains a Sequence Listing which has been submitted electronically in ASCII format and is hereby incorporated by reference in its entirety. Said ASCII copy, created on Jan. 5, 2021 is named 51551-005003_Sequence_Listing_1_5_21_ST25 and is 146,751 bytes in size.

FIELD OF INVENTION

The present invention relates to RTEL1 inhibitors, such as oligonucleotides (oligomers) that are complementary to RTEL1, leading to modulation of the expression of RTEL1 or modulation of RTEL1 activity. The invention in particular relates to the use of RTEL1 targeting nucleic acid molecules for use in treating and/or preventing a hepatitis B virus (HBV) infection, in particular a chronic HBV infection. The invention in particular relates to the use of RTEL1 inhibitors for destabilizing cccDNA, such as HBV cccDNA. Also comprised in the present invention is a pharmaceutical composition and its use in the treatment and/or prevention of a HBV infection.

BACKGROUND

Hepatitis B is an infectious disease caused by the hepatitis B virus (HBV), a small hepatotropic virus that replicates through reverse transcription. Chronic HBV infection is a key factor for severe liver diseases such as liver cirrhosis and hepatocellular carcinoma. Current treatments for chronic HBV infection are based on administration of pegylated type 1 interferons or nucleos(t)ide analogues, such as lamivudine, adefovir, entecavir, tenofovir disoproxil, and tenofovir alafenamide, which target the viral polymerase, a multifunctional reverse transcriptase. Treatment success is usually measured as loss of hepatitis B surface antigen (HBsAg). However, a complete HBsAg clearance is rarely achieved since Hepatitis B virus DNA persists in the body after infection. HBV persistence is mediated by an episomal form of the HBV genome which is stably maintained in the nucleus. This episomal form is called "covalently closed circular DNA" (cccDNA). The cccDNA serves as a template for all HBV transcripts, including pregenomic RNA (pgRNA), a viral replicative intermediate. The presence of a few copies of cccDNA might be sufficient to reinitiate a full-blown HBV infection. Current treatments for HBV do not target cccDNA. A cure of chronic HBV infection, however, would require the elimination of cccDNA (reviewed by Nassal, Gut. 2015 December; 64(12):1972-84.).

Regulator of telomere elongation helicase 1 (RTEL1) encodes a DNA helicase which functions in the stability, protection and elongation of telomeres and interacts with proteins in the shelterin complex known to protect telomeres during DNA replication. Mutations in this gene have been associated with dyskeratosis congenita and Hoyerall-Hreidarsson syndrome (See for example review by Vannier et al 2014 Trends Cell Biol. Vol 24 p. 416).

Located in the nucleus, RTEL1 functions as an ATP-dependent DNA helicase implicated in telomere-length regulation, DNA repair and the maintenance of genomic stability. RTEL1 Acts as an anti-recombinase to counteract toxic recombination and limit crossover during meiosis and regulates meiotic recombination and crossover homeostasis by physically dissociating strand invasion events and thereby promotes non-crossover repair by meiotic synthesis dependent strand annealing (SDSA) as well as disassembly of D loop recombination intermediates. In additional RTEL1 disassembles T loops and prevents telomere fragility by counteracting telomeric G4-DNA structures, which together ensure the dynamics and stability of the telomere.

RTEL1 has been identified in a siRNA screen as a stabilizer of HPV episomes: (Edwards et al 2013 PLoS One Vol 8, e75406). siRNA targeting RTEL1 has likewise been used to identify interactants with RTEL1 in Hoyeraal-Hreidarsson syndrome (Schertzer et al 2015 Nucleic Acid Res Vol 43 p. 1834). In addition, RTEL1 was identified as a HIV host dependency factor from a siRNA screen for essential host proteins to provide targets for inhibition HIV infection (WO 2007/094818).

To our knowledge RTEL1 has never been identified as a cccDNA dependency factor in the context of cccDNA stability and maintenance, nor have molecules inhibiting RTEL1 ever been suggested as cccDNA destabilizers for the treatment of HBV infection.

OBJECTIVE OF THE INVENTION

The present invention shows that there is a correlation between the inhibition of RTEL1 and reduction of cccDNA in an HBV infected cell, which is relevant in the treatment of HBV infected individuals. An objective of the present invention is to identify RTEL1 inhibitors which reduce cccDNA in an HBV infected cell. Such RTEL1 inhibitors can be used in the treatment of HBV infection.

The present invention further identifies novel nucleic acid molecules, which are capable of inhibiting the expression of RTEL1 in vitro and in vivo.

SUMMARY OF INVENTION

The present invention relates to oligonucleotides targeting a nucleic acid capable of modulating the expression of RTEL1 and to treat or prevent diseases related to the functioning of the RTEL1.

Accordingly, in a first aspect the invention provides a RTEL1 inhibitor for use in the treatment and/or prevention of Hepatitis B virus (HBV) infection. In particular, a RTEL1 inhibitor capable of reducing cccDNA and/or pre-genomic RNA (pgRNA) is useful. Such an inhibitor is advantageously selected from a nucleic acid molecule of 12 to 60 nucleotides in length, which is capable of reducing RTEL1 mRNA, such as a single stranded antisense oligonucleotide, a siRNA or a shRNA complementary to mammalian RTEL1

In a further aspect the invention relates to an oligonucleotide of 12-60 nucleotides, such as 12-30 nucleotides, comprising a contiguous nucleotides sequence of at least 10 nucleotides, in particular of 16 to 20 nucleotides, which is complementary to a mammalian RTEL1. Such an oligonucleotide is capable of inhibiting the expression of RTEL1. The oligonucleotide can be a single stranded antisense oligonucleotide or a shRNA nucleic acid molecule.

The antisense oligonucleotide can have a gapmer design. Preferably, the antisense oligonucleotide is capable of inhibiting the expression of RTEL1 by cleavage of the target nucleic acid. The cleavage is preferably achieved via nuclease recruitment.

In a further aspect, the invention provides pharmaceutical compositions comprising the antisense oligonucleotide of the invention and a pharmaceutically excipient.

In a further aspect, the invention provides methods for in vivo or in vitro method for modulation of RTEL1 expression in a target cell which is expressing RTEL1, by administering an antisense oligonucleotide or composition of the invention in an effective amount to said cell.

In a further aspect the invention provides methods for treating or preventing a disease, disorder or dysfunction associated with in vivo activity of RTEL1 comprising administering a therapeutically or prophylactically effective amount of the antisense oligonucleotide of the invention to a subject suffering from or susceptible to the disease, disorder or dysfunction.

Further aspects of the invention are conjugates of nucleic acid molecules of the invention and pharmaceutical compositions comprising the molecules of the invention. In particular conjugates targeting the liver are of interest, such as GalNAc clusters.

DEFINITIONS

HBV Infection

Figure 1A:
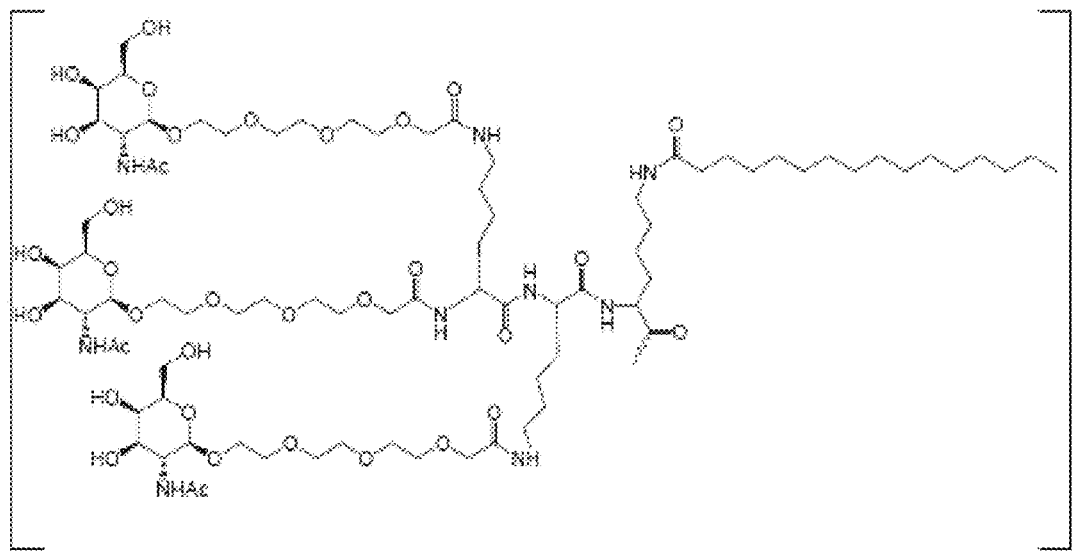
FIG. 1A-FIG. 1I: Illustrates exemplary antisense oligonucleotide conjugates, where the oligonucleotide either is represented as a wavy line (FIG. 1A-FIG. 1D) or as "oligonucleotide" (FIG. 1E-FIG. 1H) or as $T_2$ (FIG. 1I) and the asialoglycoprotein receptor targeting conjugate moieties are trivalent N-acetylgalactosamine moieties. Compounds A to D comprise a di-lysine brancher molecule, a PEG3 spacer and three terminal GalNAc carbohydrate moieties. In compound A and B the oligonucleotide is attached directly to the asialoglycoprotein receptor targeting conjugate moiety without a linker. In compound C and D the oligonucleotide is attached to the asialoglycoprotein receptor targeting conjugate moiety via a C6 linker. Compounds E-I comprise a commercially available trebler brancher molecule and spacers of varying length and structure and three terminal GalNAc carbohydrate moieties.
Figure 1B:
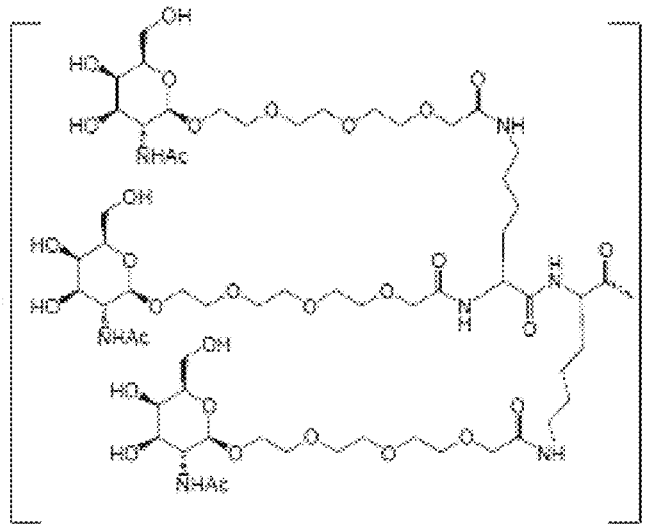
Figure 1C:
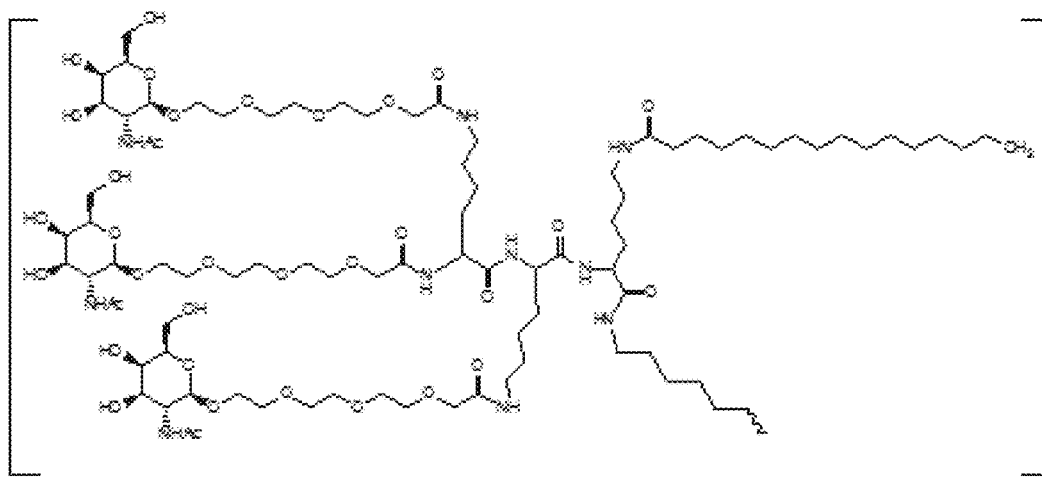

The term "hepatitis B virus infection" or "HBV infection" is commonly known in the art and refers to an infectious disease that is caused by the hepatitis B virus (HBV) and affects the liver. A HBV infection can be an acute or a chronic infection. Chronic hepatitis B virus (CHB) infection is a global disease burden affecting 248 million individuals worldwide. Approximately 686,000 deaths annually are attributed to HBV-related end-stage liver diseases and hepatocellular carcinoma (HCC) (GBD 2013; Schweitzer et al., 2015). WHO projected that without expanded intervention, the number of people living with CHB infection will remain at the current high levels for the next 40-50 years, with a cumulative 20 million deaths occurring between 2015 and 2030 (WHO 2016). CHB infection is not a homogenous disease with singular clinical presentation. Infected individuals have progressed through several phases of CHB-associated liver disease in their life; these phases of disease are also the basis for treatment with standard of care (SOC). Current guidelines recommend treating only selected CHB-infected individuals based on three criteria—serum ALT level, HBV DNA level, and severity of liver disease (EASL, 2017). This recommendation was due to the fact that SOC i.e. nucleos(t)ide analogs (NAs) and pegylated interferon-alpha (PEG-IFN), are not curative and must be administered for long periods of time thereby increasing their safety risks. NAs effectively suppress HBV DNA replication; however, they have very limited/no effect on other viral markers. Two hallmarks of HBV infection, hepatitis B surface antigen (HBsAg) and covalently closed circular DNA (cccDNA), are the main targets of novel drugs aiming for HBV cure. In the plasma of CHB individuals, HBsAg subviral (empty) particles outnumber HBV virions by a factor of 103 to 105 (Ganem & Prince, 2014); its excess is believed to contribute to immunopathogenesis of the disease, including inability of individuals to develop neutralizing anti-HBs antibody, the serological marker observed following resolution of acute HBV infection.

cccDNA (Covalently Closed Circular DNA)

cccDNA is the viral genetic template that resides in the nucleus of infected hepatocytes, where it gives rise to all HBV RNA transcripts needed for productive infection and is responsible for viral persistence during natural course of chronic HBV infection (Locarnini & Zoulim, 2010 Antivir Ther. 15 Suppl 3:3-14.). Acting as a viral reservoir, cccDNA is the source of viral rebound after cessation of treatment, necessitating long term, often, lifetime treatment. PEG-IFN can only be administered to a small subset of CHB due to its various side effects.

Consequently, novel therapies that can deliver a complete cure, defined by degradation or elimination of HBV cccDNA, to the majority of CHB patients are highly needed.

Compound

Herein, the term "compound" means any molecule capable of inhibition RTEL1 expression or activity. Particular compounds of the invention are nucleic acid molecules, such as RNAi molecules or antisense oligonucleotides according to the invention or any conjugate comprising such a nucleic acid molecule. For example, herein the compound may be a nucleic acid molecule targeting RTEL1, in particular an antisense oligonucleotide or a siRNA.

Oligonucleotide

The term "oligonucleotide" as used herein is defined as it is generally understood by the skilled person as a molecule comprising two or more covalently linked nucleosides. Such covalently bound nucleosides may also be referred to as nucleic acid molecules or oligomers, which may be used interchangeably.

The oligonucleotides referred to in in the description and claims are generally therapeutic oligonucleotides below 70 nucleotides in length. The oligonucleotide may be or comprise a single stranded antisense oligonucleotide, or may be another oligomeric nucleic acid molecule, such as a CRISPR RNA, a siRNA, shRNA, an aptamer, or a ribozyme. Therapeutic oligonucleotide molecules are commonly made in the laboratory by solid-phase chemical synthesis followed by purification and isolation. shRNA's are however often delivered to cells using lentiviral vectors from which they are then transcribed to produce the single stranded RNA that will form a stem loop (hairpin) RNA structure that is capable of interacting with the RNA interference machinery (including the RNA-induced silencing complex (RISC)). In an embodiment of the present invention the shRNA is chemically produced shRNA molecules (not relying on cell based expression from plasmids or viruses).

When referring to a sequence of the oligonucleotide, reference is made to the sequence or order of nucleobase moieties, or modifications thereof, of the covalently linked nucleotides or nucleosides. Generally, the oligonucleotide of the invention is man-made, and is chemically synthesized, and is typically purified or isolated. Although in some embodiments the oligonucleotide of the invention is a shRNA transcribed from a vector upon entry into the target cell. The oligonucleotide of the invention may comprise one or more modified nucleosides or nucleotides.

In some embodiments, the oligonucleotide of the invention comprises or consists of 10 to 70 nucleotides in length, such as from 12 to 60, such as from 13 to 50, such as from 14 to 40, such as from 15 to 30, such as from 12-25, such as from 16 to 22, such as from 16 to 20 contiguous nucleotides in length. Accordingly, the oligonucleotide of the present invention, in some embodiments, may have a length of 12-25 nucleotides. Alternatively, the oligonucleotide of the present invention, in some embodiments, may have a length of 15-22 nucleotides.

In some embodiments, the oligonucleotide or contiguous nucleotide sequence thereof comprises or consists of 24 or less nucleotides, such as 22, such as 20 or less nucleotides, such as 18 or less nucleotides, such as 14, 15, 16 or 17 nucleotides. It is to be understood that any range given herein includes the range endpoints. Accordingly, if a nucleic acid molecule is said to include from 12 to 25 nucleotides, both 12 and 25 nucleotides are included.

In some embodiments, the contiguous nucleotide sequence comprises or consists of 12, 13, 14, 15, 16, 17, 18, 19, 20, 21 or 22 contiguous nucleotides in length The olignucleotide(s) are for modulating the expression of a target nucleic acid in a mammal. In some embodiments the nucleic acid molecules, such as for siRNAs, shRNAs and antisense oligonucleotides, are typically for inhibiting the expression of a target nucleic acid(s).

In one embodiment of the invention oligonucleotide is selected from a RNAi agent, such as a siRNA or shRNA. In another embodiment the oligonucleotide is a single stranded antisense oligonucleotide, such as a high affinity modified antisense oligonucleotide interacting with RNaseH.

In some embodiments the oligonucleotide of the invention may comprise one or more modified nucleosides or nucleotides, such as 2' sugar modified nucleosides.

In some embodiments the oligonucleotide comprises phosphorothioate internucleoside linkages.

In some embodiments the oligonucleotide may be conjugated to non-nucleosidic moieties (conjugate moieties).

A library of oligonucleotides is to be understood as a collection of variant oligonucleotides. The purpose of the library of oligonucleotides can vary. In some embodiments, the library of oligonucleotides is composed of oligonucleotides with overlapping nucleobase sequence targeting one or more mammalian RTEL1 target nucleic acids with the purpose of identifying the most potent sequence within the library of oligonucleotides. In some embodiments, the library of oligonucleotides is a library of oligonucleotide design variants (child nucleic acid molecules) of a parent or ancestral oligonucleotide, wherein the oligonucleotide design variants retaining the core nucleobase sequence of the parent nucleic acid molecule.

Antisense Oligonucleotides

The term "antisense oligonucleotide" as used herein is defined as oligonucleotides capable of modulating expression of a target gene by hybridizing to a target nucleic acid, in particular to a contiguous sequence on a target nucleic acid. The antisense oligonucleotides herein are not essentially double stranded and are therefore not siRNAs or shRNAs. Preferably, the antisense oligonucleotides of the present invention are single stranded. It is understood that single stranded oligonucleotides of the present invention can form hairpins or intermolecular duplex structures (duplex between two molecules of the same oligonucleotide), as long as the degree of intra or inter self complementarity is less than 50% across of the full length of the oligonucleotide.

Advantageously, the single stranded antisense oligonucleotide of the invention does not contain RNA nucleosides, since this will decrease nuclease resistance.

Advantageously, the oligonucleotide of the invention comprises one or more modified nucleosides or nucleotides, such as 2' sugar modified nucleosides. Furthermore, it is advantageous that the nucleosides which are not modified are DNA nucleosides.

RNAi Molecules

Herein, the term "RNA interference (RNAi) molecule" refers to short double-stranded RNA based oligonucleotide capable of inducing RNA-dependent gene silencing via the RNA-induced silencing complex (RISC) in a cell's cytoplasm, where they interact with the catalytic RISC component argonaute. The RNAi molecule modulates. e g., inhibits, the expression of the target nucleic acid in a cell. e.g. a cell within a subject. such as a mammalian subject. One type of RNAi molecule is a small interfering RNA (siRNA), which is a double-stranded RNA molecule composed of two complementary oligonucleotides, where the binding of one strand to complementary mRNA after transcription, leads to its degradation and loss of translation. A small hairpin RNA (shRNA) is a single stranded RNA-based oligonucleotide that forms a stem loop (hairpin) structure which is able to reduce mRNA via the DICER and RNA reducing silencing complex (RISC). RNAi molecules can be designed based on the sequence of the gene of interest (target nucleic acid). Corresponding RNAi can then be synthesized chemically or by in vitro transcription, or expressed from a vector or PCR product.

siRNA

The term siRNA refers to a small interfering ribonucleic acid RNAi molecule. It is a class of double-stranded RNA molecules, also known in the art as short interfering RNA or silencing RNA. siRNAs typically comprise a sense strand (also referred to as a passenger strand) and an antisense strand (also referred to as the guide strand), wherein each strand are of 17-30 nucleotides in length, typically 19-25 nucleosides in length, wherein the antisense strand is complementary, such as at least 95% complementary, such as fully complementary, to the target nucleic acid (suitably a mature mRNA sequence), and the sense strand is complementary to the antisense strand so that the sense strand and antisense strand form a duplex or duplex region. siRNA strands may form a blunt ended duplex, or advantageously the sense and antisense strand 3' ends may form a 3' overhang of e.g. 1, 2 or 3 nucleosides to resemble the product produced by Dicer, which forms the RISC substrate in vivo. Effective extended forms of Dicer substrates have been described in U.S. Pat. Nos. 8,349,809 and 8,513,207, hereby incorporated by reference. In some embodiments, both the sense strand and antisense strand have a 2 nt 3' overhang. The duplex region may therefore be, for example 17-25 nucleotides in length, such as 21-23 nucleotide in length.

Once inside a cell the antisense strand is incorporated into the RISC complex which mediate target degradation or target inhibition of the target nucleic acid. siRNAs typically comprise modified nucleosides in addition to RNA nucleosides. In one embodiment the siRNA molecule may be chemically modified using modified internucleotide linkages and 2' sugar modified nucleosides, such as 2'-4' bicyclic ribose modified nucleosides, including LNA and cET or 2' substituted modifications like of 2'-O-alkyl-RNA, 2'-O-methyl-RNA, 2'-alkoxy-RNA, 2'-O-methoxyethyl-RNA (MOE), 2'-amino-DNA, 2'-fluoro-DNA, arabino nucleic acid (ANA), 2'-fluoro-ANA. In particular 2'fluoro, 2'-O-methyl or 2'-O-methoxyethyl may be incorporated into siRNAs.

In some embodiments all of the nucleotides of an siRNA sense (passenger) strand may be modified with 2' sugar modified nucleosides such as LNA (see WO2004/083430, WO2007/085485 for example). In some embodiments the passenger stand of the siRNA may be discontinuous (see WO2007/107162 for example). The incorporation of thermally destabilizing nucleotides occurring at a seed region of the antisense strand of siRNAs have been reported as useful in reducing off-target activity of siRNAs (see WO2018/098328 for example). Suitably the siRNA comprises a 5' phosphate group or a 5'-phosphate mimic at the 5' end of the antisense strand. In some embodiments the 5' end of the antisense strand is a RNA nucleoside.

In one embodiment, the siRNA molecule further comprises at least one phosphorothioate or methylphosphonate internucleoside linkage. The phosphorothioaie or methylphosphonate internucleoside linkage may be at the 3'-terminus one or both strand (e.g., the antisense strand; or the sense strand); or the phosphorothioate or methylphosphonate internucleoside linkage may be at the 5'-terminus of one or both strands (e.g., the antisense strand; or the sense strand); or the phosphorothioate or methylphosphonate internucleoside linkage may be at the both the 5'- and 3'-terminus of one or both strands (e.g., the antisense strand; or the sense strand). In some embodiments the remaining internucleoside linkages are phosphodiester linkages. In some embodiments siRNA molecules comprise one or more phosphorothioate internucleoside linkages. In siRNA molecules phosphorothioate internucleoside linkages may reduce or the nuclease cleavage in RICS, it is therefore advantageous that not all internucleoside linkages in the antisense strand are modified.

The siRNA molecule may further comprise a ligand. In some embodiments, the ligand is conjugated to the 3' end of the sense strand.

For biological distribution, siRNAs may be conjugated to a targeting ligand, and/or be formulated into lipid nanoparticles, for example.

Other aspects of the invention relate to pharmaceutical compositions comprising these dsRNA, such as siRNA molecules suitable for therapeutic use, and methods of inhibiting the expression of the target gene by administering the dsRNA molecules such as siRNAs of the invention, e.g., for the treatment of various disease conditions as disclosed herein.

shRNA

Short hairpin RNA or shRNA molecules are generally between 40 and 70 nucleotides in length, such as between 45 and 65 nucleotides in length, such as 50 and 60 nucleotides in length, and form a stem loop (hairpin) RNA structure, which interacts with the endonuclease known as Dicer which is believed to processes dsRNA into 19-23 base pair short interfering RNAs with characteristic two base 3' overhangs which are then incorporated into an RNA-induced silencing complex (RISC). Upon binding to the appropriate target mRNA, one or more endonucleases within the RISC cleave the target to induce silencing. RNAi oligonucleotides may be chemically modified using modified internucleotide linkages and 2' sugar modified nucleosides, such as 2'-4' bicyclic ribose modified nucleosides, including LNA and cET or 2' substituted modifications like of 2'-O-alkyl-RNA, 2'-O-methyl-RNA, 2'-alkoxy-RNA, 2'-O-methoxyethyl-RNA (MOE), 2'-amino-DNA, 2'-fluoro-DNA, arabino nucleic acid (ANA), 2'-fluoro-ANA.

In some embodiments shRNA nucleic acid molecules comprise one or more phosphorothioate internucleoside linkages. In RNAi molecules phosphorothioate internucleoside linkages may reduce or the nuclease cleavage in RICS it is therefore advantageous that not al internucleoside linkages in the stem loop of the shRNA molecule are modified. Phosphorothioate internucleoside linkages can advantageously be place in the 3' and/or 5' end of the stem loop of the shRNA molecule, in particular in the of the part of the molecule that is not complementary to the target nucleic acid (e.g. the sense stand or passenger strand in an siRNA molecule). The region of the shRNA molecule that is complementary to the target nucleic acid may however also be modified in the first 2 to 3 internucleoside linkages in the part that is predicted to become the 3' and/or 5' terminal following cleavage by Dicer.

Contiguous Nucleotide Sequence

The term "contiguous nucleotide sequence" refers to the region of the oligonucleotide which is complementary to the target nucleic acid. The term is used interchangeably herein with the term "contiguous nucleobase sequence" and the term "oligonucleotide motif sequence". In some embodiments all the nucleotides of the oligonucleotide constitute the contiguous nucleotide sequence. In some embodiments the contiguous nucleotide sequence is included in the guide strand of an siRNA molecule. In some embodiments the contiguous nucleotide sequence is the part of an shRNA molecule which is 100% complementary to the target nucleic acid. In some embodiments the oligonucleotide comprises the contiguous nucleotide sequence, such as a F-G-F' gapmer region, and may optionally comprise further nucleotide(s), for example a nucleotide linker region which may be used to attach a functional group (e.g. a conjugate group for targeting) to the contiguous nucleotide sequence. The nucleotide linker region may or may not be complementary to the target nucleic acid. In some embodiments, the nucleobase sequence of the antisense oligonucleotide is the contiguous nucleotide sequence. In some embodiments, the contiguous nucleotide sequence is 100% complementary to the target nucleic acid.

Nucleotides and Nucleosides

Nucleotides and nucleosides are the building blocks of oligonucleotides and polynucleotides, and for the purposes of the present invention include both naturally occurring and non-naturally occurring nucleotides and nucleosides. In nature, nucleotides, such as DNA and RNA nucleotides comprise a ribose sugar moiety, a nucleobase moiety and one or more phosphate groups (which is absent in nucleosides). Nucleosides and nucleotides may also interchangeably be referred to as "units" or "monomers".

Modified Nucleoside

The term "modified nucleoside" or "nucleoside modification" as used herein refers to nucleosides modified as compared to the equivalent DNA or RNA nucleoside by the introduction of one or more modifications of the sugar moiety or the (nucleo)base moiety. In a preferred embodiment the modified nucleoside comprise a modified sugar moiety. The term modified nucleoside may also be used herein interchangeably with the term "nucleoside analogue" or modified "units" or modified "monomers". Nucleosides with an unmodified DNA or RNA sugar moiety are termed DNA or RNA nucleosides herein. Nucleosides with modifications in the base region of the DNA or RNA nucleoside are still generally termed DNA or RNA if they allow Watson Crick base pairing.

Modified Internucleoside Linkage

The term "modified internucleoside linkage" is defined as generally understood by the skilled person as linkages other than phosphodiester (PO) linkages, that covalently couples two nucleosides together. The oligonucleotides of the invention may therefore comprise one or more modified internucleoside linkages, such as a one or more phosphorothioate internucleoside linkages, or one or more phoshporodithioate internucleoside linkages. In some embodiments, the modified internucleoside linkage increases the nuclease resistance of the oligonucleotide compared to a phosphodiester linkage. For naturally occurring oligonucleotides, the internucleoside linkage includes phosphate groups creating a phosphodiester bond between adjacent nucleosides. Modified internucleoside linkages are particularly useful in stabilizing oligonucleotides for in vivo use, and may serve to protect against nuclease cleavage at regions of DNA or RNA nucleosides in the oligonucleotide of the invention, for example within the gap region G of a gapmer oligonucleotide, as well as in regions of modified nucleosides, such as region F and F'.

In an embodiment, the oligonucleotide comprises one or more internucleoside linkages modified from the natural phosphodiester, such as one or more modified internucleoside linkages that is for example more resistant to nuclease attack. Nuclease resistance may be determined by incubating the oligonucleotide in blood serum or by using a nuclease resistance assay (e.g. snake venom phosphodiesterase (SVPD)), both are well known in the art. Internucleoside linkages which are capable of enhancing the nuclease resistance of an oligonucleotide are referred to as nuclease resistant internucleoside linkages. In some embodiments at least 50% of the internucleoside linkages in the oligonucleotide, or contiguous nucleotide sequence thereof, are modified, such as at least 60%, such as at least 70%, such as at least 75%, such as at least 80% or such as at least 90% of the internucleoside linkages in the oligonucleotide, or contiguous nucleotide sequence thereof, are modified. In some embodiments all of the internucleoside linkages of the oligonucleotide, or contiguous nucleotide sequence thereof, are modified. It will be recognized that, in some embodiments the nucleosides which link the oligonucleotide of the invention to a non-nucleotide functional group, such as a conjugate, may be phosphodiester. In some embodiments all of the internucleoside linkages of the oligonucleotide, or contiguous nucleotide sequence thereof, are nuclease resistant internucleoside linkages.

With the oligonucleotide of the invention it is advantageous to use phosphorothioate internucleoside linkages.

Phosphorothioate internucleoside linkages are particularly useful due to nuclease resistance, beneficial pharmacokinetics and ease of manufacture. In some embodiments at least 50% of the internucleoside linkages in the oligonucleotide, or contiguous nucleotide sequence thereof, are phosphorothioate, such as at least 60%, such as at least 70%, such as at least 75%, such as at least 80% or such as at least 90% of the internucleoside linkages in the oligonucleotide, or contiguous nucleotide sequence thereof, are phosphorothioate. In some embodiments all of the internucleoside linkages of the oligonucleotide, or contiguous nucleotide sequence thereof, are phosphorothioate.

Nuclease resistant linkages, such as phosphorthioate linkages, are particularly useful in oligonucleotide regions capable of recruiting nuclease when forming a duplex with the target nucleic acid, such as region G for gapmers. Phosphorothioate linkages may, however, also be useful in non-nuclease recruiting regions and/or affinity enhancing regions such as regions F and F' for gapmers. Gapmer oligonucleotides may, in some embodiments comprise one or more phosphodiester linkages in region F or F', or both region F and F', where all the internucleoside linkages in region G may be phosphorothioate.

Advantageously, all the internucleoside linkages of the contiguous nucleotide sequence of the oligonucleotide are phosphorothioate, or all the internucleoside linkages of the oligonucleotide are phosphorothioate linkages.

It is recognized that, as disclosed in EP 2 742 135, antisense oligonucleotides may comprise other internucleoside linkages (other than phosphodiester and phosphorothioate), for example alkyl phosphonate/methyl phosphonate internucleoside, which according to EP 2 742 135 may for example be tolerated in an otherwise DNA phosphorothioate the gap region.

Nucleobase

The term nucleobase includes the purine (e.g. adenine and guanine) and pyrimidine (e.g. uracil, thymine and cytosine) moiety present in nucleosides and nucleotides which form hydrogen bonds in nucleic acid hybridization. In the context of the present invention the term nucleobase also encompasses modified nucleobases which may differ from naturally occurring nucleobases, but are functional during nucleic acid hybridization. In this context "nucleobase" refers to both naturally occurring nucleobases such as adenine, guanine, cytosine, thymidine, uracil, xanthine and hypoxanthine, as well as non-naturally occurring variants. Such variants are for example described in Hirao et al (2012) Accounts of Chemical Research vol 45 page 2055 and Bergstrom (2009) Current Protocols in Nucleic Acid Chemistry Suppl. 37 1.4.1.

In some embodiments the nucleobase moiety is modified by changing the purine or pyrimidine into a modified purine or pyrimidine, such as substituted purine or substituted pyrimidine, such as a nucleobased selected from isocytosine, pseudoisocytosine, 5-methyl cytosine, 5-thiozolo-cytosine, 5-propynyl-cytosine, 5-propynyl-uracil, 5-bromouracil 5-thiazolo-uracil, 2-thio-uracil, 2'thio-thymine, inosine, diaminopurine, 6-aminopurine, 2-aminopurine, 2,6-diaminopurine and 2-chloro-6-aminopurine.

The nucleobase moieties may be indicated by the letter code for each corresponding nucleobase, e.g. A, T, G, C or U, wherein each letter may optionally include modified nucleobases of equivalent function. For example, in the exemplified oligonucleotides, the nucleobase moieties are selected from A, T, G, C, and 5-methyl cytosine. Optionally, for LNA gapmers, 5-methyl cytosine LNA nucleosides may be used.

Modified Oligonucleotide

The term modified oligonucleotide describes an oligonucleotide comprising one or more sugar-modified nucleosides and/or modified internucleoside linkages. The term chimeric" oligonucleotide is a term that has been used in the literature to describe oligonucleotides with modified nucleosides and DNA nucleosides. The antisense oligonucleotide of the invention is advantageously a chimeric oligonucleotide.

Complementarity

The term "complementarity" describes the capacity for Watson-Crick base-pairing of nucleosides/nucleotides. Watson-Crick base pairs are guanine (G)-cytosine (C) and adenine (A)-thymine (T)/uracil (U). It will be understood that oligonucleotides may comprise nucleosides with modified nucleobases, for example 5-methyl cytosine is often used in place of cytosine, and as such the term complementarity encompasses Watson Crick base-paring between non-modified and modified nucleobases (see for example Hirao et al (2012) Accounts of Chemical Research vol 45 page 2055 and Bergstrom (2009) Current Protocols in Nucleic Acid Chemistry Suppl. 37 1.4.1).

The term "% complementary" as used herein, refers to the proportion of nucleotides (in percent) of a contiguous nucleotide sequence in a nucleic acid molecule (e.g. oligonucleotide) which across the contiguous nucleotide sequence, are complementary to a reference sequence (e.g. a target sequence or sequence motif). The percentage of complementarity is thus calculated by counting the number of aligned nucleobases that are complementary (from Watson Crick base pair) between the two sequences (when aligned with the target sequence 5-3' and the oligonucleotide sequence from 3'-5'), dividing that number by the total number of nucleotides in the oligonucleotide and multiplying by 100. In such a comparison a nucleobase/nucleotide which does not align (form a base pair) is termed a mismatch. Insertions and deletions are not allowed in the calculation of % complementarity of a contiguous nucleotide sequence. It will be understood that in determining complementarity, chemical modifications of the nucleobases are disregarded as long as the functional capacity of the nucleobase to form Watson Crick base pairing is retained (e.g. 5'-methyl cytosine is considered identical to a cytosine for the purpose of calculating % identity).

The term "fully complementary", refers to 100% complementarity.

The following is an example of an oligonucleotide motif (SEQ ID NO: 33) that is fully complementary to the target nucleic acid (SEQ ID NO: 11)

5'-CTTTGACCAGAGTATGTAAAATTCTC-3' (SEQ ID NO: 11)

3'-AAACTGGTCTCATACATTTT-5' (SEQ ID NO: 33)

Identity

The term "Identity" as used herein, refers to the proportion of nucleotides (expressed in percent) of a contiguous nucleotide sequence in a nucleic acid molecule (e.g. oligonucleotide) which across the contiguous nucleotide sequence, are identical to a reference sequence (e.g. a sequence motif). The percentage of identity is thus calculated by counting the number of aligned nucleobases that are identical (a Match) between two sequences (in the contiguous nucleotide sequence of the compound of the invention and in the reference sequence), dividing that number by the total number of nucleotides in the oligonucleotide and multiplying by 100. Therefore, Percentage of Identity= (Matches×100)/Length of aligned region (e.g. the contiguous nucleotide sequence). Insertions and deletions are not allowed in the calculation the percentage of identity of a contiguous nucleotide sequence. It will be understood that in determining identity, chemical modifications of the nucleobases are disregarded as long as the functional capacity of the nucleobase to form Watson Crick base pairing is retained (e.g. 5-methyl cytosine is considered identical to a cytosine for the purpose of calculating % identity).

Hybridization

The term "hybridizing" or "hybridizes" as used herein is to be understood as two nucleic acid strands (e.g. an oligonucleotide and a target nucleic acid) forming hydrogen bonds between base pairs on opposite strands thereby forming a duplex. The affinity of the binding between two nucleic acid strands is the strength of the hybridization. It is often described in terms of the melting temperature ($T_m$) defined as the temperature at which half of the oligonucleotides are duplexed with the target nucleic acid. At physiological conditions $T_m$ is not strictly proportional to the affinity (Mergny and Lacroix, 2003, Oligonucleotides 13:515-537). The standard state Gibbs free energy $\Delta G°$ is a more accurate representation of binding affinity and is related to the dissociation constant ($K_d$) of the reaction by $\Delta G°=-RT \ln(K_d)$, where R is the gas constant and T is the absolute temperature. Therefore, a very low $\Delta G°$ of the reaction between an oligonucleotide and the target nucleic acid reflects a strong hybridization between the oligonucleotide and target nucleic acid. $\Delta G°$ is the energy associated with a reaction where aqueous concentrations are 1M, the pH is 7, and the temperature is 37° C. The hybridization of oligonucleotides to a target nucleic acid is a spontaneous reaction and for spontaneous reactions $\Delta G°$ is less than zero. $\Delta G°$ can be measured experimentally, for example, by use of the isothermal titration calorimetry (ITC) method as described in Hansen et al., 1965, *Chem. Comm.* 36-38 and Holdgate et al., 2005, *Drug Discov Today*. The skilled person will know that commercial equipment is available for $\Delta G°$ measurements. $\Delta G°$ can also be estimated numerically by using the nearest neighbor model as described by SantaLucia, 1998, *Proc Natl Acad Sci USA*. 95: 1460-1465 using appropriately derived thermodynamic parameters described by Sugimoto et al., 1995, *Biochemistry* 34:11211-11216 and McTigue et al., 2004, *Biochemistry* 43:5388-5405. In order to have the possibility of modulating its intended nucleic acid target by hybridization, oligonucleotides of the present invention hybridize to a target nucleic acid with estimated $\Delta G^0$ values below −10 kcal for oligonucleotides that are 10-30 nucleotides in length. In some embodiments the degree or strength of hybridization is measured by the standard state Gibbs free energy $\Delta G°$. The oligonucleotides may hybridize to a target nucleic acid with estimated $\Delta G^0$ values below the range of −10 kcal, such as below −15 kcal, such as below −20 kcal and such as below −25 kcal for oligonucleotides that are 8-30 nucleotides in length. In some embodiments the oligonucleotides hybridize to a target nucleic acid with an estimated $\Delta G^0$ value of −10 to −60 kcal, such as −12 to −40, such as from −15 to −30 kcal or −16 to −27 kcal such as −18 to −25 kcal.

Target Nucleic Acid

According to the present invention, the target nucleic acid is a nucleic acid which encodes mammalian RTEL1 and may for example be a gene, a RNA, a mRNA, and pre-mRNA, a mature mRNA or a cDNA sequence. The target may therefore be referred to as an RTEL1 target nucleic acid.

The oligonucleotide of the invention may for example target exon regions of a mammalian RTEL1 (in particular siRNA and shRNA target exon regions, but also antisense oligonucleotides), or may for example target intron region in the RTEL1 pre-mRNA (in particular antisense oligonucleotides target intron regions). The human RTEL1 gene encodes 15 transcripts of these 7 are protein coding and therefore potential nucleic acid targets. Table 1 lists predicted exon and intron regions of the 7 transcripts, as positioned on the human RTEL1 premRNA of SEQ ID NO: 1. It is understood that the oligonucleotides of the invention can target the mature mRNA sequence of one or more of the listed transcripts in table 1.

TABLE 1

Transcript-, exonic- and intronic regions in the human RTEL1 premRNA
(SEQ ID NO: 1) for the different protein coding RTEL1 mRNA transcripts

| Transcript ID | Transcript region | | Exonic regions | | | Intron regions | | |
|---|---|---|---|---|---|---|---|---|
| | start | end | Exon | start | end | intron | start | end |
| RTEL1-205 | 1 | 38444 | 1 | 1 | 657 | 1 | 657 | 1424 |
| ENST00000370018 | | | 2 | 1424 | 1695 | 2 | 1695 | 3489 |
| | | | 3 | 3489 | 3687 | 3 | 3687 | 4041 |
| | | | 4 | 4041 | 4134 | 4 | 4134 | 4737 |
| | | | 5 | 4737 | 4818 | 5 | 4818 | 5020 |
| | | | 6 | 5020 | 5080 | 6 | 5080 | 8195 |
| | | | 7 | 8195 | 8270 | 7 | 8270 | 9660 |
| | | | 8 | 9660 | 9744 | 8 | 9744 | 14747 |
| | | | 9 | 14747 | 14812 | 9 | 14812 | 16131 |
| | | | 10 | 16131 | 16284 | 10 | 16284 | 20336 |
| | | | 11 | 20336 | 20374 | 11 | 20374 | 20459 |
| | | | 12 | 20459 | 20537 | 12 | 20537 | 22040 |
| | | | 13 | 22040 | 22137 | 13 | 22137 | 22855 |
| | | | 14 | 22855 | 22910 | 14 | 22910 | 27714 |
| | | | 15 | 27714 | 27788 | 15 | 27788 | 27982 |
| | | | 16 | 27982 | 28063 | 16 | 28063 | 29829 |
| | | | 17 | 29829 | 29961 | 17 | 29961 | 30128 |
| | | | 18 | 30128 | 30241 | 18 | 30241 | 30330 |
| | | | 19 | 30330 | 30370 | 19 | 30370 | 30492 |
| | | | 20 | 30492 | 30577 | 20 | 30577 | 30719 |
| | | | 21 | 30719 | 30796 | 21 | 30796 | 31246 |
| | | | 22 | 31246 | 31323 | 22 | 31323 | 31693 |
| | | | 23 | 31693 | 31839 | 23 | 31839 | 31941 |
| | | | 24 | 31941 | 32056 | 24 | 32056 | 32278 |
| | | | 25 | 32278 | 32401 | 25 | 32401 | 32485 |
| | | | 26 | 32485 | 32632 | 26 | 32632 | 32996 |
| | | | 27 | 32996 | 33138 | 27 | 33138 | 33933 |
| | | | 28 | 33933 | 34028 | 28 | 34028 | 34996 |
| | | | 29 | 34996 | 35194 | 29 | 35194 | 35334 |
| | | | 30 | 35334 | 35474 | 30 | 35474 | 36563 |
| | | | 31 | 36563 | 36679 | 31 | 36679 | 36932 |
| | | | 32 | 36932 | 37165 | 32 | 37165 | 37257 |
| | | | 33 | 37257 | 37412 | 33 | 37412 | 37519 |
| | | | 34 | 37519 | 37671 | 34 | 37671 | 37969 |
| | | | 35 | 37969 | 38444 | | | |
| RTEL1-203 | 485 | 38433 | 1 | 485 | 657 | 1 | 657 | 1424 |
| ENST00000360203 | | | 2 | 1424 | 1695 | 2 | 1695 | 3489 |
| | | | 3 | 3489 | 3687 | 3 | 3687 | 4041 |
| | | | 4 | 4041 | 4134 | 4 | 4134 | 4737 |
| | | | 5 | 4737 | 4818 | 5 | 4818 | 5020 |
| | | | 6 | 5020 | 5080 | 6 | 5080 | 8195 |
| | | | 7 | 8195 | 8270 | 7 | 8270 | 9660 |
| | | | 8 | 9660 | 9744 | 8 | 9744 | 14747 |
| | | | 9 | 14747 | 14812 | 9 | 14812 | 16131 |
| | | | 10 | 16131 | 16284 | 10 | 16284 | 20336 |
| | | | 11 | 20336 | 20374 | 11 | 20374 | 20459 |
| | | | 12 | 20459 | 20537 | 12 | 20537 | 22040 |
| | | | 13 | 22040 | 22137 | 13 | 22137 | 22855 |
| | | | 14 | 22855 | 22910 | 14 | 22910 | 27714 |
| | | | 15 | 27714 | 27788 | 15 | 27788 | 27982 |
| | | | 16 | 27982 | 28063 | 16 | 28063 | 29829 |
| | | | 17 | 29829 | 29961 | 17 | 29961 | 30128 |
| | | | 18 | 30128 | 30241 | 18 | 30241 | 30330 |
| | | | 19 | 30330 | 30370 | 19 | 30370 | 30492 |
| | | | 20 | 30492 | 30577 | 20 | 30577 | 30719 |
| | | | 21 | 30719 | 30796 | 21 | 30796 | 31246 |
| | | | 22 | 31246 | 31323 | 22 | 31323 | 31693 |
| | | | 23 | 31693 | 31839 | 23 | 31839 | 31941 |
| | | | 24 | 31941 | 32056 | 24 | 32056 | 32278 |
| | | | 25 | 32278 | 32401 | 25 | 32401 | 32485 |
| | | | 26 | 32485 | 32632 | 26 | 32632 | 32996 |
| | | | 27 | 32996 | 33138 | 27 | 33138 | 33933 |
| | | | 28 | 33933 | 34028 | 28 | 34028 | 34996 |
| | | | 29 | 34996 | 35194 | 29 | 35194 | 35334 |
| | | | 30 | 35334 | 35474 | 30 | 35474 | 36563 |
| | | | 31 | 36563 | 36679 | 31 | 36679 | 36932 |
| | | | 32 | 36932 | 37165 | 32 | 37165 | 37257 |
| | | | 33 | 37257 | 37412 | 33 | 37412 | 37519 |
| | | | 34 | 37519 | 37841 | 34 | 37841 | 37969 |
| | | | 35 | 37969 | 38433 | | | |
| RTEL1-212 | 482 | 38171 | 1 | 482 | 657 | 1 | 657 | 1424 |
| ENST00000508582 | | | 2 | 1424 | 1695 | 2 | 1695 | 3489 |
| | | | 3 | 3489 | 3687 | 3 | 3687 | 4041 |

TABLE 1-continued

Transcript-, exonic- and intronic regions in the human RTEL1 premRNA (SEQ ID NO: 1) for the different protein coding RTEL1 mRNA transcripts

| Transcript ID | Transcript region start | Transcript region end | Exon | Exonic regions start | Exonic regions end | intron | Intron regions start | Intron regions end |
|---|---|---|---|---|---|---|---|---|
| | | | 4 | 4041 | 4134 | 4 | 4134 | 4665 |
| | | | 5 | 4665 | 4818 | 5 | 4818 | 5020 |
| | | | 6 | 5020 | 5080 | 6 | 5080 | 8195 |
| | | | 7 | 8195 | 8270 | 7 | 8270 | 9660 |
| | | | 8 | 9660 | 9744 | 8 | 9744 | 14747 |
| | | | 9 | 14747 | 14812 | 9 | 14812 | 16131 |
| | | | 10 | 16131 | 16284 | 10 | 16284 | 20336 |
| | | | 11 | 20336 | 20374 | 11 | 20374 | 20459 |
| | | | 12 | 20459 | 20537 | 12 | 20537 | 22040 |
| | | | 13 | 22040 | 22137 | 13 | 22137 | 22855 |
| | | | 14 | 22855 | 22910 | 14 | 22910 | 27714 |
| | | | 15 | 27714 | 27788 | 15 | 27788 | 27982 |
| | | | 16 | 27982 | 28063 | 16 | 28063 | 29829 |
| | | | 17 | 29829 | 29961 | 17 | 29961 | 30128 |
| | | | 18 | 30128 | 30241 | 18 | 30241 | 30330 |
| | | | 19 | 30330 | 30370 | 19 | 30370 | 30492 |
| | | | 20 | 30492 | 30577 | 20 | 30577 | 30719 |
| | | | 21 | 30719 | 30796 | 21 | 30796 | 31246 |
| | | | 22 | 31246 | 31323 | 22 | 31323 | 31693 |
| | | | 23 | 31693 | 31839 | 23 | 31839 | 31941 |
| | | | 24 | 31941 | 32056 | 24 | 32056 | 32278 |
| | | | 25 | 32278 | 32401 | 25 | 32401 | 32485 |
| | | | 26 | 32485 | 32632 | 26 | 32632 | 32996 |
| | | | 27 | 32996 | 33138 | 27 | 33138 | 33933 |
| | | | 28 | 33933 | 34028 | 28 | 34028 | 34996 |
| | | | 29 | 34996 | 35194 | 29 | 35194 | 35334 |
| | | | 30 | 35334 | 35474 | 30 | 35474 | 36563 |
| | | | 31 | 36563 | 36679 | 31 | 36679 | 36932 |
| | | | 32 | 36932 | 37165 | 32 | 37165 | 37257 |
| | | | 33 | 37257 | 37412 | 33 | 37412 | 37519 |
| | | | 34 | 37519 | 37671 | 34 | 37671 | 37969 |
| | | | 35 | 37969 | 38171 | | | |
| RTEL1-201 ENST00000318100 | 505 | 38434 | 1 | 505 | 650 | 1 | 650 | 3489 |
| | | | 2 | 3489 | 3687 | 2 | 3687 | 4041 |
| | | | 3 | 4041 | 4134 | 3 | 4134 | 4737 |
| | | | 4 | 4737 | 4818 | 4 | 4818 | 5020 |
| | | | 5 | 5020 | 5080 | 5 | 5080 | 8195 |
| | | | 6 | 8195 | 8270 | 6 | 8270 | 9660 |
| | | | 7 | 9660 | 9744 | 7 | 9744 | 14747 |
| | | | 8 | 14747 | 14812 | 8 | 14812 | 16131 |
| | | | 9 | 16131 | 16284 | 9 | 16284 | 20336 |
| | | | 10 | 20336 | 20374 | 10 | 20374 | 20459 |
| | | | 11 | 20459 | 20537 | 11 | 20537 | 22040 |
| | | | 12 | 22040 | 22137 | 12 | 22137 | 22855 |
| | | | 13 | 22855 | 22910 | 13 | 22910 | 27714 |
| | | | 14 | 27714 | 27788 | 14 | 27788 | 27982 |
| | | | 15 | 27982 | 28063 | 15 | 28063 | 29829 |
| | | | 16 | 29829 | 29961 | 16 | 29961 | 30128 |
| | | | 17 | 30128 | 30241 | 17 | 30241 | 30330 |
| | | | 18 | 30330 | 30370 | 18 | 30370 | 30492 |
| | | | 19 | 30492 | 30577 | 19 | 30577 | 30719 |
| | | | 20 | 30719 | 30796 | 20 | 30796 | 31246 |
| | | | 21 | 31246 | 31323 | 21 | 31323 | 31693 |
| | | | 22 | 31693 | 31839 | 22 | 31839 | 31941 |
| | | | 23 | 31941 | 32056 | 23 | 32056 | 32278 |
| | | | 24 | 32278 | 32401 | 24 | 32401 | 32485 |
| | | | 25 | 32485 | 32632 | 25 | 32632 | 32996 |
| | | | 26 | 32996 | 33138 | 26 | 33138 | 33933 |
| | | | 27 | 33933 | 34028 | 27 | 34028 | 34996 |
| | | | 28 | 34996 | 35194 | 28 | 35194 | 35334 |
| | | | 29 | 35334 | 35474 | 29 | 35474 | 36563 |
| | | | 30 | 36563 | 36679 | 30 | 36679 | 36932 |
| | | | 31 | 36932 | 37165 | 31 | 37165 | 37257 |
| | | | 32 | 37257 | 37412 | 32 | 37412 | 37519 |
| | | | 33 | 37519 | 37671 | 33 | 37671 | 37969 |
| | | | 34 | 37969 | 38434 | | | |
| RTEL1-202 ENST00000356810 | 551 | 16284 | 1 | 551 | 650 | 1 | 650 | 1424 |
| | | | 2 | 1424 | 1695 | 2 | 1695 | 3489 |
| | | | 3 | 3489 | 3687 | 3 | 3687 | 4041 |
| | | | 4 | 4041 | 4134 | 4 | 4134 | 4587 |
| | | | 5 | 4587 | 4818 | 5 | 4818 | 5020 |
| | | | 6 | 5020 | 5080 | 6 | 5080 | 8195 |
| | | | 7 | 8195 | 8270 | 7 | 8270 | 9660 |

TABLE 1-continued

Transcript-, exonic- and intronic regions in the human RTEL1 premRNA
(SEQ ID NO: 1) for the different protein coding RTEL1 mRNA transcripts

| Transcript ID | Transcript region | | Exonic regions | | | Intron regions | | |
|---|---|---|---|---|---|---|---|---|
| | start | end | Exon | start | end | intron | start | end |
| | | | 8 | 9660 | 9744 | 8 | 9744 | 14747 |
| | | | 9 | 14747 | 14812 | 9 | 14812 | 16131 |
| | | | 10 | 16131 | 16284 | | | |
| RTEL1-206 | 30530 | 33067 | 1 | 30530 | 30577 | 1 | 30577 | 30719 |
| ENST00000425905 | | | 2 | 30719 | 30796 | 2 | 30796 | 31246 |
| | | | 3 | 31246 | 31323 | 3 | 31323 | 31941 |
| | | | 4 | 31941 | 32056 | 4 | 32056 | 32278 |
| | | | 5 | 32278 | 32401 | 5 | 32401 | 32485 |
| | | | 6 | 32485 | 32632 | 6 | 32632 | 32996 |
| | | | 7 | 32996 | 33067 | | | |
| RTEL1-214 | 811 | 3653 | 1 | 811 | 943 | 1 | 943 | 1424 |
| ENST00000646389 | | | 2 | 1424 | 1695 | 2 | 1695 | 3489 |
| | | | 3 | 3489 | 3653 | | | |

Suitably, the target nucleic acid encodes an RTEL1 protein, in particular mammalian RTEL1, such as human RTEL1 (See for example tables 2 and 3) which provides the pre-mRNA sequences for human and monkey, RTEL1.

In some embodiments, the target nucleic acid is selected from SEQ ID NO: 1 and/or 2 or naturally occurring variants thereof (e.g. sequences encoding a mammalian RTEL1 protein in table 1).

If employing the oligonucleotide of the invention in research or diagnostics the target nucleic acid may be a cDNA or a synthetic nucleic acid derived from DNA or RNA.

For in vivo or in vitro application, the oligonucleotide of the invention is typically capable of inhibiting the expression of the RTEL1 target nucleic acid in a cell which is expressing the RTEL1 target nucleic acid. The contiguous sequence of nucleobases of the oligonucleotide of the invention is typically complementary to the RTEL1 target nucleic acid, as measured across the length of the oligonucleotide, optionally with the exception of one or two mismatches, and optionally excluding nucleotide based linker regions which may link the oligonucleotide to an optional functional group such as a conjugate, or other non-complementary terminal nucleotides (e.g. region D' or D"). The target nucleic acid may, in some embodiments, be a RNA or DNA, such as a messenger RNA, such as a mature mRNA (e.g. the exonic regions of the transcripts listed in table 1) or a pre-mRNA.

In some embodiments the target nucleic acid is a RNA or DNA which encodes mammalian RTEL1 protein, such as human RTEL1, e.g. the human RTEL1 mRNA sequence, such as that disclosed as SEQ ID NO 1. Further information on exemplary target nucleic acids is provided in tables 2 and 3.

TABLE 3

Sequence details for RTEL1 across species.

| Species | RNA type | Length (nt) | SEQ ID NO |
|---|---|---|---|
| Human | premRNA | 38444 | 1 |
| Monkey | premRNA | 37214 | 2 |

Note SEQ ID NO 2 comprises regions of multiple NNNNs, where the sequencing has been unable to accurately refine the sequence, and a degenerate sequence is therefore included. For the avoidance of doubt the compounds of the invention are complementary to the actual target sequence and are not therefore degenerate compounds.

In some embodiments, the target nucleic acid is SEQ ID NO 1.

In some embodiments, the target nucleic acid is SEQ ID NO 2.

Target Sequence

The term "target sequence" as used herein refers to a sequence of nucleotides present in the target nucleic acid which comprises the nucleobase sequence which is complementary to the oligonucleotide of the invention. In some embodiments, the target sequence consists of a region on the target nucleic acid with a nucleobase sequence that is complementary to the contiguous nucleotide sequence of the oligonucleotide of the invention. This region of the target nucleic acid may interchangeably be referred to as the target nucleotide sequence, target sequence or target region. In some embodiments the target sequence is longer than the complementary sequence of a single oligonucleotide, and

TABLE 2

Genome and assembly information for RTEL1 across species.

| | | | Genomic coordinates | | | |
|---|---|---|---|---|---|---|
| Species | Chr. | Strand | Start | End | Assembly | ensembl gene_id |
| Human | 20 | fwd | 63657810 | 63696253 | GRCh38.p12 | ENSG00000258366 |
| Cynomolgus monkey | 10 | fwd | 95853726 | 95890939 | Macaca_fascicularis_5.0 | ENSMFAG00000043680 |

Fwd = forward strand.
The genome coordinates provide the pre-mRNA sequence (genomic sequence).
The NCBI reference provides the mRNA sequence (cDNA sequence).

may, for example represent a preferred region of the target nucleic acid which may be targeted by several oligonucleotides of the invention.

In some embodiments the target sequence is a sequence selected from the group consisting of a human RTEL1 mRNA exon, such as a RTEL1 human mRNA exon selected from the list in table 1 above.

In some embodiments the target sequence is a sequence selected from the group consisting of a human RTEL1 mRNA intron, such as a RTEL1 human mRNA intron selected from the list in table 1 above.

The oligonucleotide of the invention comprises a contiguous nucleotide sequence which is complementary to or hybridizes to the target nucleic acid, such as a target sequence described herein.

The target sequence to which the oligonucleotide is complementary or hybridizes to generally comprises a contiguous nucleobases sequence of at least 10 nucleotides. The contiguous nucleotide sequence is between 10 to 35 nucleotides, such as 12 to 30, such as 14 to 20, such as 16 to 20 contiguous nucleotides. In one embodiment of the invention the target sequence is selected from the group consisting of SEQ ID NO: 3-21 as shown in table 4.

TABLE 4

Target sequences on human RTEL1 prem RNA (SEQ ID NO: 1)

| SEQ ID NO | Target Sequence | Start on SEQ ID 1 | End on SEQ ID 1 |
|---|---|---|---|
| 3 | gaccactgtccttccatg | 8294 | 8311 |
| 4 | ttcagagattcaagttataataa agctcttcttatattgagggga | 8677 | 8722 |
| 5 | aggaatagggttggtttt | 9377 | 9394 |
| 6 | ccttactacctgtcccg | 9667 | 9683 |
| 7 | acaattacttgttggatgcc | 9722 | 9741 |
| 8 | agcttctaacccaaccag | 10921 | 10938 |
| 9 | tataaacctaaatgtaaaagc | 11482 | 11502 |
| 10 | ttcaccaaaatttaaagctt | 11622 | 11641 |
| 11 | ctttgaccagagtatgtaaa attctc | 11752 | 11777 |
| 12 | aagacgtgttcaaagatt | 12868 | 12885 |
| 13 | ggacctactgtttttg | 13234 | 13250 |
| 14 | ggacctactgttttattcc | 13550 | 13568 |
| 15 | gtcccttctcttcctcctgtag | 14725 | 14746 |
| 16 | cgtgatctttgacgaagct | 14785 | 14803 |
| 17 | cgcaaacctttctgga | 14874 | 14889 |
| 18 | agcctgtgtgtggagtatgagca | 33025 | 33047 |
| 19 | cgtttccgtgttggtctggg | 34571 | 34590 |
| 20 | gactacaagggttccgatg | 35104 | 35122 |
| 21 | agtttgaggaggtctgtatc | 35370 | 35389 |

In some embodiments, the target sequence is selected from a region shown in Table 5A or 5B.

Target Cell

The term a "target cell" as used herein refers to a cell which is expressing the target nucleic acid. For the therapeutic use of the present invention it is advantageous if the target cell is infected with HBV. In some embodiments the target cell may be in vivo or in vitro. In some embodiments the target cell is a mammalian cell such as a rodent cell, such as a mouse cell or a rat cell, or a woodchuck cell or a primate cell such as a monkey cell (e.g. a cynomolgus monkey cell) or a human cell.

In preferred embodiments the target cell expresses RTEL1 mRNA, such as the RTEL1 pre-mRNA or RTEL1 mature mRNA. The poly A tail of RTEL1 mRNA is typically disregarded for antisense oligonucleotide targeting.

Further, the target cell may be a hepatocyte. In one embodiment the target cell is HBV infected primary human hepatocytes, either derived from HBV infected individuals or from a HBV infected mouse with a humanized liver (PhoenixBio, PXB-mouse).

In accordance with the present invention, the target cell may be infected with HBV. Further, the target cell may comprise HBV cccDNA. Thus, the target cell preferably comprises RTEL1 mRNA, such as the RTEL1 pre-mRNA or RTEL1 mature mRNA, and HBV cccDNA.

Naturally Occurring Variant

The term "naturally occurring variant" refers to variants of RTEL1 gene or transcripts which originate from the same genetic loci as the target nucleic acid, but may differ for example, by virtue of degeneracy of the genetic code causing a multiplicity of codons encoding the same amino acid, or due to alternative splicing of pre-mRNA, or the presence of polymorphisms, such as single nucleotide polymorphisms (SNPs), and allelic variants. Based on the presence of the sufficient complementary sequence to the oligonucleotide, the oligonucleotide of the invention may therefore target the target nucleic acid and naturally occurring variants thereof.

In some embodiments, the naturally occurring variants have at least 95% such as at least 98% or at least 99% homology to a mammalian RTEL1 target nucleic acid, such as a target nucleic acid of SEQ ID NO 1 and/or 2. In some embodiments the naturally occurring variants have at least 99% homology to the human RTEL1 target nucleic acid of SEQ ID NO: 1. In some embodiments the naturally occurring variants are known polymorphisms.

Modulation of Expression

The term "modulation of expression" as used herein is to be understood as an overall term for an oligonucleotide's ability to alter the amount of RTEL1 when compared to the amount of RTEL1 before administration of the oligonucleotide. Alternatively, modulation of expression may be determined by reference to a control experiment. It is generally understood that the control is an individual or target cell treated with a saline composition or an individual or target cell treated with a non-targeting oligonucleotide (mock).

One type of modulation is the ability of an oligonucleotide to inhibit, down-regulate, reduce, suppress, remove, stop, block, prevent, lessen, lower, avoid or terminate expression of RTEL1, e.g. by degradation of mRNA or blockage of transcription. Another type of modulation is an oligonucleotide's ability to restore, increase or enhance expression of RTEL1, e.g. by repair of splice sites or prevention of splicing or removal or blockage of inhibitory mechanisms such as microRNA repression.

Sugar Modifications

The oligonucleotide of the invention may comprise one or more nucleosides which have a modified sugar moiety, i.e. a modification of the sugar moiety when compared to the ribose sugar moiety found in DNA and RNA.

Numerous nucleosides with modification of the ribose sugar moiety have been made, primarily with the aim of improving certain properties of oligonucleotides, such as affinity and/or nuclease resistance.

Such modifications include those where the ribose ring structure is modified, e.g. by replacement with a hexose ring (HNA), or a bicyclic ring, which typically have a biradicle bridge between the C2 and C4 carbons on the ribose ring (LNA), or an unlinked ribose ring which typically lacks a bond between the C2 and C3 carbons (e.g. UNA). Other sugar modified nucleosides include, for example, bicyclohexose nucleic acids (WO2011/017521) or tricyclic nucleic acids (WO2013/154798). Modified nucleosides also include nucleosides where the sugar moiety is replaced with a non-sugar moiety, for example in the case of peptide nucleic acids (PNA), or morpholino nucleic acids.

Sugar modifications also include modifications made via altering the substituent groups on the ribose ring to groups other than hydrogen, or the 2'-OH group naturally found in DNA and RNA nucleosides. Substituents may, for example be introduced at the 2', 3', 4' or 5' positions.

High Affinity Modified Nucleosides

A high affinity modified nucleoside is a modified nucleotide which, when incorporated into the oligonucleotide enhances the affinity of the oligonucleotide for its complementary target, for example as measured by the melting temperature ($T_m$). A high affinity modified nucleoside of the present invention preferably result in an increase in melting temperature between +0.5 to +12° C., more preferably between +1.5 to +10° C. and most preferably between +3 to +8° C. per modified nucleoside. Numerous high affinity modified nucleosides are known in the art and include for example, many 2' substituted nucleosides as well as locked nucleic acids (LNA) (see e.g. Freier & Altmann; Nucl. Acid Res., 1997, 25, 4429-4443 and Uhlmann; Curr. Opinion in Drug Development, 2000, 3(2), 293-213).

2' Sugar Modified Nucleosides

A 2' sugar modified nucleoside is a nucleoside which has a substituent other than H or —OH at the 2' position (2' substituted nucleoside) or comprises a 2' linked biradicle capable of forming a bridge between the 2' carbon and a second carbon in the ribose ring, such as LNA (2'-4' biradicle bridged) nucleosides.

Indeed, much focus has been spent on developing 2' sugar substituted nucleosides, and numerous 2' substituted nucleosides have been found to have beneficial properties when incorporated into oligonucleotides. For example, the 2' modified sugar may provide enhanced binding affinity and/or increased nuclease resistance to the oligonucleotide. Examples of 2' substituted modified nucleosides are 2'-O-alkyl-RNA, 2'-O-methyl-RNA, 2'-alkoxy-RNA, 2'-O-methoxyethyl-RNA (MOE), 2'-amino-DNA, 2'-Fluoro-RNA, and 2'-F-ANA nucleoside. For further examples, please see e.g. Freier & Altmann; Nucl. Acid Res., 1997, 25, 4429-4443 and Uhlmann; Curr. Opinion in Drug Development, 2000, 3(2), 293-213, and Deleavey and Damha, Chemistry and Biology 2012, 19, 937. Below are illustrations of some 2' substituted modified nucleosides.

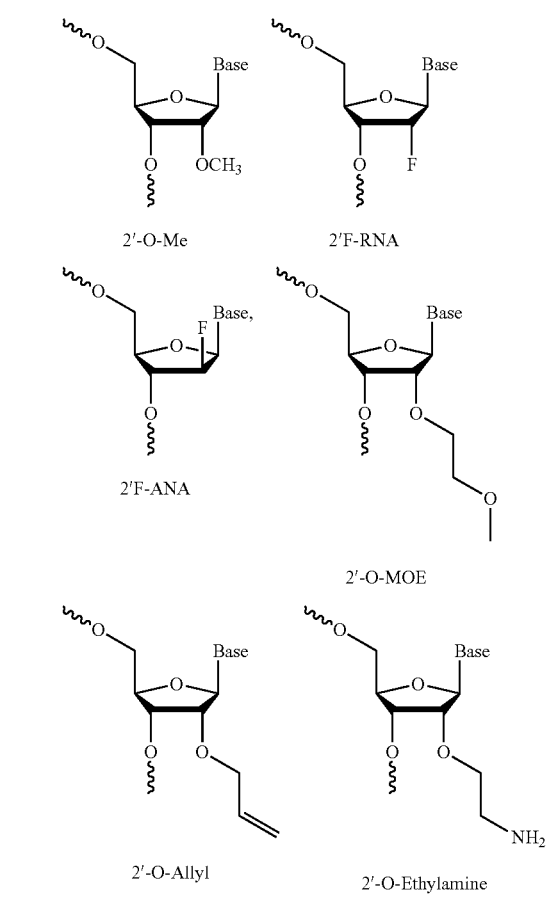

In relation to the present invention 2' substituted sugar modified nucleosides does not include 2' bridged nucleosides like LNA.

Locked Nucleic Acid Nucleosides (LNA Nucleoside)

A "LNA nucleoside" is a 2'-sugar modified nucleoside which comprises a biradical linking the C2' and C4' of the ribose sugar ring of said nucleoside (also referred to as a "2'-4' bridge"), which restricts or locks the conformation of the ribose ring. These nucleosides are also termed bridged nucleic acid or bicyclic nucleic acid (BNA) in the literature. The locking of the conformation of the ribose is associated with an enhanced affinity of hybridization (duplex stabilization) when the LNA is incorporated into an oligonucleotide for a complementary RNA or DNA molecule. This can be routinely determined by measuring the melting temperature of the oligonucleotide/complement duplex.

Non limiting, exemplary LNA nucleosides are disclosed in WO 99/014226, WO 00/66604, WO 98/039352, WO 2004/046160, WO 00/047599, WO 2007/134181, WO 2010/077578, WO 2010/036698, WO 2007/090071, WO 2009/006478, WO 2011/156202, WO 2008/154401, WO 2009/067647, WO 2008/150729, Morita et al., Bioorganic & Med. Chem. Lett. 12, 73-76, Seth et al. J. Org. Chem. 2010, Vol 75(5) pp. 1569-81, Mitsuoka et al., Nucleic Acids Research 2009, 37(4), 1225-1238, and Wan and Seth, J. Medical Chemistry 2016, 59, 9645-9667.

Particular examples of LNA nucleosides of the invention are presented in Scheme 1 (wherein B is as defined above).

Scheme 1

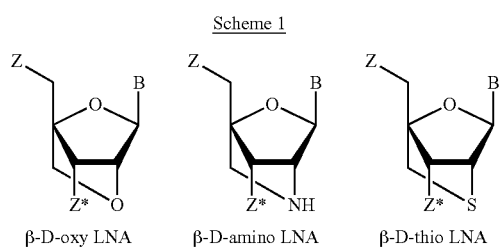

β-D-oxy LNA    β-D-amino LNA    β-D-thio LNA

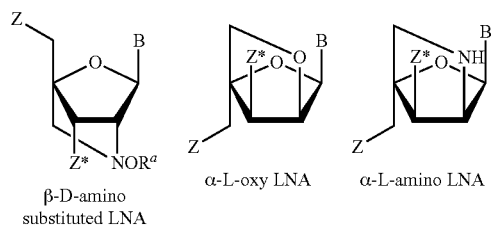

β-D-amino substituted LNA    α-L-oxy LNA    α-L-amino LNA

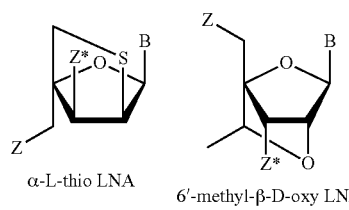

α-L-thio LNA    6'-methyl-β-D-oxy LNA

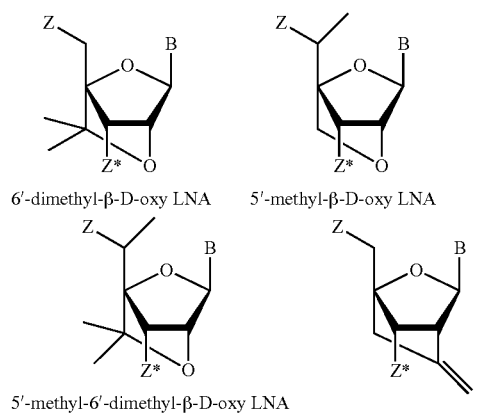

6'-dimethyl-β-D-oxy LNA    5'-methyl-β-D-oxy LNA

5'-methyl-6'-dimethyl-β-D-oxy LNA    carbocyclic(vinyl)-β-D-oxy LNA

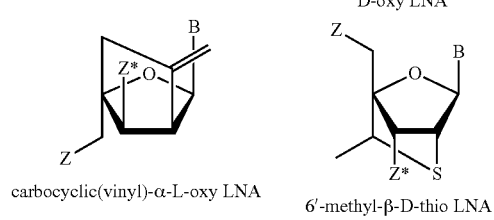

carbocyclic(vinyl)-α-L-oxy LNA    6'-methyl-β-D-thio LNA

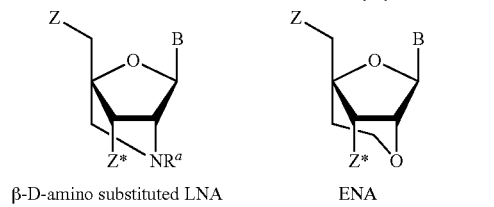

β-D-amino substituted LNA    ENA

-continued

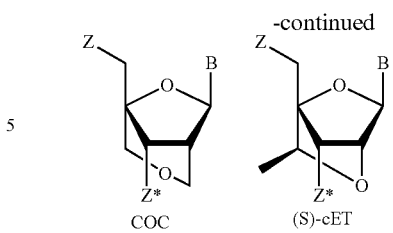

COC    (S)-cET

Particular LNA nucleosides are beta-D-oxy-LNA, 6'-methyl-beta-D-oxy LNA such as (S)-6'-methyl-beta-D-oxy-LNA (ScET) and ENA.

Pharmaceutically Acceptable Salts

The term "pharmaceutically acceptable salts" refers to those salts which retain the biological effectiveness and properties of the free bases or free acids, which are not biologically or otherwise undesirable. The salts are formed with inorganic acids such as hydrochloric acid, hydrobromic acid, sulfuric acid, nitric acid, phosphoric acid, particularly hydrochloric acid, and organic acids such as acetic acid, propionic acid, glycolic acid, pyruvic acid, oxalic acid, maleic acid, malonic acid, succinic acid, fumaric acid, tartaric acid, citric acid, benzoic acid, cinnamic acid, mandelic acid, methanesulfonic acid, ethanesulfonic acid, p-toluenesulfonic acid, salicylic acid, N-acetylcystein. In addition, these salts may be prepared form addition of an inorganic base or an organic base to the free acid. Salts derived from an inorganic base include, but are not limited to, the sodium, potassium, lithium, ammonium, calcium, magnesium salts. Salts derived from organic bases include, but are not limited to salts of primary, secondary, and tertiary amines, substituted amines including naturally occurring substituted amines, cyclic amines and basic ion exchange resins, such as isopropylamine, trimethylamine, diethylamine, triethylamine, tripropylamine, ethanolamine, lysine, arginine, N-ethylpiperidine, piperidine, polyamine resins. The compound of formula (I) can also be present in the form of zwitterions. Particularly preferred pharmaceutically acceptable salts of compounds of formula (I) are the salts of hydrochloric acid, hydrobromic acid, sulfuric acid, phosphoric acid and methanesulfonic acid.

RNase H Activity and Recruitment

The RNase H activity of an antisense oligonucleotide refers to its ability to recruit RNase H when in a duplex with a complementary RNA molecule. WO01/23613 provides in vitro methods for determining RNaseH activity, which may be used to determine the ability to recruit RNaseH. Typically an oligonucleotide is deemed capable of recruiting RNase H if it, when provided with a complementary target nucleic acid sequence, has an initial rate, as measured in pmol/l/min, of at least 5%, such as at least 10% or more than 20% of the of the initial rate determined when using a oligonucleotide having the same base sequence as the modified oligonucleotide being tested, but containing only DNA monomers with phosphorothioate linkages between all monomers in the oligonucleotide, and using the methodology provided by Example 91-95 of WO 01/23613 (hereby incorporated by reference). For use in determining RHase H activity, recombinant human RNase H1 is available from Creative Biomart® (Recombinant Human RNASEH1 fused with His tag expressed in E. coli).

Gapmer

The antisense oligonucleotide of the invention, or contiguous nucleotide sequence thereof, may be a gapmer, also termed gapmer oligonucleotide or gapmer designs. The antisense gapmers are commonly used to inhibit a target nucleic acid via RNase H mediated degradation. A gapmer oligonucleotide comprises at least three distinct structural regions a 5'-flank, a gap and a 3'-flank, F-G-F' in the '5→3' orientation. The "gap" region (G) comprises a stretch of contiguous DNA nucleotides which enable the oligonucleotide to recruit RNase H. The gap region is flanked by a 5' flanking region (F) comprising one or more sugar modified nucleosides, advantageously high affinity sugar modified nucleosides, and by a 3' flanking region (F') comprising one or more sugar modified nucleosides, advantageously high affinity sugar modified nucleosides. The one or more sugar modified nucleosides in region F and F' enhance the affinity of the oligonucleotide for the target nucleic acid (i.e. are affinity enhancing sugar modified nucleosides). In some embodiments, the one or more sugar modified nucleosides in region F and F' are 2' sugar modified nucleosides, such as high affinity 2' sugar modifications, such as independently selected from LNA and 2'-MOE.

In a gapmer design, the 5' and 3' most nucleosides of the gap region are DNA nucleosides, and are positioned adjacent to a sugar modified nucleoside of the 5' (F) or 3' (F') region respectively. The flanks may further be defined by having at least one sugar modified nucleoside at the end most distant from the gap region, i.e. at the 5' end of the 5' flank and at the 3' end of the 3' flank.

Regions F-G-F' form a contiguous nucleotide sequence. Antisense oligonucleotides of the invention, or the contiguous nucleotide sequence thereof, may comprise a gapmer region of formula F-G-F'.

The overall length of the gapmer design F-G-F' may be, for example 12 to 32 nucleosides, such as 13 to 24, such as 14 to 22 nucleosides, Such as from 14 to 17, such as 16 to 18 nucleosides.

By way of example, the gapmer oligonucleotide of the present invention can be represented by the following formulae:

$F_{1-8}$-$G_{5-18}$-$F'_{1-8}$, such as
$F_{1-8}$-$G_{5-16}$-$F'_{1-8}$, such as
$F_{1-8}$-$G_{7-16}$-$F'_{28}$ with the proviso that the overall length of the gapmer regions F-G-F' is at least 12, such as at least 14 nucleotides in length.

In an aspect of the invention the antisense oligonucleotide or contiguous nucleotide sequence thereof consists of or comprises a gapmer of formula 5'-F-G-F'-3', where region F and F' independently comprise or consist of 1-8 nucleotides, of which 1-4 are 2' sugar modified and defines the 5' and 3' end of the F and F' region, and G is a region between 6 and 18, such as 6 and 16, nucleosides which are capable of recruiting RNaseH. In some embodiments the G region consists of DNA nucleosides.

Regions F, G and F' are further defined below and can be incorporated into the F-G-F' formula.

Gapmer—Region G

Region G (gap region) of the gapmer is a region of nucleosides which enables the oligonucleotide to recruit RNaseH, such as human RNase H1, typically DNA nucleosides. RNaseH is a cellular enzyme which recognizes the duplex between DNA and RNA, and enzymatically cleaves the RNA molecule. Suitably gapmers may have a gap region (G) of at least 5 or 6 contiguous DNA nucleosides, such as 5-18 contiguous DNA nucleosides, 5-17 contiguous DNA nucleosides, such as 5-16 contiguous DNA nucleosides, such as 6-15 contiguous DNA nucleosides, such as 7-14 contiguous DNA nucleosides, such as 8-12 contiguous DNA nucleotides, such as 8-12 contiguous DNA nucleotides in length. The gap region G may, in some embodiments consist of 6, 7, 8, 9, 10, 11, 12, 13, 14, 15, 16, 17 or 18 contiguous DNA nucleosides. Cytosine (C) DNA in the gap region may in some instances be methylated, such residues are either annotated as 5'-methyl-cytosine ($^{me}C$ or with an e instead of a c). Methylation of cytosine DNA in the gap is advantageous if cg dinucleotides are present in the gap to reduce potential toxicity, the modification does not have significant impact on efficacy of the oligonucleotides. 5' substituted DNA nucleosides, such as 5' methyl DNA nucleoside have been reported for use in DNA gap regions (EP 2 742 136).

In some embodiments the gap region G may consist of 6, 7, 8, 9, 10, 11, 12, 13, 14, 15, 16, 17 or 18 contiguous phosphorothioate linked DNA nucleosides. In some embodiments, all internucleoside linkages in the gap are phosphorothioate linkages.

Whilst traditional gapmers have a DNA gap region, there are numerous examples of modified nucleosides which allow for RNaseH recruitment when they are used within the gap region. Modified nucleosides which have been reported as being capable of recruiting RNaseH when included within a gap region include, for example, alpha-L-LNA, C4' alkylated DNA (as described in PCT/EP2009/050349 and Vester et al., Bioorg. Med. Chem. Lett. 18 (2008) 2296-2300, both incorporated herein by reference), arabinose derived nucleosides like ANA and 2'F-ANA (Mangos et al. 2003 J. AM. CHEM. SOC. 125, 654-661), UNA (unlocked nucleic acid) (as described in Fluiter et al., Mol. Biosyst., 2009, 10, 1039 incorporated herein by reference). UNA is unlocked nucleic acid, typically where the bond between C2 and C3 of the ribose has been removed, forming an unlocked "sugar" residue. The modified nucleosides used in such gapmers may be nucleosides which adopt a 2' endo (DNA like) structure when introduced into the gap region, i.e. modifications which allow for RNaseH recruitment). In some embodiments the DNA Gap region (G) described herein may optionally contain 1 to 3 sugar modified nucleosides which adopt a 2' endo (DNA like) structure when introduced into the gap region.

Gapmer—Flanking Regions, F and F'

Region F is positioned immediately adjacent to the 5' DNA nucleoside of region G. The 3' most nucleoside of region F is a sugar modified nucleoside, such as a high affinity sugar modified nucleoside, for example a 2' substituted nucleoside, such as a MOE nucleoside, or an LNA nucleoside.

Region F' is positioned immediately adjacent to the 3' DNA nucleoside of region G. The 5' most nucleoside of region F' is a sugar modified nucleoside, such as a high affinity sugar modified nucleoside, for example a 2' substituted nucleoside, such as a MOE nucleoside, or an LNA nucleoside.

Region F is 1-8 contiguous nucleotides in length, such as 2-6, such as 3-4 contiguous nucleotides in length. Advantageously the 5' most nucleoside of region F is a sugar modified nucleoside. In some embodiments the two 5' most nucleoside of region F are sugar modified nucleoside. In some embodiments the 5' most nucleoside of region F is an LNA nucleoside. In some embodiments the two 5' most nucleoside of region F are LNA nucleosides. In some embodiments the two 5' most nucleoside of region F are 2' substituted nucleoside nucleosides, such as two 3' MOE nucleosides. In some embodiments the 5' most nucleoside of region F is a 2' substituted nucleoside, such as a MOE nucleoside.

Region F' is 2-8 contiguous nucleotides in length, such as 3-6, such as 4-5 contiguous nucleotides in length. Advantageously, embodiments the 3' most nucleoside of region F' is a sugar modified nucleoside. In some embodiments the two 3' most nucleoside of region F' are sugar modified nucleoside. In some embodiments the two 3' most nucleoside of region F' are LNA nucleosides. In some embodiments the 3' most nucleoside of region F' is an LNA nucleoside. In some embodiments the two 3' most nucleoside of region F' are 2' substituted nucleoside nucleosides, such as two 3' MOE nucleosides. In some embodiments the 3' most nucleoside of region F' is a 2' substituted nucleoside, such as a MOE nucleoside.

It should be noted that when the length of region F or F' is one, it is advantageously an LNA nucleoside.

In some embodiments, region F and F' independently consists of or comprises a contiguous sequence of sugar modified nucleosides. In some embodiments, the sugar modified nucleosides of region F may be independently selected from 2'-O-alkyl-RNA units, 2'-O-methyl-RNA, 2'-amino-DNA units, 2'-fluoro-DNA units, 2'-alkoxy-RNA, MOE units, LNA units, arabino nucleic acid (ANA) units and 2'-fluoro-ANA units.

In some embodiments, region F and F' independently comprises both LNA and a 2' substituted modified nucleosides (mixed wing design).

In some embodiments, region F and F' consists of only one type of sugar modified nucleosides, such as only MOE or only beta-D-oxy LNA or only ScET. Such designs are also termed uniform flanks or uniform gapmer design.

In some embodiments, all the nucleosides of region F or F', or F and F' are LNA nucleosides, such as independently selected from beta-D-oxy LNA, ENA or ScET nucleosides. In some embodiments region F consists of 1-5, such as 2-4, such as 3-4 such as 1, 2, 3, 4 or 5 contiguous LNA nucleosides. In some embodiments, all the nucleosides of region F and F' are beta-D-oxy LNA nucleosides.

In some embodiments, all the nucleosides of region F or F', or F and F' are 2' substituted nucleosides, such as OMe or MOE nucleosides. In some embodiments region F consists of 1, 2, 3, 4, 5, 6, 7, or 8 contiguous OMe or MOE nucleosides. In some embodiments only one of the flanking regions can consist of 2' substituted nucleosides, such as OMe or MOE nucleosides. In some embodiments it is the 5' (F) flanking region that consists 2' substituted nucleosides, such as OMe or MOE nucleosides whereas the 3' (F') flanking region comprises at least one LNA nucleoside, such as beta-D-oxy LNA nucleosides or cET nucleosides. In some embodiments it is the 3' (F') flanking region that consists 2' substituted nucleosides, such as OMe or MOE nucleosides whereas the 5' (F) flanking region comprises at least one LNA nucleoside, such as beta-D-oxy LNA nucleosides or cET nucleosides.

In some embodiments, all the modified nucleosides of region F and F' are LNA nucleosides, such as independently selected from beta-D-oxy LNA, ENA or ScET nucleosides, wherein region F or F', or F and F' may optionally comprise DNA nucleosides (an alternating flank, see definition of these for more details). In some embodiments, all the modified nucleosides of region F and F' are beta-D-oxy LNA nucleosides, wherein region F or F', or F and F' may optionally comprise DNA nucleosides (an alternating flank, see definition of these for more details).

In some embodiments the 5' most and the 3' most nucleosides of region F and F' are LNA nucleosides, such as beta-D-oxy LNA nucleosides or ScET nucleosides.

In some embodiments, the internucleoside linkage between region F and region G is a phosphorothioate internucleoside linkage. In some embodiments, the internucleoside linkage between region F' and region G is a phosphorothioate internucleoside linkage. In some embodiments, the internucleoside linkages between the nucleosides of region F or F', F and F' are phosphorothioate internucleoside linkages.

LNA Gapmer

An LNA gapmer is a gapmer wherein either one or both of region F and F' comprises or consists of LNA nucleosides. A beta-D-oxy gapmer is a gapmer wherein either one or both of region F and F' comprises or consists of beta-D-oxy LNA nucleosides.

In some embodiments the LNA gapmer is of formula: [LNA]$_{1-5}$-[region G]-[LNA]$_{1-5}$, wherein region G is as defined in the Gapmer region G definition.

MOE Gapmers

A MOE gapmers is a gapmer wherein regions F and F' consist of MOE nucleosides. In some embodiments the MOE gapmer is of design [MOE]$_{1-8}$-[Region G]-[MOE]$_{1-8}$, such as [MOE]$_{2-7}$-[Region G]$_{5-16}$-[MOE]$_{2-7}$, such as [MOE]$_{3-6}$-[Region G]-[MOE]$_{3-6}$, wherein region G is as defined in the Gapmer definition. MOE gapmers with a 5-10-5 design (MOE-DNA-MOE) have been widely used in the art.

Region D' or D" in an Oligonucleotide

The oligonucleotide of the invention may in some embodiments comprise or consist of the contiguous nucleotide sequence of the oligonucleotide which is complementary to the target nucleic acid, such as the gapmer F-G-F', and further 5' and/or 3' nucleosides. The further 5' and/or 3' nucleosides may or may not be fully complementary to the target nucleic acid. Such further 5' and/or 3' nucleosides may be referred to as region D' and D" herein.

The addition of region D' or D" may be used for the purpose of joining the contiguous nucleotide sequence, such as the gapmer, to a conjugate moiety or another functional group. When used for joining the contiguous nucleotide sequence with a conjugate moiety is can serve as a biocleavable linker. Alternatively, it may be used to provide exonuclease protection or for ease of synthesis or manufacture.

Region D' and D" can be attached to the 5' end of region F or the 3' end of region F', respectively to generate designs of the following formulas D'-F-G-F', F-G-F'-D" or D'-F-G-F'-D". In this instance the F-G-F' is the gapmer portion of the oligonucleotide and region D' or D" constitute a separate part of the oligonucleotide.

Region D' or D" may independently comprise or consist of 1, 2, 3, 4 or 5 additional nucleotides, which may be complementary or non-complementary to the target nucleic acid. The nucleotide adjacent to the F or F' region is not a sugar-modified nucleotide, such as a DNA or RNA or base modified versions of these. The D' or D' region may serve as a nuclease susceptible biocleavable linker (see definition of linkers). In some embodiments the additional 5' and/or 3' end nucleotides are linked with phosphodiester linkages, and are DNA or RNA. Nucleotide based biocleavable linkers suitable for use as region D' or D" are disclosed in WO2014/076195, which include by way of example a phosphodiester linked DNA dinucleotide. The use of biocleavable linkers in poly-oligonucleotide constructs is disclosed in WO2015/113922, where they are used to link multiple antisense constructs (e.g. gapmer regions) within a single oligonucleotide.

In one embodiment the oligonucleotide of the invention comprises a region D' and/or D" in addition to the contiguous nucleotide sequence which constitutes the gapmer.

In some embodiments, the oligonucleotide of the present invention can be represented by the following formulae:

F-G-F'; in particular $F_{1-8}$-$G_{5-16}$-$F'_{2-8}$
D'-F-G-F', in particular $D'_{1-3}$-$F_{1-8}$-$G_{5-16}$-$F'_{2-8}$
F-G-F'-D", in particular $F_{1-8}$-$G_{5-16}$-$F'_{2-8}$-$D''_{1-3}$
D'-F-G-F'-D", in particular $D'_{1-3}$-$F_{1-8}$-$G_{5-16}$-$F'_{2-8}$-$D''_{1-3}$ In some embodiments the internucleoside linkage positioned between region D' and region F is a phosphodiester linkage. In some embodiments the internucleoside linkage positioned between region F' and region D" is a phosphodiester linkage.

Conjugate

The term conjugate as used herein refers to an oligonucleotide which is covalently linked to a non-nucleotide moiety (conjugate moiety or region C or third region).

Conjugation of the oligonucleotide of the invention to one or more non-nucleotide moieties may improve the pharmacology of the oligonucleotide, e.g. by affecting the activity, cellular distribution, cellular uptake or stability of the oligonucleotide. In some embodiments the conjugate moiety modify or enhance the pharmacokinetic properties of the oligonucleotide by improving cellular distribution, bioavailability, metabolism, excretion, permeability, and/or cellular uptake of the oligonucleotide. In particular, the conjugate may target the oligonucleotide to a specific organ, tissue or cell type and thereby enhance the effectiveness of the oligonucleotide in that organ, tissue or cell type. At the same time the conjugate may serve to reduce activity of the oligonucleotide in non-target cell types, tissues or organs, e.g. off target activity or activity in non-target cell types, tissues or organs.

WO 93/07883 and WO2013/033230 provides suitable conjugate moieties, which are hereby incorporated by reference. Further suitable conjugate moieties are those capable of binding to the asialoglycoprotein receptor (ASGPR). In particular, tri-valent N-acetylgalactosamine conjugate moieties are suitable for binding to the ASGPR, see for example WO 2014/076196, WO 2014/207232 and WO 2014/179620 (hereby incorporated by reference). Such conjugates serve to enhance uptake of the oligonucleotide to the liver while reducing its presence in the kidney, thereby increasing the liver/kidney ratio of a conjugated oligonucleotide compared to the unconjugated version of the same oligonucleotide.

Oligonucleotide conjugates and their synthesis has also been reported in comprehensive reviews by Manoharan in Antisense Drug Technology, Principles, Strategies, and Applications, S. T. Crooke, ed., Ch. 16, Marcel Dekker, Inc., 2001 and Manoharan, Antisense and Nucleic Acid Drug Development, 2002, 12, 103, each of which is incorporated herein by reference in its entirety.

In an embodiment, the non-nucleotide moiety (conjugate moiety) is selected from the group consisting of carbohydrates, cell surface receptor ligands, drug substances, hormones, lipophilic substances, polymers, proteins, peptides, toxins (e.g. bacterial toxins), vitamins, viral proteins (e.g. capsids) or combinations thereof.

Linkers

A linkage or linker is a connection between two atoms that links one chemical group or segment of interest to another chemical group or segment of interest via one or more covalent bonds. Conjugate moieties can be attached to the oligonucleotide directly or through a linking moiety (e.g. linker or tether). Linkers serve to covalently connect a third region, e.g. a conjugate moiety (Region C), to a first region, e.g. an oligonucleotide or contiguous nucleotide sequence complementary to the target nucleic acid (region A).

In some embodiments of the invention the conjugate or oligonucleotide conjugate of the invention may optionally, comprise a linker region (second region or region B and/or region Y) which is positioned between the oligonucleotide or contiguous nucleotide sequence complementary to the target nucleic acid (region A or first region) and the conjugate moiety (region C or third region).

Region B refers to biocleavable linkers comprising or consisting of a physiologically labile bond that is cleavable under conditions normally encountered or analogous to those encountered within a mammalian body. Conditions under which physiologically labile linkers undergo chemical transformation (e.g., cleavage) include chemical conditions such as pH, temperature, oxidative or reductive conditions or agents, and salt concentration found in or analogous to those encountered in mammalian cells. Mammalian intracellular conditions also include the presence of enzymatic activity normally present in a mammalian cell such as from proteolytic enzymes or hydrolytic enzymes or nucleases. In one embodiment the biocleavable linker is susceptible to S1 nuclease cleavage. In a preferred embodiment the nuclease susceptible linker comprises between 1 and 10 nucleosides, such as 1, 2, 3, 4, 5, 6, 7, 8, 9 or 10 nucleosides, more preferably between 2 and 6 nucleosides and most preferably between 2 and 4 linked nucleosides comprising at least two consecutive phosphodiester linkages, such as at least 3 or 4 or 5 consecutive phosphodiester linkages. Preferably the nucleosides are DNA or RNA. Phosphodiester containing biocleavable linkers are described in more detail in WO 2014/076195 (hereby incorporated by reference).

Region Y refers to linkers that are not necessarily biocleavable but primarily serve to covalently connect a conjugate moiety (region C or third region), to an oligonucleotide (region A or first region). The region Y linkers may comprise a chain structure or an oligomer of repeating units such as ethylene glycol, amino acid units or amino alkyl groups The oligonucleotide conjugates of the present invention can be constructed of the following regional elements A-C, A-B-C, A-B-Y-C, A-Y-B-C or A-Y-C. In some embodiments the linker (region Y) is an amino alkyl, such as a C2-C36 amino alkyl group, including, for example C6 to C12 amino alkyl groups. In a preferred embodiment the linker (region Y) is a C6 amino alkyl group.

Treatment

The term 'treatment' as used herein refers to both treatment of an existing disease (e.g. a disease or disorder as herein referred to), or prevention of a disease, i.e. prophylaxis. It will therefore be recognized that treatment as referred to herein may, in some embodiments, be prophylactic. Prophylactic can be understood as preventing an HBV infection from turning into a chronic HBV infection or the prevention of severe liver diseases such as liver cirrhosis and hepatocellular carcinoma caused by a chronic HBV infection.

Prevention

Herein the term "preventing", "prevention" or "prevents" relates to a prophylactic treatment, i.e. to a measure or procedure the purpose of which is to prevent, rather than to cure a disease. Prevention means that a desired pharmacological and/or physiological effect is obtained that is prophylactic in terms of completely or partially preventing a disease or symptom thereof. Accordingly, herein "preventing a HBV infection" includes preventing a HBV infection from occurring in a subject, and preventing the occurrence of symptoms of a HBV infection. In the present invention in particular the prevention of HBV infection in children from HBV infected mothers are contemplated. Also contemplated is the prevention of an acute HBV infection turning into a chronic HBV infection.

Patient

For the purposes of the present invention the "subject" (or "patient") may be a vertebrate. In context of the present invention, the term "subject" includes both humans and other animals, particularly mammals, and other organisms. Thus, the herein provided means and methods are applicable to both human therapy and veterinary applications. Accordingly, herein the subject may be an animal such as a mouse, rat, hamster, rabbit, guinea pig, ferret, cat, dog, chicken, sheep, bovine species, horse, camel, or primate. Preferably, the subject is a mammal. More preferably the subject is human.

DETAILED DESCRIPTION OF THE INVENTION

HBV cccDNA in infected hepatocytes is responsible for persistent chronic infection and reactivation, being the template for all viral subgenomic transcripts and pre-genomic RNA (pgRNA) to ensure both newly synthesized viral progeny and cccDNA pool replenishment via intracellular nucleocapsid recycling. In the context of the present invention it was for the first time shown that RTEL1 is associated with cccDNA stability. This knowledge allows for the opportunity to destabilize cccDNA in HBV infected subjects which in turn opens the opportunity for a complete cure of chronically infected HBV patients.

One aspect of the present invention is a RTEL1 inhibitor for use in the treatment and/or prevention of Hepatitis B virus (HBV) infection, in particular a chronic HBV infection.

The RTEL1 inhibitor can for example be a small molecule that specifically binds to RTEL1 protein, wherein said inhibitor prevents or reduces binding of RTEL1 protein to cccDNA.

An embodiment of the invention is a RTEL1 inhibitor which is capable of reducing cccDNA and/or pgRNA in an infected cell, such as an HBV infected cell.

In a further embodiment, the RTEL1 inhibitor is capable of reducing HBsAg and/or HBeAg in vivo in an HBV infected individual.

The Oligonucleotides of the Invention

Therapeutic oligonucleotides are potentially excellent RTEL1 inhibitors since they can target the RTEL1 transcript and promote its degradation either via the RNA interference pathway or via RNaseH cleavage. Alternatively, oligonucleotides such as aptamers can also act as inhibitors of RTEL1 protein interactions.

One aspect of the present invention is a RTEL1 targeting oligonucleotide for use in treatment and/or prevention of Hepatitis B virus (HBV) infection. Such an oligonucleotide can be selected from the group consisting of single stranded antisense oligonucleotide; siRNA molecule; or shRNA molecule.

The present section describes novel oligonucleotides suitable for use in treatment and/or prevention of Hepatitis B virus (HBV) infection.

The oligonucleotides of the present invention are capable of inhibiting expression of RTEL1 in vitro and in vivo. The inhibition is achieved by hybridizing an oligonucleotide to a target nucleic acid encoding RTEL1 or which is involved in the regulation of RTEL1. The target nucleic acid may be a mammalian RTEL1 sequence, such as the sequence of SEQ ID NO: 1 and/or 2.

In some embodiments the oligonucleotide of the invention is capable of modulating the expression of the target by inhibiting or down-regulating it. Preferably, such modulation produces an inhibition of expression of at least 20% compared to the normal expression level of the target, more preferably at least 30%, at least 40%, at least 50%, at least 60%, at least 70%, at least 80%, or at least 90% inhibition compared to the normal expression level of the target. In some embodiments, the oligonucleotide of the invention may be capable of inhibiting expression levels of RTEL1 mRNA by at least 60% or 70% in vitro using 10 µM in PXB-PHH cells. In some embodiments, the oligonucleotide of the invention may be capable of inhibiting expression levels of RTEL1 protein by at least 50% in vitro using 10 µM PXB-PHH cells, this range of target reduction is advantageous in terms of selecting nucleic acid molecules with good correlation to the cccDNA reduction. Suitably, the examples provide assays which may be used to measure RTEL1 RNA or protein inhibition (e.g. example 1). The target inhibition is triggered by the hybridization between a contiguous nucleotide sequence of the oligonucleotide and the target nucleic acid. In some embodiments, the oligonucleotide of the invention comprises mismatches between the oligonucleotide and the target nucleic acid. Despite mismatches hybridization to the target nucleic acid may still be sufficient to show a desired inhibition of RTEL1 expression. Reduced binding affinity resulting from mismatches may advantageously be compensated by increased number of nucleotides in the oligonucleotide and/or an increased number of modified nucleosides capable of increasing the binding affinity to the target, such as 2' sugar modified nucleosides, including LNA, present within the oligonucleotide sequence.

An aspect of the present invention relates to an oligonucleotides of 12 to 60 nucleotides in length, which comprises a contiguous nucleotide sequence of at least 10 nucleotides in length, such as at least 12 to 30 nucleotides in length, which is at least 95% complementary, such as fully complementary, to a mammalian RTEL1 target nucleic acid, in particular a human RTEL1 nucleic acid. These oligonucleotides are capable of inhibiting the expression of RTEL1.

An aspect of the invention relates to an oligonucleotide according to the invention which is an antisense oligonucleotide of 12 to 30 nucleotides in length, comprising a contiguous nucleotide sequence of at least 10 nucleotides, such as 10 to 30 nucleotides in length which is at least 90% complementary, such as fully complementary, to a mammalian RTEL1.

A further aspect of the present invention relates to an oligonucleotide according to the invention comprising a contiguous nucleotide sequence of 12 to 20, such as 15 to 22, nucleotides in length with at least 90% complementarity, such as fully complementary, to the target nucleic acid of SEQ ID NO: 1.

In some embodiments, the oligonucleotide comprises a contiguous sequence of 10 to 30 nucleotides in length, which is at least 90% complementary, such as at least 91%, such as at least 92%, such as at least 93%, such as at least 94%, such as at least 95%, such as at least 96%, such as at least 97%, such as at least 98%, or 100% complementary with a region of the target nucleic acid or a target sequence.

It is advantageous if the oligonucleotide of the invention, or contiguous nucleotide sequence thereof is fully complementary (100% complementary) to a region of the target nucleic acid, or in some embodiments may comprise one or two mismatches between the oligonucleotide and the target nucleic acid.

In some embodiments the antisense oligonucleotide sequence is 100% complementary to a corresponding target nucleic acid of SEQ ID NO: 1.

In some embodiments the oligonucleotide or the contiguous nucleotide sequence of the invention is at least 95% complementarity, such as fully (or 100%) complementary, to the target nucleic acid of SEQ ID NO: 1 and SEQ ID NO: 2.

In some embodiments, the oligonucleotide comprises a contiguous nucleotide sequence of 15 to 22 nucleotides in length with at least 90% complementary, such as 100% complementarity, to a corresponding target sequence present in SEQ ID NO: 1, wherein the target sequence is selected from the group consisting of SEQ ID NO: 3 to 21 (table 4) or region 1A to 959A in Table 5A.

TABLE 5A

Regions of SEQ ID NO 1 which may be targeted using an oligonucleotide of the invention

| Reg. A | Position in SEQ ID NO 1 | | Length |
|---|---|---|---|
| | from | to | |
| 1A | 1594 | 1623 | 30 |
| 2A | 1636 | 1685 | 50 |
| 3A | 1687 | 1708 | 22 |
| 4A | 1773 | 1794 | 22 |
| 5A | 1810 | 1824 | 15 |
| 6A | 1824 | 1870 | 47 |
| 7A | 2890 | 2907 | 18 |
| 8A | 2931 | 2952 | 22 |
| 9A | 2984 | 2999 | 16 |
| 10A | 3002 | 3021 | 20 |
| 11A | 3026 | 3081 | 56 |
| 12A | 3083 | 3100 | 18 |
| 13A | 3175 | 3202 | 28 |
| 14A | 3205 | 3228 | 24 |
| 15A | 3253 | 3270 | 18 |
| 16A | 3289 | 3320 | 32 |
| 17A | 3353 | 3368 | 16 |
| 18A | 3374 | 3388 | 15 |
| 19A | 3443 | 3472 | 30 |
| 20A | 3525 | 3547 | 23 |
| 21A | 3549 | 3581 | 33 |
| 22A | 3584 | 3612 | 29 |
| 23A | 3648 | 3675 | 28 |
| 24A | 3681 | 3708 | 28 |
| 25A | 3716 | 3731 | 16 |
| 26A | 3733 | 3755 | 23 |
| 27A | 3757 | 3775 | 19 |
| 28A | 3797 | 3811 | 15 |
| 29A | 3823 | 3844 | 22 |
| 30A | 3846 | 3881 | 36 |
| 31A | 3922 | 3955 | 34 |
| 32A | 3957 | 3975 | 19 |
| 33A | 4016 | 4036 | 21 |
| 34A | 4038 | 4053 | 16 |
| 35A | 4067 | 4098 | 32 |
| 36A | 4100 | 4150 | 51 |
| 37A | 4271 | 4290 | 20 |
| 38A | 4312 | 4330 | 19 |
| 39A | 4345 | 4362 | 18 |
| 40A | 4364 | 4379 | 16 |
| 41A | 4420 | 4448 | 29 |
| 42A | 4480 | 4512 | 33 |
| 43A | 4527 | 4552 | 26 |
| 44A | 4651 | 4674 | 24 |
| 45A | 4733 | 4784 | 52 |
| 46A | 4786 | 4811 | 26 |
| 47A | 4830 | 4848 | 19 |
| 48A | 4857 | 4874 | 18 |
| 49A | 4915 | 4937 | 23 |
| 50A | 4944 | 4966 | 23 |
| 51A | 4969 | 4983 | 15 |
| 52A | 4995 | 5015 | 21 |
| 53A | 5017 | 5033 | 17 |
| 54A | 5035 | 5075 | 41 |
| 55A | 5109 | 5136 | 28 |
| 56A | 5155 | 5173 | 19 |
| 57A | 5175 | 5191 | 17 |
| 58A | 5209 | 5225 | 17 |
| 59A | 5241 | 5261 | 21 |
| 60A | 5263 | 5287 | 25 |
| 61A | 5299 | 5346 | 48 |
| 62A | 5394 | 5409 | 16 |
| 63A | 5428 | 5447 | 20 |
| 64A | 5472 | 5514 | 43 |
| 65A | 5579 | 5606 | 28 |
| 66A | 5617 | 5632 | 16 |
| 67A | 5690 | 5711 | 22 |
| 68A | 5713 | 5754 | 42 |
| 69A | 5727 | 5741 | 15 |
| 70A | 5756 | 5770 | 15 |
| 71A | 5812 | 5854 | 43 |
| 72A | 5871 | 5886 | 16 |
| 73A | 5896 | 5932 | 37 |
| 74A | 5992 | 6009 | 18 |
| 75A | 6011 | 6038 | 28 |
| 76A | 6057 | 6072 | 16 |
| 77A | 6101 | 6122 | 22 |
| 78A | 6127 | 6165 | 39 |
| 79A | 6187 | 6203 | 17 |
| 80A | 6210 | 6227 | 18 |
| 81A | 6243 | 6261 | 19 |
| 82A | 6271 | 6299 | 29 |
| 83A | 6378 | 6393 | 16 |
| 84A | 6468 | 6496 | 29 |
| 85A | 6498 | 6526 | 29 |
| 86A | 6558 | 6574 | 17 |
| 87A | 6720 | 6737 | 18 |
| 88A | 6735 | 6749 | 15 |
| 89A | 6785 | 6825 | 41 |
| 90A | 6879 | 6894 | 16 |
| 91A | 6921 | 6959 | 39 |
| 92A | 6995 | 7060 | 66 |
| 93A | 7062 | 7084 | 23 |
| 94A | 7114 | 7146 | 33 |
| 95A | 7155 | 7186 | 32 |
| 96A | 7188 | 7203 | 16 |
| 97A | 7230 | 7267 | 38 |
| 98A | 7281 | 7299 | 19 |
| 99A | 7291 | 7316 | 26 |
| 100A | 7344 | 7369 | 26 |
| 101A | 7375 | 7391 | 17 |
| 102A | 7400 | 7414 | 15 |
| 103A | 7427 | 7441 | 15 |
| 104A | 7437 | 7453 | 17 |
| 105A | 7449 | 7463 | 15 |
| 106A | 7467 | 7481 | 15 |
| 107A | 7500 | 7518 | 19 |
| 108A | 7532 | 7546 | 15 |
| 109A | 7573 | 7587 | 15 |
| 110A | 7607 | 7621 | 15 |
| 111A | 7659 | 7685 | 27 |
| 112A | 7732 | 7767 | 36 |
| 113A | 7779 | 7793 | 15 |
| 114A | 7844 | 7882 | 39 |
| 115A | 7888 | 7910 | 23 |
| 116A | 7966 | 7980 | 15 |
| 117A | 8033 | 8047 | 15 |
| 118A | 8049 | 8063 | 15 |
| 119A | 8160 | 8178 | 19 |
| 120A | 8180 | 8195 | 16 |
| 121A | 8216 | 8237 | 22 |
| 122A | 8239 | 8341 | 103 |
| 123A | 8357 | 8373 | 17 |
| 124A | 8415 | 8430 | 16 |
| 125A | 8449 | 8465 | 17 |
| 126A | 8541 | 8560 | 20 |
| 127A | 8574 | 8596 | 23 |
| 128A | 8677 | 8703 | 27 |
| 129A | 8705 | 8722 | 18 |
| 130A | 8748 | 8763 | 16 |

TABLE 5A-continued

Regions of SEQ ID NO 1 which may be targeted using an oligonucleotide of the invention

| Reg. A | Position in SEQ ID NO 1 from | to | Length |
|---|---|---|---|
| 131A | 8792 | 8807 | 16 |
| 132A | 8796 | 8811 | 16 |
| 133A | 8799 | 8818 | 20 |
| 134A | 8807 | 8821 | 15 |
| 135A | 8814 | 8828 | 15 |
| 136A | 8837 | 8853 | 17 |
| 137A | 8837 | 8851 | 15 |
| 138A | 8841 | 8858 | 18 |
| 139A | 8884 | 8911 | 28 |
| 140A | 8918 | 8937 | 20 |
| 141A | 8918 | 8933 | 16 |
| 142A | 8969 | 9005 | 37 |
| 143A | 8969 | 8999 | 31 |
| 144A | 8969 | 9000 | 32 |
| 145A | 8971 | 8989 | 19 |
| 146A | 8974 | 9000 | 27 |
| 147A | 8982 | 8999 | 18 |
| 148A | 9024 | 9042 | 19 |
| 149A | 9026 | 9042 | 17 |
| 150A | 9026 | 9040 | 15 |
| 151A | 9026 | 9041 | 16 |
| 152A | 9027 | 9043 | 17 |
| 153A | 9027 | 9041 | 15 |
| 154A | 9027 | 9042 | 16 |
| 155A | 9028 | 9044 | 17 |
| 156A | 9028 | 9042 | 15 |
| 157A | 9028 | 9043 | 16 |
| 158A | 9029 | 9045 | 17 |
| 159A | 9029 | 9043 | 15 |
| 160A | 9029 | 9044 | 16 |
| 161A | 9030 | 9046 | 17 |
| 162A | 9030 | 9044 | 15 |
| 163A | 9030 | 9045 | 16 |
| 164A | 9031 | 9047 | 17 |
| 165A | 9031 | 9045 | 15 |
| 166A | 9031 | 9046 | 16 |
| 167A | 9032 | 9048 | 17 |
| 168A | 9032 | 9046 | 15 |
| 169A | 9032 | 9047 | 16 |
| 170A | 9033 | 9047 | 15 |
| 171A | 9033 | 9048 | 16 |
| 172A | 9034 | 9048 | 15 |
| 173A | 9038 | 9052 | 15 |
| 174A | 9046 | 9064 | 19 |
| 175A | 9069 | 9090 | 22 |
| 176A | 9074 | 9089 | 16 |
| 177A | 9078 | 9093 | 16 |
| 178A | 9095 | 9110 | 16 |
| 179A | 9101 | 9124 | 24 |
| 180A | 9126 | 9161 | 36 |
| 181A | 9135 | 9155 | 21 |
| 182A | 9147 | 9162 | 16 |
| 183A | 9163 | 9186 | 24 |
| 184A | 9203 | 9222 | 20 |
| 185A | 9210 | 9253 | 44 |
| 186A | 9210 | 9230 | 21 |
| 187A | 9223 | 9254 | 32 |
| 188A | 9241 | 9256 | 16 |
| 189A | 9258 | 9272 | 15 |
| 190A | 9266 | 9303 | 38 |
| 191A | 9291 | 9308 | 18 |
| 192A | 9311 | 9329 | 19 |
| 193A | 9370 | 9394 | 25 |
| 194A | 9406 | 9420 | 15 |
| 195A | 9569 | 9591 | 23 |
| 196A | 9653 | 9708 | 56 |
| 197A | 9712 | 9758 | 47 |
| 198A | 9771 | 9788 | 18 |
| 199A | 9812 | 9829 | 18 |
| 200A | 9844 | 9862 | 19 |
| 201A | 9872 | 9917 | 46 |
| 202A | 9958 | 9983 | 26 |
| 203A | 9985 | 10002 | 18 |
| 204A | 10017 | 10054 | 38 |
| 205A | 10113 | 10132 | 20 |
| 206A | 10113 | 10130 | 18 |
| 207A | 10120 | 10137 | 18 |
| 208A | 10183 | 10204 | 22 |
| 209A | 10185 | 10204 | 20 |
| 210A | 10185 | 10202 | 18 |
| 211A | 10192 | 10209 | 18 |
| 212A | 10192 | 10210 | 19 |
| 213A | 10231 | 10251 | 21 |
| 214A | 10236 | 10251 | 16 |
| 215A | 10320 | 10337 | 18 |
| 216A | 10338 | 10353 | 16 |
| 217A | 10397 | 10415 | 19 |
| 218A | 10563 | 10584 | 22 |
| 219A | 10591 | 10607 | 17 |
| 220A | 10703 | 10723 | 21 |
| 221A | 10766 | 10784 | 19 |
| 222A | 10805 | 10822 | 18 |
| 223A | 10844 | 10870 | 27 |
| 224A | 10873 | 10893 | 21 |
| 225A | 10895 | 10913 | 19 |
| 226A | 10915 | 10942 | 28 |
| 227A | 10961 | 10975 | 15 |
| 228A | 10983 | 10999 | 17 |
| 229A | 11001 | 11015 | 15 |
| 230A | 11021 | 11035 | 15 |
| 231A | 11033 | 11059 | 27 |
| 232A | 11061 | 11082 | 22 |
| 233A | 11084 | 11104 | 21 |
| 234A | 11124 | 11154 | 31 |
| 235A | 11156 | 11170 | 15 |
| 236A | 11175 | 11192 | 18 |
| 237A | 11227 | 11260 | 34 |
| 238A | 11239 | 11254 | 16 |
| 239A | 11274 | 11302 | 29 |
| 240A | 11290 | 11305 | 16 |
| 241A | 11299 | 11317 | 19 |
| 242A | 11305 | 11329 | 25 |
| 243A | 11344 | 11361 | 18 |
| 244A | 11372 | 11400 | 29 |
| 245A | 11402 | 11416 | 15 |
| 246A | 11418 | 11445 | 28 |
| 247A | 11457 | 11471 | 15 |
| 248A | 11482 | 11511 | 30 |
| 249A | 11550 | 11566 | 17 |
| 250A | 11622 | 11645 | 24 |
| 251A | 11722 | 11737 | 16 |
| 252A | 11745 | 11777 | 33 |
| 253A | 11824 | 11844 | 21 |
| 254A | 11824 | 11840 | 17 |
| 255A | 12622 | 12638 | 17 |
| 256A | 12673 | 12691 | 19 |
| 257A | 12693 | 12724 | 32 |
| 258A | 12747 | 12763 | 17 |
| 259A | 12783 | 12806 | 24 |
| 260A | 12818 | 12837 | 20 |
| 261A | 12856 | 12885 | 30 |
| 262A | 12890 | 12912 | 23 |
| 263A | 12914 | 12945 | 32 |
| 264A | 12984 | 13016 | 33 |
| 265A | 13001 | 13016 | 16 |
| 266A | 13004 | 13022 | 19 |
| 267A | 13004 | 13021 | 18 |
| 268A | 13014 | 13034 | 21 |
| 269A | 13166 | 13191 | 26 |
| 270A | 13228 | 13251 | 24 |
| 271A | 13283 | 13319 | 37 |
| 272A | 13295 | 13310 | 16 |
| 273A | 13317 | 13332 | 16 |
| 274A | 13354 | 13381 | 28 |
| 275A | 13383 | 13430 | 48 |
| 276A | 13446 | 13468 | 23 |

TABLE 5A-continued

Regions of SEQ ID NO 1 which may be targeted using an oligonucleotide of the invention Position in SEQ ID NO 1

| Reg. A | from | to | Length |
|---|---|---|---|
| 277A | 13449 | 13468 | 20 |
| 278A | 13471 | 13487 | 17 |
| 279A | 13500 | 13518 | 19 |
| 280A | 13547 | 13568 | 22 |
| 281A | 13631 | 13650 | 20 |
| 282A | 13663 | 13679 | 17 |
| 283A | 13680 | 13694 | 15 |
| 284A | 13744 | 13764 | 21 |
| 285A | 13766 | 13803 | 38 |
| 286A | 13768 | 13803 | 36 |
| 287A | 13777 | 13797 | 21 |
| 288A | 13789 | 13804 | 16 |
| 289A | 13804 | 13827 | 24 |
| 290A | 13823 | 13844 | 22 |
| 291A | 13840 | 13854 | 15 |
| 292A | 13840 | 13855 | 16 |
| 293A | 13841 | 13855 | 15 |
| 294A | 13851 | 13874 | 24 |
| 295A | 13851 | 13873 | 23 |
| 296A | 13853 | 13871 | 19 |
| 297A | 13855 | 13874 | 20 |
| 298A | 13862 | 13882 | 21 |
| 299A | 13890 | 13905 | 16 |
| 300A | 13897 | 13927 | 31 |
| 301A | 13926 | 13940 | 15 |
| 302A | 13957 | 13971 | 15 |
| 303A | 13966 | 13980 | 15 |
| 304A | 13995 | 14025 | 31 |
| 305A | 14027 | 14048 | 22 |
| 306A | 14048 | 14067 | 20 |
| 307A | 14084 | 14098 | 15 |
| 308A | 14118 | 14133 | 16 |
| 309A | 14154 | 14171 | 18 |
| 310A | 14173 | 14210 | 38 |
| 311A | 14198 | 14218 | 21 |
| 312A | 14200 | 14218 | 19 |
| 313A | 14237 | 14265 | 29 |
| 314A | 14242 | 14265 | 24 |
| 315A | 14242 | 14264 | 23 |
| 316A | 14244 | 14262 | 19 |
| 317A | 14246 | 14265 | 20 |
| 318A | 14253 | 14271 | 19 |
| 319A | 14273 | 14293 | 21 |
| 320A | 14290 | 14304 | 15 |
| 321A | 14295 | 14320 | 26 |
| 322A | 14308 | 14352 | 45 |
| 323A | 14323 | 14352 | 30 |
| 324A | 14326 | 14352 | 27 |
| 325A | 14334 | 14351 | 18 |
| 326A | 14340 | 14364 | 25 |
| 327A | 14340 | 14359 | 20 |
| 328A | 14348 | 14362 | 15 |
| 329A | 14374 | 14406 | 33 |
| 330A | 14416 | 14446 | 31 |
| 331A | 14462 | 14489 | 28 |
| 332A | 14505 | 14521 | 17 |
| 333A | 14523 | 14541 | 19 |
| 334A | 14577 | 14598 | 22 |
| 335A | 14725 | 14762 | 38 |
| 336A | 14764 | 14781 | 18 |
| 337A | 14783 | 14808 | 26 |
| 338A | 14874 | 14905 | 32 |
| 339A | 14974 | 15030 | 57 |
| 340A | 15032 | 15059 | 28 |
| 341A | 15084 | 15098 | 15 |
| 342A | 15087 | 15106 | 20 |
| 343A | 15108 | 15126 | 19 |
| 344A | 15147 | 15180 | 34 |
| 345A | 15183 | 15202 | 20 |
| 346A | 15230 | 15247 | 18 |
| 347A | 15255 | 15270 | 16 |
| 348A | 15272 | 15298 | 27 |
| 349A | 15288 | 15312 | 25 |
| 350A | 15319 | 15349 | 31 |
| 351A | 15359 | 15373 | 15 |
| 352A | 15370 | 15385 | 16 |
| 353A | 15382 | 15400 | 19 |
| 354A | 15388 | 15408 | 21 |
| 355A | 15410 | 15435 | 26 |
| 356A | 15435 | 15452 | 18 |
| 357A | 15456 | 15498 | 43 |
| 358A | 15459 | 15474 | 16 |
| 359A | 15479 | 15498 | 20 |
| 360A | 15486 | 15502 | 17 |
| 361A | 15528 | 15543 | 16 |
| 362A | 15543 | 15561 | 19 |
| 363A | 15572 | 15591 | 20 |
| 364A | 15623 | 15642 | 20 |
| 365A | 15646 | 15660 | 15 |
| 366A | 15662 | 15690 | 29 |
| 367A | 15702 | 15740 | 39 |
| 368A | 15740 | 15754 | 15 |
| 369A | 15743 | 15773 | 31 |
| 370A | 15746 | 15761 | 16 |
| 371A | 15764 | 15789 | 26 |
| 372A | 15777 | 15803 | 27 |
| 373A | 15791 | 15816 | 26 |
| 374A | 15832 | 15848 | 17 |
| 375A | 15855 | 15873 | 19 |
| 376A | 15870 | 15890 | 21 |
| 377A | 15878 | 15908 | 31 |
| 378A | 15880 | 15898 | 19 |
| 379A | 15891 | 15908 | 18 |
| 380A | 15896 | 15916 | 21 |
| 381A | 15911 | 15929 | 19 |
| 382A | 15911 | 15930 | 20 |
| 383A | 15947 | 15963 | 17 |
| 384A | 16023 | 16056 | 34 |
| 385A | 16068 | 16091 | 24 |
| 386A | 16083 | 16097 | 15 |
| 387A | 16129 | 16150 | 22 |
| 388A | 16170 | 16229 | 60 |
| 389A | 16245 | 16265 | 21 |
| 390A | 16269 | 16300 | 32 |
| 391A | 16308 | 16334 | 27 |
| 392A | 16336 | 16356 | 21 |
| 393A | 16336 | 16358 | 23 |
| 394A | 16360 | 16391 | 32 |
| 395A | 16360 | 16397 | 38 |
| 396A | 16425 | 16465 | 41 |
| 397A | 16472 | 16493 | 22 |
| 398A | 16498 | 16515 | 18 |
| 399A | 16545 | 16562 | 18 |
| 400A | 16564 | 16586 | 23 |
| 401A | 16588 | 16613 | 26 |
| 402A | 16615 | 16639 | 25 |
| 403A | 16651 | 16667 | 17 |
| 404A | 16669 | 16695 | 27 |
| 405A | 16696 | 16716 | 21 |
| 406A | 16704 | 16718 | 15 |
| 407A | 16732 | 16760 | 29 |
| 408A | 16737 | 16760 | 24 |
| 409A | 16849 | 16865 | 17 |
| 410A | 16853 | 16868 | 16 |
| 411A | 16853 | 16867 | 15 |
| 412A | 16882 | 16897 | 16 |
| 413A | 16885 | 16902 | 18 |
| 414A | 16914 | 16938 | 25 |
| 415A | 16942 | 16956 | 15 |
| 416A | 16990 | 17004 | 15 |
| 417A | 17016 | 17042 | 27 |
| 418A | 17097 | 17115 | 19 |
| 419A | 17105 | 17119 | 15 |
| 420A | 17105 | 17126 | 22 |
| 421A | 17114 | 17128 | 15 |
| 422A | 17133 | 17158 | 26 |

TABLE 5A-continued

Regions of SEQ ID NO 1 which may be targeted using an oligonucleotide of the invention Position in SEQ ID NO 1

| Reg. A | from | to | Length |
|---|---|---|---|
| 423A | 17160 | 17174 | 15 |
| 424A | 17162 | 17178 | 17 |
| 425A | 17166 | 17183 | 18 |
| 426A | 17178 | 17199 | 22 |
| 427A | 17187 | 17201 | 15 |
| 428A | 17203 | 17223 | 21 |
| 429A | 17213 | 17230 | 18 |
| 430A | 17213 | 17235 | 23 |
| 431A | 17237 | 17259 | 23 |
| 432A | 17249 | 17279 | 31 |
| 433A | 17267 | 17285 | 19 |
| 434A | 17273 | 17288 | 16 |
| 435A | 17297 | 17315 | 19 |
| 436A | 17300 | 17315 | 16 |
| 437A | 17302 | 17317 | 16 |
| 438A | 17303 | 17324 | 22 |
| 439A | 17312 | 17330 | 19 |
| 440A | 17346 | 17375 | 30 |
| 441A | 17349 | 17375 | 27 |
| 442A | 17357 | 17374 | 18 |
| 443A | 17363 | 17382 | 20 |
| 444A | 17371 | 17385 | 15 |
| 445A | 17420 | 17447 | 28 |
| 446A | 17524 | 17551 | 28 |
| 447A | 17562 | 17580 | 19 |
| 448A | 17622 | 17636 | 15 |
| 449A | 17702 | 17734 | 33 |
| 450A | 17730 | 17745 | 16 |
| 451A | 17733 | 17755 | 23 |
| 452A | 17743 | 17758 | 16 |
| 453A | 17810 | 17824 | 15 |
| 454A | 17900 | 17940 | 41 |
| 455A | 17942 | 17968 | 27 |
| 456A | 17988 | 18002 | 15 |
| 457A | 18007 | 18024 | 18 |
| 458A | 18026 | 18042 | 17 |
| 459A | 18044 | 18059 | 16 |
| 460A | 18126 | 18159 | 34 |
| 461A | 18179 | 18205 | 27 |
| 462A | 18237 | 18253 | 17 |
| 463A | 18272 | 18290 | 19 |
| 464A | 18299 | 18314 | 16 |
| 465A | 18328 | 18344 | 17 |
| 466A | 18329 | 18344 | 16 |
| 467A | 18347 | 18361 | 15 |
| 468A | 18380 | 18402 | 23 |
| 469A | 18385 | 18399 | 15 |
| 470A | 18406 | 18421 | 16 |
| 471A | 18446 | 18473 | 28 |
| 472A | 18527 | 18543 | 17 |
| 473A | 18554 | 18569 | 16 |
| 474A | 18631 | 18645 | 15 |
| 475A | 18673 | 18693 | 21 |
| 476A | 18746 | 18765 | 20 |
| 477A | 18797 | 18824 | 28 |
| 478A | 18842 | 18860 | 19 |
| 479A | 18872 | 18892 | 21 |
| 480A | 18901 | 18915 | 15 |
| 481A | 18901 | 18940 | 40 |
| 482A | 18942 | 18976 | 35 |
| 483A | 18951 | 18976 | 26 |
| 484A | 18971 | 18994 | 24 |
| 485A | 18998 | 19016 | 19 |
| 486A | 19020 | 19039 | 20 |
| 487A | 19027 | 19043 | 17 |
| 488A | 19027 | 19050 | 24 |
| 489A | 19088 | 19102 | 15 |
| 490A | 19109 | 19129 | 21 |
| 491A | 19128 | 19145 | 18 |
| 492A | 19240 | 19258 | 19 |
| 493A | 19280 | 19366 | 87 |
| 494A | 19372 | 19387 | 16 |
| 495A | 19422 | 19444 | 23 |
| 496A | 19446 | 19462 | 17 |
| 497A | 19489 | 19506 | 18 |
| 498A | 19546 | 19571 | 26 |
| 499A | 19597 | 19615 | 19 |
| 500A | 19624 | 19648 | 25 |
| 501A | 19680 | 19695 | 16 |
| 502A | 19713 | 19727 | 15 |
| 503A | 19775 | 19792 | 18 |
| 504A | 19789 | 19803 | 15 |
| 505A | 19811 | 19825 | 15 |
| 506A | 19838 | 19862 | 25 |
| 507A | 20241 | 20257 | 17 |
| 508A | 20259 | 20290 | 32 |
| 509A | 20309 | 20381 | 73 |
| 510A | 20404 | 20419 | 16 |
| 511A | 20470 | 20492 | 23 |
| 512A | 20495 | 20557 | 63 |
| 513A | 20593 | 20609 | 17 |
| 514A | 20626 | 20646 | 21 |
| 515A | 20648 | 20669 | 22 |
| 516A | 20683 | 20699 | 17 |
| 517A | 20718 | 20735 | 18 |
| 518A | 20749 | 20765 | 17 |
| 519A | 20751 | 20765 | 15 |
| 520A | 20769 | 20785 | 17 |
| 521A | 20773 | 20791 | 19 |
| 522A | 20777 | 20798 | 22 |
| 523A | 20779 | 20798 | 20 |
| 524A | 20779 | 20797 | 19 |
| 525A | 20798 | 20819 | 22 |
| 526A | 20800 | 20819 | 20 |
| 527A | 20800 | 20818 | 19 |
| 528A | 20819 | 20840 | 22 |
| 529A | 20819 | 20853 | 35 |
| 530A | 20821 | 20840 | 20 |
| 531A | 20821 | 20853 | 33 |
| 532A | 20821 | 20839 | 19 |
| 533A | 20833 | 20851 | 19 |
| 534A | 20833 | 20855 | 23 |
| 535A | 20841 | 20864 | 24 |
| 536A | 20855 | 20869 | 15 |
| 537A | 20866 | 20895 | 30 |
| 538A | 20881 | 20902 | 22 |
| 539A | 20881 | 20915 | 35 |
| 540A | 20883 | 20902 | 20 |
| 541A | 20883 | 20915 | 33 |
| 542A | 20883 | 20901 | 19 |
| 543A | 20895 | 20913 | 19 |
| 544A | 20895 | 20917 | 23 |
| 545A | 20903 | 20926 | 24 |
| 546A | 20917 | 20931 | 15 |
| 547A | 20928 | 20946 | 19 |
| 548A | 20937 | 20951 | 15 |
| 549A | 20955 | 20973 | 19 |
| 550A | 20975 | 20993 | 19 |
| 551A | 20975 | 20997 | 23 |
| 552A | 20983 | 21004 | 22 |
| 553A | 20983 | 21017 | 35 |
| 554A | 20985 | 21004 | 20 |
| 555A | 20985 | 21017 | 33 |
| 556A | 20985 | 21003 | 19 |
| 557A | 20997 | 21015 | 19 |
| 558A | 20997 | 21019 | 23 |
| 559A | 21005 | 21028 | 24 |
| 560A | 21019 | 21033 | 15 |
| 561A | 21030 | 21048 | 19 |
| 562A | 21030 | 21052 | 23 |
| 563A | 21057 | 21075 | 19 |
| 564A | 21057 | 21079 | 23 |
| 565A | 21067 | 21085 | 19 |
| 566A | 21088 | 21118 | 31 |
| 567A | 21127 | 21153 | 27 |
| 568A | 21155 | 21169 | 15 |

TABLE 5A-continued

Regions of SEQ ID NO 1 which may be targeted using an oligonucleotide of the invention

| Reg. A | Position in SEQ ID NO 1 from | to | Length |
|---|---|---|---|
| 569A | 21155 | 21180 | 26 |
| 570A | 21205 | 21220 | 16 |
| 571A | 21222 | 21283 | 62 |
| 572A | 21347 | 21370 | 24 |
| 573A | 21431 | 21445 | 15 |
| 574A | 21463 | 21487 | 25 |
| 575A | 21489 | 21518 | 30 |
| 576A | 21520 | 21535 | 16 |
| 577A | 21551 | 21573 | 23 |
| 578A | 21574 | 21591 | 18 |
| 579A | 21595 | 21618 | 24 |
| 580A | 21622 | 21641 | 20 |
| 581A | 21664 | 21678 | 15 |
| 582A | 21758 | 21789 | 32 |
| 583A | 21799 | 21816 | 18 |
| 584A | 21820 | 21852 | 33 |
| 585A | 21865 | 21882 | 18 |
| 586A | 21890 | 21905 | 16 |
| 587A | 21917 | 21932 | 16 |
| 588A | 21956 | 21976 | 21 |
| 589A | 21975 | 21993 | 19 |
| 590A | 22007 | 22035 | 29 |
| 591A | 22014 | 22034 | 21 |
| 592A | 22036 | 22051 | 16 |
| 593A | 22036 | 22068 | 33 |
| 594A | 22070 | 22132 | 63 |
| 595A | 22174 | 22203 | 30 |
| 596A | 22205 | 22219 | 15 |
| 597A | 22229 | 22254 | 26 |
| 598A | 22276 | 22299 | 24 |
| 599A | 22309 | 22353 | 45 |
| 600A | 22359 | 22373 | 15 |
| 601A | 22385 | 22403 | 19 |
| 602A | 22443 | 22460 | 18 |
| 603A | 22462 | 22490 | 29 |
| 604A | 22499 | 22520 | 22 |
| 605A | 22601 | 22623 | 23 |
| 606A | 22646 | 22661 | 16 |
| 607A | 22663 | 22682 | 20 |
| 608A | 22713 | 22735 | 23 |
| 609A | 22737 | 22772 | 36 |
| 610A | 22793 | 22826 | 34 |
| 611A | 22851 | 22903 | 53 |
| 612A | 22905 | 22928 | 24 |
| 613A | 22934 | 22985 | 52 |
| 614A | 23071 | 23089 | 19 |
| 615A | 23094 | 23121 | 28 |
| 616A | 23174 | 23208 | 35 |
| 617A | 23249 | 23276 | 28 |
| 618A | 23279 | 23311 | 33 |
| 619A | 23313 | 23328 | 16 |
| 620A | 23450 | 23470 | 21 |
| 621A | 23488 | 23503 | 16 |
| 622A | 23511 | 23529 | 19 |
| 623A | 23555 | 23570 | 16 |
| 624A | 23575 | 23589 | 15 |
| 625A | 23597 | 23620 | 24 |
| 626A | 23632 | 23647 | 16 |
| 627A | 23672 | 23687 | 16 |
| 628A | 23737 | 23775 | 39 |
| 629A | 23746 | 23760 | 15 |
| 630A | 23833 | 23847 | 15 |
| 631A | 23872 | 23911 | 40 |
| 632A | 23919 | 23936 | 18 |
| 633A | 24050 | 24068 | 19 |
| 634A | 24083 | 24111 | 29 |
| 635A | 24111 | 24125 | 15 |
| 636A | 24131 | 24164 | 34 |
| 637A | 24167 | 24189 | 23 |
| 638A | 24204 | 24227 | 24 |
| 639A | 24236 | 24285 | 50 |
| 640A | 24438 | 24453 | 16 |
| 641A | 24499 | 24514 | 16 |
| 642A | 24560 | 24575 | 16 |
| 643A | 24621 | 24636 | 16 |
| 644A | 24682 | 24697 | 16 |
| 645A | 24717 | 24753 | 37 |
| 646A | 24842 | 24857 | 16 |
| 647A | 24902 | 24918 | 17 |
| 648A | 24932 | 24962 | 31 |
| 649A | 25018 | 25056 | 39 |
| 650A | 25160 | 25176 | 17 |
| 651A | 25219 | 25251 | 33 |
| 652A | 25259 | 25278 | 20 |
| 653A | 25332 | 25346 | 15 |
| 654A | 25363 | 25379 | 17 |
| 655A | 25367 | 25383 | 17 |
| 656A | 25405 | 25435 | 31 |
| 657A | 25405 | 25436 | 32 |
| 658A | 25407 | 25425 | 19 |
| 659A | 25410 | 25436 | 27 |
| 660A | 25418 | 25435 | 18 |
| 661A | 25475 | 25495 | 21 |
| 662A | 25502 | 25518 | 17 |
| 663A | 25559 | 25582 | 24 |
| 664A | 25596 | 25640 | 45 |
| 665A | 25671 | 25688 | 18 |
| 666A | 25796 | 25816 | 21 |
| 667A | 25818 | 25832 | 15 |
| 668A | 25834 | 25857 | 24 |
| 669A | 25867 | 25881 | 15 |
| 670A | 25928 | 25943 | 16 |
| 671A | 25986 | 26001 | 16 |
| 672A | 26014 | 26037 | 24 |
| 673A | 26187 | 26210 | 24 |
| 674A | 26212 | 26228 | 17 |
| 675A | 26268 | 26286 | 19 |
| 676A | 26300 | 26319 | 20 |
| 677A | 26359 | 26394 | 36 |
| 678A | 26396 | 26426 | 31 |
| 679A | 26465 | 26482 | 18 |
| 680A | 26505 | 26529 | 25 |
| 681A | 26547 | 26565 | 19 |
| 682A | 26576 | 26600 | 25 |
| 683A | 26588 | 26603 | 16 |
| 684A | 26588 | 26606 | 19 |
| 685A | 26609 | 26624 | 16 |
| 686A | 26615 | 26638 | 24 |
| 687A | 26615 | 26642 | 28 |
| 688A | 26632 | 26669 | 38 |
| 689A | 26649 | 26669 | 21 |
| 690A | 26658 | 26672 | 15 |
| 691A | 26695 | 26716 | 22 |
| 692A | 26706 | 26725 | 20 |
| 693A | 26713 | 26735 | 23 |
| 694A | 26715 | 26733 | 19 |
| 695A | 26737 | 26768 | 32 |
| 696A | 26755 | 26770 | 16 |
| 697A | 26756 | 26789 | 34 |
| 698A | 26759 | 26789 | 31 |
| 699A | 26787 | 26813 | 27 |
| 700A | 26795 | 26812 | 18 |
| 701A | 26815 | 26829 | 15 |
| 702A | 26861 | 26880 | 20 |
| 703A | 26862 | 26882 | 21 |
| 704A | 26865 | 26883 | 19 |
| 705A | 26868 | 26883 | 16 |
| 706A | 26870 | 26885 | 16 |
| 707A | 26871 | 26892 | 22 |
| 708A | 26880 | 26898 | 19 |
| 709A | 26889 | 26910 | 22 |
| 710A | 26908 | 26924 | 17 |
| 711A | 26917 | 26939 | 23 |
| 712A | 26948 | 26962 | 15 |
| 713A | 26955 | 26973 | 19 |
| 714A | 27097 | 27113 | 17 |

TABLE 5A-continued

Regions of SEQ ID NO 1 which may be targeted using an oligonucleotide of the invention

| Reg. A | Position in SEQ ID NO 1 from | to | Length |
|---|---|---|---|
| 715A | 27101 | 27128 | 28 |
| 716A | 27112 | 27127 | 16 |
| 717A | 27116 | 27183 | 68 |
| 718A | 27133 | 27165 | 33 |
| 719A | 27188 | 27209 | 22 |
| 720A | 27218 | 27232 | 15 |
| 721A | 27218 | 27234 | 17 |
| 722A | 27235 | 27253 | 19 |
| 723A | 27237 | 27253 | 17 |
| 724A | 27237 | 27251 | 15 |
| 725A | 27237 | 27252 | 16 |
| 726A | 27238 | 27254 | 17 |
| 727A | 27238 | 27252 | 15 |
| 728A | 27238 | 27253 | 16 |
| 729A | 27239 | 27255 | 17 |
| 730A | 27239 | 27253 | 15 |
| 731A | 27239 | 27254 | 16 |
| 732A | 27240 | 27254 | 15 |
| 733A | 27240 | 27255 | 16 |
| 734A | 27241 | 27255 | 15 |
| 735A | 27269 | 27320 | 52 |
| 736A | 27281 | 27297 | 17 |
| 737A | 27286 | 27307 | 22 |
| 738A | 27340 | 27358 | 19 |
| 739A | 27360 | 27404 | 45 |
| 740A | 27411 | 27438 | 28 |
| 741A | 27458 | 27474 | 17 |
| 742A | 27531 | 27572 | 42 |
| 743A | 27575 | 27600 | 26 |
| 744A | 27602 | 27616 | 15 |
| 745A | 27618 | 27637 | 20 |
| 746A | 27670 | 27684 | 15 |
| 747A | 27707 | 27721 | 15 |
| 748A | 27723 | 27747 | 25 |
| 749A | 27772 | 27816 | 45 |
| 750A | 27772 | 27790 | 19 |
| 751A | 27829 | 27847 | 19 |
| 752A | 27850 | 27868 | 19 |
| 753A | 27870 | 27905 | 36 |
| 754A | 27927 | 27942 | 16 |
| 755A | 27963 | 27987 | 25 |
| 756A | 27989 | 28083 | 95 |
| 757A | 28085 | 28103 | 19 |
| 758A | 28120 | 28138 | 19 |
| 759A | 28167 | 28188 | 22 |
| 760A | 28190 | 28207 | 18 |
| 761A | 28209 | 28231 | 23 |
| 762A | 28234 | 28250 | 17 |
| 763A | 28260 | 28303 | 44 |
| 764A | 28427 | 28444 | 18 |
| 765A | 28446 | 28462 | 17 |
| 766A | 28464 | 28484 | 21 |
| 767A | 28503 | 28519 | 17 |
| 768A | 28521 | 28536 | 16 |
| 769A | 28538 | 28565 | 28 |
| 770A | 28595 | 28612 | 18 |
| 771A | 28694 | 28709 | 16 |
| 772A | 28701 | 28715 | 15 |
| 773A | 28715 | 28751 | 37 |
| 774A | 28801 | 28825 | 25 |
| 775A | 28832 | 28846 | 15 |
| 776A | 28846 | 28870 | 25 |
| 777A | 28878 | 28893 | 16 |
| 778A | 28895 | 28911 | 17 |
| 779A | 28938 | 28961 | 24 |
| 780A | 29010 | 29025 | 16 |
| 781A | 29057 | 29072 | 16 |
| 782A | 29119 | 29134 | 16 |
| 783A | 29179 | 29193 | 15 |
| 784A | 29235 | 29256 | 22 |
| 785A | 29330 | 29349 | 20 |
| 786A | 29367 | 29381 | 15 |
| 787A | 29530 | 29556 | 27 |
| 788A | 29587 | 29605 | 19 |
| 789A | 29652 | 29692 | 41 |
| 790A | 29695 | 29710 | 16 |
| 791A | 29722 | 29742 | 21 |
| 792A | 29743 | 29768 | 26 |
| 793A | 29770 | 29797 | 28 |
| 794A | 29818 | 29836 | 19 |
| 795A | 29838 | 29873 | 36 |
| 796A | 29875 | 29946 | 72 |
| 797A | 29948 | 29983 | 36 |
| 798A | 30028 | 30048 | 21 |
| 799A | 30046 | 30060 | 15 |
| 800A | 30051 | 30067 | 17 |
| 801A | 30069 | 30090 | 22 |
| 802A | 30093 | 30107 | 15 |
| 803A | 30116 | 30136 | 21 |
| 804A | 30138 | 30202 | 65 |
| 805A | 30220 | 30262 | 43 |
| 806A | 30303 | 30320 | 18 |
| 807A | 30349 | 30372 | 24 |
| 808A | 30387 | 30418 | 32 |
| 809A | 30417 | 30441 | 25 |
| 810A | 30476 | 30516 | 41 |
| 811A | 30524 | 30576 | 53 |
| 812A | 30602 | 30628 | 27 |
| 813A | 30658 | 30680 | 23 |
| 814A | 30682 | 30747 | 66 |
| 815A | 30749 | 30799 | 51 |
| 816A | 30801 | 30821 | 21 |
| 817A | 30823 | 30844 | 22 |
| 818A | 30908 | 30922 | 15 |
| 819A | 30924 | 30980 | 57 |
| 820A | 31027 | 31045 | 19 |
| 821A | 31047 | 31080 | 34 |
| 822A | 31086 | 31113 | 28 |
| 823A | 31128 | 31146 | 19 |
| 824A | 31150 | 31164 | 15 |
| 825A | 31166 | 31193 | 28 |
| 826A | 31229 | 31271 | 43 |
| 827A | 31276 | 31310 | 35 |
| 828A | 31312 | 31333 | 22 |
| 829A | 31400 | 31417 | 18 |
| 830A | 31419 | 31433 | 15 |
| 831A | 31456 | 31470 | 15 |
| 832A | 31517 | 31569 | 53 |
| 833A | 31578 | 31599 | 22 |
| 834A | 31661 | 31689 | 29 |
| 835A | 31706 | 31739 | 34 |
| 836A | 31741 | 31763 | 23 |
| 837A | 31765 | 31805 | 41 |
| 838A | 31807 | 31855 | 49 |
| 839A | 31819 | 31834 | 16 |
| 840A | 31851 | 31866 | 16 |
| 841A | 31857 | 31872 | 16 |
| 842A | 31938 | 31984 | 47 |
| 843A | 31986 | 32032 | 47 |
| 844A | 32034 | 32071 | 38 |
| 845A | 32082 | 32097 | 16 |
| 846A | 32124 | 32151 | 28 |
| 847A | 32197 | 32216 | 20 |
| 848A | 32233 | 32262 | 30 |
| 849A | 32264 | 32289 | 26 |
| 850A | 32306 | 32325 | 20 |
| 851A | 32357 | 32408 | 52 |
| 852A | 32410 | 32459 | 50 |
| 853A | 32474 | 32492 | 19 |
| 854A | 32494 | 32508 | 15 |
| 855A | 32527 | 32543 | 17 |
| 856A | 32545 | 32560 | 16 |
| 857A | 32570 | 32636 | 67 |
| 858A | 32697 | 32713 | 17 |
| 859A | 32744 | 32765 | 22 |
| 860A | 32801 | 32823 | 23 |

TABLE 5A-continued

Regions of SEQ ID NO 1 which may be targeted using an oligonucleotide of the invention

| Reg. A | Position in SEQ ID NO 1 from | to | Length |
|---|---|---|---|
| 861A | 32865 | 32892 | 28 |
| 862A | 32944 | 32959 | 16 |
| 863A | 32962 | 32985 | 24 |
| 864A | 32998 | 33104 | 107 |
| 865A | 33126 | 33140 | 15 |
| 866A | 33142 | 33194 | 53 |
| 867A | 33213 | 33252 | 40 |
| 868A | 33277 | 33298 | 22 |
| 869A | 33318 | 33365 | 48 |
| 870A | 33375 | 33390 | 16 |
| 871A | 33402 | 33417 | 16 |
| 872A | 33419 | 33443 | 25 |
| 873A | 33456 | 33488 | 33 |
| 874A | 33509 | 33542 | 34 |
| 875A | 33562 | 33583 | 22 |
| 876A | 33607 | 33622 | 16 |
| 877A | 33655 | 33700 | 46 |
| 878A | 33704 | 33720 | 17 |
| 879A | 33735 | 33753 | 19 |
| 880A | 33755 | 33780 | 26 |
| 881A | 33806 | 33820 | 15 |
| 882A | 33829 | 33845 | 17 |
| 883A | 33916 | 33962 | 47 |
| 884A | 33964 | 33982 | 19 |
| 885A | 33989 | 34026 | 38 |
| 886A | 34028 | 34072 | 45 |
| 887A | 34089 | 34104 | 16 |
| 888A | 34113 | 34130 | 18 |
| 889A | 34141 | 34158 | 18 |
| 890A | 34281 | 34309 | 29 |
| 891A | 34377 | 34407 | 31 |
| 892A | 34423 | 34498 | 76 |
| 893A | 34507 | 34521 | 15 |
| 894A | 34524 | 34545 | 22 |
| 895A | 34552 | 34596 | 45 |
| 896A | 34688 | 34703 | 16 |
| 897A | 34742 | 34759 | 18 |
| 898A | 34770 | 34798 | 29 |
| 899A | 34860 | 34882 | 23 |
| 900A | 34919 | 34938 | 20 |
| 901A | 34950 | 34988 | 39 |
| 902A | 34990 | 35012 | 23 |
| 903A | 35022 | 35048 | 27 |
| 904A | 35063 | 35182 | 120 |
| 905A | 35184 | 35210 | 27 |
| 906A | 35222 | 35241 | 20 |
| 907A | 35245 | 35275 | 31 |
| 908A | 35277 | 35297 | 21 |
| 909A | 35319 | 35355 | 37 |
| 910A | 35367 | 35397 | 31 |
| 911A | 35433 | 35457 | 25 |
| 912A | 35461 | 35486 | 26 |
| 913A | 35490 | 35509 | 20 |
| 914A | 35546 | 35560 | 15 |
| 915A | 35573 | 35593 | 21 |
| 916A | 35597 | 35613 | 17 |
| 917A | 35968 | 35999 | 32 |
| 918A | 35997 | 36011 | 15 |
| 919A | 36037 | 36051 | 15 |
| 920A | 36097 | 36118 | 22 |
| 921A | 36117 | 36132 | 16 |
| 922A | 36278 | 36295 | 18 |
| 923A | 36350 | 36364 | 15 |
| 924A | 36366 | 36392 | 27 |
| 925A | 36433 | 36458 | 26 |
| 926A | 36460 | 36483 | 24 |
| 927A | 36530 | 36547 | 18 |
| 928A | 36549 | 36566 | 18 |
| 929A | 36600 | 36625 | 26 |
| 930A | 36627 | 36665 | 39 |
| 931A | 36759 | 36774 | 16 |
| 932A | 36765 | 36782 | 18 |
| 933A | 36815 | 36850 | 36 |
| 934A | 36873 | 36891 | 19 |
| 935A | 36894 | 36934 | 41 |
| 936A | 36969 | 36994 | 26 |
| 937A | 36996 | 37016 | 21 |
| 938A | 37023 | 37040 | 18 |
| 939A | 37093 | 37112 | 20 |
| 940A | 37118 | 37142 | 25 |
| 941A | 37144 | 37163 | 20 |
| 942A | 37242 | 37324 | 83 |
| 943A | 37352 | 37368 | 17 |
| 944A | 37370 | 37389 | 20 |
| 945A | 37391 | 37419 | 29 |
| 946A | 37421 | 37438 | 18 |
| 947A | 37444 | 37491 | 48 |
| 948A | 37511 | 37538 | 28 |
| 949A | 37567 | 37614 | 48 |
| 950A | 37636 | 37680 | 45 |
| 951A | 37723 | 37765 | 43 |
| 952A | 37773 | 37801 | 29 |
| 953A | 37803 | 37822 | 20 |
| 954A | 37824 | 37853 | 30 |
| 955A | 37855 | 37887 | 33 |
| 956A | 37889 | 37908 | 20 |
| 957A | 37920 | 37939 | 20 |
| 958A | 37988 | 38020 | 33 |
| 959A | 38022 | 38049 | 28 |

In some embodiments, the oligonucleotide comprises a contiguous nucleotide sequence of 16 to 20, such as 15 to 22, nucleotides in length with at least 90% complementary, such as 100% complementarity, to a corresponding target sequence present in SEQ ID NO: 1, wherein the target sequence is selected from the group consisting of SEQ ID NO: 3 to 21 (table 4) or region B1 to B28 in Table 5B.

TABLE 5B

Regions of SEQ ID NO 1 which may be targeted using an oligonucleotide of the invention

| Reg. B | Position in SEQ ID NO 1 from | to | Length |
|---|---|---|---|
| 1 | 8295 | 8312 | 17 |
| 2 | 8684 | 8704 | 20 |
| 3 | 9668 | 9684 | 16 |
| 4 | 9669 | 9684 | 15 |
| 5 | 9722 | 9741 | 19 |
| 6 | 9723 | 9741 | 18 |
| 7 | 9724 | 9742 | 18 |
| 8 | 10921 | 10937 | 16 |
| 9 | 11483 | 11503 | 20 |
| 10 | 11512 | 11531 | 19 |
| 11 | 11622 | 11641 | 19 |
| 12 | 11753 | 11773 | 20 |
| 13 | 11755 | 11772 | 17 |
| 14 | 11756 | 11776 | 20 |
| 15 | 11757 | 11776 | 19 |
| 16 | 11758 | 11778 | 20 |
| 17 | 12868 | 11885 | 17 |
| 18 | 13234 | 13252 | 18 |
| 19 | 13551 | 13569 | 18 |
| 20 | 14786 | 14804 | 18 |
| 21 | 18085 | 18101 | 16 |
| 22 | 22425 | 22441 | 16 |
| 23 | 33030 | 33048 | 18 |
| 24 | 35103 | 35123 | 20 |
| 25 | 35371 | 35390 | 19 |
| 26 | 35636 | 35655 | 19 |

TABLE 5B-continued

Regions of SEQ ID NO 1 which may be targeted using an oligonucleotide of the invention

| | Position in SEQ ID NO 1 | | |
|---|---|---|---|
| Reg. B | from | to | Length |
| 27 | 35638 | 35654 | 16 |
| 28 | 36915 | 36931 | 16 |

In some embodiments, the oligonucleotide of the invention comprises or consists of 12 to 60 nucleotides in length, such as from 13 to 50, such as from 14 to 35, such as 15 to 30, such as from 16 to 20 contiguous nucleotides in length. In a preferred embodiment, the oligonucleotide comprises or consists of 15, 16, 17, 18, 19 or 20 nucleotides in length.

In some embodiments, the contiguous nucleotide sequence of the oligonucleotide which is complementary to the target nucleic acids comprises or consists of 12 to 30, such as from 13 to 25, such as from 15 to 23, such as from 16 to 22, contiguous nucleotides in length.

In some embodiments, the contiguous nucleotide sequence of the siRNA or shRNA which is complementary to the target nucleic acids comprises or consists of 18 to 28, such as from 19 to 26, such as from 20 to 24, such as from 21 to 23, contiguous nucleotides in length.

In some embodiments, the contiguous nucleotide sequence of the single stranded antisense oligonucleotide which is complementary to the target nucleic acids comprises or consists of 12 to 22, such as from 14 to 20, such as from 16 to 20, such as from 15 to 21, such as from 15 to 18, such as from 16 to 18, such as from 16 to 17 contiguous nucleotides in length.

In some embodiments, the oligonucleotide or contiguous nucleotide sequence comprises or consists of a sequence selected from the group consisting of sequences listed in table 6 (Materials and Method section).

In some embodiments, the oligonucleotide or contiguous nucleotide sequence comprises or consists of 10 to 30 nucleotides in length with at least 90% identity, preferably 100% identity, to a sequence selected from the group consisting of SEQ ID NO: 22 to 237 (see motif sequences listed in table 6). In a particular embodiment the oligonucleotide or contiguous nucleotide sequence is selected from SEQ ID NO: 22; 23; 24; 25; 26; 27; 28; 29; 32; 35; 36; 37; 38; 39; 40; 41; 42; 42; 42; 43; 43; 46; 49; 83; 109; 130; 203; and 232.

It is understood that the contiguous oligonucleotide sequence (motif sequence) can be modified to, for example, increase nuclease resistance and/or binding affinity to the target nucleic acid.

The pattern in which the modified nucleosides (such as high affinity modified nucleosides) are incorporated into the oligonucleotide sequence is generally termed oligonucleotide design.

The oligonucleotide of the invention may be designed with modified nucleosides and RNA nucleosides (in particular for siRNA and shRNA molecules) or DNA nucleosides (in particular for single stranded antisense oligonucleotides). Advantageously, high affinity modified nucleosides are used.

In an embodiment, the oligonucleotide comprises at least 1 modified nucleoside, such as at least 2, at least 3, at least 4, at least 5, at least 6, at least 7, at least 8, at least 9, at least 10, at least 11, at least 12, at least 13, at least 14, at least 15 or at least 16 modified nucleosides. In an embodiment the oligonucleotide comprises from 1 to 10 modified nucleosides, such as from 2 to 9 modified nucleosides, such as from 3 to 8 modified nucleosides, such as from 4 to 7 modified nucleosides, such as 6 or 7 modified nucleosides. Suitable modifications are described in the "Definitions" section under "modified nucleoside", "high affinity modified nucleosides", "sugar modifications", "2' sugar modifications" and Locked nucleic acids (LNA)".

In an embodiment, the oligonucleotide comprises one or more sugar modified nucleosides, such as 2' sugar modified nucleosides. Preferably the oligonucleotide of the invention comprises one or more 2' sugar modified nucleoside independently selected from the group consisting of 2'-O-alkyl-RNA, 2'-O-methyl-RNA, 2'-alkoxy-RNA, 2'-O-methoxyethyl-RNA, 2'-amino-DNA, 2'-fluoro-DNA, arabino nucleic acid (ANA), 2'-fluoro-ANA and LNA nucleosides. It is advantageous if one or more of the modified nucleoside(s) is a locked nucleic acid (LNA).

In a further embodiment the oligonucleotide comprises at least one modified internucleoside linkage. Suitable internucleoside modifications are described in the "Definitions" section under "Modified internucleoside linkage". It is advantageous if at least 2 to 3 internucleoside linkages at the 5' or 3' end of the oligonucleotide are phosphorothioate internucleoside linkages. For single stranded antisense oligonucleotides it is advantageous if at least 75%, such as all, the internucleoside linkages within the contiguous nucleotide sequence are phosphorothioate internucleoside linkages. In some embodiments all the internucleotide linkages in the contiguous sequence of the single stranded antisense oligonucleotide are phosphorothioate linkages.

In some embodiments, the oligonucleotide of the invention comprises at least one LNA nucleoside, such as 1, 2, 3, 4, 5, 6, 7, or 8 LNA nucleosides, such as from 2 to 6 LNA nucleosides, such as from 3 to 7 LNA nucleosides, 4 to 8 LNA nucleosides or 3, 4, 5, 6, 7 or 8 LNA nucleosides. In some embodiments, at least 75% of the modified nucleosides in the oligonucleotide are LNA nucleosides, such as 80%, such as 85%, such as 90% of the modified nucleosides are LNA nucleosides. In a still further embodiment all the modified nucleosides in the oligonucleotide are LNA nucleosides. In a further embodiment, the oligonucleotide may comprise both beta-D-oxy-LNA, and one or more of the following LNA nucleosides: thio-LNA, amino-LNA, oxy-LNA, ScET and/or ENA in either the beta-D or alpha-L configurations or combinations thereof. In a further embodiment, all LNA cytosine units are 5-methyl-cytosine. It is advantageous for the nuclease stability of the oligonucleotide or contiguous nucleotide sequence to have at least 1 LNA nucleoside at the 5' end and at least 2 LNA nucleosides at the 3' end of the nucleotide sequence.

In an embodiment of the invention the oligonucleotide of the invention is capable of recruiting RNase H.

In the current invention an advantageous structural design is a gapmer design as described in the "Definitions" section under for example "Gapmer", "LNA Gapmer" and "MOE gapmer". In the present invention it is advantageous if the antisense oligonucleotide of the invention is a gapmer with an F-G-F' design. In some embodiments the gapmer is an LNA gapmer with uniform flanks.

In some embodiments of the invention the LNA gapmer is selected from the following uniform flank designs: 2-12-3, 4-14-2, 3-10-3, 3-9-3, 2-15-2, 2-12-4, 1-13-2, 3-13-2, 4-13-2, 2-12-2, 3-12-2, 3-15-2, 3-14-2, 3-13-3, 2-14-4, 3-12-3, 1-14-3, 3-14-3, 2-14-3, 2-15-3, 3-11-3, 1-12-3, 1-11-4, 1-13-2, 2-13-2, 2-16-2, 1-14-2, 1-17-3 and 1-18-2.

Table 6 (Materials and Method section) lists preferred designs of each motif sequence.

In all instances the F-G-F' design may further include region D' and/or D" as described in the "Definitions" section under "Region D' or D"in an oligonucleotide". In some embodiments the oligonucleotide of the invention has 1, 2 or 3 phosphodiester linked nucleoside units, such as DNA units, at the 5' or 3' end of the gapmer region. In some embodiments the oligonucleotide of the invention consists of two 5' phosphodiester linked DNA nucleosides followed by a F-G-F' gapmer region as defined in the "Definitions" section. Oligonucleotides that contain phosphodiester linked DNA units at the 5' or 3' end are suitable for conjugation and may further comprise a conjugate moiety as described herein. For delivery to the liver ASGPR targeting moieties are particular advantageous as conjugate moieties.

For some embodiments of the invention, the oligonucleotide is selected from the group of oligonucleotide compounds with CMP-ID-NO: 22_1; 23_1; 24_1; 25_1; 26_1; 27_1; 28_1; 29_1; 30_1; 31_1; 32_1; 33_1; 34_1; 35_1; 36_1; 37_1; 38_1; 39_1; 40_1; 41_1; 42_1; 42_2; 42_3; 43_1; 43_2; 44_1; 45_1; 46_1; 47_1; 48_1; 49_1; 130_1; 109_1; 83_1; 203_1 and 232_1 (see Table 6).

Conjugates

Since HBV infection primarily affects the hepatocytes in the liver it is advantageous to conjugate the RTEL1 inhibitor to a conjugate moiety that will increase the delivery of the inhibitor to the liver compared to the unconjugated inhibitor. In one embodiment liver targeting moieties are selected from moieties comprising cholesterol or other lipids or conjugate moieties capable of binding to the asialoglycoprotein receptor (ASGPR).

In some embodiments, the invention provides a conjugate comprising a nucleic acid molecule of the invention covalently attached to a conjugate moiety.

The asialoglycoprotein receptor (ASGPR) conjugate moiety comprises one or more carbohydrate moieties capable of binding to the asialoglycoprotein receptor (ASPGR targeting moieties) with affinity equal to or greater than that of galactose. The affinities of numerous galactose derivatives for the asialoglycoprotein receptor have been studied (see for example: Jobst, S. T. and Drickamer, K. JB. C. 1996, 271, 6686) or are readily determined using methods typical in the art.

In one embodiment the conjugate moiety comprises at least one asialoglycoprotein receptor targeting moiety selected from group consisting of galactose, galactosamine, N-formyl-galactosamine, N-acetylgalactosamine, N-propionyl-galactosamine, N-n-butanoyl-galactosamine and N-isobutanoylgalactosamine. Advantageously the asialoglycoprotein receptor targeting moiety is N-acetylgalactosamine (GalNAc).

To generate the ASGPR conjugate moiety the ASPGR targeting moieties (preferably GalNAc) can be attached to a conjugate scaffold. Generally, the ASPGR targeting moieties can be at the same end of the scaffold. In one embodiment, the conjugate moiety consists of two to four terminal GalNAc moieties linked to a spacer which links each GalNAc moiety to a brancher molecule that can be conjugated to the antisense oligonucleotide.

In a further embodiment, the conjugate moiety is mono-valent, di-valent, tri-valent or tetra-valent with respect to asialoglycoprotein receptor targeting moieties. Advantageously the asialoglycoprotein receptor targeting moiety comprises N-acetylgalactosamine (GalNAc) moieties.

GalNAc conjugate moieties can include, for example, those described in WO 2014/179620 and WO 2016/055601 and PCT/EP2017/059080 (hereby incorporated by reference), as well as small peptides with GalNAc moieties attached such as Tyr-Glu-Glu-(aminohexyl GalNAc)3 (YEE (ahGalNAc)3; a glycotripeptide that binds to asialoglycoprotein receptor on hepatocytes, see, e.g., Duff, et al., Methods Enzymol, 2000, 313, 297); lysine-based galactose clusters (e.g., L3G4; Biessen, et al., Cardovasc. Med., 1999, 214); and cholane-based galactose clusters (e.g., carbohydrate recognition motif for asialoglycoprotein receptor).

The ASGPR conjugate moiety, in particular a trivalent GalNAc conjugate moiety, may be attached to the 3'- or 5'-end of the oligonucleotide using methods known in the art. In one embodiment the ASGPR conjugate moiety is linked to the 5'-end of the oligonucleotide.

Figure 1D:
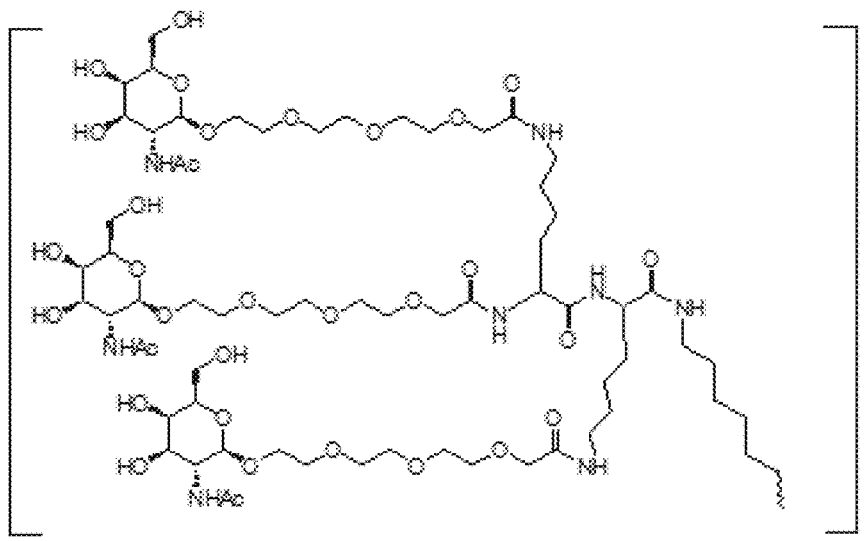
Figure 1E:
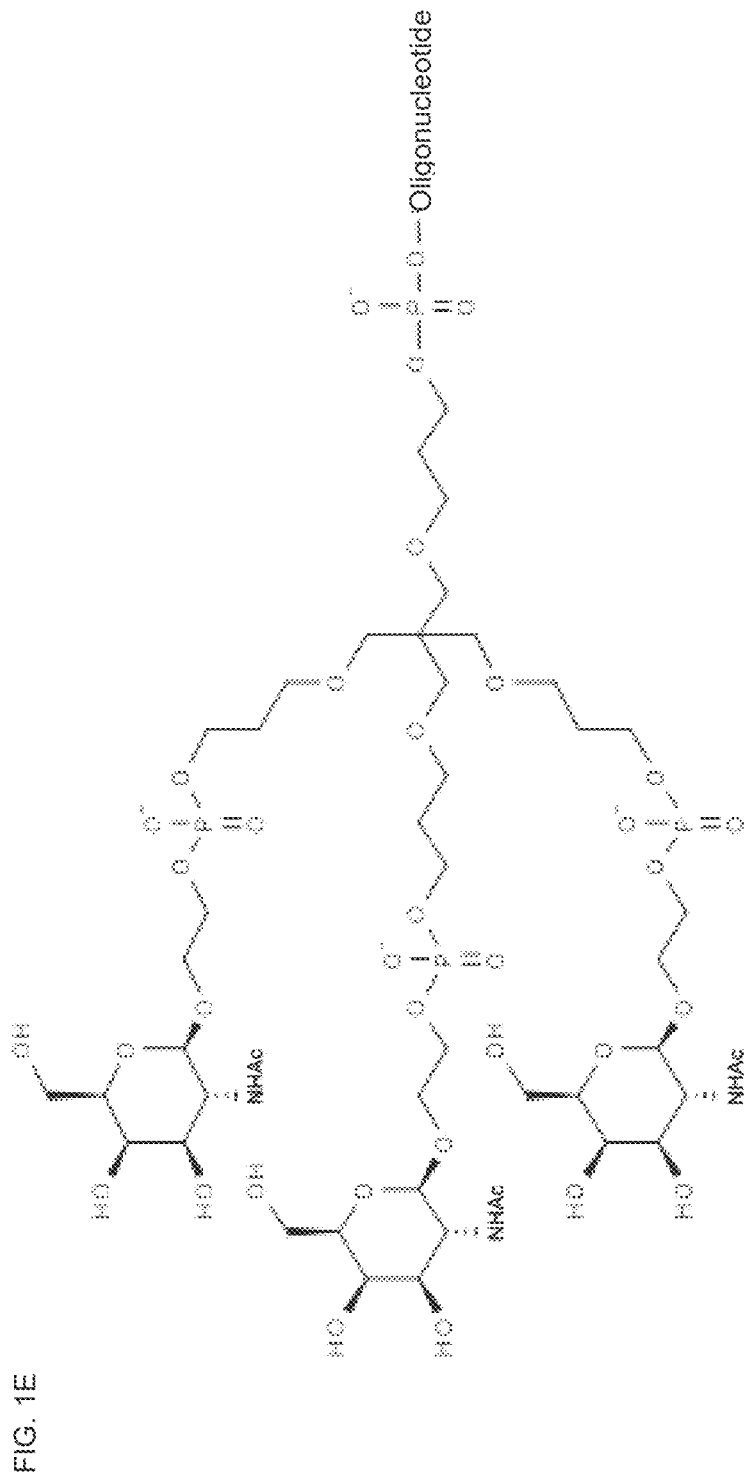
Figure 1F:
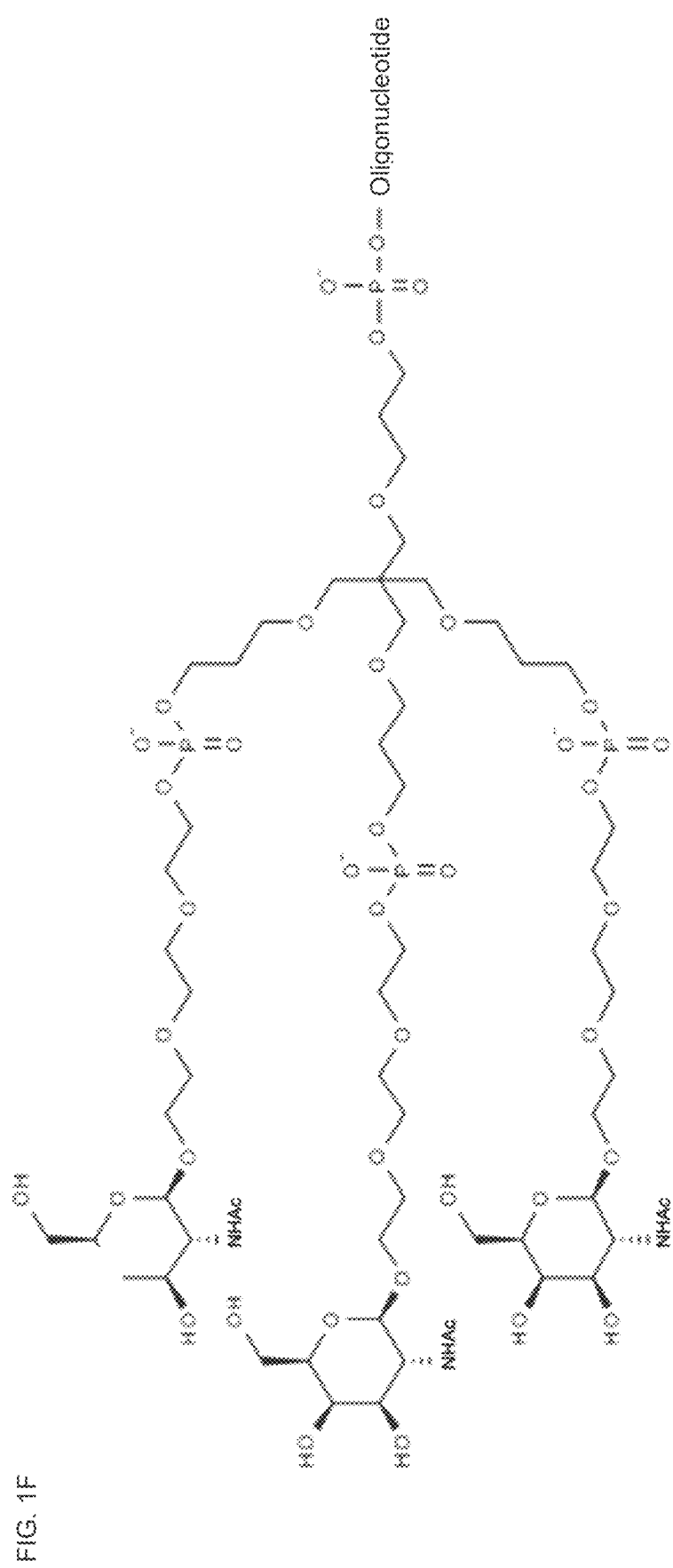
Figure 1G:
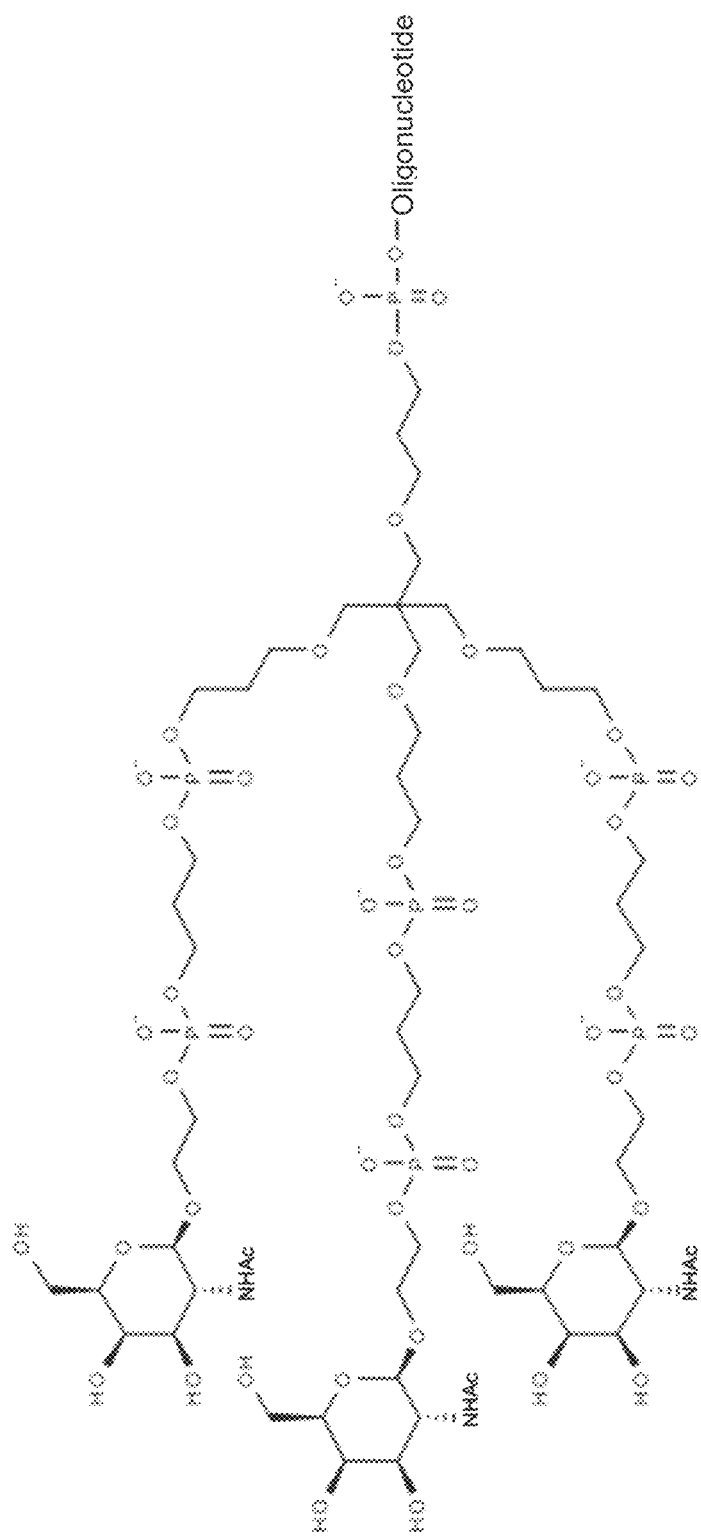
Figure 1H:
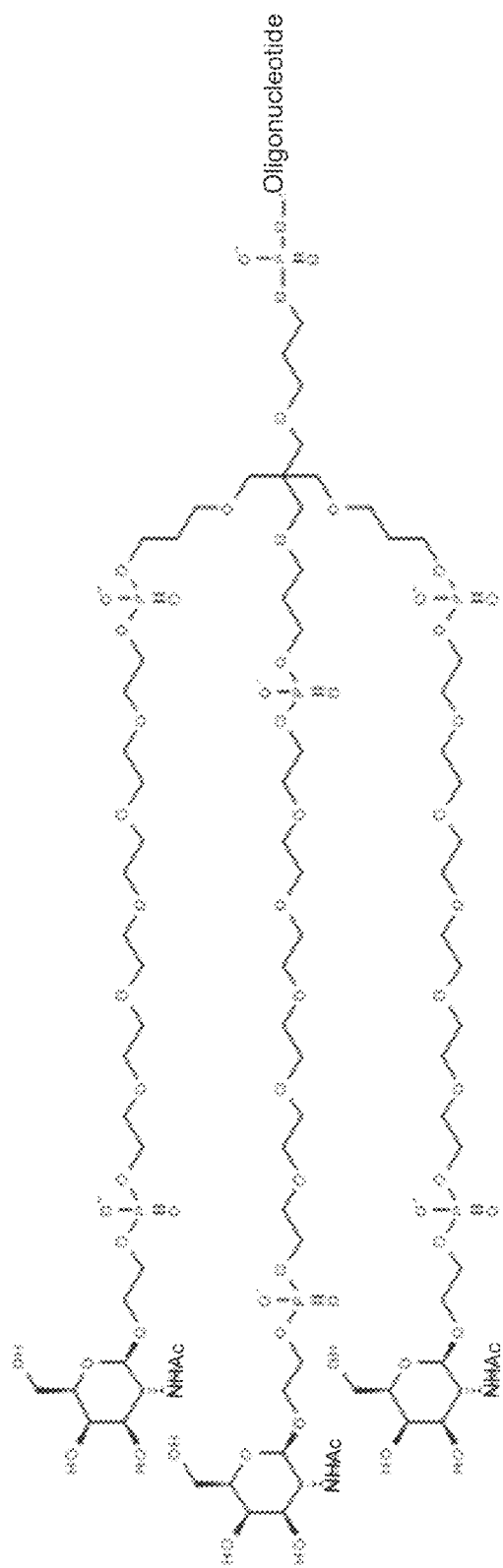
Figure 1I:
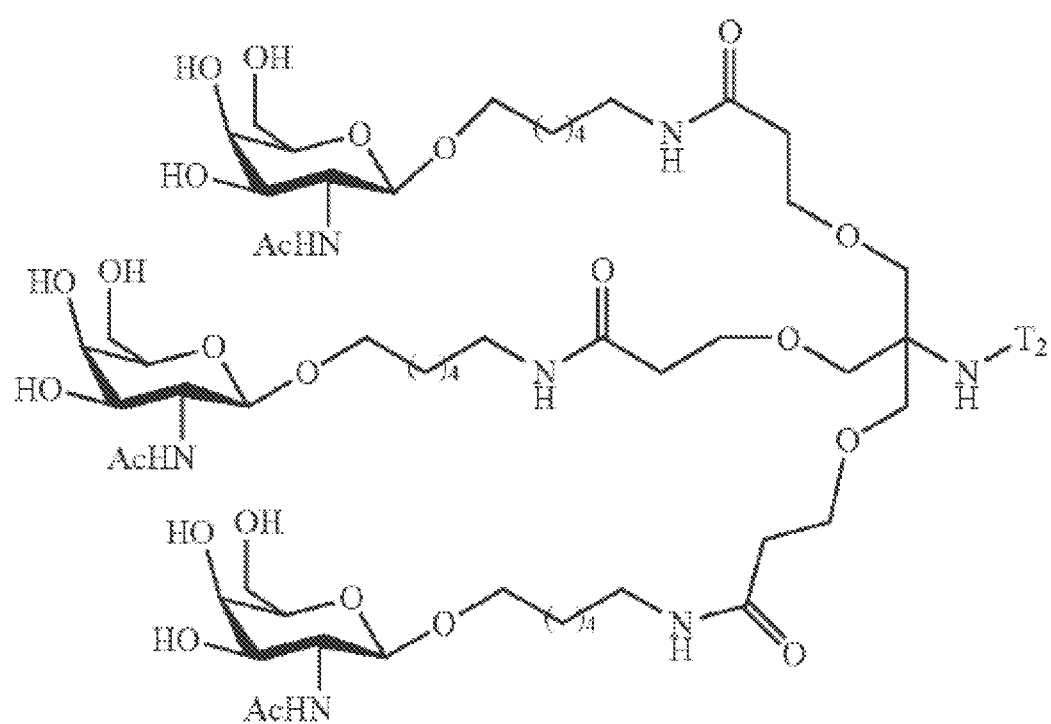

In one embodiment the conjugate moiety is a tri-valent N-acetylgalactosamine (GalNAc), such as those shown in FIG. 1, in particular as shown in FIG. 1D.

Method of Manufacture

In a further aspect, the invention provides methods for manufacturing the oligonucleotides of the invention comprising reacting nucleotide units and thereby forming covalently linked contiguous nucleotide units comprised in the oligonucleotide. Preferably, the method uses phophoramidite chemistry (see for example Caruthers et al, 1987, Methods in Enzymology vol. 154, pages 287-313). In a further embodiment the method further comprises reacting the contiguous nucleotide sequence with a conjugating moiety (ligand) to covalently attach the conjugate moiety to the oligonucleotide. In a further aspect a method is provided for manufacturing the composition of the invention, comprising mixing the oligonucleotide or conjugated oligonucleotide of the invention with a pharmaceutically acceptable diluent, solvent, carrier, salt and/or adjuvant.

Pharmaceutical Salt

The compounds according to the present invention may exist in the form of their pharmaceutically acceptable salts. The term "pharmaceutically acceptable salt" refers to conventional acid-addition salts or base-addition salts that retain the biological effectiveness and properties of the compounds of the present invention and are formed from suitable non-toxic organic or inorganic acids or organic or inorganic bases. Acid-addition salts include for example those derived from inorganic acids such as hydrochloric acid, hydrobromic acid, hydroiodic acid, sulfuric acid, sulfamic acid, phosphoric acid and nitric acid, and those derived from organic acids such as p-toluenesulfonic acid, salicylic acid, methanesulfonic acid, oxalic acid, succinic acid, citric acid, malic acid, lactic acid, fumaric acid, and the like. Base-addition salts include those derived from ammonium, potassium, sodium and, quaternary ammonium hydroxides, such as for example, tetramethyl ammonium hydroxide. The chemical modification of a pharmaceutical compound into a salt is a technique well known to pharmaceutical chemists in order to obtain improved physical and chemical stability, hygroscopicity, flowability and solubility of compounds. It is for example described in Bastin, Organic Process Research & Development 2000, 4, 427-435 or in Ansel, In: Pharmaceutical Dosage Forms and Drug Delivery Systems, 6th ed. (1995), pp. 196 and 1456-1457. For example, the pharmaceutically acceptable salt of the compounds provided herein may be a sodium salt.

In a further aspect the invention provides a pharmaceutically acceptable salt of the antisense oligonucleotide or a conjugate thereof. In a preferred embodiment, the pharmaceutically acceptable salt is a sodium or a potassium salt.

Pharmaceutical Composition

In a further aspect, the invention provides pharmaceutical compositions comprising any of the aforementioned oligonucleotides and/or oligonucleotide conjugates or salts thereof and a pharmaceutically acceptable diluent, carrier, salt and/or adjuvant. A pharmaceutically acceptable diluent includes phosphate-buffered saline (PBS) and pharmaceutically acceptable salts include, but are not limited to, sodium and potassium salts. In some embodiments the pharmaceutically acceptable diluent is sterile phosphate buffered saline. In some embodiments the oligonucleotide is used in the pharmaceutically acceptable diluent at a concentration of 50-300 µM solution.

Suitable formulations for use in the present invention are found in Remington's Pharmaceutical Sciences, Mack Publishing Company, Philadelphia, Pa., 17th ed., 1985. For a brief review of methods for drug delivery, see, e.g., Langer (Science 249:1527-1533, 1990). WO 2007/031091 provides further suitable and preferred examples of pharmaceutically acceptable diluents, carriers and adjuvants (hereby incorporated by reference). Suitable dosages, formulations, administration routes, compositions, dosage forms, combinations with other therapeutic agents, pro-drug formulations are also provided in WO2007/031091.

In some embodiments, the oligonucleotide or oligonucleotide conjugates of the invention, or pharmaceutically acceptable salt thereof is in a solid form, such as a powder, such as a lyophilized powder.

Compounds, oligonucleotides or oligonucleotide conjugates of the invention may be mixed with pharmaceutically acceptable active or inert substances for the preparation of pharmaceutical compositions or formulations. Compositions and methods for the formulation of pharmaceutical compositions are dependent upon a number of criteria, including, but not limited to, route of administration, extent of disease, or dose to be administered.

These compositions may be sterilized by conventional sterilization techniques, or may be sterile filtered. The resulting aqueous solutions may be packaged for use as is, or lyophilized, the lyophilized preparation being combined with a sterile aqueous carrier prior to administration. The pH of the preparations typically will be between 3 and 11, more preferably between 5 and 9 or between 6 and 8, and most preferably between 7 and 8, such as 7 to 7.5. The resulting compositions in solid form may be packaged in multiple single dose units, each containing a fixed amount of the above-mentioned agent or agents, such as in a sealed package of tablets or capsules. The composition in solid form can also be packaged in a container for a flexible quantity, such as in a squeezable tube designed for a topically applicable cream or ointment.

In some embodiments, the oligonucleotide or oligonucleotide conjugate of the invention is a prodrug. In particular, with respect to oligonucleotide conjugates the conjugate moiety is cleaved off the oligonucleotide once the prodrug is delivered to the site of action, e.g. the target cell.

Administration

The compounds, oligonucleotides, oligonucleotide conjugates or pharmaceutical compositions of the present invention may be administered topical (such as, to the skin, inhalation, ophthalmic or otic) or enteral (such as, orally or through the gastrointestinal tract) or parenteral (such as, intravenous, subcutaneous, intra-muscular, intracerebral, intracerebroventricular or intrathecal).

In a preferred embodiment the oligonucleotide or pharmaceutical compositions of the present invention are administered by a parenteral route including intravenous, intraarterial, subcutaneous, intraperitoneal or intramuscular injection or infusion, intrathecal or intracranial, e.g. intracerebral or intraventricular, intravitreal administration. In one embodiment the active oligonucleotide or oligonucleotide conjugate is administered intravenously. In another embodiment the active oligonucleotide or oligonucleotide conjugate is administered subcutaneously.

In some embodiments, the oligonucleotide, oligonucleotide conjugate or pharmaceutical composition of the invention is administered at a dose of 0.1-15 mg/kg, such as from 0.2-10 mg/kg, such as from 0.25-5 mg/kg. The administration can be once a week, every $2^{nd}$ week, every third week or even once a month.

The invention also provides for the use of the oligonucleotide or oligonucleotide conjugate of the invention as described for the manufacture of a medicament wherein the medicament is in a dosage form for subcutaneous administration.

Combination Therapies

In some embodiments the inhibitor of the present invention, such as the compound, oligonucleotide, oligonucleotide conjugate or pharmaceutical composition of the invention is for use in a combination treatment with another therapeutic agent. The therapeutic agent can for example be the standard of care for the diseases or disorders described above.

By way of example, the oligomer or the oligomer conjugate of the present invention may be used in combination with other actives, such as oligonucleotide-based antivirals—such as sequence specific oligonucleotide-based antivirals—acting either through antisense (including other LNA oligomers), siRNAs (such as ARC520), aptamers, morpholinos or any other antiviral, nucleotide sequence-dependent mode of action.

By way of further example, the oligomer or the oligomer conjugate of the present invention may be used in combination with other actives, such as immune stimulatory antiviral compounds, such as interferon (e.g. pegylated interferon alpha), TLR7 agonists (e.g. GS-9620), or therapeutic vaccines.

By way of further example, the oligomer or the oligomer conjugate of the present invention may be used in combination with other actives, such as small molecules, with antiviral activity. These other actives could be, for example, nucleoside/nucleotide inhibitors (eg entecavir or tenofovir disoproxil fumarate), encapsidation inhibitors, entry inhibitors (eg Myrcludex B).

In certain embodiments, the additional therapeutic agent may be an HBV agent, a Hepatitis C virus (HCV) agent, a chemotherapeutic agent, an antibiotic, an analgesic, a non-steroidal anti-inflammatory (NSAID) agent, an antifungal agent, an antiparasitic agent, an anti-nausea agent, an anti-diarrheal agent, or an immunosuppressant agent.

In particular, related embodiments, the additional HBV agent may be interferon alpha-2b, interferon alpha-2a, and interferon alphacon-1 (pegylated and unpegylated), ribavirin; an HBV RNA replication inhibitor; a second antisense oligomer; an HBV therapeutic vaccine; an HBV prophylactic vaccine; lamivudine (3TC); entecavir (ETV); tenofovir diisoproxil fumarate (TDF); telbivudine (LdT); adefovir; or an HBV antibody therapy (monoclonal or polyclonal).

In other particular related embodiments, the additional HCV agent may be interferon alpha-2b, interferon alpha-2a, and interferon alphacon-1 (pegylated and unpegylated); ribavirin; pegasys; an HCV RNA replication inhibitor (e.g., ViroPharma's VP50406 series); an HCV antisense agent; an HCV therapeutic vaccine; an HCV protease inhibitor; an HCV helicase inhibitor; or an HCV monoclonal or polyclonal antibody therapy.

Applications

The oligonucleotides of the invention may be utilized as research reagents for, for example, diagnostics, therapeutics and prophylaxis.

In research, such oligonucleotides may be used to specifically modulate the synthesis of RTEL1 protein in cells (e.g. in vitro cell cultures) and experimental animals thereby facilitating functional analysis of the target or an appraisal of its usefulness as a target for therapeutic intervention. Typically, the target modulation is achieved by degrading or inhibiting the mRNA producing the protein, thereby prevent protein formation or by degrading or inhibiting a modulator of the gene or mRNA producing the protein.

If employing the oligonucleotides of the invention in research or diagnostics the target nucleic acid may be a cDNA or a synthetic nucleic acid derived from DNA or RNA.

Also encompassed by the present invention is an in vivo or in vitro method for modulating RTEL1 expression in a target cell which is expressing RTEL1, said method comprising administering an oligonucleotide, conjugate compound or pharmaceutical composition of the invention in an effective amount to said cell.

In some embodiments, the target cell, is a mammalian cell in particular a human cell. The target cell may be an in vitro cell culture or an in vivo cell forming part of a tissue in a mammal. In preferred embodiments the target cell is present in in the liver. The target cell may be a hepatocyte.

One aspect of the present invention is related the oligonucleotides, conjugate compounds or pharmaceutical compositions of the invention for use as a medicament.

In an aspect of the invention the oligonucleotides, conjugate compound or pharmaceutical composition of the invention is capable of reducing the cccDNA level in the infected cells and therefore inhibiting HBV infection. In particular, the antisense oligonucleotide is capable of affecting one or more of the following parameters i) reducing cccDNA and/or ii) reducing pgRNA and/or iii) reducing HBV DNA and/or iv) reducing HBV viral antigens in an infected cell.

For example, nucleic acid molecule that inhibits HBV infection may reduce i) the cccDNA levels in an infected cell by at least 40% such as 50%, 60%, 70%, 80%, or 90% reduction compared to controls; or ii) the level of pgRNA by at least 40% such as 50%, 60%, 70%, 80%, or 90% reduction compared to controls. The controls may be untreated cells or animals, or cells or animals treated with an appropriate control.

Inhibition of HBV infection may be measured in vitro using HBV infected primary human hepatocytes or in vivo using humanized hepatocytes PXB mouse model (available at PhoenixBio, see also Kakuni et al 2014 Int. J. Mol. Sci. 15:58-74). Inhibition of secretion of HBsAg and/or HBeAg may be measured by ELISA, e.g. by using the CLIA ELISA Kit (Autobio Diagnostic) according to the manufacturers' instructions. Reduction of intracellular cccDNA or HBV mRNA and pgRNA may be measured by qPCR, e.g. as described in the Materials and Methods section. Further methods for evaluating whether a test compound inhibits HBV infection are measuring secretion of HBV DNA by qPCR e.g. as described in WO 2015/173208 or using Northern Blot; in-situ hybridization, or immuno-fluorescence.

Due to the reduction of RTEL1 levels the oligonucleotides, conjugate compounds or pharmaceutical compositions of the present invention can be used to inhibit development of or in the treatment of HBV infection. In particular, the destabilization and reduction of the cccDNA, the oligonucleotides, conjugate compounds or pharmaceutical compositions of the present invention more efficiently inhibits development of or treats a chronic HBV infection as compared to a compound that only reduces secretion of HBsAg.

Accordingly, one aspect of the present invention is related to use of the oligonucleotide, conjugate compounds or pharmaceutical compositions of the invention to reduce cccDNA and/or pgRNA in an HBV infected individual.

A further aspect of the invention relates to the use of the oligonucleotides, conjugate compounds or pharmaceutical compositions of the invention to inhibit development of or treat a chronic HBV infection.

A further aspect of the invention relates to the use of the oligonucleotides, conjugate compounds or pharmaceutical compositions of the invention to reduce the infectiousness of a HBV infected person. In a particular aspect of the invention, the oligonucleotides, conjugate compounds or pharmaceutical compositions of the invention inhibits development of a chronic HBV infection.

The subject to be treated with the oligonucleotides, conjugate compounds or pharmaceutical compositions of the invention (or which prophylactically receives antisense oligonucleotides, conjugate compounds or pharmaceutical compositions of the present invention) is preferably a human, more preferably a human patient who is HBsAg positive and/or HBeAg positive, even more preferably a human patient that is HBsAg positive and HBeAg positive.

Accordingly, the present invention relates to a method of treating a HBV infection, wherein the method comprises administering an effective amount of the oligonucleotides, conjugate compounds or pharmaceutical compositions of the invention. The present invention further relates to a method of preventing liver cirrhosis and hepatocellular carcinoma caused by a chronic HBV infection.

The invention also provides for the use of an oligonucleotide, a conjugate compound or a pharmaceutical composition of the invention for the manufacture of a medicament, in particular a medicament for use in the treatment of HBV infection or chronic HBV infection or reduction of the infectiousness of a HBV infected person. In preferred embodiments the medicament is manufactured in a dosage form for subcutaneous administration.

The invention also provides for the use of an oligonucleotide, a conjugate compound, the pharmaceutical composition of the invention for the manufacture of a medicament wherein the medicament is in a dosage form for intravenous administration.

The oligonucleotide, conjugate or the pharmaceutical composition of the invention may be used in a combination therapy. For example, oligonucleotide, conjugate or the pharmaceutical composition of the invention may be combined with other anti-HBV agents such as interferon alpha-2b, interferon alpha-2a, and interferon alphacon-1 (pegylated and unpegylated), ribavirin, lamivudine (3TC), entecavir, tenofovir, telbivudine (LdT), adefovir, or other emerging anti-HBV agents such as a HBV RNA replication inhibitor, a HBsAg secretion inhibitor, a HBV capsid inhibitor, an antisense oligomer (e.g. as described in WO2012/145697, WO 2014/179629 and WO2017/216390), a siRNA (e.g. described in WO 2005/014806, WO 2012/024170, WO 2012/2055362, WO 2013/003520, WO 2013/159109, WO 2017/027350 and WO2017/015175), a HBV therapeutic vaccine, a HBV prophylactic vaccine, a HBV antibody therapy (monoclonal or polyclonal), or TLR 2, 3, 7, 8 or 9 agonists for the treatment and/or prophylaxis of HBV.

EMBODIMENTS OF THE INVENTION

The following embodiments of the present invention may be used in combination with any other embodiments described herein.
1. A RTEL1 inhibitor for use in the in the treatment and/or prevention of Hepatitis B virus (HBV) infection.
2. The RTEL1 inhibitor for the use of embodiment 1, wherein the RTEL1 inhibitor is administered in an effective amount.
3. The RTEL1 inhibitor for the use of embodiment 1 or 2, wherein the HBV infection is a chronic infection.
4. The RTEL1 inhibitor for the use of embodiments 1 to 3, wherein the RTEL1 inhibitor is capable of reducing cccDNA and/or pgRNA in an infected cell.
5. The RTEL1 inhibitor for the use of any one of embodiments 1 to 4, wherein the RTEL1 inhibitor prevents or reduces the binding of RTEL1 to DNA, such as cccDNA.
6. RTEL1 inhibitor for the use of embodiment 5, wherein said inhibitor is a small molecule that specifically binds to RTEL1 protein, wherein said inhibitor prevents or reduces binding of RTEL1 protein to cccDNA.
7. The RTEL1 inhibitor for the use of any one of embodiments 1 to 5, wherein said inhibitor is an oligonucleotide of 12-60 nucleotides in length comprising or consisting of a contiguous nucleotide sequence of at least 10 nucleotides in length which is at least 90% complementary to a mammalian RTEL1 target nucleic acid.
8. The RTEL1 inhibitor for the use of embodiment 7, which is capable of reducing the level of the RTEL1 target nucleic acid.
9. The RTEL1 inhibitor for the use of embodiment 7 or 8, wherein the target nucleic acid is RNA.
10. The RTEL1 inhibitor for the use of embodiment 9, wherein the RNA is pre-mRNA.
11. The RTEL1 inhibitor for the use of any one of embodiments 7 to 10, wherein the oligonucleotide is selected from an antisense oligonucleotide, siRNA or shRNA.
12. The RTEL1 inhibitor for the use of embodiments 11, wherein the oligonucleotide is a single stranded antisense oligonucleotide or a double stranded siRNA.
13. The RTEL1 inhibitor for the use of any one of embodiments 7 to 12, wherein the mammalian RTEL1 target nucleic acid is selected from SEQ ID NO: 1 or 2.
14. The RTEL1 inhibitor for the use of any one of embodiments 7 to 12, wherein the contiguous nucleotide sequence of the oligonucleotide is at least 98% complementarity to the target nucleic acid of SEQ ID NO: 1 and SEQ ID NO: 2.
15. The RTEL1 inhibitor for the use of any one of embodiments 1 to 14, wherein the cccDNA in an HBV infected cell is reduced by at least 50%, such as 60%, such as 70%, such as 80%, such 90%, such as 95%, such as 100%, when compared to a control.
16. The oligonucleotide for the use of any one of embodiments 7 to 15, wherein the RTEL1 mRNA is reduced by at least 50%, such as 60%, such as 70%, such as 80%, such as 90%, such as 95%, such as 100%, when compared to a control.
17. An oligonucleotide of 12 to 60 nucleotides in length which comprises or consists of a contiguous nucleotide sequence of 12 to 30 nucleotides in length wherein the contiguous nucleotide sequence is at least 90% complementary, such as 95%, such as 98%, such as fully complementarity, to a mammalian RTEL1 target nucleic acid.
18. The oligonucleotide of embodiment 17, wherein the oligonucleotide is chemically produced.
19. The oligonucleotide of embodiment 17 or 18, wherein the mammalian RTEL1 target nucleic acid is selected from SEQ ID NO: 1 or 2.
20. The oligonucleotide embodiment 17 or 18, wherein the contiguous nucleotide sequence is at least 98% complementarity to the target nucleic acid of SEQ ID NO: 1 and SEQ ID NO: 2.
21. The oligonucleotide of any one of embodiments 17 to 20, wherein the oligonucleotide is 12 to 30 nucleotides in length.
22. The oligonucleotide of any one of embodiments 17 to 21, wherein the oligonucleotide is a RNAi molecule, such as a double stranded siRNA or shRNA
23. The oligonucleotide of any one of embodiments 17 to 21, wherein the oligonucleotide is a single stranded antisense oligonucleotide.
24. The oligonucleotide of any one of embodiments 17 to 23, wherein contiguous nucleotide sequence is complementary to a target sequence selected from SEQ ID NO: 3 to 21 (table 4).
25. The oligonucleotide of embodiment 17 to 24, which is capable of hybridizing to a target nucleic acid of SEQ ID NO: 1 and SEQ ID NO: 2 with a $\Delta G°$ below $-15$ kcal.
26. The oligonucleotide of any one of embodiments 17 to 25, wherein the contiguous nucleotide sequence comprises or consists of at least 14 contiguous nucleotides, particularly 15, 16, 17, 18, 19, 20, 21 or 22 contiguous nucleotides.
27. The oligonucleotide of any one of embodiments 17 to 25, wherein the contiguous nucleotide sequence comprises or consists of from 14 to 22 nucleotides.
28. The oligonucleotide of embodiment 27, wherein the contiguous nucleotide sequence comprises or consists of from 16 to 20 nucleotides.
29. The oligonucleotide of any one of embodiments 17 to 28, wherein the oligonucleotide comprises or consists of 14 to 25 nucleotides in length.
30. The oligonucleotide of embodiment 29, wherein the oligonucleotide comprises or consists of 16 to 22 nucleotides in length.
31. The oligonucleotide of any one of embodiment 17 to 30, wherein the oligonucleotide comprises a sequence selected from SEQ ID NO: 22-237.
32. The oligonucleotide of any one of embodiments 17 to 31, wherein the contiguous nucleotide sequence has zero to three mismatches compared to the target nucleic acids it is complementary to.
33. The oligonucleotide of embodiment 32, wherein the contiguous nucleotide sequence has one mismatch compared to the target nucleic acids.
34. The oligonucleotide of embodiment 32, wherein the contiguous nucleotide sequence has two mismatches compared to the target nucleic acids.
35. The oligonucleotide of embodiment 32, wherein the contiguous nucleotide sequence is fully complementary to both target nucleic acid sequences.
36. The oligonucleotide of embodiment 17 to 35, comprising one or more modified nucleosides.

37. The oligonucleotide of embodiment 36, wherein the one or more modified nucleoside is a high-affinity modified nucleosides.
38. The oligonucleotide of embodiment 36 or 37, wherein the one or more modified nucleoside is a 2' sugar modified nucleoside.
39. The oligonucleotide of embodiment 38, wherein the one or more 2' sugar modified nucleoside is independently selected from the group consisting of 2'-O-alkyl-RNA, 2'-O-methyl-RNA, 2'-alkoxy-RNA, 2'-O-methoxyethyl-RNA, 2'-amino-DNA, 2'-fluoro-DNA, 2'-fluoro-ANA and LNA nucleosides.
40. The oligonucleotide of embodiment 36-39, wherein the one or more modified nucleoside is a LNA nucleoside.
41. The oligonucleotide of embodiment 40, wherein the modified LNA nucleoside is selected from oxy-LNA, amino-LNA, thio-LNA, cET, and ENA.
42. The oligonucleotide of embodiment 40 or 41, wherein the modified LNA nucleoside is oxy-LNA with the following 2'-4' bridge —O—CH$_2$—.
43. The oligonucleotide of embodiment 42, wherein the oxy-LNA is beta-D-oxy-LNA.
44. The oligonucleotide of embodiment 40 or 41, wherein the modified LNA nucleoside is cET with the following 2'-4' bridge —O—CH(CH$_3$)—.
45. The oligonucleotide of embodiment 44, wherein the cET is (S)cET, i.e. 6'(S)methyl-beta-D-oxy-LNA.
46. The oligonucleotide of embodiment 40 or 41, wherein the LNA is ENA, with the following 2' 4' bridge —O—CH$_2$—CH$_2$—.
47. The oligonucleotide of any one of embodiments 17 to 46, wherein the oligonucleotide comprises at least one modified internucleoside linkage.
48. The oligonucleotide of embodiment 47, wherein the modified internucleoside linkage is nuclease resistant.
49. The oligonucleotide of embodiment 47 or 48, wherein the modified internucleoside linkages is a phosphorothioate internucleoside linkages.
50. The oligonucleotide any one of embodiments 17 to 49, wherein the oligonucleotide is an antisense oligonucleotide capable of recruiting RNase H.
51. The antisense oligonucleotide of embodiment 50, wherein the antisense oligonucleotide or the contiguous nucleotide sequence is a gapmer.
52. The antisense oligonucleotide of embodiment 51, wherein the antisense oligonucleotide or contiguous nucleotide sequence thereof consists of or comprises a gapmer of formula 5'-F-G-F'-3', where region F and F' independently comprise or consist of 1-4 2' sugar modified nucleosides and G is a region between 6 and 18 nucleosides which are capable of recruiting RNaseH.
53. The antisense oligonucleotide of embodiment 52, wherein the 2' sugar modified nucleoside independently is selected from the group consisting of 2'-O-alkyl-RNA, 2'-O-methyl-RNA, 2'-alkoxy-RNA, 2'-O-methoxyethyl-RNA, 2'-amino-DNA, 2'-fluoro-DNA, arabino nucleic acid (ANA), 2'-fluoro-ANA and LNA nucleosides.
54. The antisense oligonucleotide of embodiment 52 or 53, wherein one or more of the 2' sugar modified nucleosides in region F and F' is a LNA nucleoside
55. The antisense oligonucleotide of embodiment 54, wherein all the 2' sugar modified nucleosides in region F and F' are LNA nucleosides.
56. The oligonucleotide of embodiment 53 to 55, wherein the LNA nucleoside is selected from beta-D-oxy-LNA, alpha-L-oxy-LNA, beta-D-amino-LNA, alpha-L-amino-LNA, beta-D-thio-LNA, alpha-L-thio-LNA, (S)cET, (R)cET beta-D-ENA and alpha-L-ENA.
57. The antisense oligonucleotide of embodiment 53 to 56, wherein region F and F' consist of identical LNA nucleosides.
58. The antisense oligonucleotide of embodiment 53 to 57, wherein all the 2' sugar modified nucleosides in region F and F' are oxy-LNA nucleosides.
59. The antisense oligonucleotide of any one of embodiments 52 to 58, wherein the nucleosides in region G is DNA and/or alpha-L-LNA nucleosides.
60. The antisense oligonucleotide of embodiment 59, wherein region G consists of at least 75% DNA nucleosides.
61. The antisense oligonucleotide of embodiment 60, where all the nucleosides in region G are DNA nucleosides.
62. The oligonucleotide any one of embodiments 17 to 62, wherein the oligonucleotide is selected from CMP ID NO: 22_1; 23_1; 24_1; 25_1; 26_1; 27_1; 28_1; 29_1; 30_1; 31_1; 32_1; 33_1; 34_1; 35_1; 36_1; 37_1; 38_1; 39_1; 40_1; 41_1; 42_1; 42_2; 42_3; 43_1; 43_2; 44_1; 45_1; 46_1; 49_1; 130_1; 109_1; 83_1; 203_1 and 232_1, or pharmaceutically acceptable salts thereof.
63. A conjugate compound comprising an oligonucleotide according to any one of embodiments 17 to 50 or an antisense oligonucleotide according to any one of embodiments 51 to 62, and at least one conjugate moiety covalently attached to said antisense oligonucleotide.
64. The conjugate compound of embodiment 63, wherein the oligonucleotide is a double stranded siRNA and the conjugate moiety is covalently attached to the sense strand of the siRNA.
65. The conjugate compound of embodiment 63 or 64, wherein the conjugate moiety is selected from carbohydrates, cell surface receptor ligands, drug substances, hormones, lipophilic substances, polymers, proteins, peptides, toxins, vitamins, viral proteins or combinations thereof.
66. The conjugate compound of any one of embodiments 63 to 65, wherein the conjugate moiety is capable of binding to the asialoglycoprotein receptor.
67. The conjugate compound of embodiment 66, wherein the conjugate moiety comprises at least one asialoglycoprotein receptor targeting moiety selected from group consisting of galactose, galactosamine, N-formyl-galactosamine, N-acetylgalactosamine, N-propionyl-galactosamine, N-n-butanoyl-galactosamine and N-isobutanoylgalactosamine.
68. The conjugate compound of embodiment 67, wherein the asialoglycoprotein receptor targeting moiety is N-acetylgalactosamine (GalNAc).
69. The conjugate compound of embodiment 67 or 68, wherein the conjugate moiety is mono-valent, di-valent, tri-valent or tetra-valent with respect to asialoglycoprotein receptor targeting moieties.
70. The conjugate compound of embodiment 69, wherein the conjugate moiety consists of two to four terminal GalNAc moieties and a spacer linking each GalNAc moiety to a brancher molecule that can be conjugated to the antisense compound.

71. The conjugate compound of embodiment 70, wherein the spacer is a PEG spacer.
72. The conjugate compound of embodiment 66 to 71, wherein the conjugate moiety is a tri-valent N-acetyl-galactosamine (GalNAc) moiety.
73. The conjugate compound of embodiment 66 to 72, wherein the conjugate moiety is selected from one of the trivalent GalNAc moieties in FIG. 1A-FIG. 1I.
74. The conjugate compound of embodiment 73, wherein the conjugate moiety is the trivalent GalNAc moiety in FIG. 1D.
75. The conjugate compound of embodiment 63-74, comprising a linker which is positioned between the oligonucleotide or the antisense oligonucleotide and the conjugate moiety.
76. The conjugate compound of embodiment 75, wherein the linker is a physiologically labile linker.
77. The conjugate compound of embodiment 76, wherein the physiologically labile linker is nuclease susceptible linker.
78. The oligonucleotide conjugate of embodiment 76 or 77, wherein the physiologically labile linker is composed of 2 to 5 consecutive phosphodiester linkages.
79. The conjugate compound of embodiment 66-78, which display improved cellular distribution between liver vs. kidney or improved cellular uptake into the liver of the conjugate compound as compared to an unconjugated oligonucleotide or antisense oligonucleotide.
80. A pharmaceutical composition comprising a oligonucleotide according to any one of embodiments 17 to 50 or an antisense oligonucleotide according to any one of embodiments 51 to 61, a conjugate compound of embodiment 63 to 79 or acceptable salts thereof and a pharmaceutically acceptable diluent, carrier, salt and/or adjuvant.
81. A method for identifying a compound that prevents, ameliorates and/or inhibits a hepatitis B virus (HBV) infection, comprising:
   a. contacting a test compound with
      i. a RTEL1 polypeptide; or
      ii. a cell expressing RTEL1;
   b. measuring the expression and/or activity of RTEL1 in the presence and absence of said test compound; and
   c. identifying a compound that reduces the expression and/or activity RTEL1 and reduces cccDNA.
82. An in vivo or in vitro method for modulating RTEL1 expression in a target cell which is expressing RTEL1, said method comprising administering the oligonucleotide of any one of embodiments 17 to 50 or an antisense oligonucleotide according to any one of embodiments 51 to 61, a conjugate compound of embodiment 63 to 79 or the pharmaceutical composition of embodiment 80 in an effective amount to said cell.
83. The method of embodiments 82, wherein the RTEL1 expression is reduced by at least 50%, or at least 60%, or at least 70%, or at least 80%, or at least 90%, or at least 95% in the target cell compared to the level without any treatment or treated with a control.
84. The method of embodiments 82, wherein the target cell is infected with HBV and the cccDNA in an HBV infected cell is reduced by at least 50%, or at least 60%, or at least 70%, or at least 80%, or at least 90%, or at least 95% in the HBV infected target cell compared to the level without any treatment or treated with a control.
85. A method for treating or preventing a disease comprising administering a therapeutically or prophylactically effective amount of the oligonucleotide any one of embodiments 17 to 50 or an antisense oligonucleotide according to any one of embodiments 51 to 61, a conjugate compound of embodiment 63 to 79 or the pharmaceutical composition of embodiment 80 to a subject suffering from or susceptible to the disease.
86. The oligonucleotide of any one of embodiments 17 to 50 or the antisense oligonucleotide according to any one of embodiments 51 to 61, or the conjugate compound of any one of embodiments 63 to 79 or the pharmaceutical composition of embodiment 80, for use as a medicament for treatment or prevention of a disease in a subject.
87. Use of the oligonucleotide any one of embodiments 17 to 50 or the antisense oligonucleotide according to any one of embodiments 51 to 61, or the conjugate compound of any one of embodiments 63 to 79 for the preparation of a medicament for treatment or prevention of a disease in a subject.
88. The method, the oligonucleotide, the antisense oligonucleotide, the conjugate or the use of embodiments 85-87 wherein the subject is a mammal.
89. The method, the oligonucleotide, the antisense oligonucleotide, the conjugate, or the use of embodiment 88, wherein the mammal is human.

The invention will now be illustrated by the following examples which have no limiting character.

EXAMPLES

Materials and Methods

Oligonucleotide Motif Sequences and Oligonucleotide Compounds

TABLE 6 list of oligonucleotide motif sequences (indicated by SEQ ID NO), designs of these, as well as specific oligonucleotide compounds (indicated by CMP ID NO) designed based on the motif sequence.

| SEQ ID NO | Motif sequence | Design | Oligonucleotide Compound | CMP ID NO | Start position on SEQ ID NO: 1 |
|---|---|---|---|---|---|
| 22 | catggaaggacagtggt | 2-12-3 | CAtggaaggacagtGGT | 22_1 | 8295 |
| 23 | agctttattataacttgaat | 4-14-2 | AGCTttattataacttgaAT | 23_1 | 8684 |
| 24 | cgggacaggtagtaag | 3-10-3 | CGGgacaggtagtAAG | 24_1 | 9668 |

TABLE 6-continued list of oligonucleotide motif sequences (indicated by SEQ ID NO),
designs of these, as well as specific oligonucleotide compounds
(indicated by CMP ID NO) designed based on the motif sequence.

| SEQ ID NO | Motif sequence | Design | Oligonucleotide Compound | CMP ID NO | Start position on SEQ ID NO: 1 |
|---|---|---|---|---|---|
| 25 | cgggacaggtagtaa | 3-9-3 | CGGgacaggtagTAA | 25_1 | 9669 |
| 26 | gcatccaacaagtaattgt | 2-15-2 | GCatccaacaagtaattGT | 26_1 | 9722 |
| 27 | gcatccaacaagtaattg | 2-12-4 | GCatccaacaagtaATTG | 27_1 | 9723 |
| 28 | ggcatccaacaagtaatt | 3-13-2 | GGCatccaacaagtaaTT | 28_1 | 9724 |
| 29 | ggttgggttagaagct | 2-12-2 | GGttgggttagaagCT | 29_1 | 10921 |
| 30 | gcttttacatttaggtttat | 3-15-2 | GCTtttacatttaggtttAT | 30_1 | 11483 |
| 31 | catgttcctttctataact | 3-14-2 | CATgttcctttctataaCT | 31_1 | 11512 |
| 32 | agctttaaattttggtgaa | 3-13-3 | AGCtttaaattttggtGAA | 32_1 | 11622 |
| 33 | ttttacatactctggtcaaa | 2-14-4 | TTttacatactctggtCAAA | 33_1 | 11753 |
| 34 | ttttacatactctggtca | 3-12-3 | TTTtacatactctggTCA | 34_1 | 11755 |
| 35 | gaattttacatactctggtc | 3-14-3 | GAAttttacatactctgGTC | 35_1 | 11756 |
| 36 | gaattttacatactctggt | 2-14-3 | GAattttacatactctGGT | 36_1 | 11757 |
| 37 | gagaattttacatactctgg | 2-15-3 | GAgaattttacatactcTGG | 37_1 | 11758 |
| 38 | atctttgaacacgtctt | 3-11-3 | ATCtttgaacacgtCTT | 38_1 | 12868 |
| 39 | acaaaaaacagtaggtcc | 2-12-4 | ACaaaaaacagtagGTCC | 39_1 | 13234 |
| 40 | ggaataaaacagtaggtc | 2-12-4 | GGaataaaacagtaGGTC | 40_1 | 13551 |
| 41 | agcttcgtcaaagatcac | 3-13-2 | AGCttcgtcaaagatcAC | 41_1 | 14786 |
| 42 | ggtgggtggatgtttc | 1-12-3 | GgtgggtggatgtTTC | 42_1 | 18085 |
| 42 | ggtgggtggatgtttc | 1-11-4 | GgtgggtggatgTTTC | 42_2 | 18085 |
| 42 | ggtgggtggatgtttc | 1-13-2 | GgtgggtggatgttTC | 42_3 | 18085 |
| 43 | ggtggtgtggagaagc | 1-12-3 | GgtggtgtggagaAGC | 43_1 | 22425 |
| 43 | ggtggtgtggagaagc | 1-13-2 | GgtggtgtggagaaGC | 43_2 | 22425 |
| 44 | gctcatactccacacac | 2-13-2 | GCtcatactccacacAC | 44_1 | 33030 |
| 45 | catcggaacccttgtagtcc | 2-16-2 | CAtcggaacccttgtagtCC | 45_1 | 35103 |
| 46 | gatacagacctcctcaaac | 2-15-2 | GAtacagacctcctcaaAC | 46_1 | 35371 |
| 47 | ggtggaggtggtgctgc | 1-14-2 | GgtggaggtggtgctGC | 47_1 | 35636 |
| 48 | aggtggaggtggtgct | 1-12-3 | AggtggaggtggGCT | 48_1 | 35638 |
| 49 | tggtgtgggagtagca | 2-12-2 | TGgtgtgggagtagCA | 49_1 | 36915 |
| 50 | cgatggcgagaaatta | 4-10-2 | CGATggcgagaaatTA | 50_1 | 3824 |
| 51 | taattcagcaaaaaagccca | 3-15-2 | TAAttcagcaaaaaagccCA | 51_1 | 3858 |
| 52 | aagaatctgacacccca | 2-12-3 | AAgaatctgacaccCCA | 52_1 | 3924 |
| 53 | agacagccaagaatctgacac | 1-18-2 | AgacagccaagaatctgacAC | 53_1 | 3928 |
| 54 | cagccaagaatctgaca | 2-12-3 | CAgccaagaatctgACA | 54_1 | 3929 |
| 55 | acaggaacccgacag | 2-10-3 | ACaggaacccgaCAG | 55_1 | 4496 |
| 56 | gttactctcttgtttcttcac | 1-18-2 | GttactctcttgtttcttcAC | 56_1 | 4789 |

TABLE 6-continued list of oligonucleotide motif sequences (indicated by SEQ ID NO),
designs of these, as well as specific oligonucleotide compounds
(indicated by CMP ID NO) designed based on the motif sequence.

| SEQ ID NO | Motif sequence | Design | Oligonucleotide Compound | CMP ID NO | Start position on SEQ ID NO: 1 |
|---|---|---|---|---|---|
| 57 | ttactctcttgtttcttca | 1-16-2 | TtactctcttgtttcttCA | 57_1 | 4790 |
| 57 | ttactctcttgtttcttca | 1-14-4 | TtactctcttgtttcTTCA | 57_2 | 4790 |
| 58 | gttactctcttgtttcttc | 2-15-2 | GTtactctcttgtttctTC | 58_1 | 4791 |
| 59 | cgtgggtggagaagca | 1-13-2 | CgtgggtggagaagCA | 59_1 | 5717 |
| 60 | acgtgggtggagaagc | 2-12-2 | ACgtgggtggagaaGC | 60_1 | 5718 |
| 61 | cagaaactgtaagggca | 1-13-3 | CagaaactgtaaggGCA | 61_1 | 5815 |
| 62 | agggatagcagggaagg | 2-13-2 | AGggatagcagggaaGG | 62_1 | 7246 |
| 63 | gcttaaacacagacaga | 2-11-4 | GCttaaacacagaCAGA | 63_1 | 7501 |
| 64 | tgcttaaacacagacag | 3-11-3 | TGCttaaacacagaCAG | 64_1 | 7502 |
| 65 | cagggcagggaagaacag | 1-14-3 | CagggcagggaagaaCAG | 65_1 | 7845 |
| 66 | catggaaggacagtgg | 3-10-3 | CATggaaggacagTGG | 66_1 | 8296 |
| 66 | catggaaggacagtgg | 1-12-3 | CatggaaggacagTGG | 66_2 | 8296 |
| 67 | cccctcaatataagaa | 3-12-2 | CCCcctcaatataagAA | 67_1 | 8705 |
| 68 | aaccaaccctattcctgg | 2-14-2 | AAccaaccctattcctGG | 68_1 | 9375 |
| 68 | aaccaaccctattcctgg | 1-15-2 | AaccaaccctattcctGG | 68_2 | 9375 |
| 69 | accaaccctattcctg | 1-12-3 | AccaaccctattcCTG | 69_1 | 9376 |
| 70 | aaccaaccctattcctg | 3-12-2 | AACcaaccctattccTG | 70_1 | 9376 |
| 71 | aaaaccaaccctattcct | 3-12-3 | AAAaccaaccctattCCT | 71_1 | 9377 |
| 72 | aaaccaaccctattcc | 4-10-2 | AAAAccaaccctattCC | 72_1 | 9378 |
| 73 | ggtagtaagggcacacc | 1-14-2 | GgtagtaagggcacaCC | 73_1 | 9660 |
| 74 | gacaggtagtaagggcacac | 1-17-2 | GacaggtagtaagggcacAC | 74_1 | 9661 |
| 75 | gtagtaagggcacac | 3-9-3 | GTAgtaagggcaCAC | 75_1 | 9661 |
| 76 | gacaggtagtaagggcaca | 1-16-2 | GacaggtagtaagggcaCA | 76_1 | 9662 |
| 77 | acaggtagtaagggcaca | 2-14-2 | ACaggtagtaagggcaCA | 77_1 | 9662 |
| 78 | gacaggtagtaagggca | 2-13-2 | GAcaggtagtaagggCA | 78_1 | 9664 |
| 79 | cgggacaggtagtaaggg | 1-15-2 | CgggacaggtagtaagGG | 79_1 | 9666 |
| 80 | catccaacaagtaattgt | 3-12-3 | CATccaacaagtaatTGT | 80_1 | 9722 |
| 80 | catccaacaagtaattgt | 2-13-3 | CAtccaacaagtaatTGT | 80_2 | 9722 |
| 81 | ggcatccaacaagtaattgt | 1-16-3 | GgcatccaacaagtaatTGT | 81_1 | 9722 |
| 82 | ggcatccaacaagtaattg | 3-14-2 | GGCatccaacaagtaatTG | 82_1 | 9723 |
| 82 | ggcatccaacaagtaattg | 1-15-3 | GgcatccaacaagtaaTTG | 82_2 | 9723 |
| 83 | ggcatccaacaagtaat | 4-11-2 | GGCAtccaacaagtaAT | 83_1 | 9725 |
| 83 | ggcatccaacaagtaat | 3-12-2 | GGCatccaacaagtaAT | 83_2 | 9725 |
| 84 | cgtgaaggagagaacct | 2-12-3 | CGtgaaggagagaaCCT | 84_1 | 10036 |
| 85 | acgtgaaggagagaacc | 3-12-2 | ACGtgaaggagagaaCC | 85_1 | 10037 |
| 86 | gacgtgaaggagagaacc | 2-13-3 | GAcgtgaaggagagaACC | 86_1 | 10037 |

TABLE 6-continued list of oligonucleotide motif sequences (indicated by SEQ ID NO),
designs of these, as well as specific oligonucleotide compounds
(indicated by CMP ID NO) designed based on the motif sequence.

| SEQ ID NO | Motif sequence | Design | Oligonucleotide Compound | CMP ID NO | Start position on SEQ ID NO: 1 |
|---|---|---|---|---|---|
| 86 | gacgtgaaggagagaacc | 2-14-2 | GAcgtgaaggagagaaCC | 86_2 | 10037 |
| 85 | acgtgaaggagagaacc | 4-11-2 | ACGTgaaggagagaaCC | 85_2 | 10037 |
| 87 | gacgtgaaggagagaac | 2-11-4 | GAcgtgaaggagaGAAC | 87_1 | 10038 |
| 88 | cagtcttgctatgcct | 2-12-2 | CAgtcttgctatgcCT | 88_1 | 10563 |
| 89 | ctagaatcaaagctcca | 2-12-3 | CTagaatcaaagctCCA | 89_1 | 10591 |
| 90 | acatcgcacttgggc | 1-12-2 | Acatcgcacttggc | 90_1 | 10705 |
| 91 | cacggcaaacctcacc | 1-12-3 | Cacggcaaacctcacc | 91_1 | 10851 |
| 92 | aaccacggcaaacctcac | 3-13-2 | AACcacggcaaacctcAC | 92_1 | 10852 |
| 93 | caaagcaccgagtcacc | 1-13-3 | Caaagcaccgagtcacc | 93_1 | 10873 |
| 94 | tcaaagcaccgagtcac | 1-13-3 | Tcaaagcaccgagtcac | 94_1 | 10874 |
| 95 | ctggttgggttagaag | 2-10-4 | CTggttgggttaGAAG | 95_1 | 10923 |
| 95 | ctggttgggttagaag | 2-12-2 | CTggttgggttagaAG | 95_2 | 10923 |
| 96 | tataacttttagtttagc | 2-12-4 | TAtaacttttagttTAGC | 96_1 | 11501 |
| 97 | ttcctttctataactttt | 4-12-2 | TTCCtttctataacttTT | 97_1 | 11509 |
| 98 | gttcctttctataactttt | 4-13-2 | GTTCctttctataacttTT | 98_1 | 11509 |
| 99 | gttcctttctataacttt | 4-12-2 | GTTCctttctataactTT | 99_1 | 11510 |
| 100 | atgttcctttctataactttt | 2-15-3 | ATgttcctttctataacTTT | 100_1 | 11510 |
| 101 | atgttcctttctataactt | 2-14-3 | ATgttcctttctataaCTT | 101_1 | 11511 |
| 102 | atgttcctttctataact | 2-14-2 | ATgttcctttctataaCT | 102_1 | 11512 |
| 103 | gctttaatctgccttc | 1-11-4 | GctttaatctgcCTTC | 103_1 | 12697 |
| 104 | ccgtggctttaatctgc | 1-14-2 | Ccgtggctttaatctgc | 104_1 | 12701 |
| 105 | ccgtggctttaatctg | 2-12-2 | CCgtggctttaatcTG | 105_1 | 12702 |
| 105 | ccgtggctttaatctg | 3-11-2 | CCGtggctttaatcTG | 105_2 | 12702 |
| 106 | caaaaaacagtaggtcc | 2-11-4 | CAaaaaacagtagGTCC | 106_1 | 13234 |
| 106 | caaaaaacagtaggtcc | 3-11-3 | CAAaaaacagtaggTCC | 106_2 | 13234 |
| 107 | gaataaaacagtaggtcc | 2-12-4 | GAataaaacagtagGTCC | 107_1 | 13550 |
| 108 | ggaataaaacagtaggtcc | 4-13-2 | GGAAtaaaacagtaggtCC | 108_1 | 13550 |
| 108 | ggaataaaacagtaggtcc | 2-15-2 | GGaataaaacagtaggtCC | 108_2 | 13550 |
| 108 | ggaataaaacagtaggtcc | 1-14-4 | Ggaataaaacagtagcc | 108_3 | 13550 |
| 109 | ggaataaaacagtaggt | 3-11-3 | GGAataaaacagtaGGT | 109_1 | 13552 |
| 109 | ggaataaaacagtaggt | 2-11-4 | GGaataaaacagtAGGT | 109_2 | 13552 |
| 110 | ggaataaaacagtagg | 2-10-4 | GGaataaaacagTAGG | 110_1 | 13553 |
| 111 | cacagagtgtcatggg | 1-13-2 | Cacagagtgtcatggg | 111_1 | 14032 |
| 112 | acagcatggaaaggcacg | 1-13-4 | AcagcatggaaaggCACG | 112_1 | 14523 |
| 113 | cagcatggaaaggcacg | 1-12-4 | CagcatggaaaggCACG | 113_1 | 14523 |

TABLE 6-continued list of oligonucleotide motif sequences (indicated by SEQ ID NO), designs of these, as well as specific oligonucleotide compounds (indicated by CMP ID NO) designed based on the motif sequence.

| SEQ ID NO | Motif sequence | Design | Oligonucleotide Compound | CMP ID NO | Start position on SEQ ID NO: 1 |
|---|---|---|---|---|---|
| 114 | tacaggaggaagagaagggac | 1-18-2 | TacaggaggaagagaagggAC | 114_1 | 14725 |
| 115 | acaggaggaagagaaggg | 1-13-4 | AcaggaggaagagaAGGG | 115_1 | 14727 |
| 116 | tctacaggaggaagagaa | 4-12-2 | TCTAcaggaggaagagAA | 116_1 | 14730 |
| 116 | tctacaggaggaagagaa | 1-13-4 | TctacaggaggaagAGAA | 116_2 | 14730 |
| 117 | tctacaggaggaagaga | 4-11-2 | TCTAcaggaggaagaGA | 117_1 | 14731 |
| 117 | tctacaggaggaagaga | 2-12-3 | TCtacaggaggaagAGA | 117_2 | 14731 |
| 117 | tctacaggaggaagaga | 2-11-4 | TCtacaggaggaaGAGA | 117_3 | 14731 |
| 118 | cttcgtcaaagatcacg | 2-11-4 | CTtcgtcaaagatCACG | 118_1 | 14785 |
| 119 | gcttcgtcaaagatcacg | 2-13-3 | GCttcgtcaaagatcACG | 119_1 | 14785 |
| 120 | gcttcgtcaaagatcac | 3-11-3 | GCTtcgtcaaagatCAC | 120_1 | 14786 |
| 120 | gcttcgtcaaagatcac | 2-13-2 | GCttcgtcaaagatcAC | 120_2 | 14786 |
| 121 | ccagaaaggtttgcg | 3-10-2 | CCAgaaaggtttgCG | 121_1 | 14874 |
| 122 | tccagaaaggtttgcg | 3-11-2 | TCCagaaaggtttgCG | 122_1 | 14874 |
| 122 | tccagaaaggtttgcg | 1-12-3 | TccagaaaggtttGCG | 122_2 | 14874 |
| 123 | cagaggcatcggatcag | 2-13-2 | CAgaggcatcggatcAG | 123_1 | 14974 |
| 124 | cagaggcatcggatca | 3-11-2 | CAGaggcatcggatCA | 124_1 | 14975 |
| 125 | agcagaggcatcggatc | 2-13-2 | AGcagaggcatcggaTC | 125_1 | 14976 |
| 126 | attcttcacacatcttc | 2-11-4 | ATtcttcacacatCTTC | 126_1 | 16133 |
| 127 | ctatgaacgcacctg | 3-9-3 | CTAtgaacgcacCTG | 127_1 | 16282 |
| 128 | ggctatgaacgcacctg | 1-14-2 | GgctatgaacgcaccTG | 128_1 | 16282 |
| 129 | gctgggagaagacatag | 1-12-4 | GctgggagaagacATAG | 129_1 | 16593 |
| 130 | caaaatgcccttacagtga | 4-13-2 | CAAAatgcccttacagtGA | 130_1 | 16919 |
| 131 | caaaatgcccttacagt | 2-12-3 | CAaaatgcccttacAGT | 131_1 | 16921 |
| 132 | tgtgcgatttttaaaggaaat | 3-15-3 | TGTgcgatttttaaaggaaAAT | 132_1 | 17525 |
| 133 | catgtgcgatttttaaaggaaa | 3-15-3 | CATgtgcgatttttaaaggAAA | 133_1 | 17527 |
| 134 | tgtgcgatttttaaaggaa | 4-12-2 | TGTGcgatttttaaaggAA | 134_1 | 17528 |
| 135 | catgtgcgatttttaaagga | 1-15-3 | CatgtgcgatttttaaaGGA | 135_1 | 17529 |
| 136 | atgtgcgatttttaaagga | 3-13-2 | ATGtgcgatttttaaagGA | 136_1 | 17529 |
| 137 | accctgtcacttaaatatatg | 1-18-2 | AccctgtcacttaaatataTG | 137_1 | 17712 |
| 138 | gagggaggtggagcgtt | 1-14-2 | GagggaggtggagcgTT | 138_1 | 17924 |
| 139 | ctgaagagtggagaagg | 2-11-4 | CTgaagagtggagAAGG | 139_1 | 18130 |
| 139 | ctgaagagtggagaagg | 1-13-3 | CtgaagagtggagAGG | 139_2 | 18130 |
| 140 | caataaataaagtgtgagga | 3-14-3 | CAAtaaataaagtgtgaGGA | 140_1 | 18454 |
| 141 | caacccagtaaccatgac | 3-13-2 | CAAcccagtaaccatgAC | 141_1 | 19424 |
| 142 | caacccagtaaccatga | 3-12-2 | CAAcccagtaaccatGA | 142_1 | 19425 |
| 143 | accaacccagtaaccatga | 1-16-2 | AccaacccagtaaccatGA | 143_1 | 19425 |

TABLE 6-continued list of oligonucleotide motif sequences (indicated by SEQ ID NO),
designs of these, as well as specific oligonucleotide compounds
(indicated by CMP ID NO) designed based on the motif sequence.

| SEQ ID NO | Motif sequence | Design | Oligonucleotide Compound | CMP ID NO | Start position on SEQ ID NO: 1 |
|---|---|---|---|---|---|
| 144 | gagcaggtgttttatc | 3-11-2 | GAGcaggtgttttaTC | 144_1 | 19825 |
| 145 | ggtcgaggaggtgtcac | 1-14-2 | GgtcgaggaggtgtcAC | 145_1 | 20437 |
| 145 | ggtcgaggaggtgtcac | 2-13-2 | GGtcgaggaggtgtcAC | 145_2 | 20437 |
| 146 | gtcgaggaggtgtcac | 1-11-4 | GtcgaggaggtgTCAC | 146_1 | 20437 |
| 147 | ggtcgaggaggtgtca | 1-13-2 | GgtcgaggaggtgtCA | 147_1 | 20438 |
| 147 | ggtcgaggaggtgtca | 1-12-3 | GgtcgaggaggtgTCA | 147_2 | 20438 |
| 148 | ggtcgaggaggtgtc | 2-11-2 | GGtcgaggaggtgTC | 148_1 | 20439 |
| 149 | ccaggtctcaaaaaggg | 1-13-3 | CcaggtctcaaaaaGGG | 149_1 | 20653 |
| 150 | attacgctgaggaca | 1-10-4 | AttacgctgagGACA | 150_1 | 21489 |
| 151 | cattacgctgaggac | 4-9-2 | CATTacgctgaggAC | 151_1 | 21490 |
| 152 | cttgagcattacgc | 3-8-3 | CTTgagcattaCGC | 152_1 | 21497 |
| 153 | cgaggagaagaaggcag | 3-12-2 | CGAggagaagaaggcAG | 153_1 | 22019 |
| 153 | cgaggagaagaaggcag | 2-11-4 | CGaggagaagaagGCAG | 153_2 | 22019 |
| 154 | ccttggtctgaaacgtgat | 1-15-3 | CcttggtctgaaacgtGAT | 154_1 | 22071 |
| 155 | ctaacgcctccacgc | 1-12-2 | CtaacgcctccaCGC | 155_1 | 22281 |
| 156 | ggacaggctctacgg | 1-11-3 | GgacaggctctaCGG | 156_1 | 22312 |
| 157 | actaatacagcaggagaagg | 2-16-2 | ACtaatacagcaggagaaGG | 157_1 | 22964 |
| 158 | aactaatacagcaggagaagg | 1-16-4 | AactaatacagcaggaAAGG | 158_1 | 22964 |
| 158 | aactaatacagcaggagaagg | 1-17-3 | AactaatacagcaggagAGG | 158_2 | 22964 |
| 159 | taactaatacagcaggagaag | 1-16-4 | TaactaatacagcaggaGAAG | 159_1 | 22965 |
| 160 | ttgaagagccaaccac | 1-11-4 | TtgaagagccaaCCAC | 160_1 | 24131 |
| 161 | ccattttcactgtcaag | 3-12-2 | CCAttttcactgtcaAG | 161_1 | 25605 |
| 162 | gccattttcactgtcaa | 2-12-3 | GCcattttcactgtCAA | 162_1 | 25606 |
| 163 | agaaatgcgagaagc | 2-10-4 | AGaaatgcgagAAGC | 163_1 | 25796 |
| 164 | aaatggaaaaaatgaccagc | 2-14-4 | AAatggaaaaaatgacCAGC | 164_1 | 26188 |
| 165 | aggacttacgacaaaaccac | 1-15-4 | AggacttacgacaaaaCCAC | 165_1 | 26505 |
| 166 | ggacttacgacaaaacca | 2-13-3 | GGacttacgacaaaaCCA | 166_1 | 26506 |
| 167 | gacttacgacaaaacca | 3-11-3 | GACttacgacaaaaCCA | 167_1 | 26506 |
| 168 | acaccaggacttacgaca | 1-14-3 | AcaccaggacttacgACA | 168_1 | 26512 |
| 169 | tagaaattcaacatggc | 1-12-4 | TagaaattcaacaTGGC | 169_1 | 27376 |
| 169 | tagaaattcaacatggc | 4-11-2 | TAGAaattcaacatgGC | 169_2 | 27376 |
| 169 | tagaaattcaacatggc | 2-12-3 | TAgaaattcaacatGGC | 169_3 | 27376 |
| 170 | ctagaaattcaacatggc | 2-13-3 | CTagaaattcaacatGGC | 170_1 | 27376 |
| 171 | gtcatcggttcacc | 1-9-4 | GtcatcggtTCACC | 171_1 | 27602 |
| 172 | actcgaagacgcca | 2-8-4 | ACtcgaagacGCCA | 172_1 | 28539 |

TABLE 6-continued list of oligonucleotide motif sequences (indicated by SEQ ID NO), designs of these, as well as specific oligonucleotide compounds (indicated by CMP ID NO) designed based on the motif sequence.

| SEQ ID NO | Motif sequence | Design | Oligonucleotide Compound | CMP ID NO | Start position on SEQ ID NO: 1 |
|---|---|---|---|---|---|
| 173 | gactcgaagacgcc | 3-9-2 | GACtcgaagacgCC | 173_1 | 28540 |
| 174 | ggcacaagcagaacgac | 2-13-2 | GGcacaagcagaacAC | 174_1 | 29235 |
| 175 | agtcagaacaaaggaggc | 1-15-2 | AgtcagaacaaaggagGC | 175_1 | 29668 |
| 176 | gaagtcagaacaaaggag | 4-12-2 | GAAGtcagaacaaaggAG | 176_1 | 29670 |
| 177 | gcagaagtcagaacaaagg | 1-14-4 | GcagaagtcagaacaAAGG | 177_1 | 29672 |
| 178 | gtgcagaagtcagaacaaa | 3-13-3 | GTGcagaagtcagaacAAA | 178_1 | 29674 |
| 178 | gtgcagaagtcagaacaaa | 3-14-2 | GTGcagaagtcagaacaAA | 178_2 | 29674 |
| 179 | gtgcagaagtcagaacaa | 3-13-2 | GTGcagaagtcagaacAA | 179_1 | 29675 |
| 180 | aaggatgagggagcggac | 1-14-3 | AaggatgagggagcGAC | 180_1 | 29894 |
| 181 | gtaaggatgagggagc | 2-12-2 | GTaaggatgagggaGC | 181_1 | 29898 |
| 182 | tggtaaggatgagggag | 1-12-4 | TggtaaggatgagGGAG | 182_1 | 29899 |
| 183 | cgtacatctgcatctc | 2-10-4 | CGtacatctgcaTCTC | 183_1 | 29951 |
| 184 | tgtaagataagaggcaacact | 1-18-2 | TgtaagataagaggcaacaCT | 184_1 | 30947 |
| 185 | ttgtaagataagaggcaacac | 1-17-3 | TtgtaagataagaggcaaCAC | 185_1 | 30948 |
| 186 | ttgtaagataagaggcaaca | 2-14-4 | TTgtaagataagaggcAACA | 186_1 | 30949 |
| 187 | tttgtaagataagaggcaaca | 2-17-2 | TTtgtaagataagaggcaaCA | 187_1 | 30949 |
| 188 | tgtaagataagaggcaa | 2-11-4 | TGtaagataagagGCAA | 188_1 | 30951 |
| 189 | ctggaaggaaagttggt | 2-12-3 | CTggaaggaaagttGGT | 189_1 | 31229 |
| 190 | atagtaagcactgatggtc | 3-14-2 | ATAgtaagcactgatggTC | 190_1 | 31245 |
| 190 | atagtaagcactgatggtc | 1-14-4 | AtagtaagcactgatGGTC | 190_2 | 31245 |
| 191 | tagtaagcactgatgg | 2-11-3 | TAgtaagcactgaTGG | 191_1 | 31247 |
| 192 | catagtaagcactgatg | 3-12-2 | CATagtaagcactgaTG | 192_1 | 31248 |
| 192 | catagtaagcactgatg | 2-11-4 | CAtagtaagcactGATG | 192_2 | 31248 |
| 193 | ctgtaactcacctggc | 1-13-2 | CtgtaactcacctgGC | 193_1 | 31835 |
| 193 | ctgtaactcacctggc | 2-12-2 | CTgtaactcacctgGC | 193_2 | 31835 |
| 194 | cggatcactcgcccg | 1-12-2 | CggatcactcgccCG | 194_1 | 32000 |
| 195 | acacaggctactctcgg | 1-14-2 | AcacaggctactctGG | 195_1 | 33017 |
| 196 | acacaggctactctcg | 3-10-3 | ACAcaggctactcTCG | 196_1 | 33018 |
| 197 | ccacacaggctactc | 1-14-2 | CcacacaggctacTC | 197_1 | 33021 |
| 198 | atactccacacaggct | 1-15-2 | AtactccacacaggCT | 198_1 | 33025 |
| 199 | atactccacacaggc | 1-14-2 | AtactccacacagGC | 199_1 | 33026 |
| 200 | gctcatactccacacacag | 1-16-2 | GctcatactccacacacAG | 200_1 | 33028 |
| 201 | tcatactccacacacag | 2-11-4 | TCatactccacaACAG | 201_1 | 33028 |
| 201 | tcatactccacacacag | 2-13-2 | TCatactccacacacAG | 201_2 | 33028 |
| 202 | gctcatactccacacaca | 1-14-3 | GctcatactccacacACA | 202_1 | 33029 |
| 202 | gctcatactccacacaca | 1-15-2 | GctcatactccacacaCA | 202_2 | 33029 |

TABLE 6-continued list of oligonucleotide motif sequences (indicated by SEQ ID NO),
designs of these, as well as specific oligonucleotide compounds
(indicated by CMP ID NO) designed based on the motif sequence.

| SEQ ID NO | Motif sequence | Design | Oligonucleotide Compound | CMP ID NO | Start position on SEQ ID NO: 1 |
|---|---|---|---|---|---|
| 203 | tgctcatactccacacac | 1-14-3 | TgctcatactccacaCAC | 203_1 | 33030 |
| 203 | tgctcatactccacacac | 1-15-2 | TgctcatactccacacAC | 203_2 | 33030 |
| 203 | tgctcatactccacacac | 2-14-2 | TGctcatactccacacAC | 203_3 | 33030 |
| 204 | agcaggaagcagggagaaa | 2-15-2 | AGcaggaagcagggagaAA | 204_1 | 33562 |
| 205 | tccgaccacagcgag | 2-11-2 | TCcgaccacagcgAG | 205_1 | 33681 |
| 206 | cagaagccaagggacatg | 1-14-3 | CagaagccaagggacATG | 206_1 | 34432 |
| 206 | cagaagccaagggacatg | 2-14-2 | CAgaagccaagggacaTG | 206_2 | 34432 |
| 207 | cagaagccaagggacat | 2-12-3 | CAgaagccaagggaCAT | 207_1 | 34433 |
| 208 | ccagaccaacacggaaacg | 1-14-4 | CcagaccaacacggaAACG | 208_1 | 34571 |
| 209 | ccagaccaacacggaaac | 2-12-4 | CCagaccaacacggAAAC | 209_1 | 34572 |
| 210 | gaatgggcaaagggtaga | 4-12-2 | GAATgggcaaagggtaGA | 210_1 | 34742 |
| 211 | aatgggcaaagggtaga | 2-12-3 | AAtgggcaaagggtAGA | 211_1 | 34742 |
| 210 | gaatgggcaaagggtaga | 2-14-2 | GAatgggcaaagggtaGA | 210_2 | 34742 |
| 212 | gaatgggcaaagggtag | 2-12-3 | GAatgggcaaagggTAG | 212_1 | 34743 |
| 213 | gaacccttgtagtcctg | 1-14-2 | GaacccttgtagtccTG | 213_1 | 35101 |
| 214 | aacccttgtagtcct | 4-9-2 | AACCcttgtagtcCT | 214_1 | 35102 |
| 215 | ggaacccttgtagtc | 2-11-2 | GGaacccttgtagTC | 215_1 | 35104 |
| 216 | atcggaacccttgtagtc | 2-14-2 | ATcggaacccttgtagTC | 216_1 | 35104 |
| 216 | atcggaacccttgtagtc | 1-15-2 | AtcggaacccttgtagTC | 216_2 | 35104 |
| 217 | catcggaacccttgtagtc | 1-16-2 | CatcggaacccttgtagTC | 217_1 | 35104 |
| 218 | catcggaacccttgtagt | 2-14-2 | CAtcggaacccttgtaGT | 218_1 | 35105 |
| 219 | gatacagacctcctcaaact | 1-17-2 | GatacagacctcctcaaaCT | 219_1 | 35370 |
| 220 | gatacagacctcctcaaac | 2-14-3 | GAtacagacctcctcaAAC | 220_1 | 35371 |
| 221 | gatacagacctcctcaaa | 2-13-3 | GAtacagacctcctcAAA | 221_1 | 35372 |
| 221 | gatacagacctcctcaaa | 2-12-4 | GAtacagacctcctCAAA | 221_2 | 35372 |
| 221 | gatacagacctcctcaaa | 1-13-4 | GatacagacctcctCAAA | 221_3 | 35372 |
| 222 | gatacagacctcctcaa | 2-11-4 | GAtacagacctccTCAA | 222_1 | 35373 |
| 222 | gatacagacctcctcaa | 1-13-3 | GatacagacctcctCAA | 222_2 | 35373 |
| 223 | gccccatttaccagtg | 1-13-2 | GccccatttaccagTG | 223_1 | 35470 |
| 224 | cccaacaagtgatgct | 2-12-2 | CCcaacaagtgatgCT | 224_1 | 35965 |
| 225 | cccaacaagtgatgc | 2-11-2 | CCcaacaagtgatGC | 225_1 | 35966 |
| 226 | gtaccaagcccagaagg | 1-14-2 | GtaccaagcccagaaGG | 226_1 | 36279 |
| 227 | gtaccaagcccagaag | 1-11-4 | GtaccaagcccaGAAG | 227_1 | 36280 |
| 228 | ttcctgatgaagagatg | 4-11-2 | TTCCtgatgaagagaTG | 228_1 | 36549 |
| 229 | tcctgatgaagagatg | 2-10-4 | TCctgatgaagaGATG | 229_1 | 36549 |

TABLE 6-continued list of oligonucleotide motif sequences (indicated by SEQ ID NO), designs of these, as well as specific oligonucleotide compounds (indicated by CMP ID NO) designed based on the motif sequence.

| SEQ ID NO | Motif sequence | Design | Oligonucleotide Compound | CMP ID NO | Start position on SEQ ID NO: 1 |
|---|---|---|---|---|---|
| 229 | tcctgatgaagagatg | 3-11-2 | TCCtgatgaagagaTG | 229_2 | 36549 |
| 230 | tgggagtagcatggc | 2-11-2 | TGggagtagcatgGC | 230_1 | 36911 |
| 231 | tgtgggagtagcatggc | 1-14-2 | TgtgggagtagcatgGC | 231_1 | 36911 |
| 232 | gtgggagtagcatggc | 1-13-2 | GtgggagtagcatgGC | 232_1 | 36911 |
| 230 | tgggagtagcatggc | 1-11-3 | TgggagtagcatGGC | 230_2 | 36911 |
| 233 | aaacatgctgaaccctg | 2-11-4 | AAacatgctgaacCCTG | 233_1 | 37254 |
| 234 | acaaacatgctgaaccct | 2-13-3 | ACaaacatgctgaacCCT | 234_1 | 37255 |
| 234 | acaaacatgctgaaccct | 1-14-3 | AcaaacatgctgaacCCT | 234_2 | 37255 |
| 234 | acaaacatgctgaaccct | 3-13-2 | ACAaacatgctgaaccCT | 234_3 | 37255 |
| 235 | cacaaacatgctgaaccc | 2-14-2 | CAcaaacatgctgaacCC | 235_1 | 37256 |
| 236 | cacaaacatgctgaacc | 2-12-3 | CAcaaacatgctgaACC | 236_1 | 37257 |
| 237 | tggacgcacaaacatgc | 1-12-4 | TggaegcacaaacATGC | 237_1 | 37263 |

Motif sequences represent the contiguous sequence of nucleobases present in the oligonucleotide.

Designs refer to the gapmer design, F-G-F', where each number represents the number of consecutive modified nucleosides, e.g 2' modified nucleosides (first number=5' flank), followed by the number of DNA nucleosides (second number=gap region), followed by the number of modified nucleosides, e.g 2' modified nucleosides (third number=3' flank), optionally preceded by or followed by further repeated regions of DNA and LNA, which are not necessarily part of the contiguous sequence that is complementary to the target nucleic acid.

Oligonucleotide compounds represent specific designs of a motif sequence. Capital letters represent beta-D-oxy LNA nucleosides, lowercase letters represent DNA nucleosides, all LNA C are 5-methyl cytosine and 5-methyl DNA cytosines are presented by "e", and all internucleoside linkages are phosphorothioate internucleoside linkages.

Oligonucleotide Synthesis

Oligonucleotide synthesis is generally known in the art. Below is a protocol which may be applied. The oligonucleotides of the present invention may have been produced by slightly varying methods in terms of apparatus, support and concentrations used.

Oligonucleotides are synthesized on uridine universal supports using the phosphoramidite approach on an Oligomaker 48 at 1 µmol scale. At the end of the synthesis, the oligonucleotides are cleaved from the solid support using aqueous ammonia for 5-16 hours at 60° C. The oligonucleotides are purified by reverse phase HPLC (RP-HPLC) or by solid phase extractions and characterized by UPLC, and the molecular mass is further confirmed by ESI-MS.

Elongation of the Oligonucleotide:

The coupling of β-cyanoethyl-phosphoramidites (DNA-A(Bz), DNA-G(ibu), DNA-C(Bz), DNA-T, LNA-5-methyl-C(Bz), LNA-A(Bz), LNA-G(dmf), or LNA-T) is performed by using a solution of 0.1 M of the 5'-O-DMT-protected amidite in acetonitrile and DCI (4,5-dicyanoimidazole) in acetonitrile (0.25 M) as activator. For the final cycle a phosphoramidite with desired modifications can be used, e.g. a C6 linker for attaching a conjugate group or a conjugate group as such. Thiolation for introduction of phosphorthioate linkages is carried out by using xanthane hydride (0.01 M in acetonitrile/pyridine 9:1). Phosphordiester linkages can be introduced using 0.02 M iodine in THF/Pyridine/water 7:2:1. The rest of the reagents are the ones typically used for oligonucleotide synthesis.

For post solid phase synthesis conjugation a commercially available C6 aminolinker phorphoramidite can be used in the last cycle of the solid phase synthesis and after deprotection and cleavage from the solid support the aminolinked deprotected oligonucleotide is isolated. The conjugates are introduced via activation of the functional group using standard synthesis methods.

Purification by RP-HPLC:

The crude compounds are purified by preparative RP-HPLC on a Phenomenex Jupiter C18 10µ 150×10 mm column. 0.1 M ammonium acetate pH 8 and acetonitrile is used as buffers at a flow rate of 5 mL/min. The collected fractions are lyophilized to give the purified compound typically as a white solid.

Abbreviations

DCI: 4,5-Dicyanoimidazole
DCM: Dichloromethane
DMF: Dimethylformamide
DMT: 4,4'-Dimethoxytrityl
THF: Tetrahydrofurane
Bz: Benzoyl
Ibu: Isobutyryl
RP-HPLC: Reverse phase high performance liquid chromatography $T_m$ Assay:

Oligonucleotide and RNA target (phosphate linked, PO) duplexes are diluted to 3 mM in 500 ml RNase-free water and mixed with 500 ml 2×$T_m$-buffer (200 mM NaCl, 0.2 mM EDTA, 20 mM Naphosphate, pH 7.0). The solution is heated to 95° C. for 3 min and then allowed to anneal in room temperature for 30 min. The duplex melting temperatures ($T_m$) is measured on a Lambda 40 UV/VIS Spectrophotometer equipped with a Peltier temperature programmer PTP6 using PE Templab software (Perkin Elmer). The temperature is ramped up from 20° C. to 95° C. and then down to 25° C., recording absorption at 260 nm. First derivative and the local maximums of both the melting and annealing are used to assess the duplex $T_m$.

clonal growth medium (dHCGM). dHCGM is a DMEM medium containing 100 U/ml Penicillin, 100 µg/ml Streptomycin, 20 mM Hepes, 44 mM NaHC03, 15 µg/ml L-proline, 0.25 µg/ml insulin, 50 nM Dexamethazone, 5 ng/ml EGF, 0.1 mM Asc-2P, 2% DMSO and 10% FBS (Ishida et al., 2015). Cells were cultured at 37° C. incubator in a humidified atmosphere with 5% C02. Culture medium was replaced 24 h post-plating and every 2 days until harvest.

Primary Human Hepatocytes (PXB-PHH)

Fresh primary human hepatocytes (PXB-PHH) harvested from humanized mice (uPA/SCID mice)—herein called PHH—were obtained from PhoenixBio Co., Ltd (Japan). Cells were seeded on a collagen 1-coated plate at the following cell density: 35,000 cells/well (384-well), 70,000 cells/well (96-well), or, 400,000 cells/well (24-well) in modified hepatocyte clonal growth medium (dHCGM). dHCGM is a DMEM medium containing 100 U/ml Penicillin, 100 µg/ml Streptomycin, 20 mM Hepes, 44 mM NaHC03, 15 µg/ml L-proline, 0.25 µg/ml insulin, 50 nM Dexamethazone, 5 ng/ml EGF, 0.1 mM Asc-2P, 2% DMSO and 10% FBS (Ishida et al., 2015). Cells were cultured at 37° C. incubator in a humidified atmosphere with 5% C02. Culture medium was replaced 24 h post-plating and every 2 days until harvest.

HBV Infection and Oligonucleotide Treatment

PHH were incubated with HBV (purified from CHB individuals) at multiplicity of infection (MOI) of 40 together with 4% PEG for 24 hr; virus inoculum was removed the following day. To allow for cccDNA establishment compound treatment in PHH was started at day 3 post HBV infection. Fresh oligonucleotide dissolved in medium was replenished every 2 days (example 1) or fresh oligonucleotide on day 3, 5, 7 and 9 and after that medium was replenished every 2 days (example 2) until cells were harvested at day 19.

HBV Antigen Measurements

To evaluate the impact on HBV antigen expression and secretion, supernatants were collected on Day 19. The HBV propagation parameters, HBsAg and HBeAg levels, were measured using CLIA ELISA Kits (Autobio Diagnostic #CL0310-2, #CL0312-2), according to the manufacturer's protocol. Briefly, 25 µL of supernatant per well were transferred to the respective antibody coated microtiter plate and 25 µL of enzyme conjugate reagent were added. The plate was incubated for 60 min on a shaker at room temperature before the wells were washed five times with washing buffer using an automatic washer. 25 µL of substrate A and B were added to each well. The plates were incubated on a shaker for 10 min at room temperature before luminescence was measured using an Envision luminescence reader (Perkin Elmer).

CCK8 Cellular Toxicity Measurements

To evaluate the impact of cellular toxicity upon treatment of oligonucleotide, cells were treated as described in HBV infection and oligonucleotide treatment and at Day 18, PHH were pre-incubated for 24 hours at 37° C. incubator in a humidified atmosphere with 5% $CO_2$. 10 ul of CCK-8 solution was added to 100 ul in each well of a 96 well plate and incubated for 1-4 hours. Absorbance at 450 nM using a microplate reader (Tecan) was measured for each plate and values are calculated as % of control (untreated cells).

Real-Time PCR for Intracellular HBV pgRNA and RTEL1 RNA mRNA was extracted from the cells using a Qiagen BioRobot Universal System and the RNeasy 96 well Extraction Plates (RNeasy 96 BioRobot 8000 Kit (12)/Cat No./ID: 967152) according to the manufacturer's protocol. The relative HBV and cellular mRNA expression levels were analyzed using Real-time PCR on the ABI QuantStudio 12 k Flex.

Beta-actin (ACT B) and HBV pgRNA were quantified by qPCR using TaqMan Fast Advanced Master Mix (Life Technologies, cat no. 4444558) in technical triplicates. Results were normalized over the human ACT B endogenous control. The mRNA expression was analyzed using the comparative cycle threshold 2-ΔΔCt method normalized to the reference gene ACT B and to non-transfected cells. Primers used for ACTB RNA and HBV pgRNA quantification are listed in table 7.

TABLE 7

ACT B and HBV pgRNA qPCR primers

| Parameter | Direction | Primer Sequence | Seq ID No |
|---|---|---|---|
| HBV pgRNA | Fwd | 5'-GGAGTGTGGAT TCGCACTCCT-3' | 238 |
|  | Rev | 5'-AGATTGAGATC TTCTGCGAC-3' | 239 |
|  | Probe | [6FAM]-AGGCAGG TCCCCTAGAAGAA GAACTCC-[BHQ1] | 240 |
| RTEL1 | Fwd | 5'-CCATCCTGGAC ATTGAGGACT-3' | 241 |
|  | Rev | 5'-CAGGTTCCGGG ACAGGTAGTA-3' | 242 |
| Housekeeping gene primers ACT B (VIC): Hs01060665_g1 (Thermo Fisher Scientific) | | | |

HBV cccDNA Quantification

DNA was extracted from HBV infected Primary Human Hepatocytes using an SDS Lysis Buffer and purified using the ZymoResearch Genomic DNA Clean & Concentrator kit (ZymoResearch, cat no. D4067) protocol. cccDNA levels were determined after digestion with T5 exonuclease (New England Biolabs, MA, USA) using 10 U of T5 for 500 ng of DNA, 1 hour at 37° C. in 20 ul total volume. After digestion, the samples were diluted to 50 ul of which 4 ul were used for the qPCR reaction. The mRNA expression was analyzed using the comparative cycle threshold 2-ΔΔCt method normalized to the reference gene mitochondrial DNA and to non-transfected cells. Quantitative real-time polymerase chain reaction measurements were performed on the QuantStudio 12K Flex PCR System (Applied Biosystems). qPCR was performed with the Fast SYBR™ Green Master Mix (Life Technologies, Cat. No 4385612). Primer are shown in table 8.

TABLE 8 cccDNA qPCR primers.

| Parameter | Direction | Primer Sequence | Seq ID No |
|---|---|---|---|
| cccDNA | Fwd | 5'-CGTCTGTGCCT TCTCATCTGC-3' | 243 |
|  | Rev | 5'-GCACAGCTTGG AGGCTTGAA-3' | 244 |
| mitochondrial DNA | Fwd | 5'-CCGTCTGAACT ATCCTGCCC-3' | 245 |
|  | Rev | 5'-GCCGTAGTCGG TGTACTCGT-3' | 246 | tions; one for RTEL1 mRNA and pgRNA measurements using one lysis buffer and one for cccDNA measurements using another lysis buffers as described in Materials and Methods. All values are shown in Table 9 as % of control (untreated cells) i.e. for RTEL1 mRNA, cccDNA and pgRNA the lower the value the larger the inhibition.

CCK8 cellular toxicity was measured as described in the Materials and Methods section to confirm that any reduction in the viral parameters is not the cause of cell death, the closer the value is to 100% the lower the toxicity. The results are shown in table 9.

TABLE 9

RTEL1 mediated cccDNA degradation and inhibition of downstream products

| Comp ID NO | % CCK8 of Control | | % RTEL1 of Control | | % cccDNA of Control | | % pgRNA of Control | | % HBsAg of Control | | % HBeAg of Control | |
|---|---|---|---|---|---|---|---|---|---|---|---|---|
|  | Mean | SD | Mean | SD | Mean | SD | Mean | SD | Mean | SD | Mean | SD |
| 22_1 | 93 | 10 | 68 | 12 | 19 | 4 | 55 | 9 | 60 | 48 | 32 | 28 |
| 23_1 | 98 | 7 | 40 | 1 | 46 | 15 | 57 | 18 | 113 | 5 | 140 | 14 |
| 24_1 | 100 | 2 | 9 | 1 | 37 | 13 | 52 | 12 | 106 | 5 | 110 | 24 |
| 25_1 | 99 | 5 | 14 | 0 | 69 | 15 | 57 | 8 | 99 | 16 | 54 | 10 |
| 26_1 | 95 | 4 | 3 | 1 | 38 | 12 | 44 | 3 | 78 | 2 | 74 | 12 |
| 27_1 | 84 | 2 | 4 | 1 | 45 | 16 | 31 | 15 | 106 | 7 | 79 | 8 |
| 28_1 | 92 | 0 | 31 | 14 | 35 | 37 | 7 | 3 | 4 | 0 | 27 | 25 |
| 29_1 | 89 | 7 | 33 | 4 | 24 | 6 | 80 | 15 | 81 | 3 | 54 | 4 |
| 32_1 | 115 | 9 | 25 | 3 | 22 | 3 | 104 | 14 | 100 | 6 | 109 | 14 |
| 35_1 | 97 | 6 | 4 | 1 | 27 | 0 | 115 | 24 | 80 | 5 | 76 | 7 |
| 36_1 | 96 | 7 | 14 | 1 | 43 | 18 | 129 | 35 | 102 | 15 | 91 | 27 |
| 37_1 | 103 | 14 | 8 | 4 | 27 | 11 | 127 | 41 | 91 | 4 | 90 | 9 |
| 38_1 | 107 | 6 | 14 | 3 | 47 | 11 | 129 | 12 | 123 | 5 | 141 | 10 |
| 39_1 | 107 | 13 | 29 | 1 | 26 | 10 | 107 | 61 | 124 | 4 | 112 | 30 |
| 40_1 | 101 | 2 | 48 | 33 | 19 | 5 | 29 | 4 | 94 | 13 | 88 | 19 |
| 41_1 | 112 | 15 | 31 | 9 | 42 | 16 | 129 | 18 | 134 | 31 | 79 | 37 |
| 42_1 | 100 | 1 | 27 | 4 | 17 | 19 | 72 | 13 | 15 | 13 | 22 | 0 |
| 42_2 | 94 | 6 | 23 | 4 | 6 | 4 | 76 | 8 | 30 | 2 | 26 | 1 |
| 42_3 | 100 | 1 | 29 | 5 | 30 | 13 | 78 | 12 | 22 | 5 | 21 | 4 |
| 43_1 | 97 | 1 | 34 | 12 | 8 | 5 | 66 | 3 | 78 | 6 | 49 | 9 |
| 43_2 | 121 | 17 | 48 | 5 | 26 | 4 | 70 | 10 | 95 | 27 | 98 | 36 |
| 46_1 | 124 | 13 | 21 | 4 | 37 | 17 | 130 | 11 | 102 | 3 | 74 | 9 |
| 49_1 | 96 | 9 | 57 | 14 | 36 | 23 | 30 | 10 | 10 | 2 | 15 | 2 |

*RTEL1 and HBV pgRNA is normalized to housekeeping gene.

Example 1: Effect of Antisense Oligonucleotides Targeting RTEL1 on HBV Parameters in HBV Infected PHH In the following experiment, the effect of RTEL1 knockdown on the HBV parameters, HBsAg, HBeAg, HBV pgRNA and cccDNA, were tested using the oligonucleotide compounds in table 6.

PHH were cultured as described in the Materials and Methods section. The cells were dosed at a final oligonucleotide concentration of 10 μM dissolved in dHCGM Medium at Day 3 post HBV infection with a final culture volume of 100 μl/well. The experiment was performed in biological triplicate and cells were harvested at Day 19 post HBV infection replenishing oligonucleotide every 2 days. According to Materials and Methods, cellular toxicity was determined using CCK8, supernatant was collected to measure HBsAg and HBeAg and cells were harvested in two frac- All the tested antisense oligonucleotides targeting RTEL1 display target knockdown and HBV antiviral efficacy at a single time point of measurement against at least one of the parameters cccDNA, pgRNA, HBsAg and HBeAg with no observed cellular toxicity measured by CCK8.

Example 2: Additional Oligonucleotide Library Targeting RTEL1 Tested for Effect on cccDNA in Infected PHH In the following experiment an additional library of 236 oligonucleotides targeting across the RTEL1 transcript was generated, shown in table 6 as CMP ID NO: 50_1 to 237_1. The ability to reduce RTEL1 as well as cccDNA, was tested.

PHH were cultured as described in the Materials and Methods section. The cells were dosed at a final oligonucleotide concentration of 10 μM dissolved in dHCGM Medium at Day 3. 5. 7 and 9 post HBV infection with a final culture volume of 100 μl/well. The experiment was performed in biological triplicate and cells were harvested at Day 19 post HBV infection with replenishing medium every 2 days until day 19.

According to Materials and Methods, cells were harvested in two fractions; one for RTEL1 mRNA using one lysis buffer and one for cccDNA measurements using another lysis buffers as described in Materials and Methods. All values are shown in Table 10 as % of control (untreated cells) i.e. for RTEL1 mRNA and cccDNA the lower the value the larger the inhibition/reduction.

TABLE 10

RTEL1 reduction and cccDNA degradation following oligonucleotide treatment

| Comp ID NO | % RTEL1 of Control Mean | SD | % cccDNA of Control Mean | SD |
|---|---|---|---|---|
| 50_1 | 7.01 | 1.47 | 91.93 | 53.33 |
| 51_1 | 23.34 | 5.14 | 91.90 | 100.79 |
| 52_1 | 4.97 | 3.32 | 73.18 | 18.65 |
| 53_1 | 74.82 | 16.01 | 52.34 | 6.08 |
| 54_1 | 23.96 | 11.87 | 84.18 | 48.67 |
| 55_1 | 35.59 | 7.17 | 93.69 | 8.65 |
| 56_1 | 78.85 | 7.76 | 79.38 | 6.37 |
| 57_1 | 43.89 | 3.45 | 56.65 | 21.45 |
| 57_2 | 33.43 | 20.36 | 53.42 | 24.96 |
| 58_1 | 23.10 | 3.28 | 55.61 | 24.65 |
| 59_1 | 84.74 | 22.73 | 83.30 | 8.28 |
| 60_1 | 64.90 | 34.31 | 51.76 | 9.74 |
| 61_1 | 40.04 | 6.27 | 105.58 | 36.39 |
| 62_1 | 48.58 | 7.48 | 69.29 | 5.28 |
| 63_1 | 12.26 | 1.26 | 104.61 | 34.95 |
| 64_1 | 9.23 | 5.14 | 101.03 | 20.54 |
| 65_1 | 44.85 | 17.33 | 101.27 | 9.05 |
| 66_1 | 69.93 | 1.72 | 57.89 | 17.40 |
| 66_2 | 68.17 | 6.74 | 86.07 | 8.18 |
| 67_1 | 34.99 | 34.99 | 56.88 | 31.24 |
| 68_1 | 49.49 | 15.69 | 108.68 | 37.37 |
| 68_2 | 68.22 | 14.89 | 100.98 | 74.61 |
| 69_1 | 86.75 | 3.21 | 96.31 | 6.98 |
| 70_1 | 30.76 | 11.20 | 105.62 | 22.24 |
| 71_1 | 41.40 | 9.03 | 77.41 | 55.10 |
| 72_1 | 42.31 | 3.14 | 84.91 | 30.20 |
| 73_1 | 56.43 | 2.53 | 52.43 | 7.92 |
| 74_1 | 62.53 | 11.46 | 63.20 | 10.15 |
| 75_1 | 27.73 | 0.03 | 54.09 | 8.64 |
| 76_1 | 68.10 | 16.93 | 60.01 | 41.58 |
| 77_1 | 25.25 | 8.17 | 97.07 | 11.51 |
| 78_1 | 24.30 | 4.02 | 57.29 | 3.26 |
| 79_1 | 34.02 | 5.55 | 52.04 | 8.90 |
| 80_1 | 64.76 | 6.15 | 92.09 | 8.09 |
| 80_2 | 100.95 | 0.38 | 91.57 | 16.17 |
| 81_1 | 14.80 | 0.00 | 61.33 | 9.38 |
| 82_1 | 7.11 | 1.75 | 54.70 | 15.77 |
| 82_2 | 9.81 | 1.64 | 58.75 | 1.67 |
| 83_1 | 36.85 | 0.00 | 69.70 | 7.20 |
| 83_2 | 8.21 | 4.88 | 66.53 | 7.60 |
| 84_1 | 62.48 | 11.67 | 93.31 | 8.13 |
| 85_1 | 44.09 | 9.50 | 61.00 | 9.51 |
| 85_2 | 46.72 | 4.15 | 97.36 | 24.50 |
| 86_1 | 80.90 | 31.21 | 51.63 | 23.28 |
| 86_2 | 78.93 | 4.86 | 79.87 | 49.47 |
| 87_1 | 26.46 | 3.80 | 58.61 | 6.02 |
| 88_1 | 19.44 | 0.42 | 80.75 | 14.07 |
| 89_1 | 86.51 | 25.84 | 58.06 | 27.75 |
| 90_1 | 58.49 | 9.86 | 97.93 | 30.79 |
| 91_1 | 90.34 | 8.97 | 70.59 | 11.83 |
| 92_1 | 53.35 | 13.77 | 92.14 | 13.18 |
| 93_1 | 86.17 | 18.80 | 68.78 | 12.94 |
| 94_1 | 82.51 | 34.51 | 74.00 | 6.73 |
| 95_1 | 28.32 | 13.87 | 81.77 | 0.96 |
| 95_2 | 31.64 | 0.23 | 54.23 | 0.02 |
| 96_1 | 65.92 | 43.39 | 90.65 | 44.78 |
| 97_1 | 67.17 | 19.66 | 91.10 | 45.98 |
| 98_1 | 20.59 | 11.95 | 70.09 | 7.77 |
| 99_1 | 45.17 | 11.96 | 81.29 | 17.73 |
| 100_1 | 17.96 | 8.21 | 72.67 | 33.48 |
| 101_1 | 17.68 | 4.56 | 59.25 | 15.63 |
| 102_1 | 21.78 | 7.52 | 56.99 | 3.77 |
| 103_1 | 19.65 | 2.57 | 97.02 | 4.67 |
| 104_1 | 46.82 | 22.92 | 55.25 | 3.33 |
| 105_1 | 27.66 | 3.21 | 72.99 | 3.87 |
| 105_2 | 48.60 | 13.68 | 83.37 | 14.25 |
| 106_1 | 29.66 | 11.05 | 102.77 | 23.24 |
| 106_2 | 56.28 | 1.60 | 50.25 | 12.84 |
| 107_1 | 47.82 | 18.86 | 57.44 | 34.75 |
| 108_1 | 26.06 | 6.57 | 53.90 | 14.97 |
| 108_2 | 9.75 | 2.24 | 59.30 | 0.53 |
| 108_3 | 51.83 | 0.77 | 69.13 | 12.27 |
| 109_1 | 5.91 | 2.61 | 52.52 | 12.19 |
| 109_2 | 6.37 | 1.45 | 68.41 | 17.92 |
| 110_1 | 11.12 | 1.90 | 71.58 | 47.02 |
| 111_1 | 84.19 | 10.48 | 55.32 | 2.17 |
| 112_1 | 41.08 | 12.50 | 52.72 | 6.13 |
| 113_1 | 100.00 | 0.00 | 78.91 | 6.77 |
| 114_1 | 99.08 | 41.68 | 57.06 | 6.19 |
| 115_1 | 25.63 | 22.23 | 72.30 | 60.35 |
| 116_1 | 87.50 | 1.46 | 108.23 | 75.62 |
| 116_2 | 83.18 | 0.17 | 105.88 | 5.43 |
| 117_1 | 76.07 | 4.23 | 67.01 | 6.43 |
| 117_2 | 109.05 | 3.40 | 108.67 | 30.57 |
| 117_3 | 93.69 | 11.88 | 76.35 | 2.30 |
| 118_1 | 46.05 | 10.08 | 72.32 | 8.58 |
| 119_1 | 54.19 | 20.46 | 90.03 | 4.64 |
| 120_1 | 29.75 | 11.69 | 90.50 | 26.06 |
| 120_2 | 47.34 | 0.97 | 101.98 | 12.10 |
| 121_1 | 34.63 | 9.13 | 103.04 | 31.21 |
| 122_1 | 23.84 | 3.45 | 60.00 | 1.08 |
| 122_2 | 49.03 | 3.58 | 57.10 | 15.69 |
| 123_1 | 87.91 | 14.47 | 80.61 | 3.32 |
| 124_1 | 45.34 | 4.29 | 97.91 | 15.74 |
| 125_1 | 65.93 | 8.36 | 82.38 | 1.51 |
| 126_1 | 19.63 | 1.74 | 67.12 | 12.80 |
| 127_1 | 28.07 | 3.10 | 59.52 | 3.75 |
| 128_1 | 46.11 | 9.85 | 89.13 | 11.64 |
| 129_1 | 83.14 | 23.83 | 88.56 | 9.69 |
| 130_1 | 3.01 | 1.73 | 51.18 | 0.78 |
| 131_1 | 5.14 | 1.68 | 106.08 | 38.37 |
| 132_1 | 94.17 | 18.86 | 85.17 | 13.15 |
| 133_1 | 37.12 | 8.11 | 71.11 | 12.56 |
| 134_1 | 19.28 | 5.14 | 68.39 | 8.54 |
| 135_1 | 17.83 | 0.86 | 84.76 | 4.78 |
| 136_1 | 5.76 | 3.37 | 91.47 | 13.69 |
| 137_1 | 91.76 | 19.69 | 89.85 | 32.57 |
| 138_1 | 73.95 | 8.38 | 50.33 | 10.55 |
| 139_1 | 54.46 | 1.17 | 70.90 | 15.24 |
| 139_2 | 52.71 | 12.53 | 52.57 | 17.88 |
| 140_1 | 53.81 | 13.82 | 55.02 | 39.17 |
| 141_1 | 24.70 | 4.90 | 93.03 | 59.35 |
| 142_1 | 19.89 | 3.31 | 54.31 | 2.48 |
| 143_1 | 31.38 | 2.16 | 62.23 | 54.78 |
| 144_1 | 18.80 | 15.78 | 65.31 | 22.34 |
| 145_1 | 42.42 | 4.00 | 65.22 | 31.76 |
| 145_2 | 57.20 | 14.77 | 66.82 | 56.81 |
| 146_1 | 74.65 | 9.52 | 58.95 | 24.13 |
| 147_1 | 109.87 | 31.74 | 71.13 | 40.86 |
| 147_2 | 49.79 | 11.64 | 66.49 | 6.77 |
| 148_1 | 99.53 | 13.20 | 82.39 | 6.25 |
| 149_1 | 63.54 | 1.61 | 58.26 | 12.29 |
| 150_1 | 38.91 | 3.01 | 85.40 | 38.11 |
| 151_1 | 75.08 | 50.61 | 99.88 | 1.35 |
| 152_1 | 36.80 | 3.08 | 53.63 | 9.51 |
| 153_1 | 38.60 | 2.68 | 103.42 | 45.69 |
| 153_2 | 28.05 | 7.82 | 74.47 | 62.74 |
| 154_1 | 41.59 | 7.01 | 77.58 | 12.13 |
| 155_1 | 68.84 | 9.18 | 56.76 | 20.70 |
| 156_1 | 58.21 | 14.18 | 69.70 | 8.08 |
| 157_1 | 70.14 | 24.39 | 58.48 | 4.65 |
| 158_1 | 48.72 | 1.12 | 92.78 | 2.45 |
| 158_2 | 96.47 | 44.09 | 63.51 | 2.33 |
| 159_1 | 69.81 | 9.81 | 63.86 | 5.72 |
| 160_1 | 18.16 | 0.57 | 76.72 | 8.87 |
| 161_1 | 4.70 | 1.81 | 63.24 | 27.23 |

TABLE 10-continued

RTEL1 reduction and cccDNA degradation following oligonucleotide treatment

| Comp ID NO | % RTEL1 of Control Mean | SD | % cccDNA of Control Mean | SD |
|---|---|---|---|---|
| 162_1 | 1.23 | 0.24 | 96.00 | 1.23 |
| 163_1 | 18.96 | 8.11 | 107.22 | 28.58 |
| 164_1 | 20.71 | 8.98 | 100.94 | 10.67 |
| 165_1 | 54.95 | 11.34 | 79.93 | 2.08 |
| 166_1 | 83.13 | 18.00 | 72.36 | 39.67 |
| 167_1 | 105.82 | 73.31 | 69.39 | 13.42 |
| 168_1 | 56.30 | 26.26 | 61.25 | 5.61 |
| 169_1 | 68.48 | 18.97 | 102.59 | 5.31 |
| 169_2 | 40.76 | 10.27 | 71.29 | 13.34 |
| 169_3 | 12.35 | 7.59 | 103.66 | 4.18 |
| 170_1 | 62.45 | 13.28 | 101.40 | 4.46 |
| 171_1 | 48.84 | 14.22 | 56.66 | 4.08 |
| 172_1 | 65.73 | 10.35 | 86.22 | 58.44 |
| 173_1 | 74.87 | 8.18 | 57.84 | 1.98 |
| 174_1 | 32.77 | 6.46 | 65.95 | 17.39 |
| 175_1 | 14.82 | 5.49 | 77.83 | 11.93 |
| 176_1 | 10.54 | 4.41 | 64.33 | 32.00 |
| 177_1 | 9.41 | 2.42 | 60.66 | 6.42 |
| 178_1 | 2.79 | 1.65 | 76.11 | 8.17 |
| 178_2 | 1.61 | 1.09 | 82.07 | 37.30 |
| 179_1 | 2.40 | 0.97 | 100.84 | 2.49 |
| 180_1 | 28.81 | 9.47 | 64.36 | 9.58 |
| 181_1 | 39.34 | 6.66 | 64.81 | 42.15 |
| 182_1 | 40.14 | 7.85 | 50.35 | 5.83 |
| 183_1 | 27.21 | 11.98 | 96.97 | 14.85 |
| 184_1 | 54.48 | 12.67 | 97.69 | 3.13 |
| 185_1 | 97.74 | 21.37 | 57.01 | 9.95 |
| 186_1 | 13.48 | 2.66 | 76.92 | 17.59 |
| 187_1 | 99.48 | 9.54 | 68.99 | 6.50 |
| 188_1 | 4.89 | 1.53 | 75.04 | 5.16 |
| 189_1 | 62.35 | 14.74 | 72.42 | 7.24 |
| 190_1 | 30.13 | 3.34 | 53.95 | 16.62 |
| 190_2 | 70.42 | 8.41 | 57.21 | 7.44 |
| 191_1 | 13.78 | 2.44 | 59.40 | 8.50 |
| 192_1 | 33.66 | 5.65 | 54.13 | 15.57 |
| 192_2 | 52.23 | 12.88 | 81.54 | 6.25 |
| 193_1 | 72.41 | 7.09 | 79.15 | 22.21 |
| 193_2 | 45.71 | 16.85 | 54.47 | 27.40 |
| 194_1 | 27.32 | 14.47 | 76.00 | 7.91 |
| 195_1 | 44.50 | 2.82 | 51.02 | 9.90 |
| 196_1 | 7.35 | 2.01 | 62.45 | 40.44 |
| 197_1 | 60.12 | 8.74 | 59.04 | 23.63 |
| 198_1 | 17.64 | 9.05 | 72.08 | 10.88 |
| 199_1 | 11.67 | 2.87 | 71.46 | 24.06 |
| 200_1 | 22.21 | 1.07 | 105.37 | 3.83 |
| 201_1 | 2.79 | 2.14 | 67.89 | 3.06 |
| 201_2 | 2.14 | 0.14 | 79.46 | 18.07 |
| 202_1 | 8.36 | 1.66 | 81.72 | 3.96 |
| 202_2 | 17.71 | 3.55 | 91.16 | 6.78 |
| 203_1 | 6.91 | 1.51 | 55.95 | 4.33 |
| 203_2 | 10.41 | 6.90 | 75.76 | 2.97 |
| 203_3 | 41.89 | 0.58 | 61.00 | 6.57 |
| 204_1 | 94.01 | 4.50 | 88.29 | 7.73 |
| 205_1 | 13.51 | 5.81 | 109.03 | 20.51 |
| 206_1 | 89.89 | 7.82 | 85.70 | 3.32 |
| 206_2 | 67.36 | 7.93 | 60.55 | 9.50 |
| 207_1 | 23.15 | 9.64 | 60.44 | 29.16 |
| 208_1 | 92.51 | 27.58 | 75.99 | 10.80 |
| 209_1 | 92.08 | 9.26 | 52.56 | 6.76 |
| 210_1 | 12.27 | 6.71 | 76.30 | 31.02 |
| 210_2 | 89.62 | 18.30 | 77.25 | 3.97 |
| 211_1 | 39.78 | 3.92 | 88.22 | 14.53 |
| 212_1 | 36.19 | 2.39 | 56.65 | 14.73 |
| 213_1 | 26.52 | 14.58 | 62.72 | 7.94 |
| 214_1 | 21.32 | 6.14 | 62.15 | 15.02 |
| 215_1 | 22.10 | 3.45 | 97.49 | 19.57 |
| 216_1 | 29.74 | 1.46 | 53.53 | 20.26 |
| 216_2 | 31.17 | 7.18 | 100.84 | 59.55 |
| 217_1 | 36.16 | 21.08 | 73.76 | 5.05 |
| 218_1 | 26.08 | 3.63 | 62.45 | 6.34 |
| 219_1 | 27.98 | 0.88 | 96.57 | 11.43 |
| 220_1 | 35.67 | 2.59 | 103.11 | 28.19 |
| 221_1 | 21.87 | 3.53 | 80.38 | 6.57 |
| 221_2 | 38.08 | 4.00 | 92.15 | 12.10 |
| 221_3 | 40.64 | 9.61 | 107.45 | 5.84 |
| 222_1 | 19.69 | 3.07 | 59.72 | 7.41 |
| 222_2 | 30.77 | 10.21 | 54.26 | 1.45 |
| 223_1 | 78.85 | 28.60 | 90.08 | 12.56 |
| 224_1 | 26.92 | 15.16 | 71.93 | 15.87 |
| 225_1 | 30.24 | 6.80 | 109.61 | 36.24 |
| 226_1 | 35.09 | 15.62 | 107.11 | 10.01 |
| 227_1 | 37.63 | 12.68 | 70.20 | 8.73 |
| 228_1 | 87.69 | 10.70 | 72.25 | 4.00 |
| 229_1 | 44.99 | 22.32 | 77.03 | 46.39 |
| 229_2 | 63.89 | 35.36 | 51.67 | 29.57 |
| 230_1 | 73.08 | 17.58 | 90.57 | 53.08 |
| 230_2 | 36.46 | 5.34 | 61.99 | 30.47 |
| 231_1 | 45.85 | 28.46 | 67.18 | 23.44 |
| 232_1 | 15.33 | 10.56 | 58.98 | 30.05 |
| 233_1 | 92.94 | 7.62 | 60.18 | 12.23 |
| 234_1 | 36.40 | 26.60 | 60.64 | 20.11 |
| 234_2 | 36.46 | 9.00 | 76.75 | 15.69 |
| 234_3 | 55.70 | 17.41 | 72.99 | 21.80 |
| 235_1 | 85.79 | 19.15 | 69.06 | 8.99 |
| 236_1 | 50.52 | 7.64 | 85.61 | 8.75 |
| 237_1 | 94.23 | 25.38 | 79.07 | 31.59 |

CCK8 cellular toxicity was measured as described in the Materials and Methods section to assess if reduction in the viral parameters could be caused by cell death, the closer the value is to 100% the lower the toxicity. The results are shown in table 11. For CCK8 values above 80% of control it is not considered likely that cell death has an impact on the RTEL1 and cccDNA reduction shown in table 10.

TABLE 11

CCK8 cellular toxicity

| Comp ID NO | CCK8 % of Control Mean | SD |
|---|---|---|
| 50_1 | 116.26 | 8.82 |
| 51_1 | 105.05 | 7.05 |
| 52_1 | 82.96 | 6.08 |
| 53_1 | 134.27 | 5.46 |
| 54_1 | 103.38 | 9.14 |
| 55_1 | 71.55 | 5.78 |
| 56_1 | 95.93 | 20.93 |
| 57_1 | 105.94 | 3.64 |
| 57_2 | 111.45 | 11.03 |
| 58_1 | 107.29 | 9.64 |
| 59_1 | 88.76 | 7.99 |
| 60_1 | 107.26 | 3.18 |
| 61_1 | 123.93 | 12.61 |
| 62_1 | 108.72 | 7.62 |
| 63_1 | 98.97 | 11.62 |
| 64_1 | 76.87 | 11.82 |
| 65_1 | 101.36 | 5.18 |
| 66_1 | 89.28 | 6.92 |
| 66_2 | 106.42 | 0.96 |
| 67_1 | 28.82 | 0.83 |
| 68_1 | 118.08 | 11.35 |
| 68_2 | 125.36 | 11.78 |
| 69_1 | 97.66 | 16.30 |
| 70_1 | 120.71 | 12.95 |
| 71_1 | 102.41 | 6.80 |
| 72_1 | 83.17 | 6.40 |
| 73_1 | 55.40 | 2.16 |
| 74_1 | 118.35 | 4.36 |
| 75_1 | 84.55 | 0.14 |
| 76_1 | 102.91 | 13.06 |

TABLE 11-continued

CCK8 cellular toxicity

| Comp ID NO | CCK8 % of Control Mean | SD |
|---|---|---|
| 77_1 | 99.31 | 8.11 |
| 78_1 | #N/A | #N/A |
| 79_1 | 55.12 | 5.20 |
| 80_1 | 90.80 | 2.66 |
| 80_2 | 98.59 | 2.30 |
| 81_1 | 67.03 | 2.60 |
| 82_1 | 59.63 | 2.52 |
| 82_2 | 68.54 | 1.17 |
| 83_1 | 64.43 | 2.61 |
| 83_2 | 64.11 | 0.89 |
| 84_1 | #N/A | #N/A |
| 85_1 | 96.19 | 0.06 |
| 85_2 | 90.23 | 8.54 |
| 86_1 | 89.93 | 1.33 |
| 86_2 | 106.93 | 12.98 |
| 87_1 | #N/A | #N/A |
| 88_1 | 33.65 | 2.65 |
| 89_1 | 95.60 | 3.51 |
| 90_1 | 97.32 | 6.73 |
| 91_1 | 61.96 | 5.80 |
| 92_1 | 64.15 | 10.92 |
| 93_1 | 92.01 | 6.19 |
| 94_1 | 96.44 | 10.38 |
| 95_1 | 80.17 | 2.61 |
| 95_2 | 77.56 | 1.32 |
| 96_1 | #N/A | #N/A |
| 97_1 | #N/A | #N/A |
| 98_1 | 107.81 | 13.88 |
| 99_1 | #N/A | #N/A |
| 100_1 | #N/A | #N/A |
| 101_1 | #N/A | #N/A |
| 102_1 | #N/A | #N/A |
| 103_1 | 114.99 | 24.45 |
| 104_1 | 103.45 | 5.92 |
| 105_1 | 75.27 | 1.94 |
| 105_2 | 61.11 | 2.24 |
| 106_1 | 101.58 | 1.06 |
| 106_2 | 101.83 | 5.69 |
| 107_1 | #N/A | #N/A |
| 108_1 | 103.24 | 5.94 |
| 108_2 | 101.74 | 5.49 |
| 108_3 | 90.13 | 13.66 |
| 109_1 | 100.11 | 4.80 |
| 109_2 | 113.58 | 2.84 |
| 110_1 | #N/A | #N/A |
| 111_1 | 92.73 | 1.91 |
| 112_1 | 105.20 | 2.71 |
| 113_1 | 103.59 | 5.78 |
| 114_1 | 103.47 | 7.90 |
| 115_1 | 107.24 | 8.20 |
| 116_1 | 85.06 | 7.26 |
| 116_2 | 80.29 | 5.56 |
| 117_1 | #N/A | #N/A |
| 117_2 | 95.10 | 2.33 |
| 117_3 | 96.89 | 13.60 |
| 118_1 | #N/A | #N/A |
| 119_1 | 85.82 | 4.56 |
| 120_1 | 85.68 | 11.44 |
| 120_2 | 93.79 | 5.14 |
| 121_1 | #N/A | #N/A |
| 122_1 | 144.58 | 44.88 |
| 122_2 | 113.11 | 8.57 |
| 123_1 | 59.62 | 9.47 |
| 124_1 | 52.57 | 2.90 |
| 125_1 | 101.47 | 7.25 |
| 126_1 | 129.31 | 9.43 |
| 127_1 | 87.40 | 4.43 |
| 128_1 | 80.60 | 7.16 |
| 129_1 | 95.26 | 0.97 |
| 130_1 | 125.56 | 4.29 |
| 131_1 | 107.17 | 5.92 |
| 132_1 | 21.86 | 2.92 |
| 133_1 | 77.50 | 10.35 |
| 134_1 | 106.91 | 0.79 |
| 135_1 | 103.33 | 1.13 |
| 136_1 | 64.06 | 3.46 |
| 137_1 | 70.57 | 14.52 |
| 138_1 | 70.14 | 17.00 |
| 139_1 | 62.23 | 1.13 |
| 139_2 | 59.93 | 2.52 |
| 140_1 | 90.30 | 7.69 |
| 141_1 | 63.42 | 2.15 |
| 142_1 | 123.38 | 47.71 |
| 143_1 | 69.90 | 3.87 |
| 144_1 | #N/A | #N/A |
| 145_1 | #N/A | #N/A |
| 145_2 | #N/A | #N/A |
| 146_1 | #N/A | #N/A |
| 147_1 | #N/A | #N/A |
| 147_2 | #N/A | #N/A |
| 148_1 | #N/A | #N/A |
| 149_1 | 107.30 | 13.12 |
| 150_1 | 112.39 | 27.25 |
| 151_1 | 72.22 | 6.20 |
| 152_1 | 128.68 | 44.31 |
| 153_1 | 148.38 | 11.62 |
| 153_2 | 136.75 | 4.21 |
| 154_1 | 99.55 | 5.83 |
| 155_1 | 110.71 | 8.09 |
| 156_1 | 116.06 | 0.75 |
| 157_1 | 106.15 | 16.19 |
| 158_1 | 98.71 | 16.36 |
| 158_2 | 85.55 | 5.15 |
| 159_1 | 118.35 | 1.48 |
| 160_1 | 165.75 | 9.61 |
| 161_1 | 158.90 | 0.88 |
| 162_1 | 104.97 | 1.85 |
| 163_1 | 133.83 | 9.44 |
| 164_1 | 84.46 | 17.61 |
| 165_1 | 95.10 | 11.69 |
| 166_1 | 74.96 | 8.17 |
| 167_1 | 68.09 | 11.24 |
| 168_1 | 90.07 | 16.56 |
| 169_1 | 92.53 | 8.41 |
| 169_2 | 102.95 | 9.23 |
| 169_3 | 100.23 | 4.07 |
| 170_1 | 100.71 | 10.54 |
| 171_1 | 120.58 | 39.11 |
| 172_1 | 113.47 | 9.82 |
| 173_1 | 102.28 | 2.81 |
| 174_1 | 87.69 | 3.76 |
| 175_1 | 122.11 | 5.30 |
| 176_1 | 69.43 | 2.44 |
| 177_1 | 108.37 | 7.16 |
| 178_1 | 107.27 | 9.14 |
| 178_2 | 117.93 | 3.77 |
| 179_1 | 114.12 | 5.05 |
| 180_1 | 93.24 | 2.68 |
| 181_1 | 98.66 | 2.53 |
| 182_1 | 89.46 | 7.87 |
| 183_1 | 83.55 | 4.22 |
| 184_1 | 70.62 | 12.67 |
| 185_1 | 97.55 | 10.88 |
| 186_1 | 96.65 | 8.31 |
| 187_1 | 54.10 | 8.19 |
| 188_1 | 101.60 | 8.41 |
| 189_1 | 68.00 | 10.70 |
| 190_1 | 141.71 | 16.49 |
| 190_2 | 83.85 | 6.76 |
| 191_1 | 148.53 | 8.91 |
| 192_1 | 106.29 | 5.85 |
| 192_2 | 85.20 | 10.09 |
| 193_1 | 91.71 | 5.71 |
| 193_2 | 73.38 | 2.71 |
| 194_1 | 93.19 | 4.43 |
| 195_1 | 95.70 | 2.72 |
| 196_1 | 67.40 | 8.02 |
| 197_1 | 114.76 | 21.86 |

TABLE 11-continued

CCK8 cellular toxicity

| Comp ID NO | CCK8 % of Control | |
|---|---|---|
| | Mean | SD |
| 198_1 | 85.13 | 6.45 |
| 199_1 | 91.59 | 3.24 |
| 200_1 | 87.64 | 6.54 |
| 201_1 | 101.76 | 5.01 |
| 201_2 | 110.01 | 8.04 |
| 202_1 | 85.95 | 4.63 |
| 202_2 | 88.94 | 3.52 |
| 203_1 | 92.92 | 2.20 |
| 203_2 | 104.16 | 3.17 |
| 203_3 | 129.86 | 20.13 |
| 204_1 | 112.00 | 27.06 |
| 205_1 | 87.02 | 9.91 |
| 206_1 | 90.88 | 10.42 |
| 206_2 | 67.71 | 14.83 |
| 207_1 | 93.70 | 3.15 |
| 208_1 | 90.05 | 3.01 |
| 209_1 | 69.85 | 4.14 |
| 210_1 | 86.07 | 4.68 |
| 210_2 | 84.28 | 15.59 |
| 211_1 | 101.07 | 4.83 |
| 212_1 | 94.44 | 4.57 |
| 213_1 | 99.59 | 14.01 |
| 214_1 | #N/A | #N/A |
| 215_1 | #N/A | #N/A |
| 216_1 | 96.46 | 10.44 |
| 216_2 | 103.47 | 4.95 |
| 217_1 | 104.08 | 4.88 |
| 218_1 | #N/A | #N/A |
| 219_1 | 112.81 | 6.71 |
| 220_1 | 93.55 | 8.40 |
| 221_1 | #N/A | #N/A |
| 221_2 | 93.70 | 5.32 |
| 221_3 | 106.21 | 8.49 |
| 222_1 | 97.90 | 13.52 |
| 222_2 | 103.67 | 13.27 |
| 223_1 | 78.11 | 5.49 |
| 224_1 | #N/A | #N/A |
| 225_1 | #N/A | #N/A |
| 226_1 | 98.77 | 6.85 |
| 227_1 | 132.53 | 18.49 |
| 228_1 | 90.41 | 3.32 |
| 229_1 | 107.49 | 3.69 |
| 229_2 | 92.21 | 3.07 |
| 230_1 | 93.65 | 2.24 |
| 230_2 | 105.60 | 5.47 |
| 231_1 | 97.51 | 5.97 |
| 232_1 | 111.24 | 3.86 |
| 233_1 | 119.06 | 18.13 |
| 234_1 | 85.73 | 12.74 |
| 234_2 | 101.48 | 9.74 |
| 234_3 | 91.68 | 23.71 |
| 235_1 | 93.48 | 9.09 |
| 236_1 | 95.73 | 8.67 |
| 237_1 | 87.22 | 5.14 |

NA means that the CCK8 was not measured for the indicated compound.

The results show that of the 236 oligonucleotides in the library only 5% were not able to reduce at least either RTEL1 or cccDNA to at least 80% of the control. From this it can be seen that it is possible to produce oligonucleotides targeting across the entire RTEL1 transcript which are capable of reducing RTEL1 and/or cccDNA, generally the reduction in RTEL1 and cccDNA are not due to cell death, although it may be the case for a few of the compounds.

The invention claimed is:

1. A method of treating or preventing a Hepatitis B virus (HBV) infection in a subject, the method comprising administering a therapeutically or prophylactically effective amount of a RTEL1 inhibitor to the subject, wherein the RTEL1 inhibitor is an oligonucleotide of 12 to 60 nucleotides in length comprising a contiguous nucleotide sequence of at least 10 nucleotides in length which is at least 95% complementary to a mammalian RTEL1 target nucleic acid, and wherein the RTEL1 inhibitor is capable of reducing RTEL1 mRNA expression in a target cell.

2. The method of claim 1, wherein the HBV infection is a chronic HBV infection.

3. The method of claim 1, wherein the RTEL1 inhibitor is capable of reducing a level of covalently closed circular DNA (cccDNA) in an infected cell.

4. The method of claim 1, wherein the RTEL1 inhibitor is selected from the group consisting of a single-stranded antisense oligonucleotide, siRNA molecule, and shRNA molecule.

5. The method of claim 1, wherein the mammalian RTEL1 target nucleic acid is SEQ ID NO: 1 or SEQ ID NO: 2.

6. The method of claim 1, wherein the contiguous nucleotide sequence has at least 98% complementarity to the mammalian RTEL1 target nucleic acid of SEQ ID NO: 1 and SEQ ID NO: 2.

7. The method of claim 3, wherein the cccDNA in the infected cell is reduced by at least 60% as compared to a control.

8. The method of claim 1, wherein the RTEL1 mRNA expression is reduced by at least 60% in the target cell as compared to a control.

* * * * *